(12) United States Patent
Okur

(10) Patent No.: US 11,944,103 B2
(45) Date of Patent: Apr. 2, 2024

(54) DEVICE FOR COOKING AND TOPPING OF FOOD

(71) Applicant: Muhammed A. Okur, Hermosa Beach, CA (US)

(72) Inventor: Muhammed A. Okur, Hermosa Beach, CA (US)

(*) Notice: Subject to any disclaimer, the term of this patent is extended or adjusted under 35 U.S.C. 154(b) by 650 days.

(21) Appl. No.: 16/864,907

(22) Filed: May 1, 2020

(65) Prior Publication Data

US 2021/0076687 A1    Mar. 18, 2021

Related U.S. Application Data

(60) Provisional application No. 62/843,015, filed on May 3, 2019.

(51) Int. Cl.
*A21C 15/00* (2006.01)
*A47J 37/06* (2006.01)
*A47J 37/08* (2006.01)

(52) U.S. Cl.
CPC ......... *A21C 15/002* (2013.01); *A47J 37/0664* (2013.01); *A47J 37/0871* (2013.01)

(58) Field of Classification Search
USPC .......................... 118/13, 24, 58, 64, 695, 696
See application file for complete search history.

(56) References Cited

U.S. PATENT DOCUMENTS

| | | | | |
|---|---|---|---|---|
| 2,597,271 | A * | 5/1952 | Williams | A21B 5/00 425/308 |
| 5,409,533 | A | 4/1995 | Pretty | |
| 6,157,002 | A * | 12/2000 | Schjerven, Sr. | A21B 2/00 219/494 |
| 6,386,095 | B1 * | 5/2002 | Ausaf | A47J 37/044 99/421 H |
| 7,848,906 | B2 * | 12/2010 | Keyes, IV | G05B 19/4183 702/182 |
| 2009/0223380 | A1 | 9/2009 | Van Aken | |
| 2015/0107465 | A1 | 4/2015 | Harter et al. | |
| 2015/0108162 | A1 | 4/2015 | Harter et al. | |

FOREIGN PATENT DOCUMENTS

| | | |
|---|---|---|
| CN | 202801322 U | 3/2013 |
| CN | 205052681 U | 3/2016 |
| EP | 1488701 A1 | 12/2004 |
| KR | 1012875520000 | 7/2013 |
| KR | 1020130035611 | 7/2013 |
| WO | 2008090491 | 1/2007 |

* cited by examiner

*Primary Examiner* — Yewebdar T Tadesse
(74) *Attorney, Agent, or Firm* — Milord A. Keshishian

(57) ABSTRACT

A device, comprising a cooker and a topper for auto cooking and or topping of food.

4 Claims, 156 Drawing Sheets

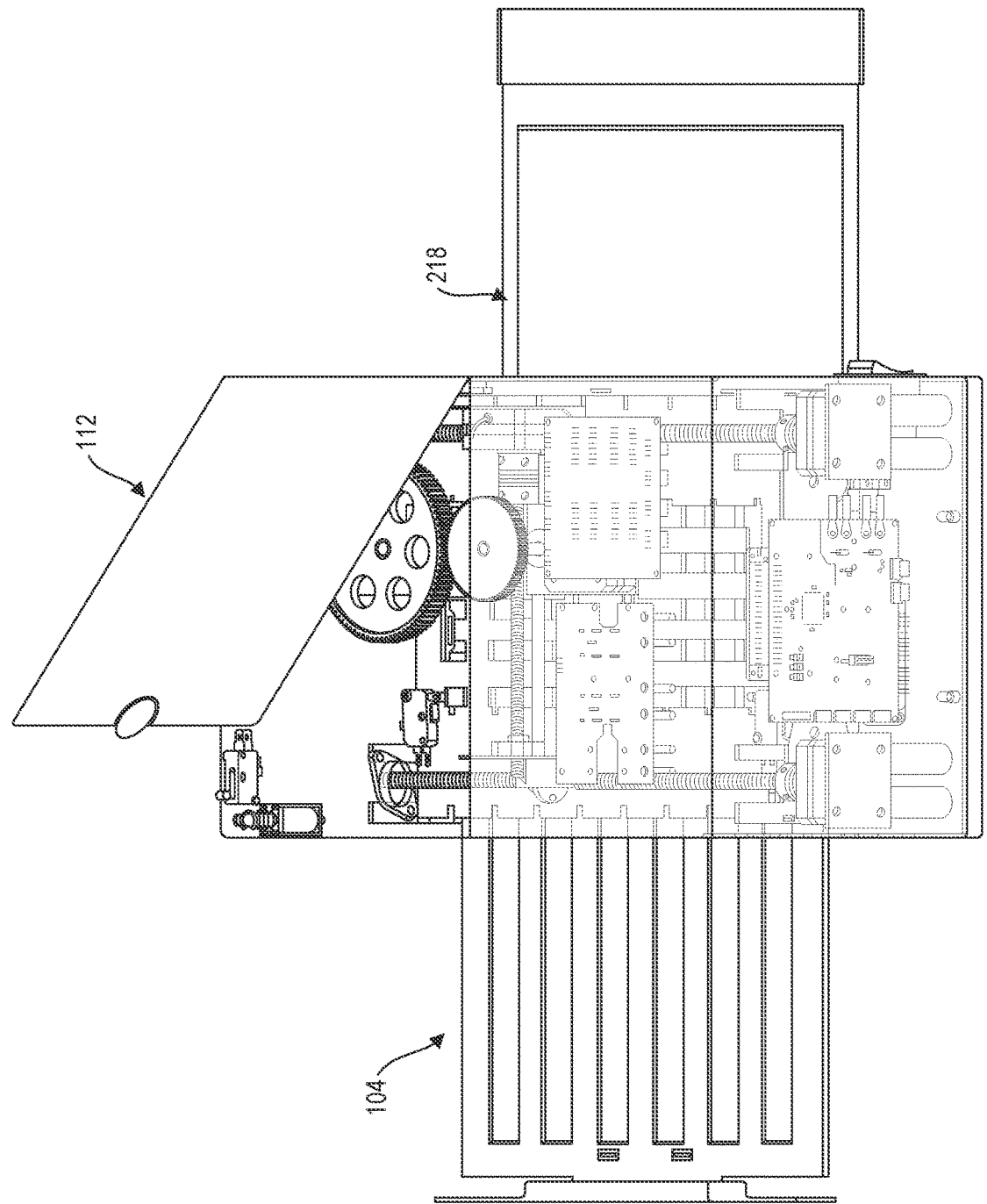

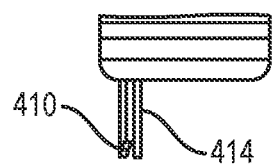
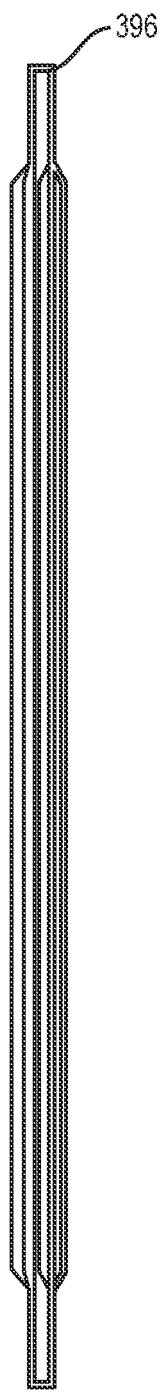
FIG. 8J

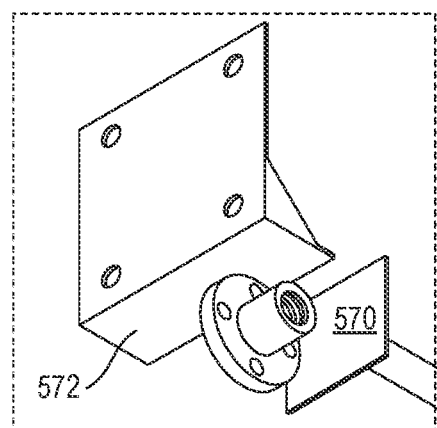
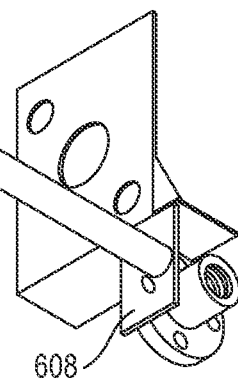
FIG. 14E
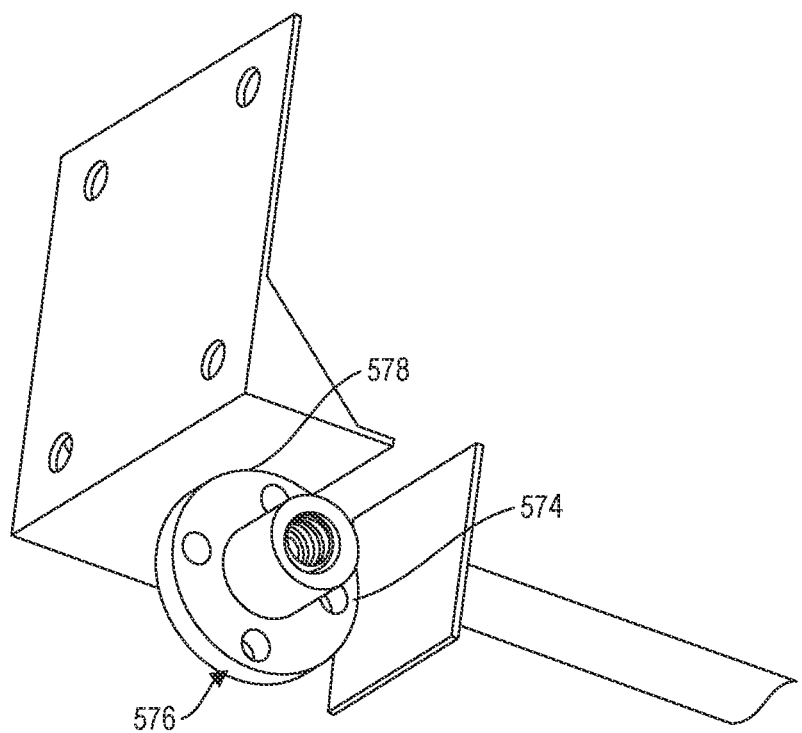
FIG. 14F

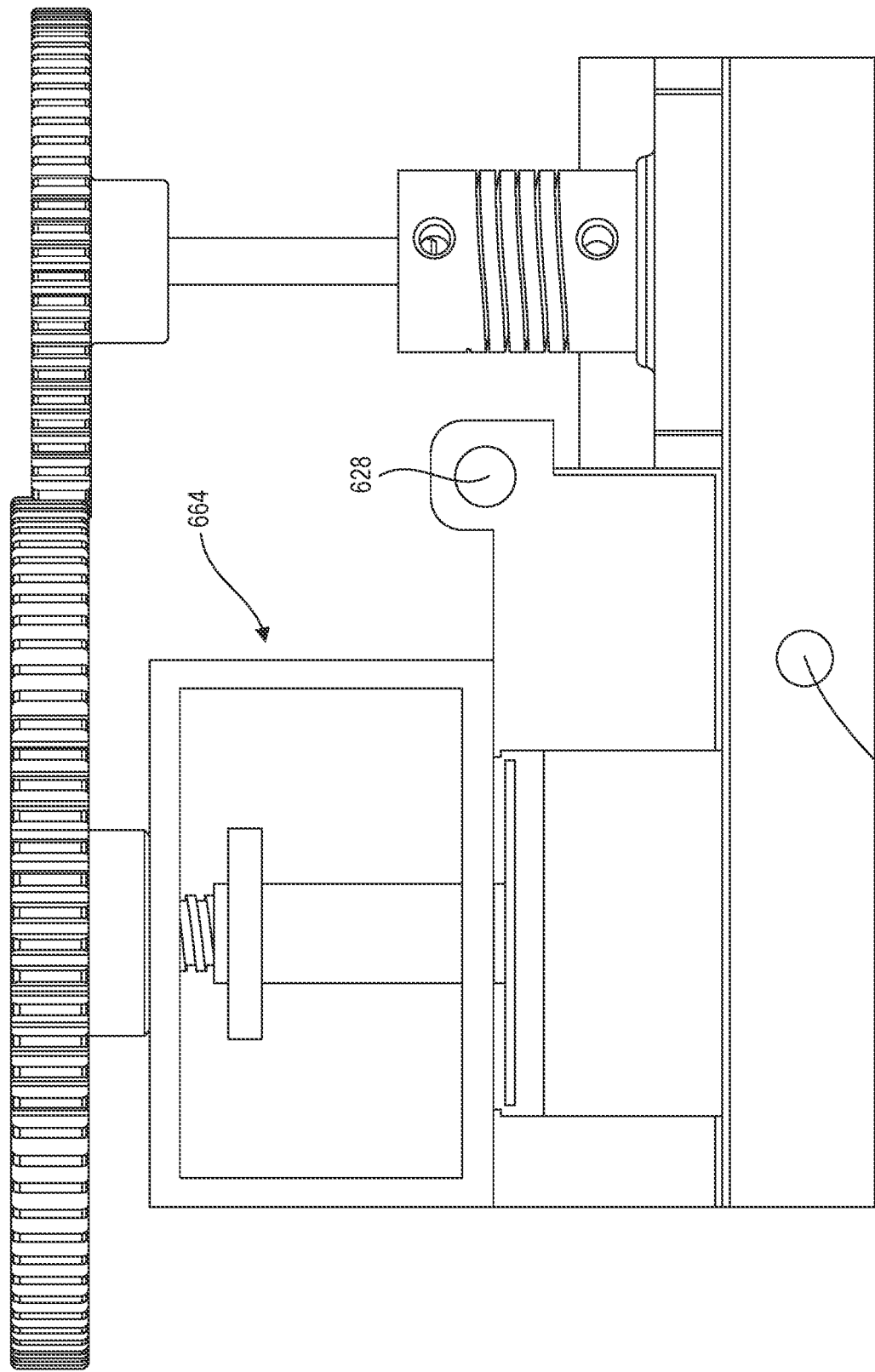

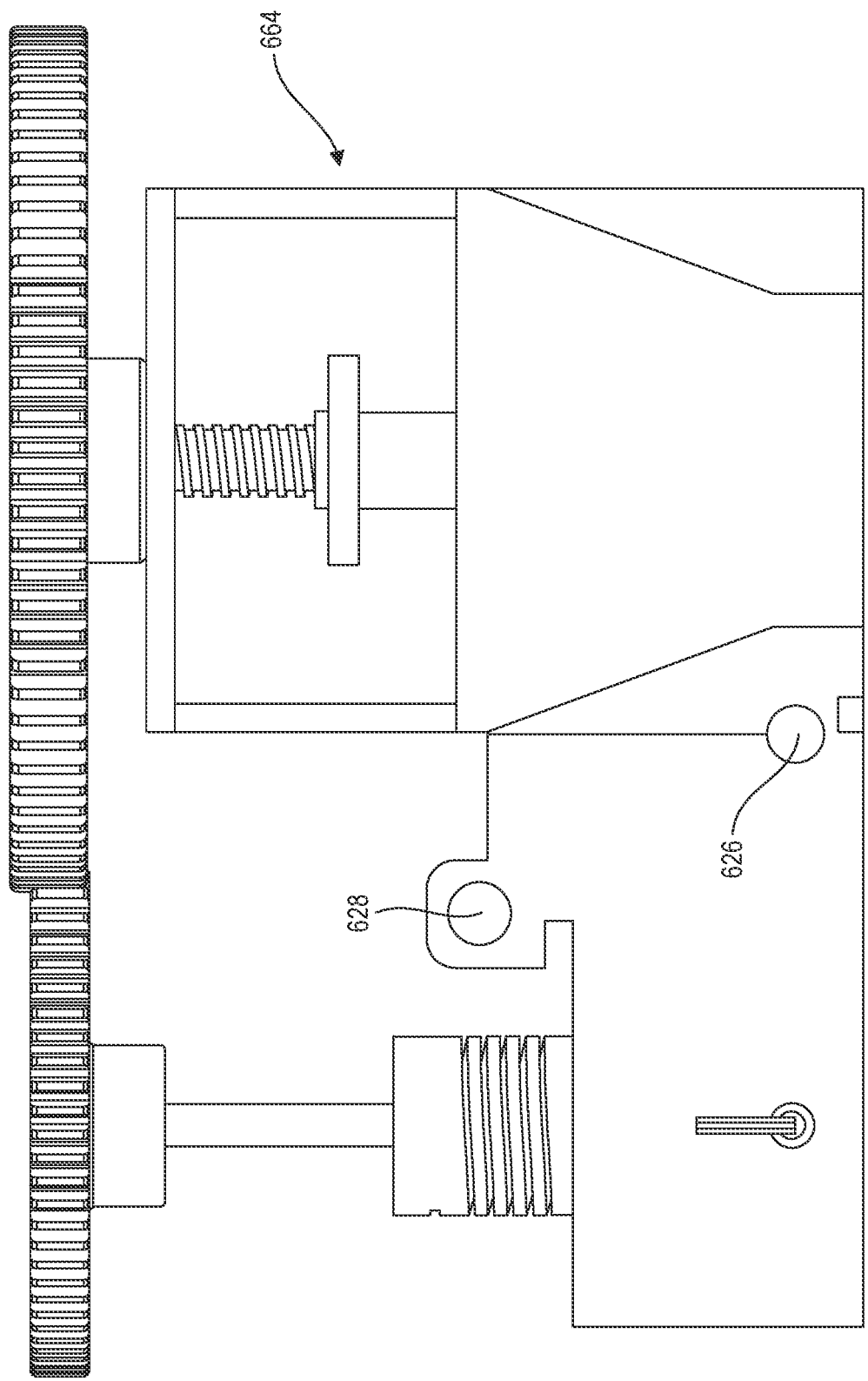

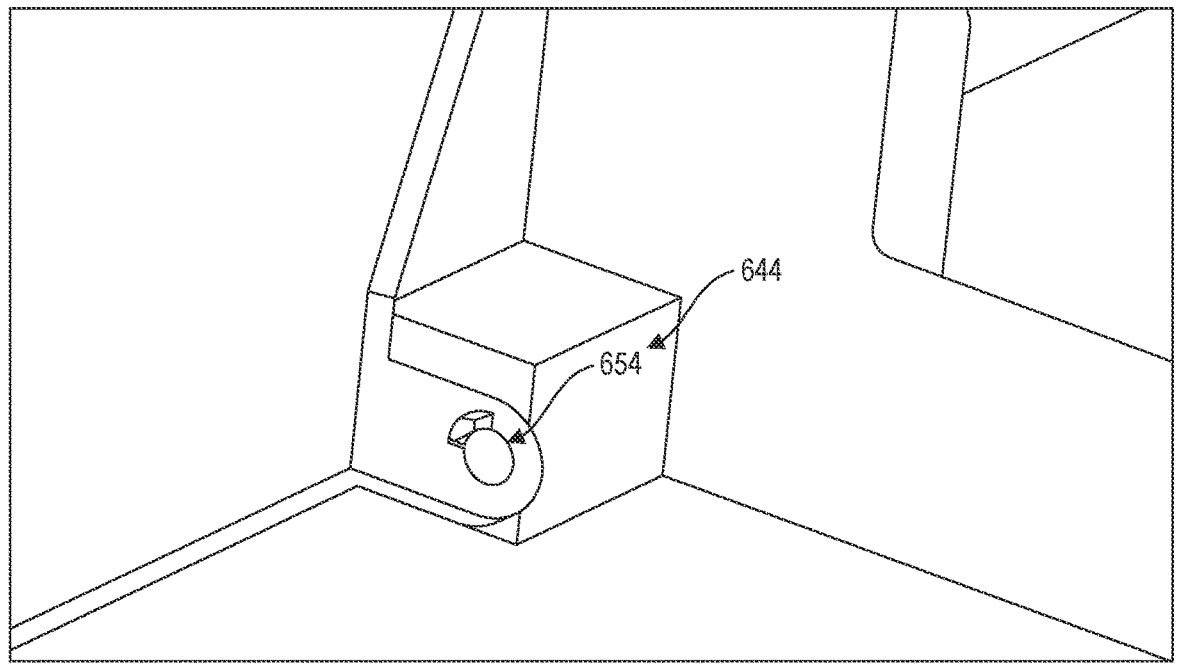
FIG. 15H
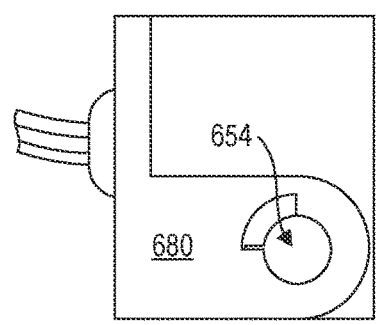 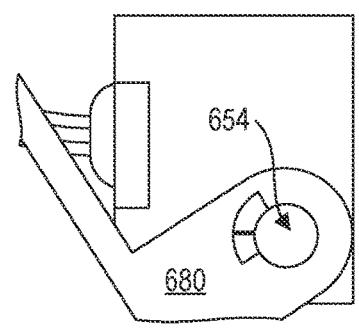 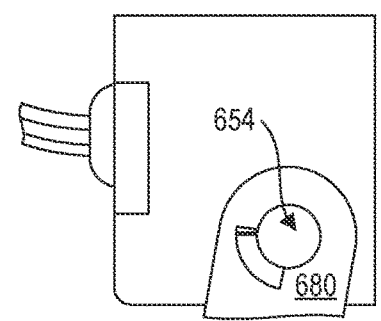
FIG. 15I-1  FIG. 15I-2  FIG. 15I-3

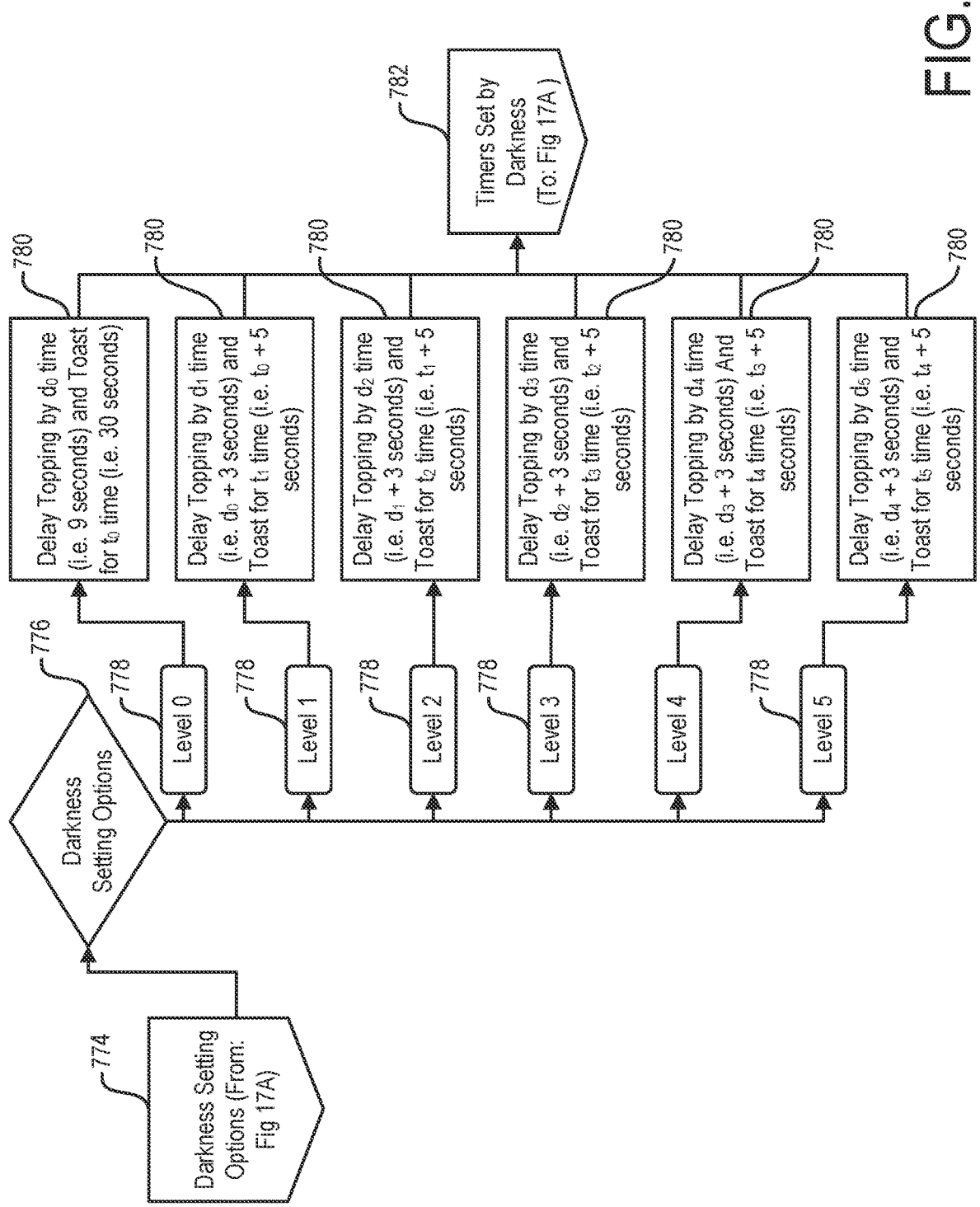

DEVICE FOR COOKING AND TOPPING OF FOOD

CROSS-REFERENCE TO RELATED APPLICATIONS

This application claims the benefit of priority of co-pending U.S. Utility Provisional Patent Application 62/843,015, filed May 3, 2019, the entire disclosure of which is expressly incorporated by reference in its entirety herein.

All documents mentioned in this specification are herein incorporated by reference to the same extent as if each individual document was specifically and individually indicated to be incorporated by reference.

It should be noted that throughout the disclosure, where a definition or use of a term in any incorporated document(s) is inconsistent or contrary to the definition of that term provided herein, the definition of that term provided herein applies and the definition of that term in the incorporated document(s) does not apply.

BACKGROUND OF THE INVENTION

Field of the Invention

One or more embodiments of the present invention relate to an appliance device and, more particularly, to a device for cooking and topping of food.

Description of Related Art

Conventional toasters are well known and have been in use for a number of years. Regrettably, known toasters do not have the means or the capability to add toppings (cheese, butter, candy sprinkles, etc.) onto a base food (bread, meat, etc.). In other words, toasters have no means to provide for a layer of food to be pour or spread over a base of a different type of food.

Accordingly, in light of the current state of the art and the drawbacks to current toasters mentioned above, a need exists for a device that would enable cooking and topping of food.

BRIEF SUMMARY OF THE INVENTION

A non-limiting, exemplary aspect of an embodiment of the present invention provides a device for cooking and topping of food, comprising:
  a cooker; and
  a topper;
  wherein:
  a base food item is cooked and topped with a topping food item if both the cooker and the topper are ON;
  the base food item is cooked without the topping food item if the cooker is ON and the topper if OFF;
  the base food item is topped with the topping food item without cooking if the topper is ON and the cooker is OFF.

Another non-limiting, exemplary aspect of an embodiment of the present invention provides a device for cooking and topping of food, comprising: a cooker;
  a topper;
  a tray for positioning a base food item within the device; and
  a control panel for turning ON the cooker, the topper, or both the cooker and the topper, wherein:
  the base food item on the tray is cooked and topped with a topping food item if both the cooker and the topper are ON;
  the base food item on the tray is cooked without the topping food item if the cooker is ON and the topper if OFF;
  the base food item on the tray is topped with the topping food item without cooking if the topper is ON and the cooker is OFF.

Still a further non-limiting, exemplary aspect of an embodiment of the present invention provides a device, comprising:
  a cooker and a topper for cooking and topping of food.

These and other features and aspects of the invention will be apparent to those skilled in the art from the following detailed description of preferred non-limiting exemplary embodiments, taken together with the drawings and the claims that follow.

BRIEF DESCRIPTION OF THE DRAWINGS

It is to be understood that the drawings are to be used for the purposes of exemplary illustration only and not as a definition of the limits of the invention. Throughout the disclosure, the word "exemplary" may be used to mean "serving as an example, instance, or illustration," but the absence of the term "exemplary" does not denote a limiting embodiment. Any embodiment described as "exemplary" is not necessarily to be construed as preferred or advantageous over other embodiments. In the drawings, like reference character(s) present corresponding part(s) throughout.

FIGS. 1A to 1M-9 are non-limiting, exemplary illustrations of a device for cooking and topping of food, progressively illustrating a non-limiting, exemplary method of usage thereof in accordance with one or more embodiments of the present invention;

FIGS. 2A to 2L are non-limiting, exemplary systems overview illustrations of the device shown in FIGS. 1A to 1M-9, illustrating details of the various components in accordance with one or more embodiments of the present invention;

FIGS. 8A to 8J are non-limiting, exemplary illustrations of main tray of device shown in FIGS. 1A to 7H in accordance with one or more embodiments of the present invention;

FIGS. 14A to 14H are non-limiting, exemplary illustrations of Y-motive force platform of device shown in FIGS. 1A to 13F in accordance with one or more embodiments of the present invention;

FIGS. 16A to 16B-2 are non-limiting, exemplary illustrations of electrical circuitry of device shown in FIGS. 1A to 15N-2 in accordance with one or more embodiments of the present invention.

DETAILED DESCRIPTION OF THE INVENTION

Figure 1A:
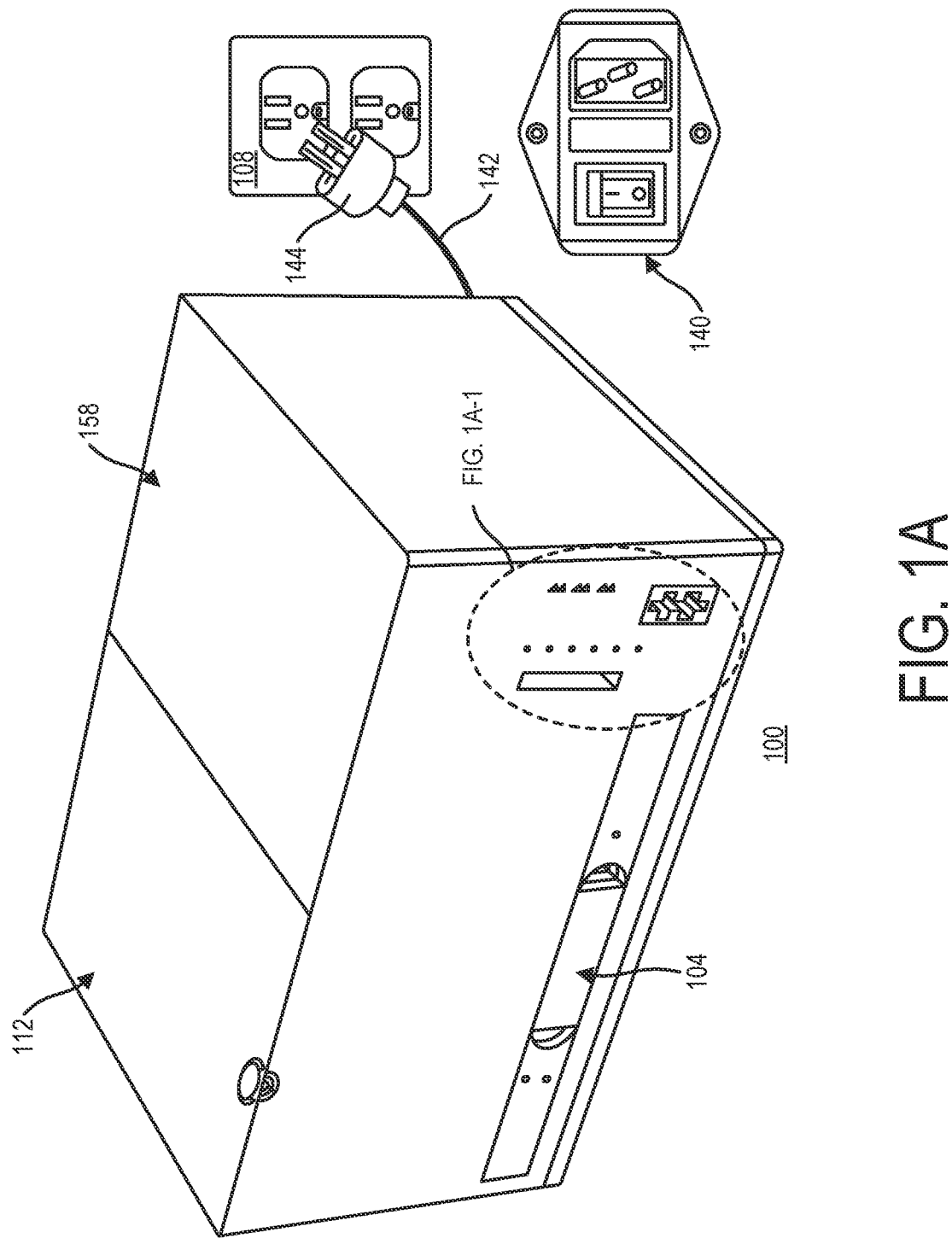

The detailed description set forth below in connection with the appended drawings is intended as a description of presently preferred embodiments of the invention and is not intended to represent the only forms in which the present invention may be constructed and or utilized.

It is to be appreciated that certain features of the invention, which are, for clarity, described in the context of separate embodiments, may also be provided in combination in a single embodiment. Conversely, various features of the invention that are, for brevity, described in the context of a single embodiment may also be provided separately or in any suitable sub-combination or as suitable in any other described embodiment of the invention. Stated otherwise, although the invention is described below in terms of various exemplary embodiments and implementations, it should be understood that the various features and aspects described in one or more of the individual embodiments are not limited in their applicability to the particular embodiment with which they are described, but instead can be applied, alone or in various combinations, to one or more of the other embodiments of the invention.

For purposes of illustration, programs and other executable program components are illustrated herein as discrete blocks, although it is recognized that such programs and components may reside at various times in different storage components, and are executed by the data processor(s) of the computers. Further, each block within a flowchart (if a flowchart is used) may represent both method function(s), operation(s), or act(s) and one or more elements for performing the method function(s), operation(s), or act(s). In addition, depending upon the implementation, the corresponding one or more elements may be configured in hardware, software, firmware, or combinations thereof.

Throughout the disclosure, references to a toaster are meant as illustrative, convenience of example, and for discussion purposes only. That is, the one or more embodiments of present invention provide a cooking device that should not be limited to mere toaster or toaster oven types but may be used to actually cook and bake food, including of course, toasting and topping of food.

It should be noted that throughout the disclosure of the present invention, the use of terms such as "cook," "bake," "toast," their derivatives, or equivalents thereof are considered equivalent and interchangeable. The applicant has elected to use these similar terms throughout the disclosure for an easier read of the specification and the claims.

One or more embodiments of the present invention define the term "cook" as preparing food by combining ingredients in various ways, which may include heating.

One or more embodiments of the present invention define the term "topping" as one or more layers of food poured onto and or spread over a base of a different type of food.

It should be noted that the device for cooking and topping of the present invention provides a user interface that is understandable by human intellect and human senses for interaction. A non-limiting example of a user interface may include the use of physical controls or a graphic user interface (GUI) to allow a visual way of interacting with the device.

The disclosed user interface provided throughout the disclosure is meant to be illustrative and for convenience of example only and should not be limiting. Therefore, the present invention is not limited to any particular physical controls or any GUI configuration and may be implemented in a variety of different types of user interfaces.

Further, all physical controls or GUI representations of any concepts, aspects, functions, or features may be varied and therefore, none should be limiting. The non-limiting, non-exhaustive illustrations of the physical controls used throughout the disclosure are provided only for a framework for discussion and may easily be converted to touch screen with GUI representations.

One or more embodiments of the present invention provide a device for cooking and topping food.

FIGS. 1A to 1M-9 are non-limiting, exemplary illustrations of a device for cooking and topping of food, progressively illustrating a non-limiting, exemplary method of usage thereof in accordance with one or more embodiments of the present invention. As illustrated in FIGS. 1A to 1M-9, device for cooking and topping of food (hereinafter, "device") 100 includes a control user interface 102 (best shown in FIG. 1A-1) that may be used to operate device 100.

Device 100 further includes a main tray 104 (FIG. 1A) for positioning a base food item 106 for cooking and or topping. Also include is a topping cover 112 that may be opened (FIG. 1D) to allow access to a topping dispenser mechanism 114 (detailed below). As with other electrical device, device 100 must be plugged into an outlet 108 in order to commence operation of device 100.

To turn on device 100 after it is plugged into outlet 108, user must actuate main power switch 140 (FIG. 1A) to an ON position. Main power switch 140 in the ON position is the power source gate that provides 110V AC/5A power to device 100. Often times, this main power switch 140 is at the back of device 100 and may be kept ON and will not require to be switched for every use, very similar to most appliances. Main power switch 140 may comprise of any well-known switch, a non-limiting, example of which may be a well-known rocker switch as illustrated, that receives one plug-end (not shown) of power cord 142, with the other plug-end 144 of power cord 142 plugged into outlet 108.

Once device 100 is plugged into outlet 108 and power switch 140 is ON, users may simply pull out main tray 104 by pulling tray handle 110 (FIG. 1B) and extend tray to a fully extracted position (FIG. 1C), and place base food item 106 onto main tray 104 (same operation as a regular oven toaster). Thereafter, main tray 104 is pushed back in all the way (FIG. 1D) until it is locked or flush with the body of the toaster. The device cannot be operated with the main tray 104 improperly closed.

As further detailed below, positioned adjacent main tray 104, there is a tray limiter switch (mechanical end-stop) 266 that is pushed in (closed) when main tray 104 is closed properly which transmits signal to a controller unit PCB 260 to activate (turn ON) user interface 102. When tray limiter switch 266 is open (because main tray 104 is out), then user interface 102 will not activate (or turn ON) and will remain OFF.

Further included is a tray solenoid switch 268 that magnetically maintains main tray 104 in a closed position during operation (e.g., toasting and/or topping operations) of device 100. Once operations are completed, tray solenoid switch 268 is powered OFF to allow main tray 104 to be moved to an open position.

Figures 1, 1A:
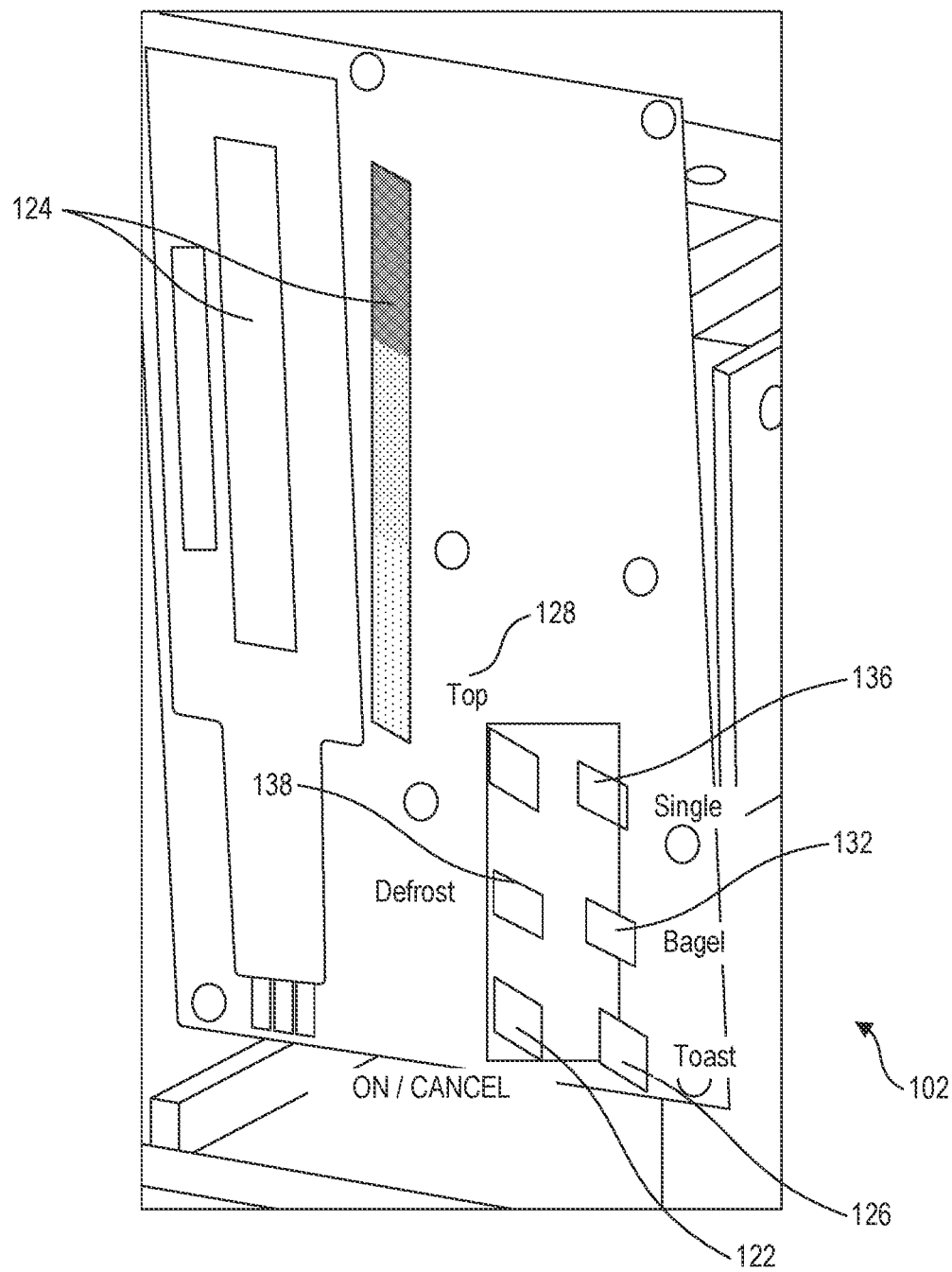
Figure 1B:
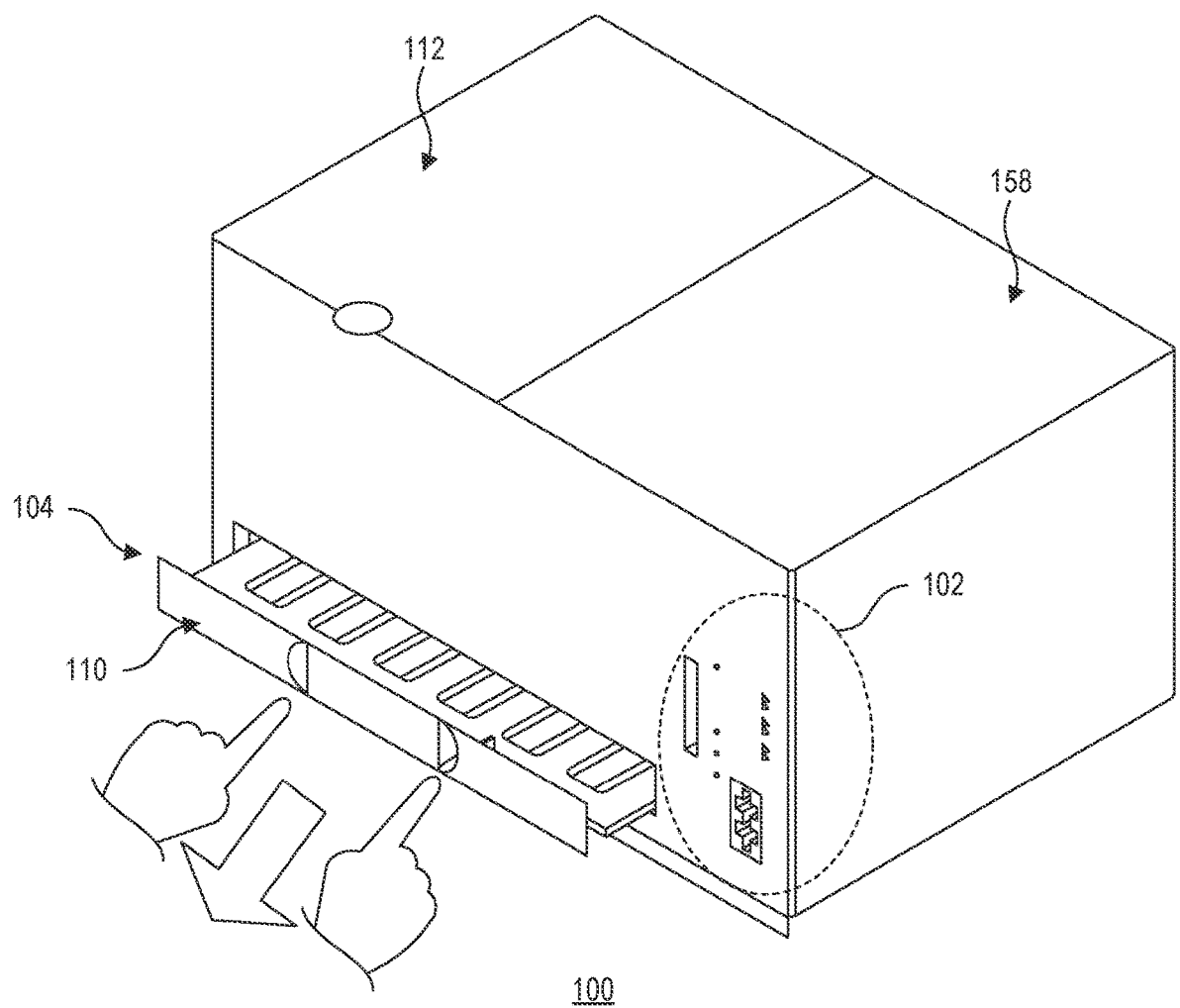
Figure 1C:
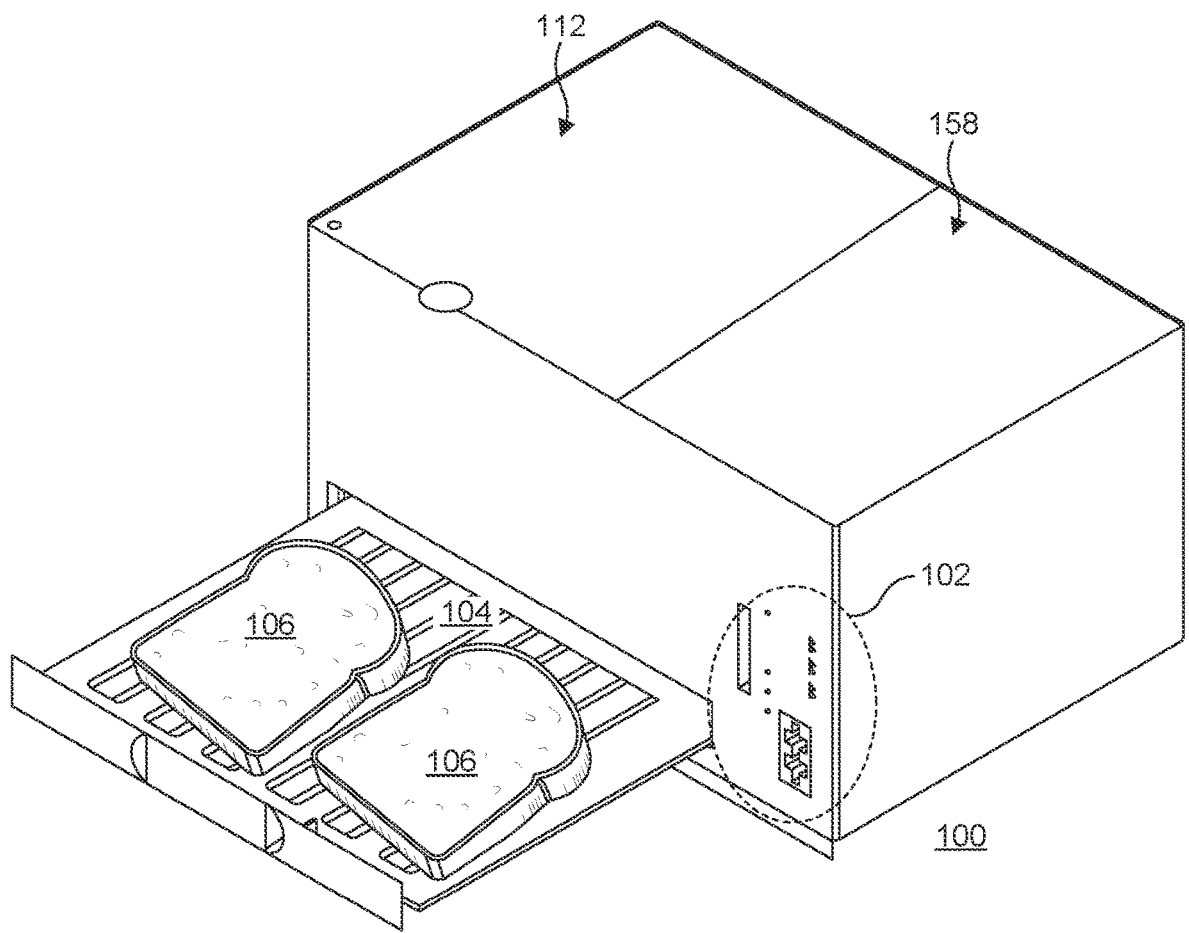
Figure 1D:
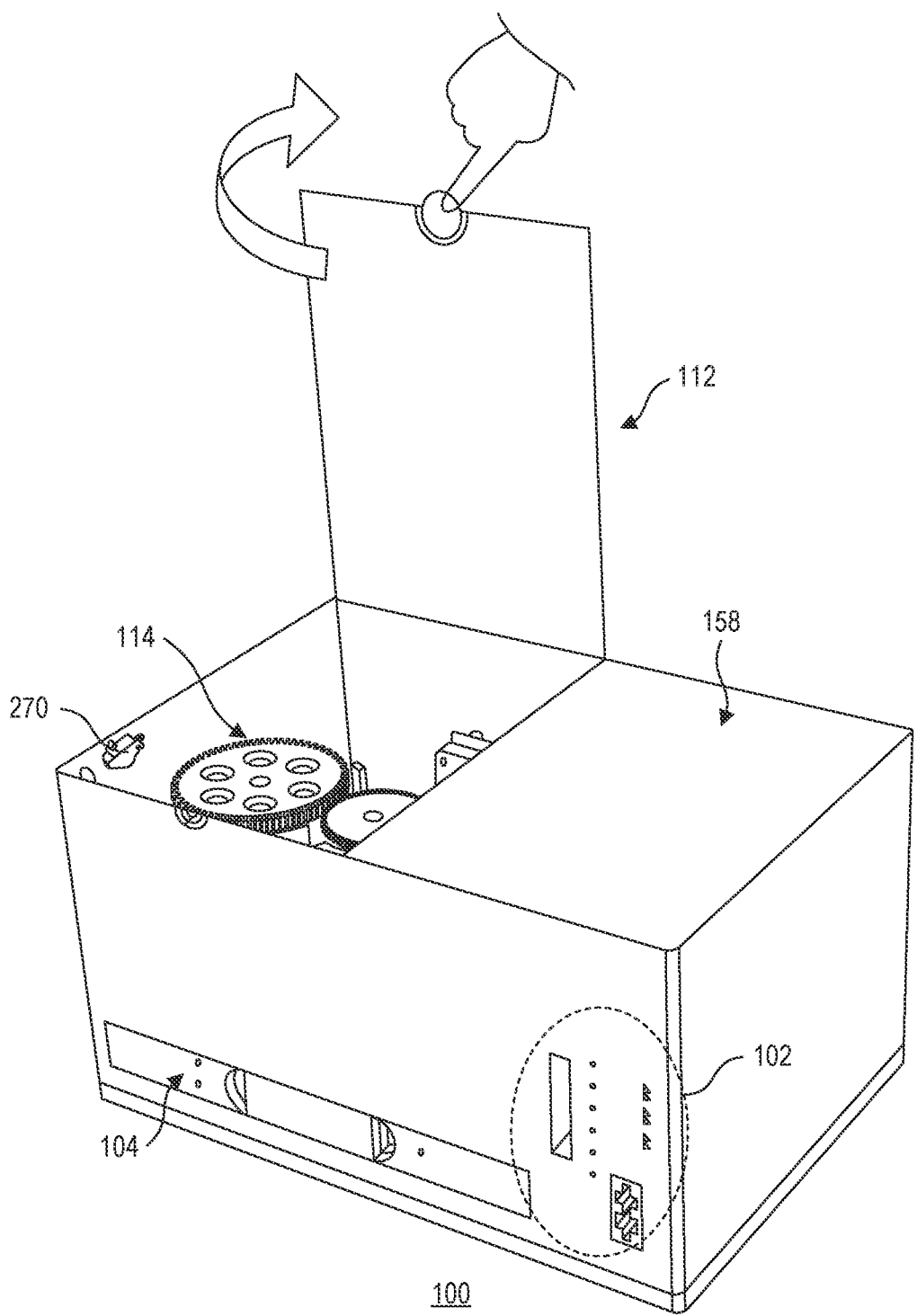
Figures 1, 1E:
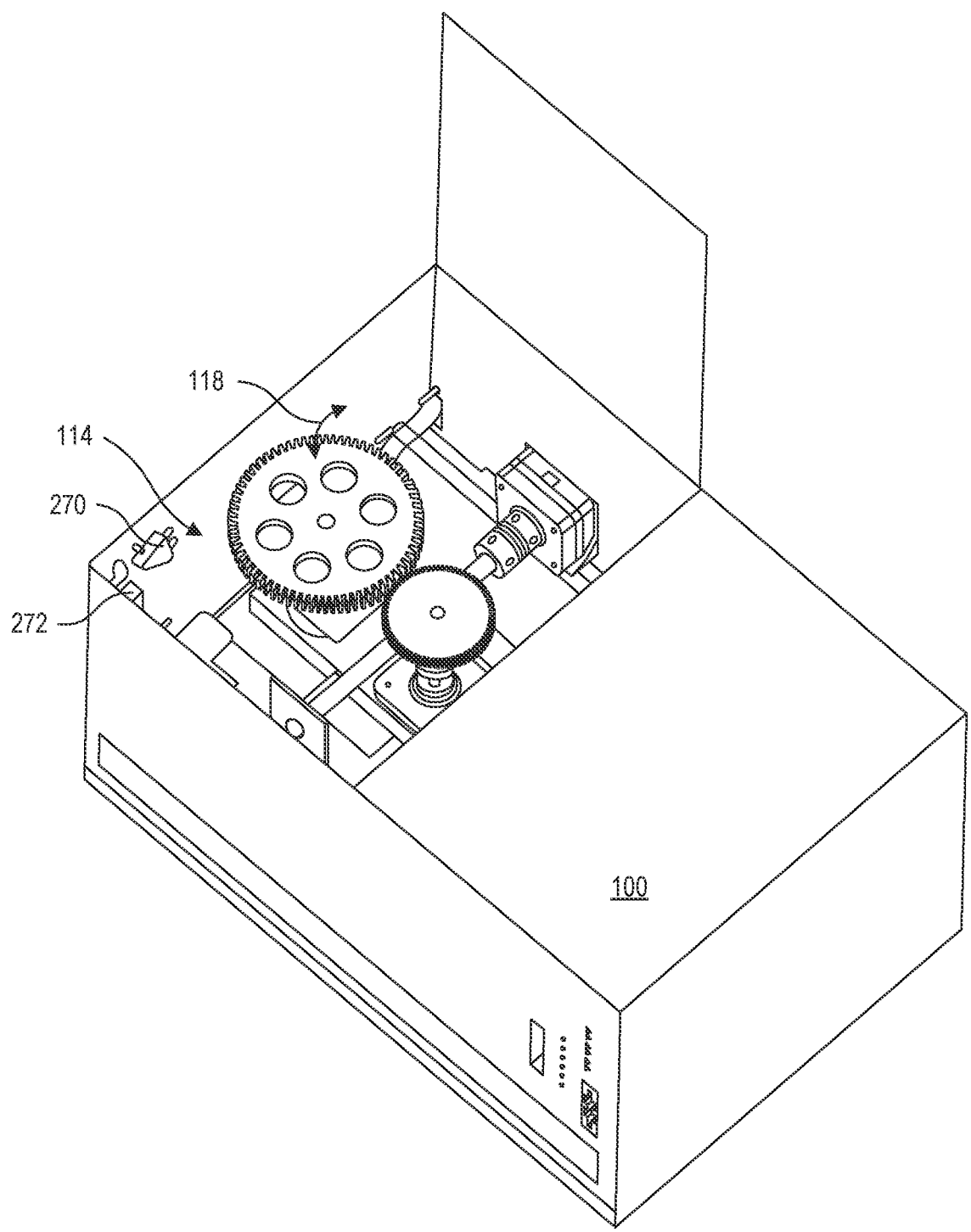
Figures 1, 1E, 2:
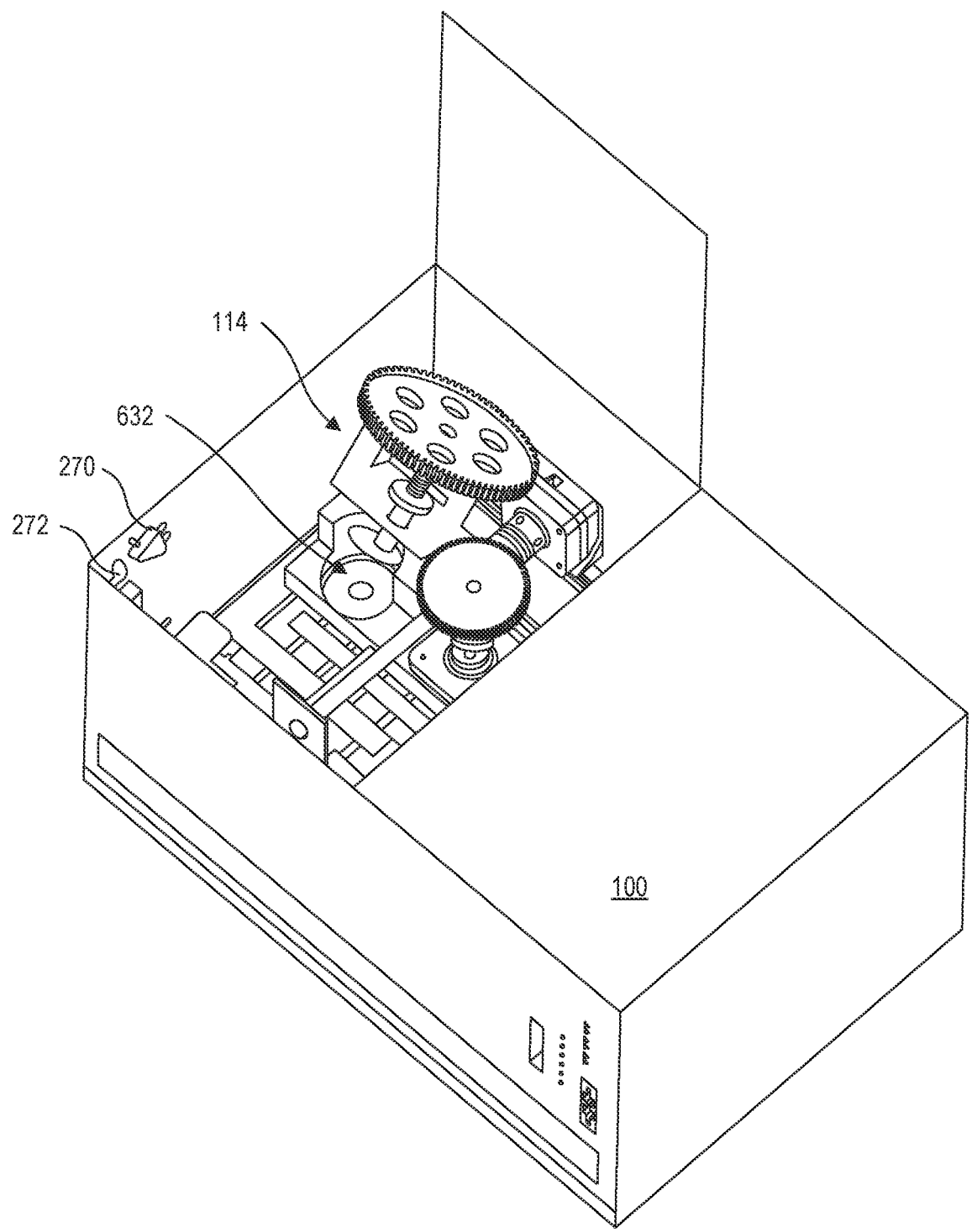
Figures 1, 1E, 2, 3:
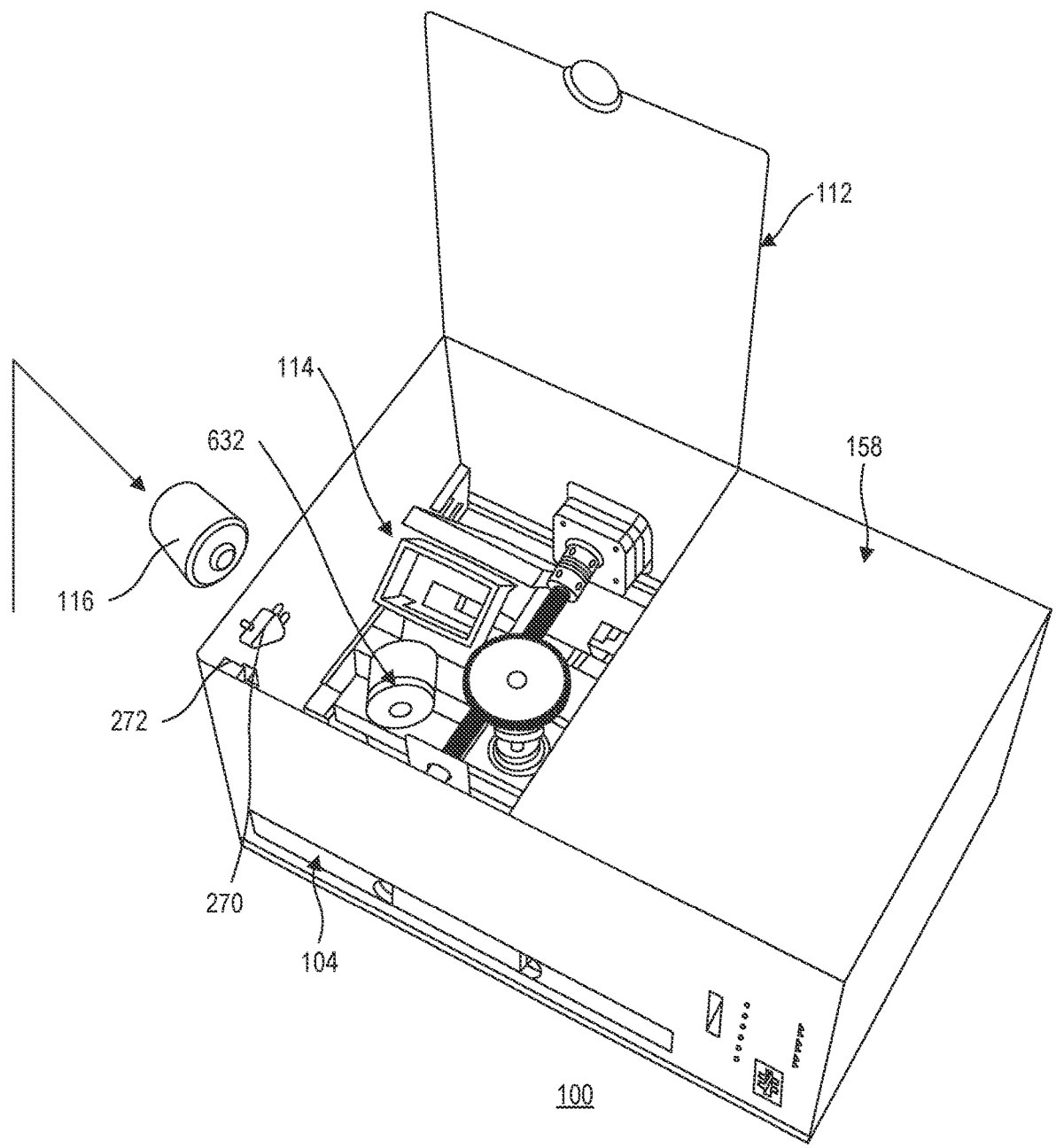
Figures 1, 1E, 2, 3, 4:
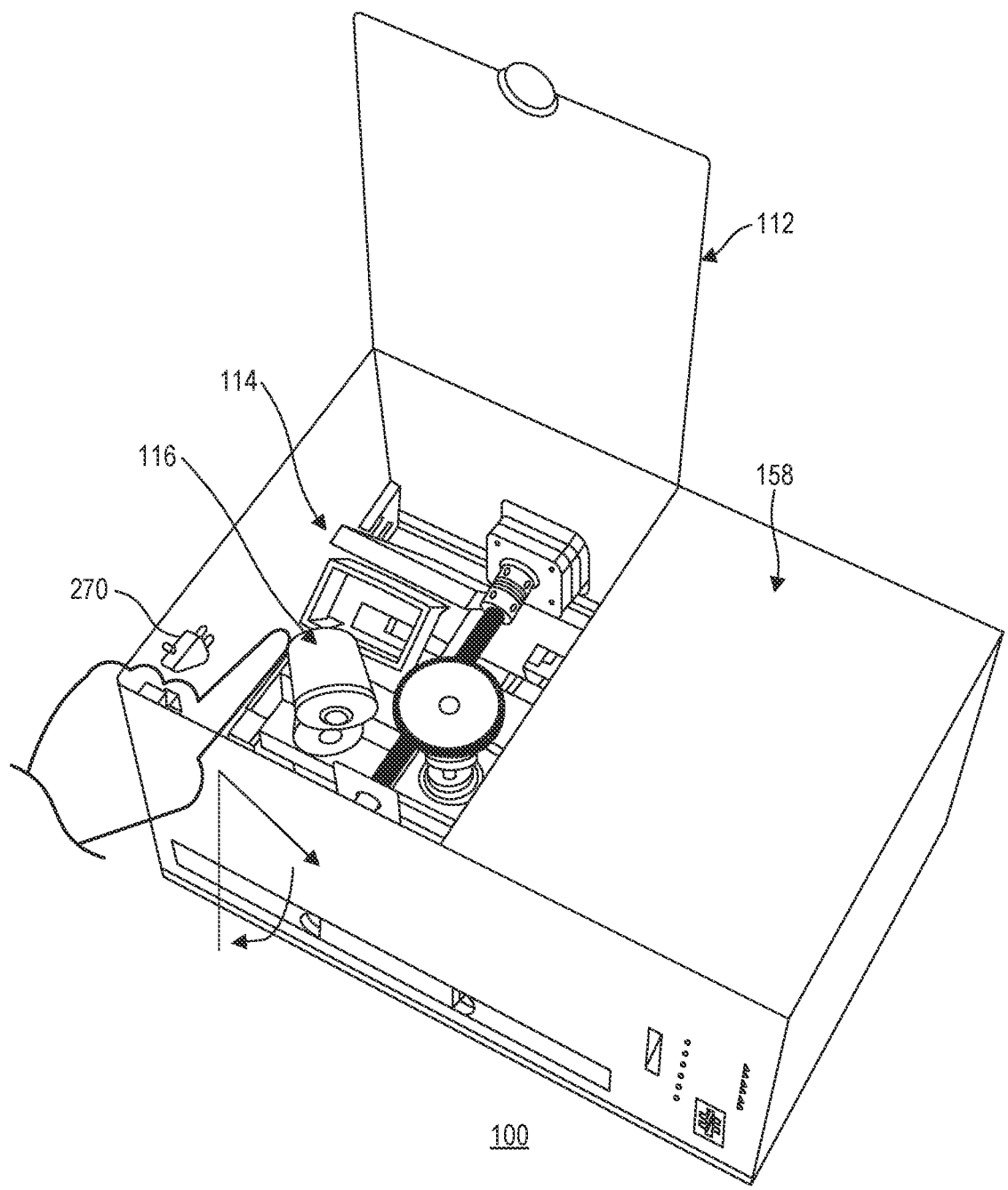
Figures 1, 1E, 2, 3, 4, 5:
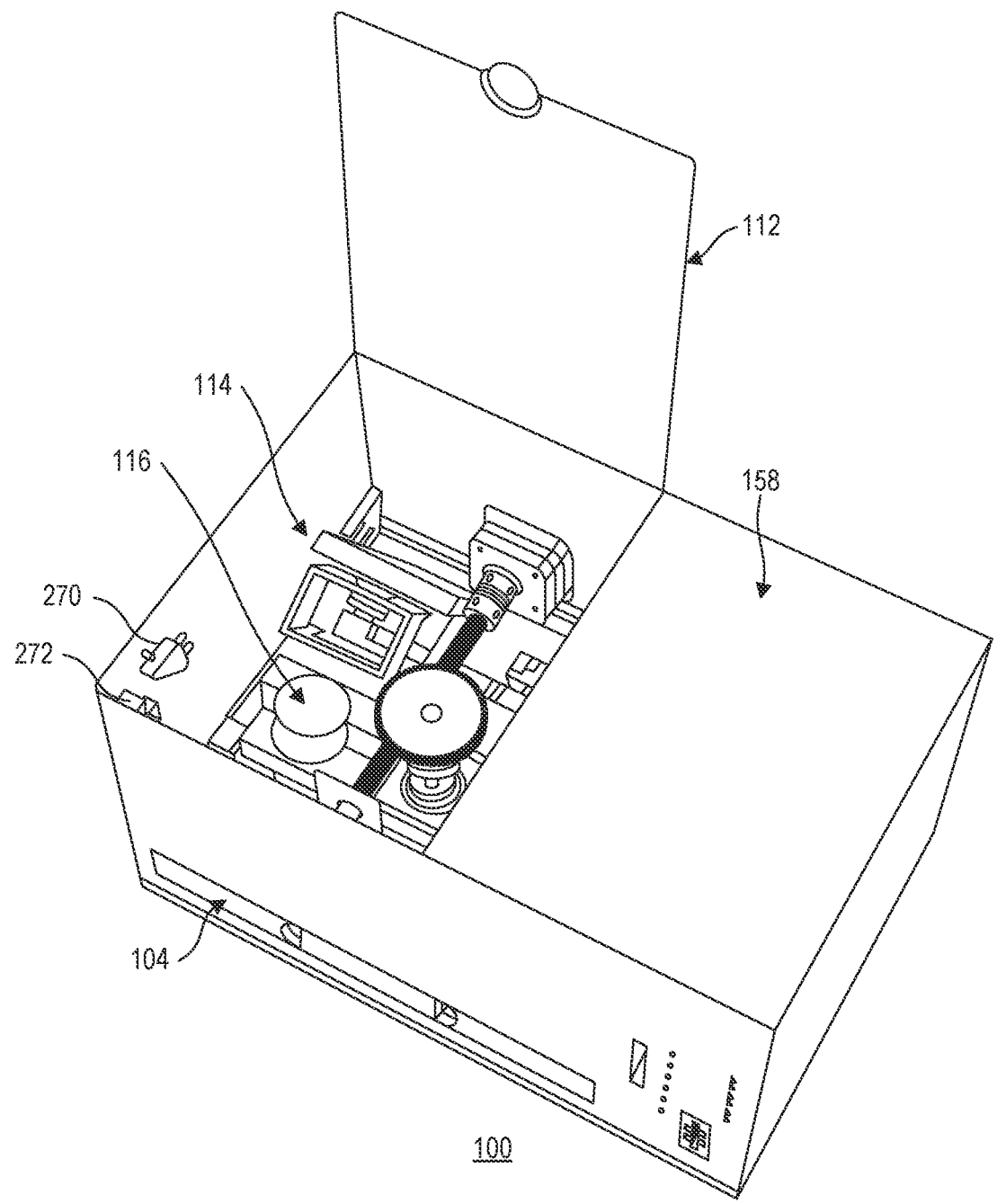
Figures 1, 1E, 2, 3, 4, 5, 6:
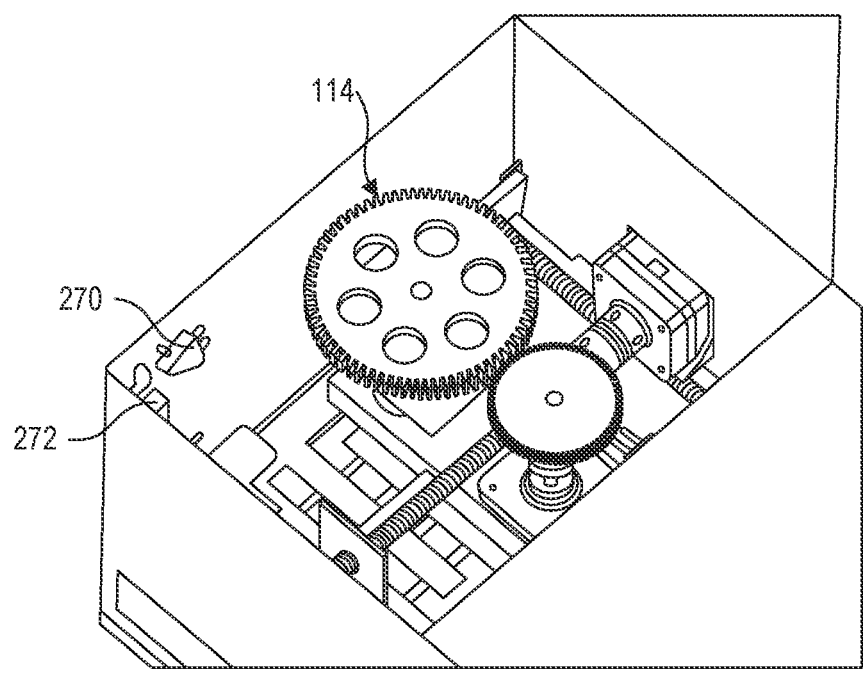
Figures 1, 1F:
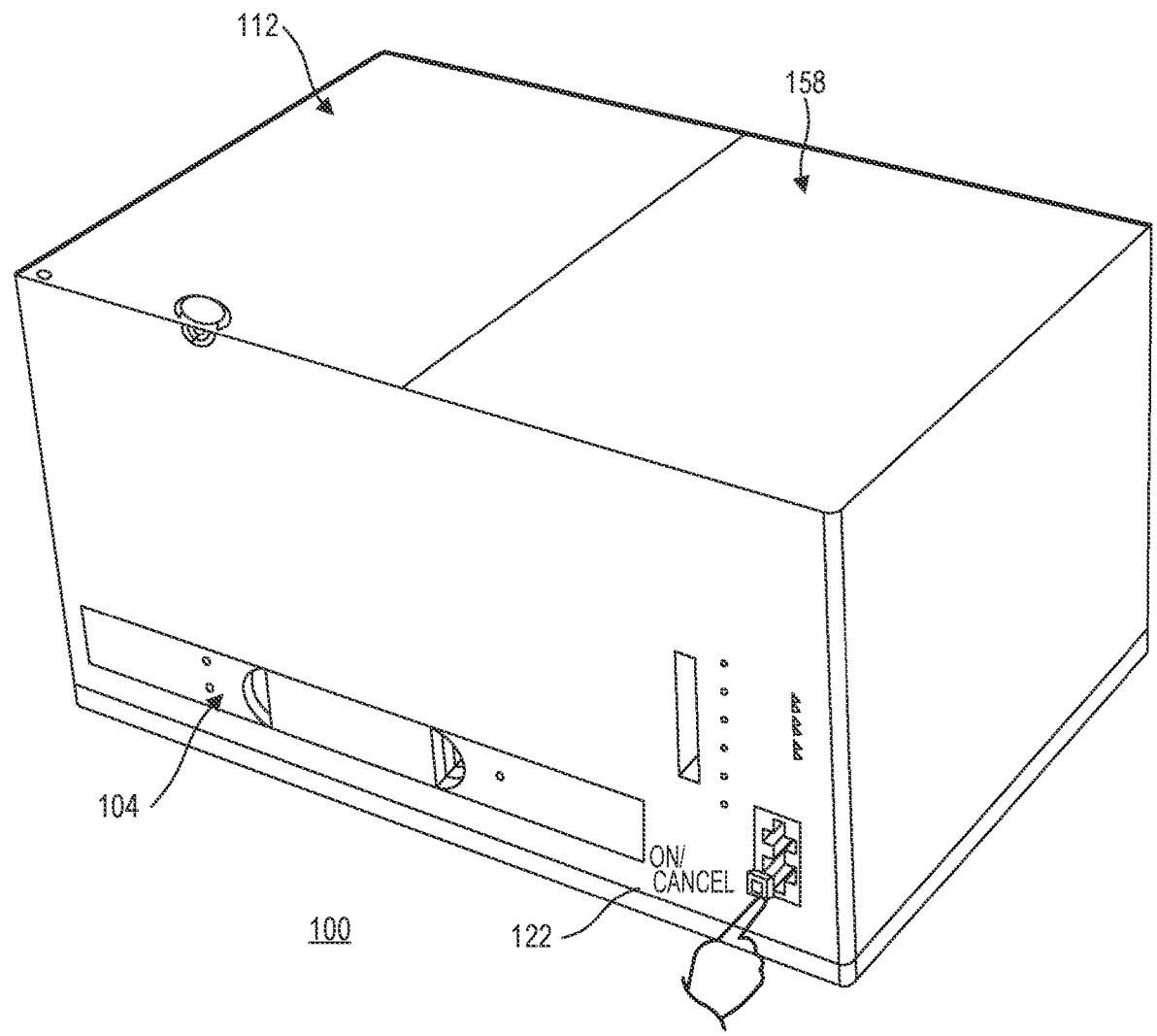
Figures 1, 1F, 2:
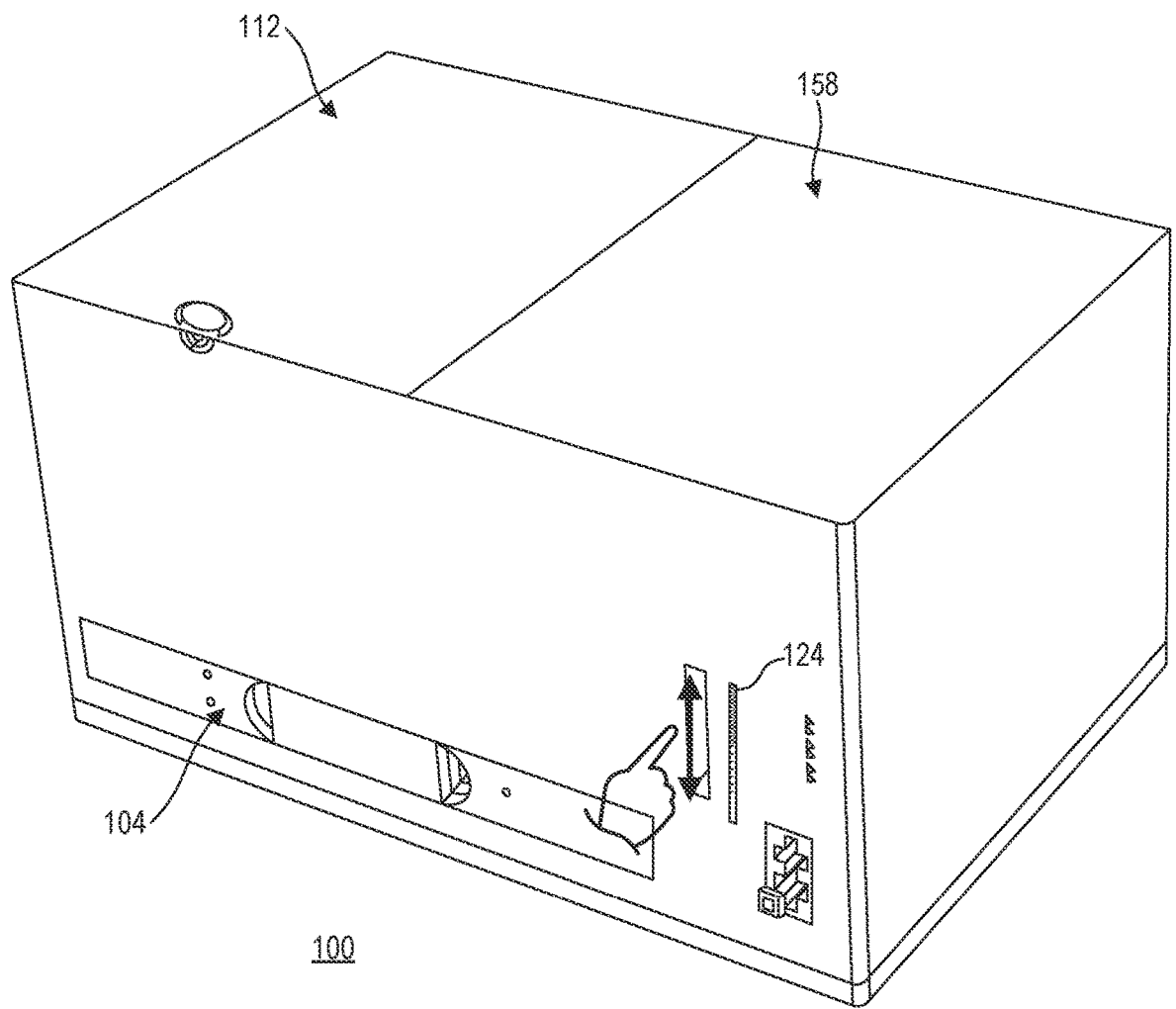
Figures 1, 1F, 2, 3:
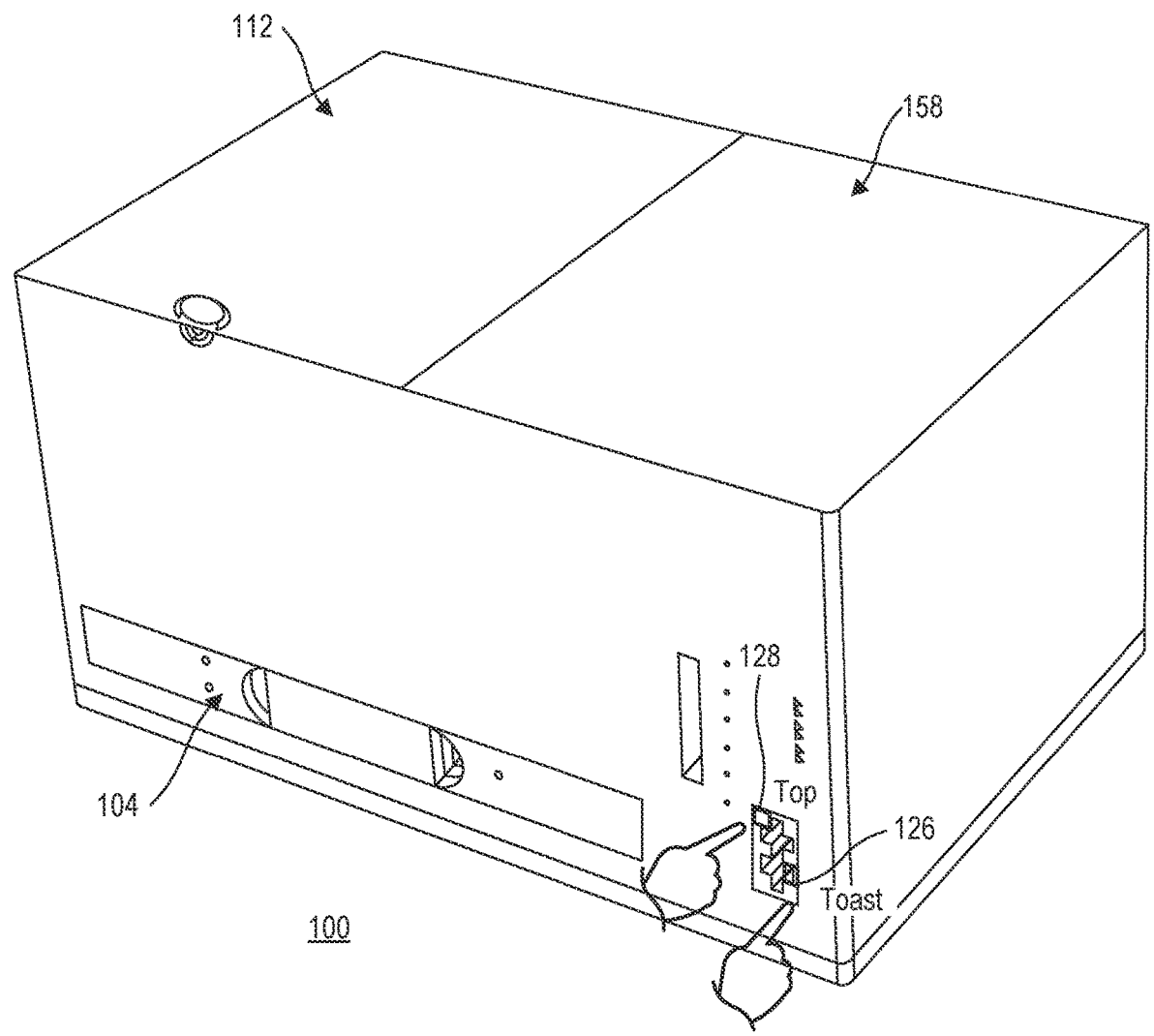

To enable or activate user interface 102 (to turn it ON), ON/ Cancel button 122 must be actuated (FIG. 1F-1). The ON/ Cancel button 122 is a simple push-button switch that when actuated provides a 5V signal to controller unit 260 to allow for lighting up an ON/Cancel LEDs (shown in FIGS. 16B- and 16B-2). Actuation of ON/Cancel button 122 also enables full functional operation of controller unit 260.

In this non-limiting, exemplary instance if a topping food item 130 (FIG. 1G-2) is to be added onto base food item 106, topping cover 112 (if closed) may be opened to access topping dispenser mechanism 114 (shown in FIG. 1D).

FIGS. 1E-1 to 1E-6 are non-limiting, exemplary illustrations of positioning a topping food item container (hereinafter food cartridge or simply, cartridge 116) within device 100, progressively illustrating a non-limiting, exemplary method of insertion and securing thereof in accordance with one or more embodiments of the present invention. As illustrated, prior to insertion (securing) of cartridge 116 within device 100, topping dispenser mechanism 114 is first tilted as shown by arrow 118 (FIG. 1E-1) to an open position (FIGS. 1E-2 and 1E-3) to enable access to a cartridge housing (or holder) 632.

As shown in FIGS. 1E-4 and 1E-5 (and further detailed below), cartridge 116 is first tilted sideways (FIG. 1E-4) and next pushing into cartridge housing 632 vertically until locked in place (FIG. 1E-5). Once cartridge 116 is properly positioned within cartridge housing 632, topping dispenser mechanism 114 may be tilted back to its closed position (FIG. 1E-6). Thereafter, topping cover 112 may be closed and the user may commence selection of cooking controls. Toppings operations cannot be started with the topping cover 112 improperly closed.

Device 100 provides a cover limiter switch 270 that when actuated (due to closure of topping cover 112), transmits a close signal to controller unit 260, which in turn, allows commencement of device 100 operations. It should be noted that device 100 also includes a cover solenoid switch 272 that is powered ON during operation of device 100 to magnetically maintain topping cover 112 in closed position. Once operations are completed, cover solenoid switch 272 is powered OFF to allow topping cover 112 to be moved to an open position.

FIGS. 1F-1 to 1F-3 are non-limiting, exemplary illustrations of cooking selection for cooking and topping of the base food item, progressively illustrating a non-limiting, exemplary method of use of control user interface of device 100 in accordance with one or more embodiments of the present invention. At this stage, if device 100 (and hence user interface 102) is not powered ON, user may simply actuate an ON/Cancel button 122 (FIG. 1F-1) of device 100 to power ON device 100, which illuminates the ON/Cancel button 122.

Assuming user desire to toast and top base food item 106, user may manipulate a cook-level user interface (or slider) 124 (detailed below) to select the level of cooking (for example, level of darkness for toasting a bread). Therefore, the darkness level of the toast may be set by sliding a user finger (FIG. 1F-2) across the slider 124 (top side of slider 124 is darker, bottom side is lighter toast—lighting will become denser as the darker setting is set). Default setting is medium setting.

As best shown in FIG. 1F-3, once cook-level is set, users may actuate toast button 126 and topping button 128 to toast and top base food item 106. Pushing the toast button 126 and topping button 128 commences toasting and topping of the base food item 106 and illuminates both toast and topping buttons 126 and 128.

Figures 1, 1G:
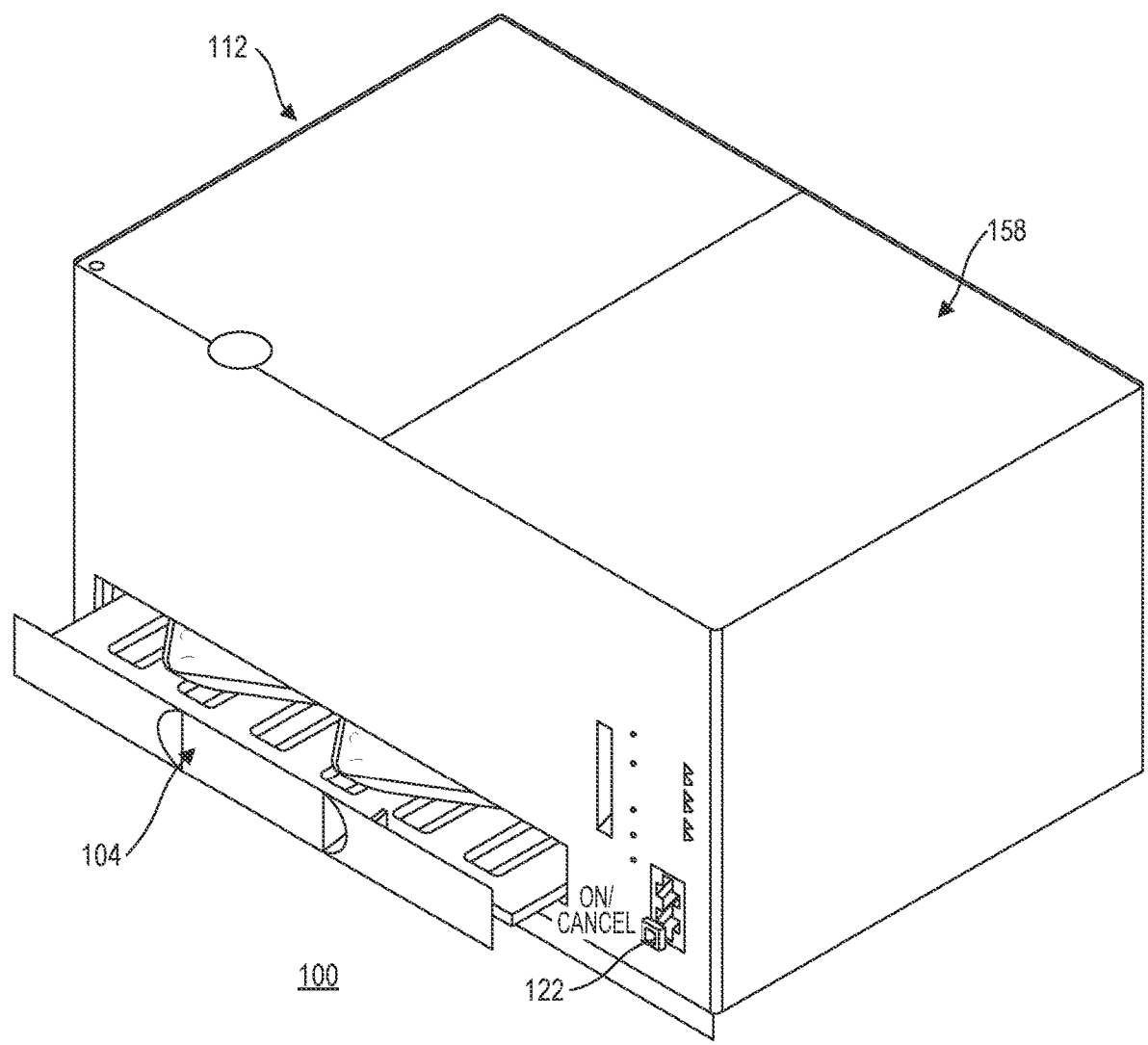
Figures 1, 1G, 2:
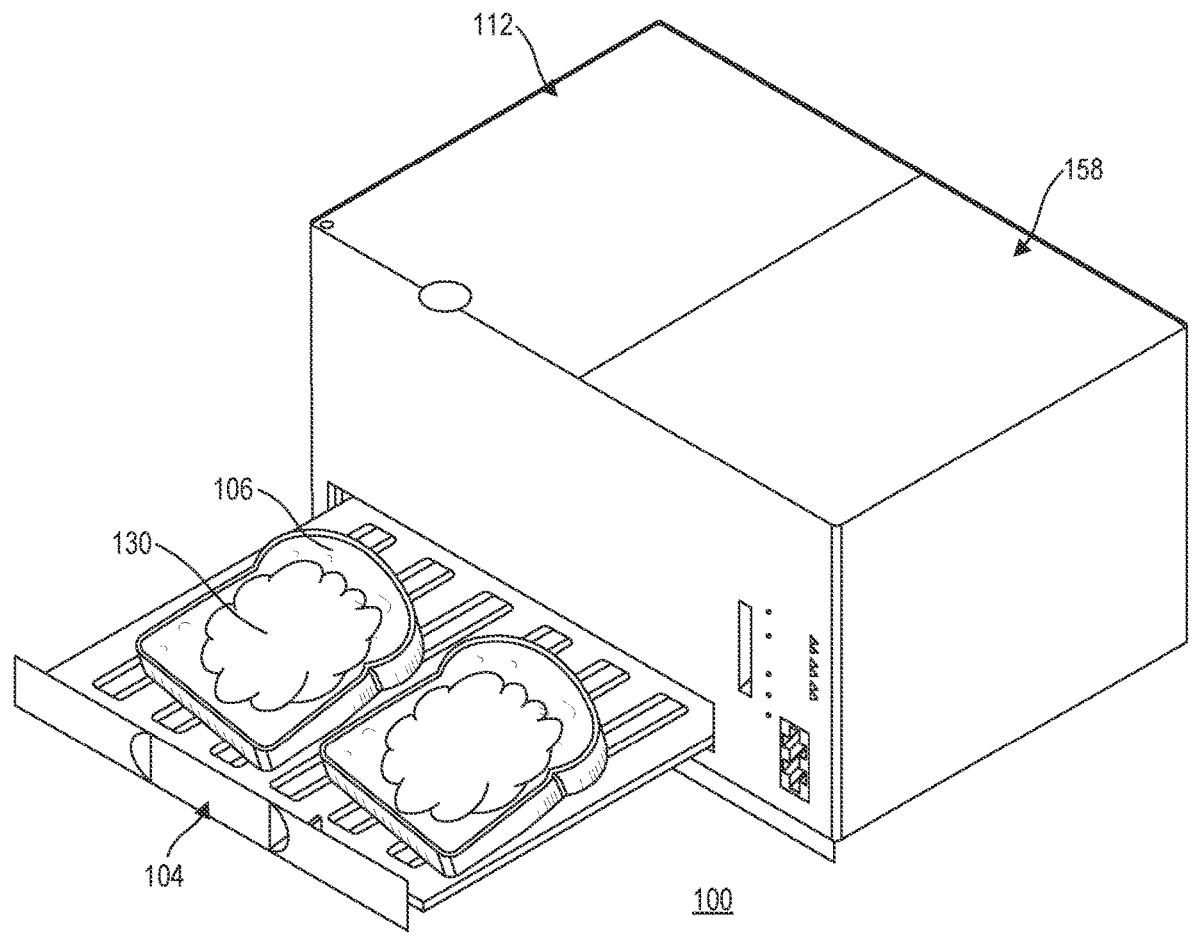
Figures 1, 1H:
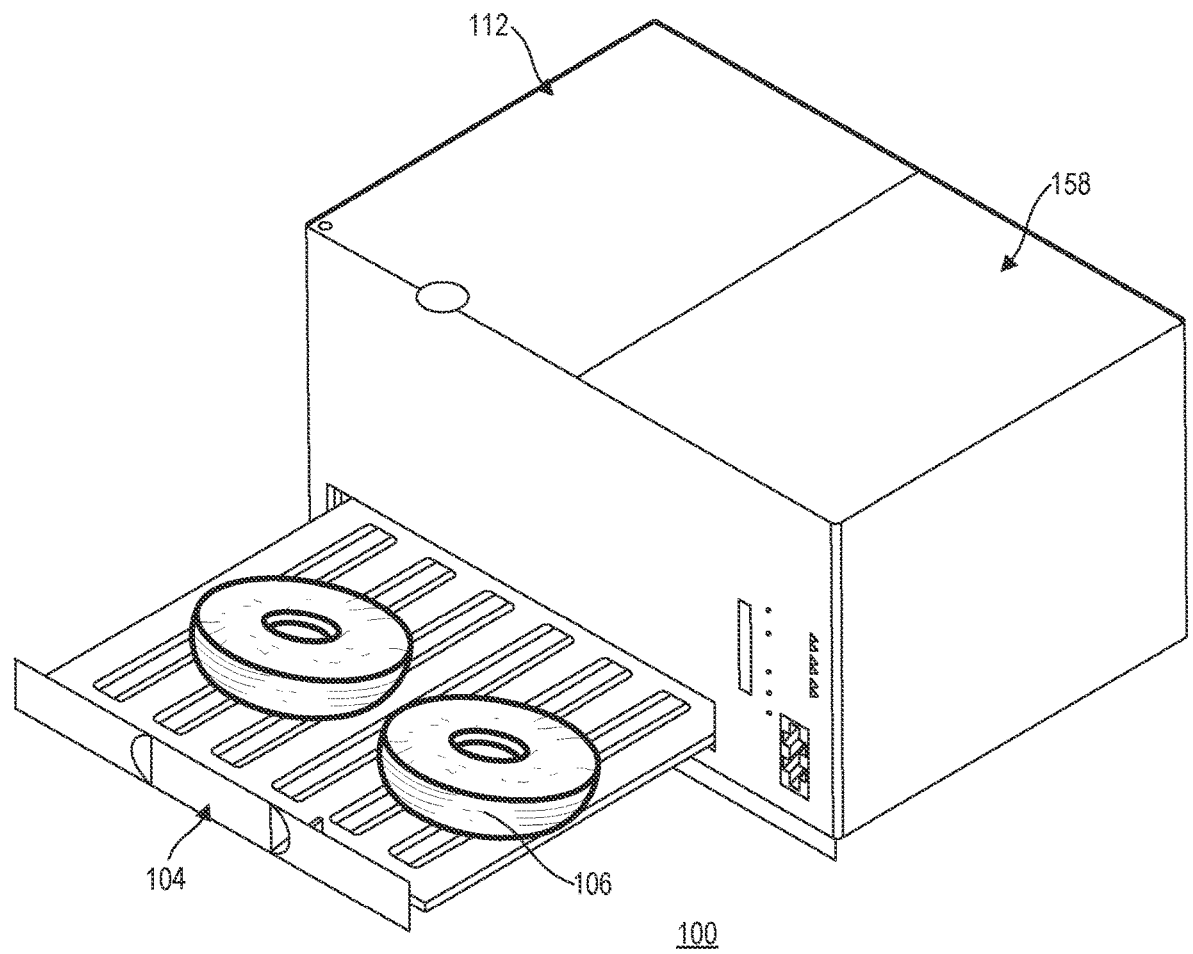
Figures 1, 1H, 2:
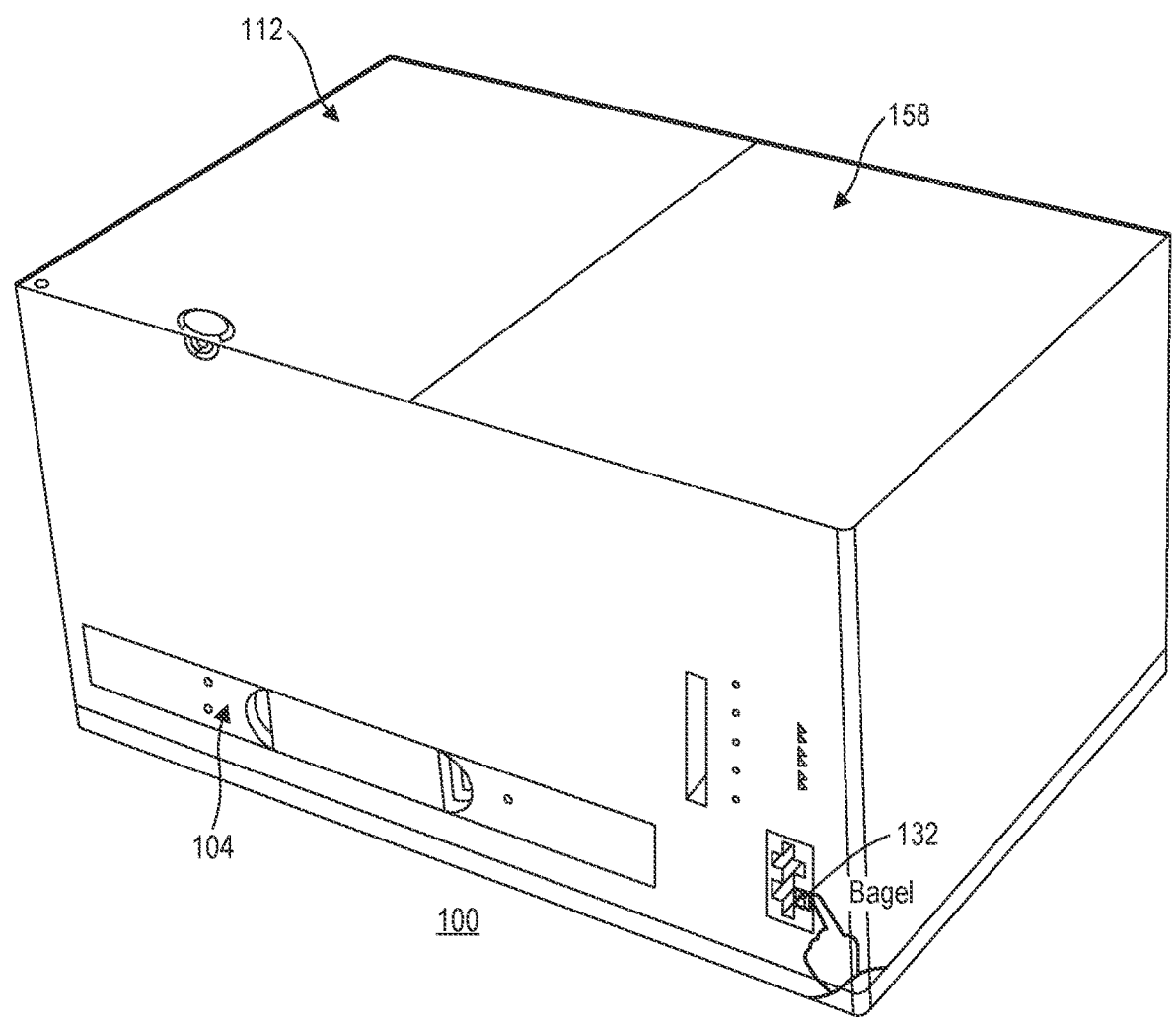
Figures 1, 1H, 2, 3:
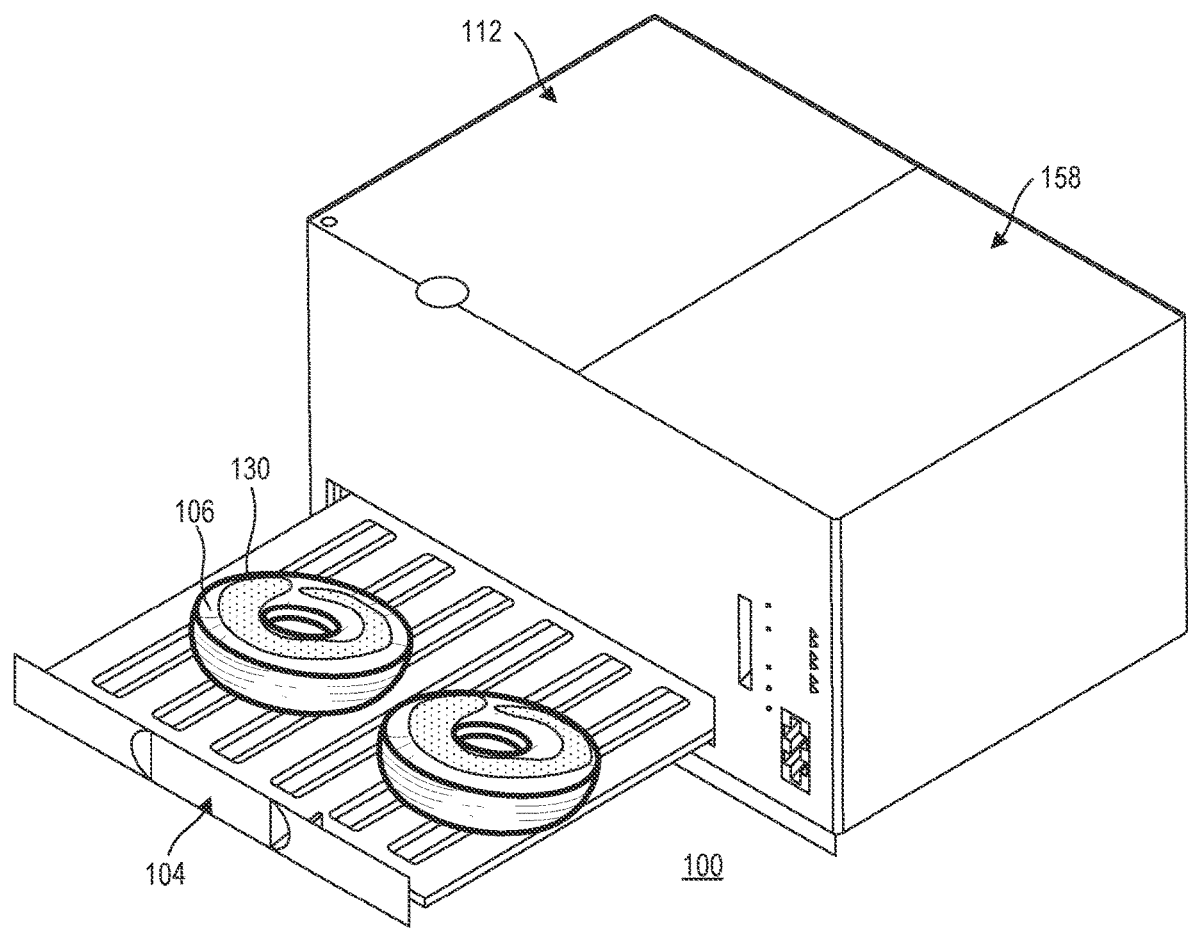

As best illustrated in FIGS. 1G-1 and 1G-2, once toasting and topping of base food item 106 is completed, main tray 104 will pop-out and the ON/CANCEL button light will turn OFF. It should be noted that at any time during the operation of device 100, ON/CANCEL button 122 may be pressed to immediately end any process.

FIGS. 1H-1 to 1H-3 are non-limiting, exemplary illustrations of cooking selection for cooking and topping of an odd shaped base food item in accordance with one or more embodiments of the present invention. Processes for cooking an odd-shaped base food item 106 such as a bagel or donut is the same as described above in relation to FIGS. 1A to 1G-2, with the exception that an additional "bagel" button 132 (FIG. 1H-2) is pushed (illuminating button 132). Pressing bagel button 132 instructs microcontroller unit of device 100 regarding the odd-shaped nature of base food item 106. Also, and as detailed below, actuation of bagel button 132 shuts OFF power to a bottom heater while maintaining a top heater ON for cooking operation and or cooking and topping operations. FIG. 1H-3 illustrate base food item 106 toasted and topped.

Figures 1, 1I:
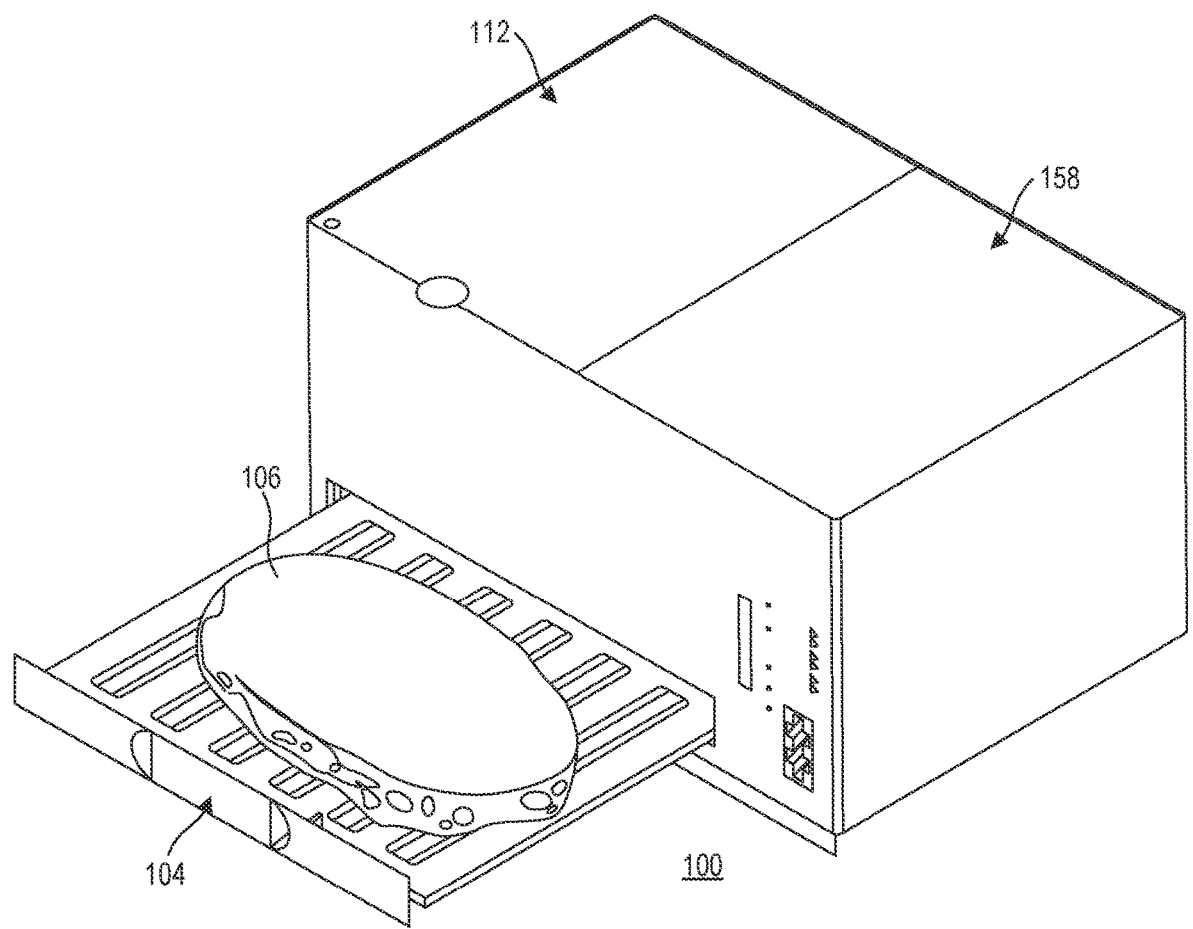
Figures 1, 1I, 2:
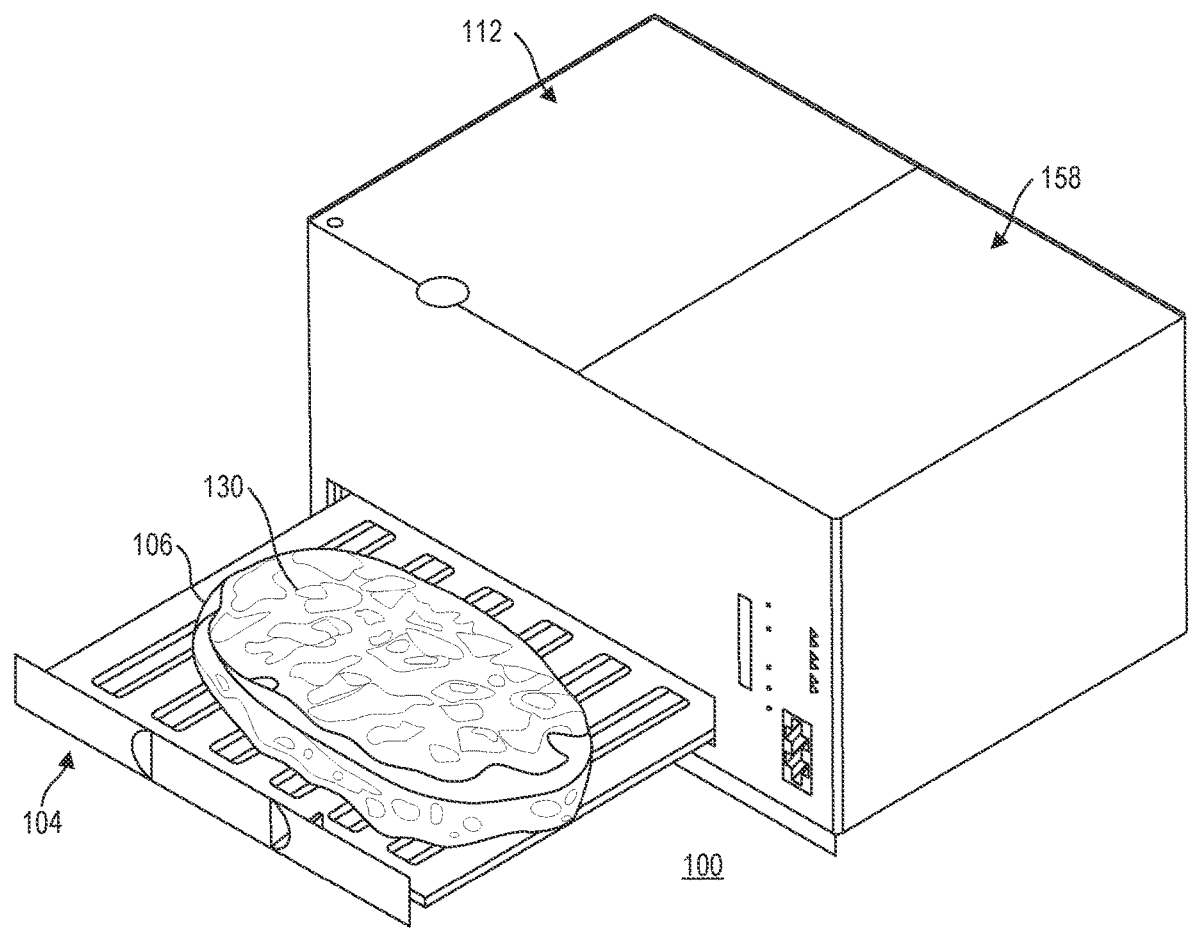
Figures 1, 1J:
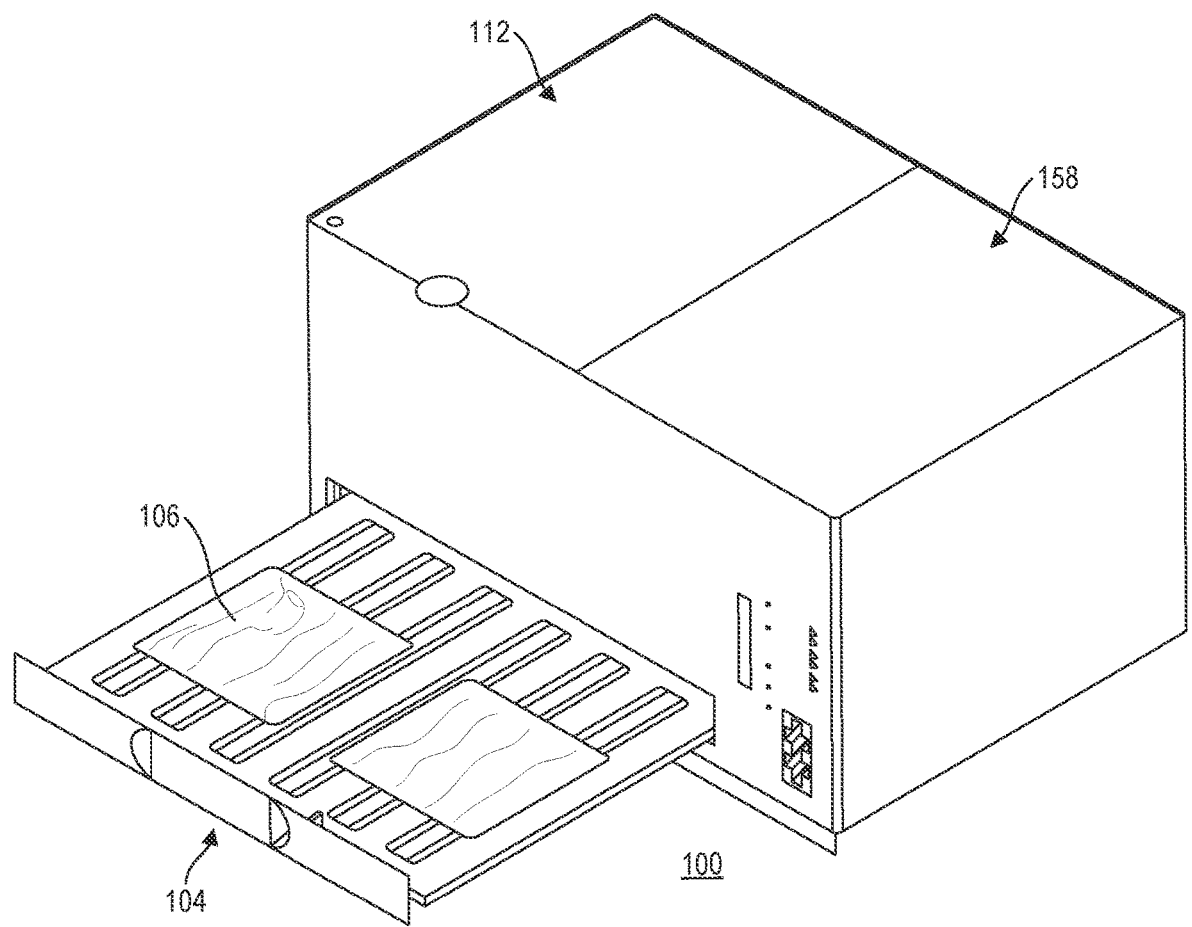
Figures 1, 1J, 2:
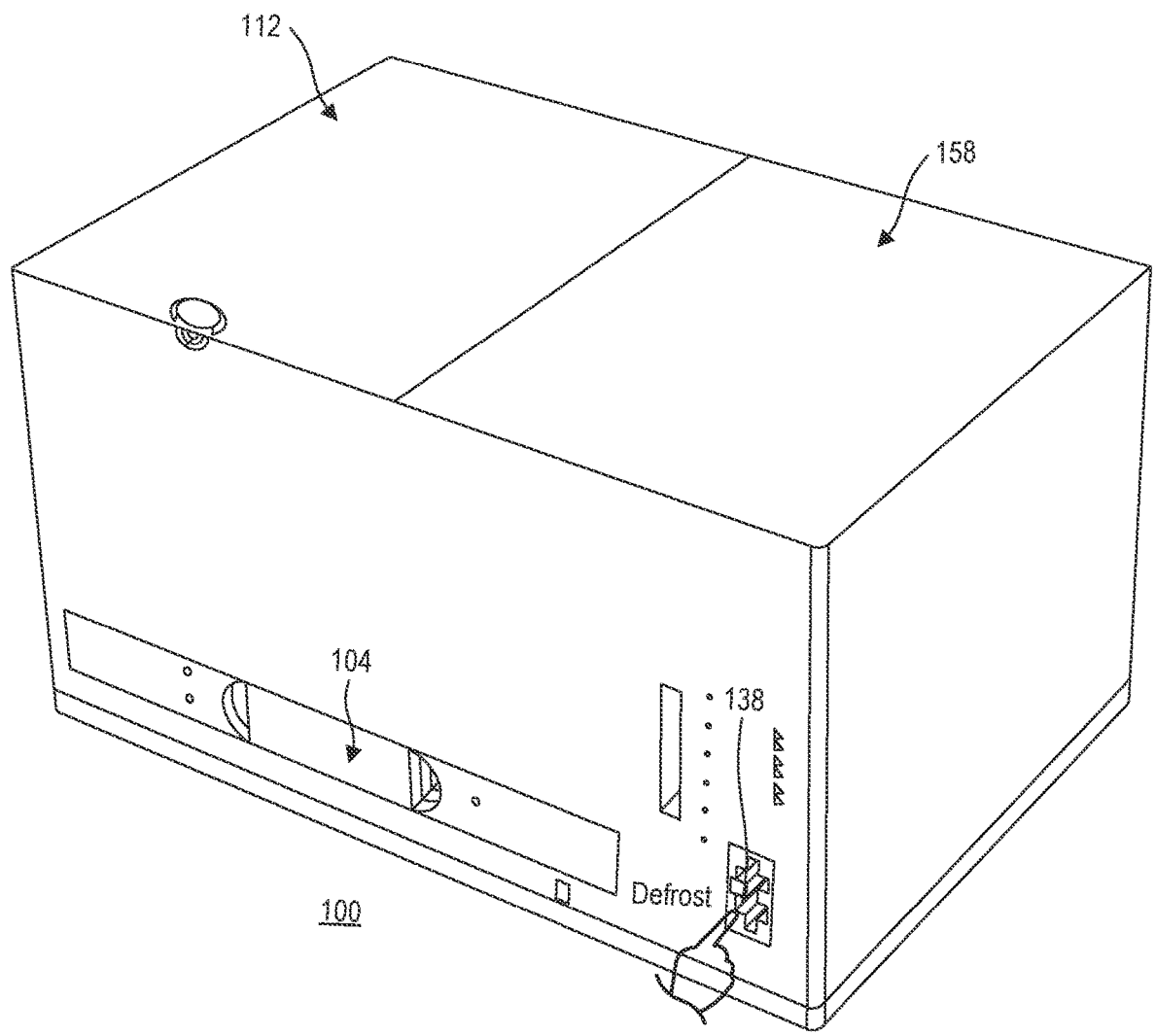
Figures 1, 1J, 2, 3:
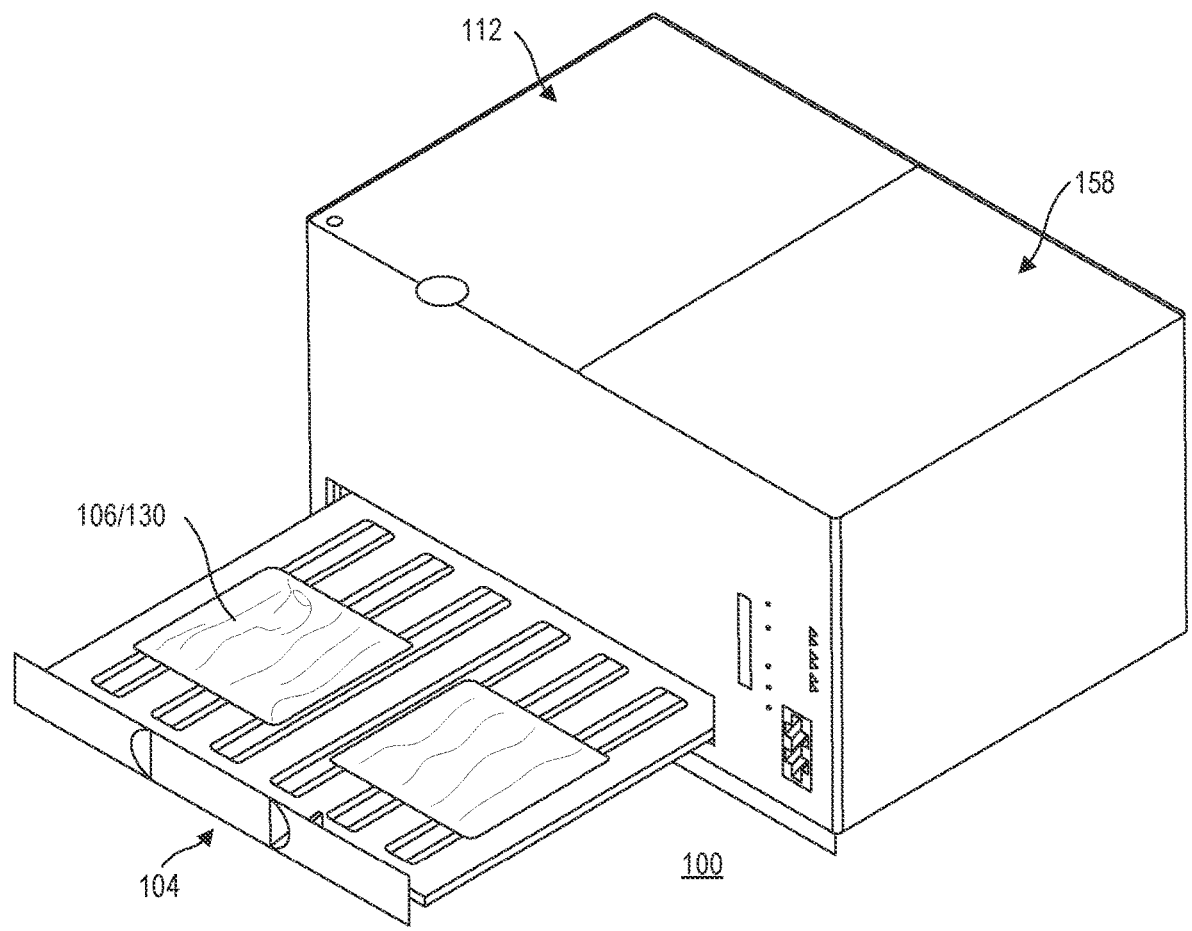
Figures 1, 1K:
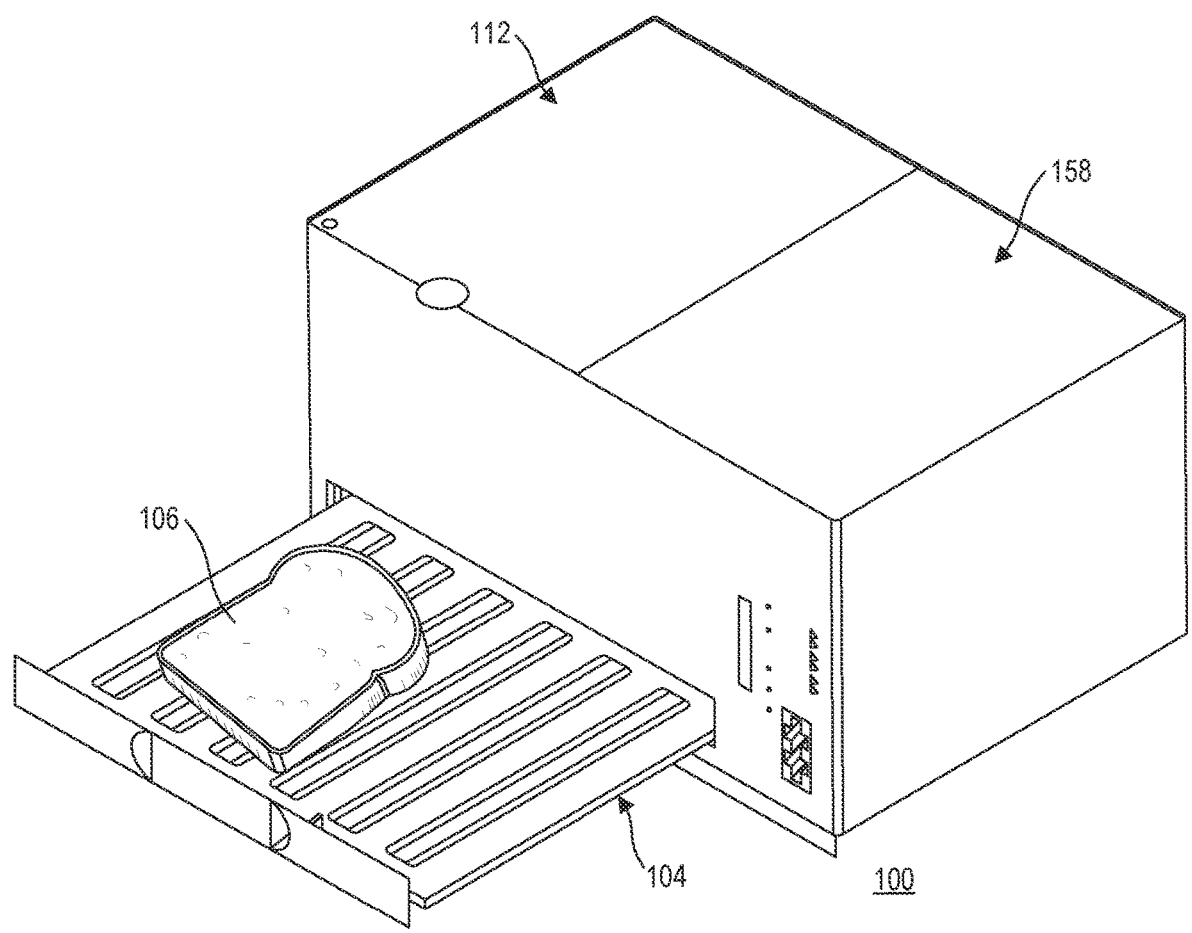
Figures 1, 1K, 2:
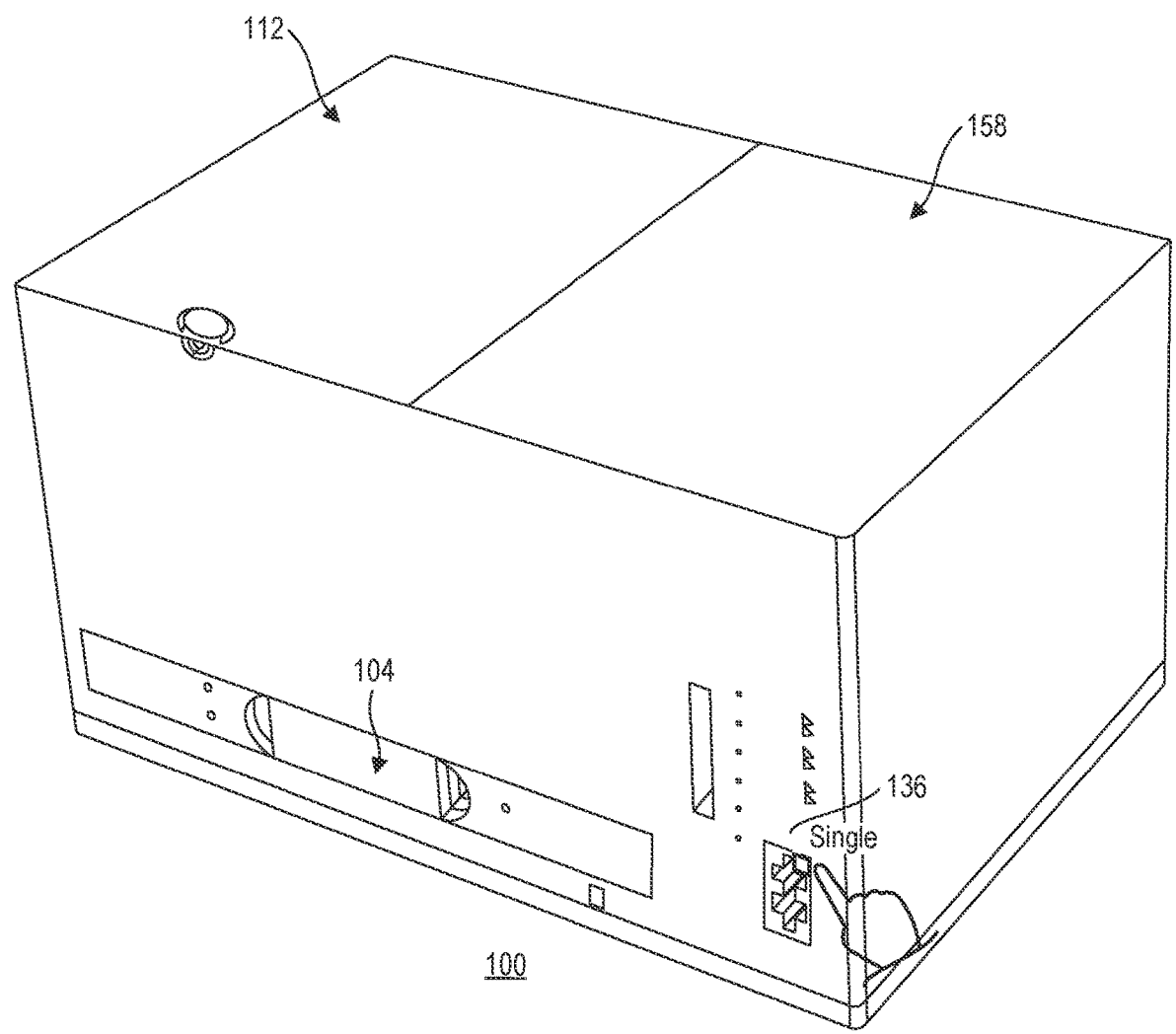
Figures 1, 1K, 2, 3:
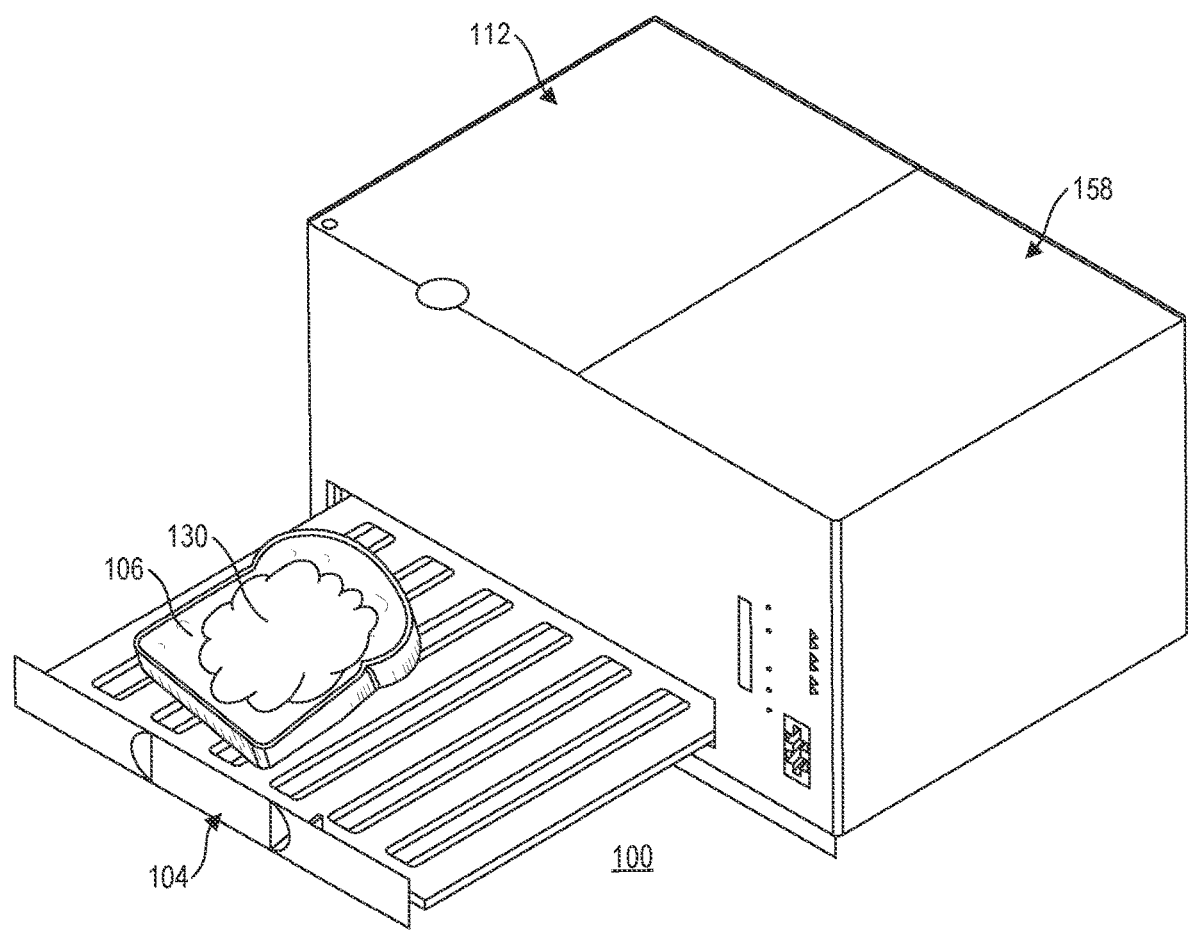
Figures 1, 1L:
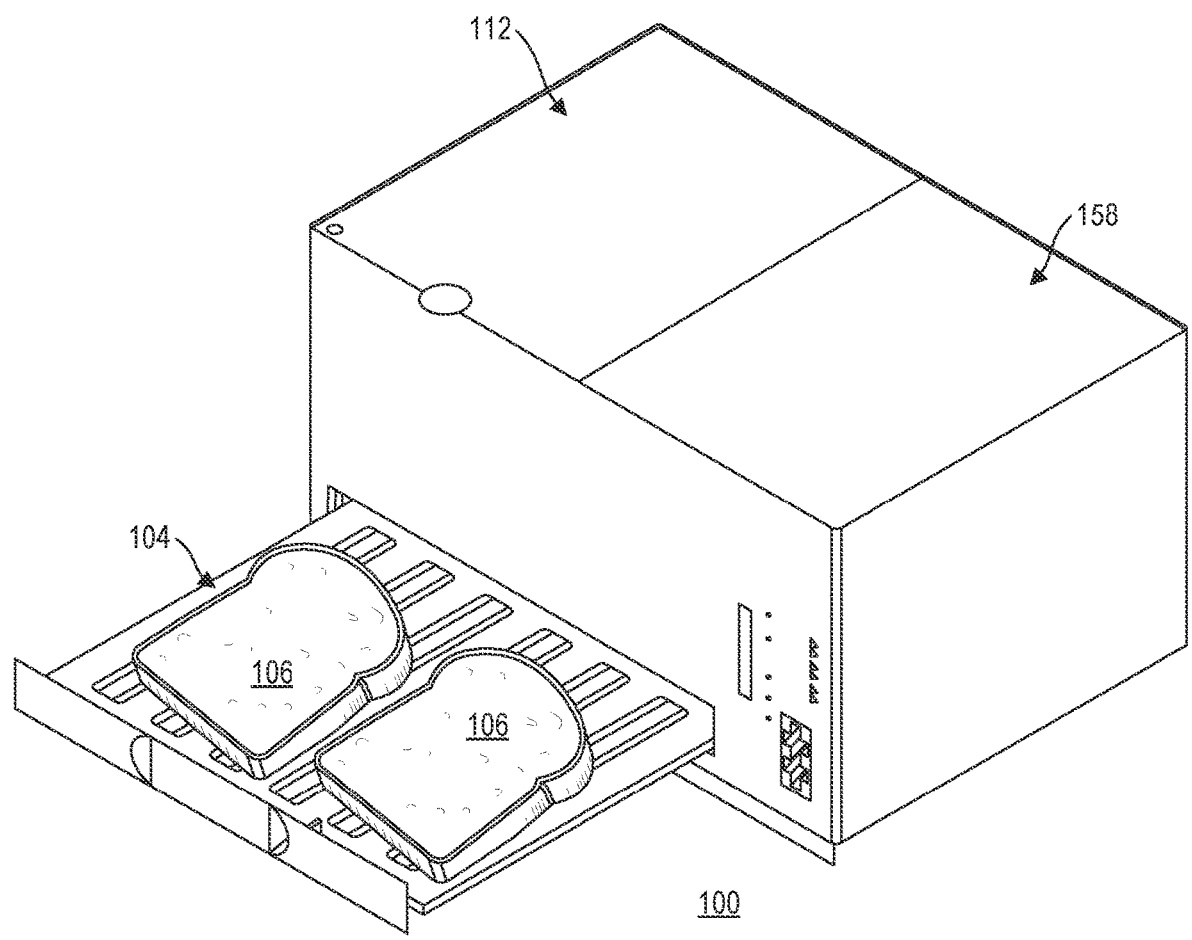
Figures 1, 1L, 2:
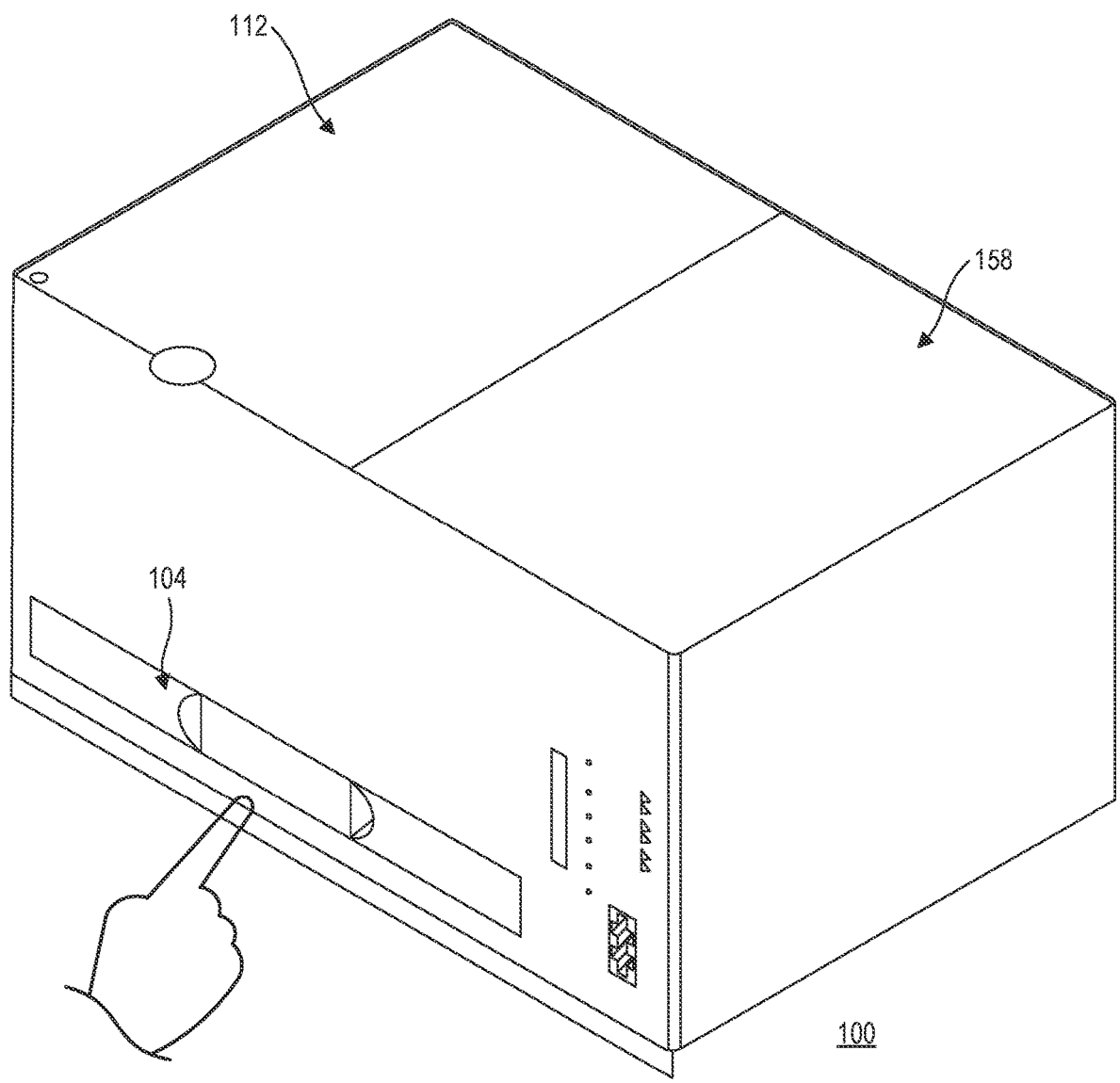
Figures 1, 1L, 2, 3:
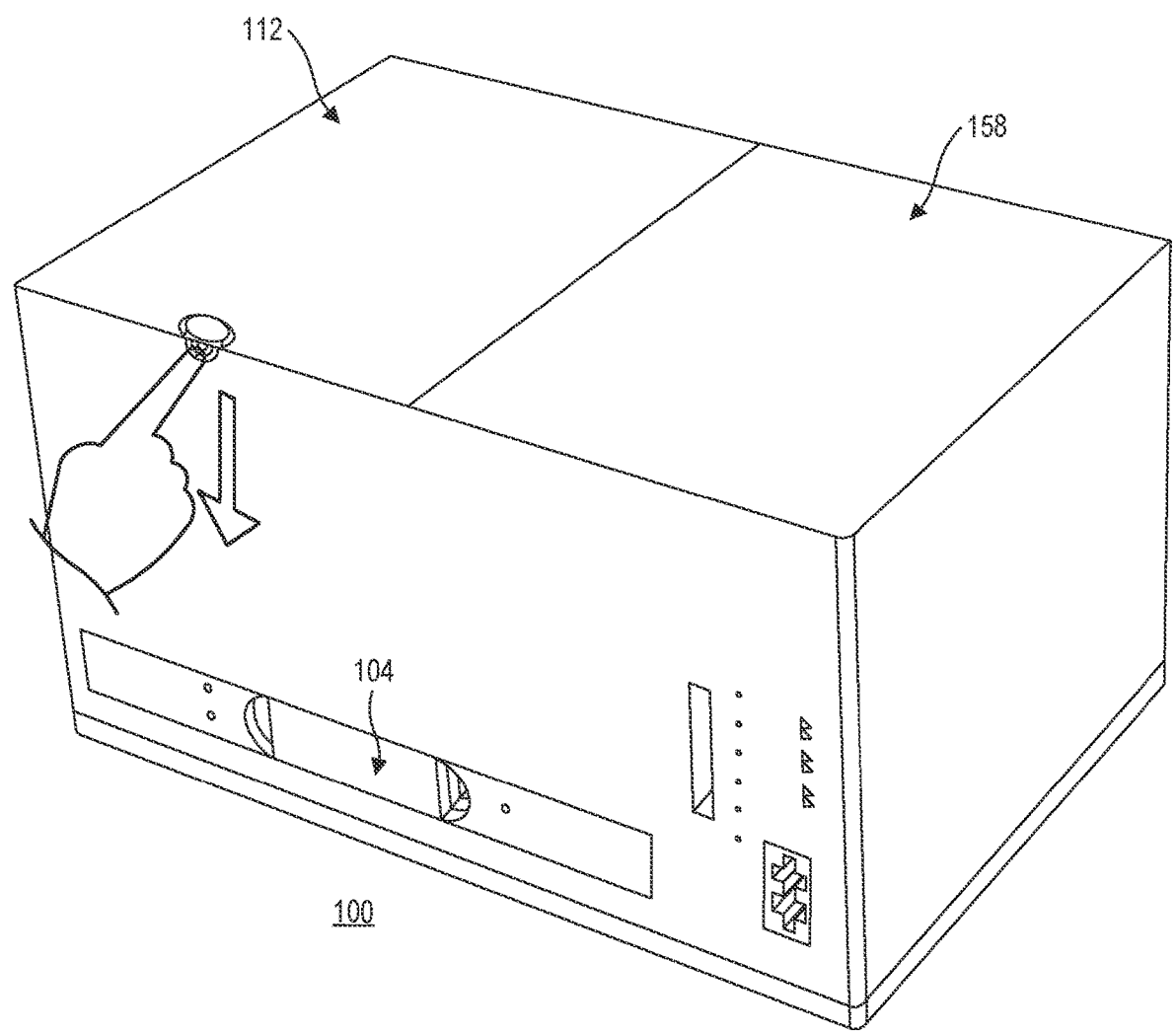
Figures 1, 1L, 2, 3, 4:
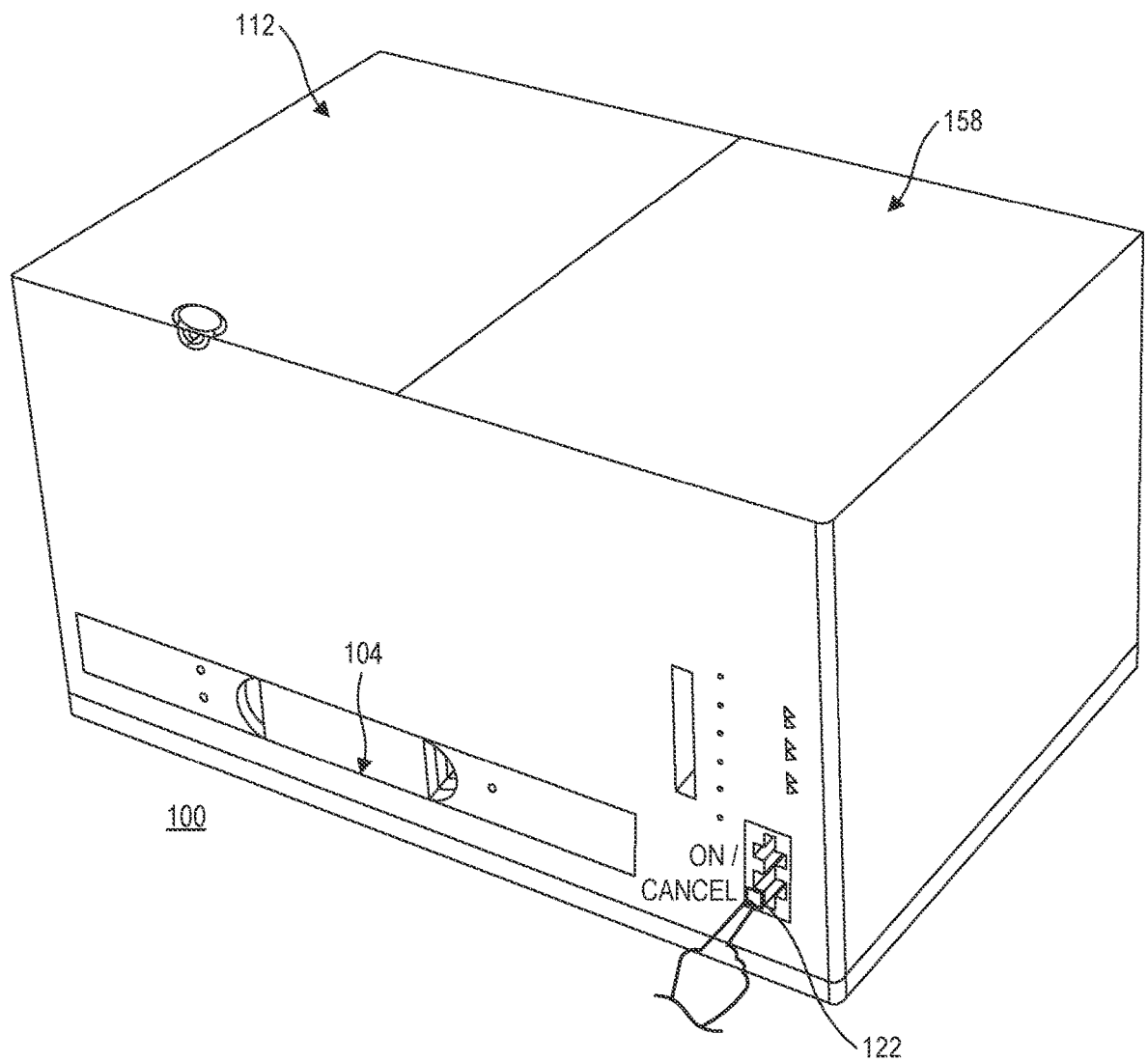
Figures 1, 1L, 2, 3, 4, 5:
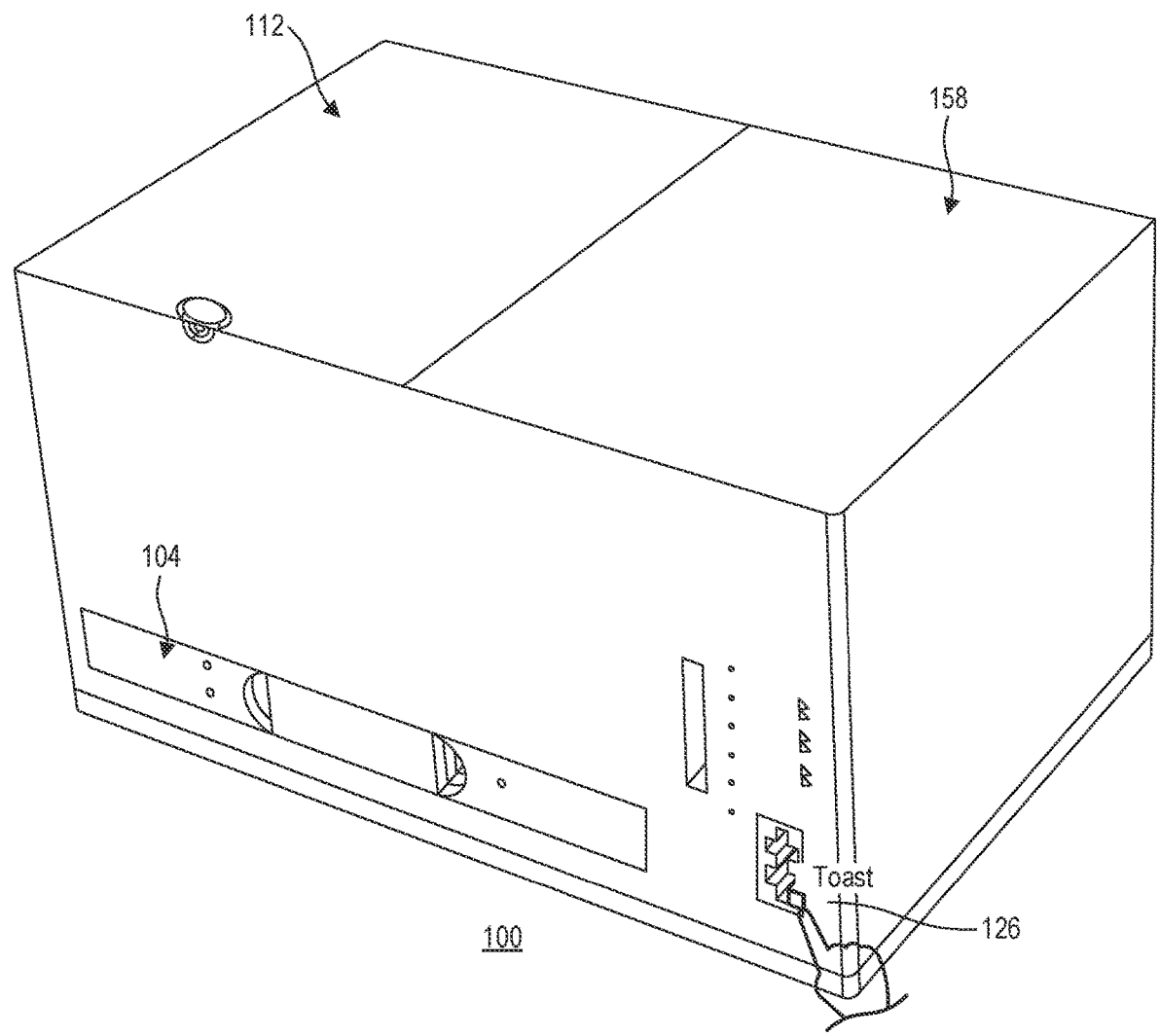
Figures 1, 1L, 2, 3, 4, 5, 6:
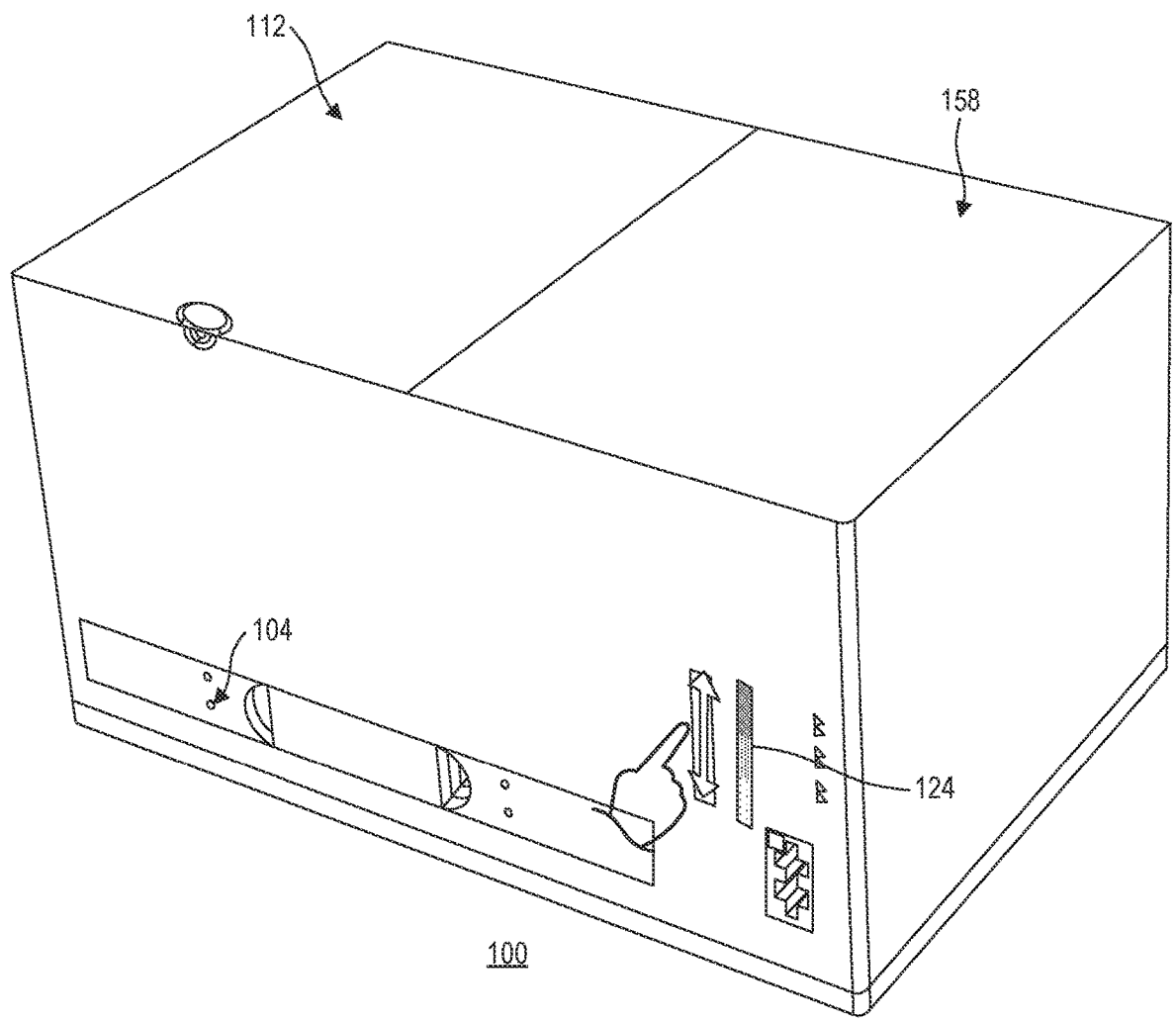
Figures 1, 1L, 2, 3, 4, 5, 6, 7:
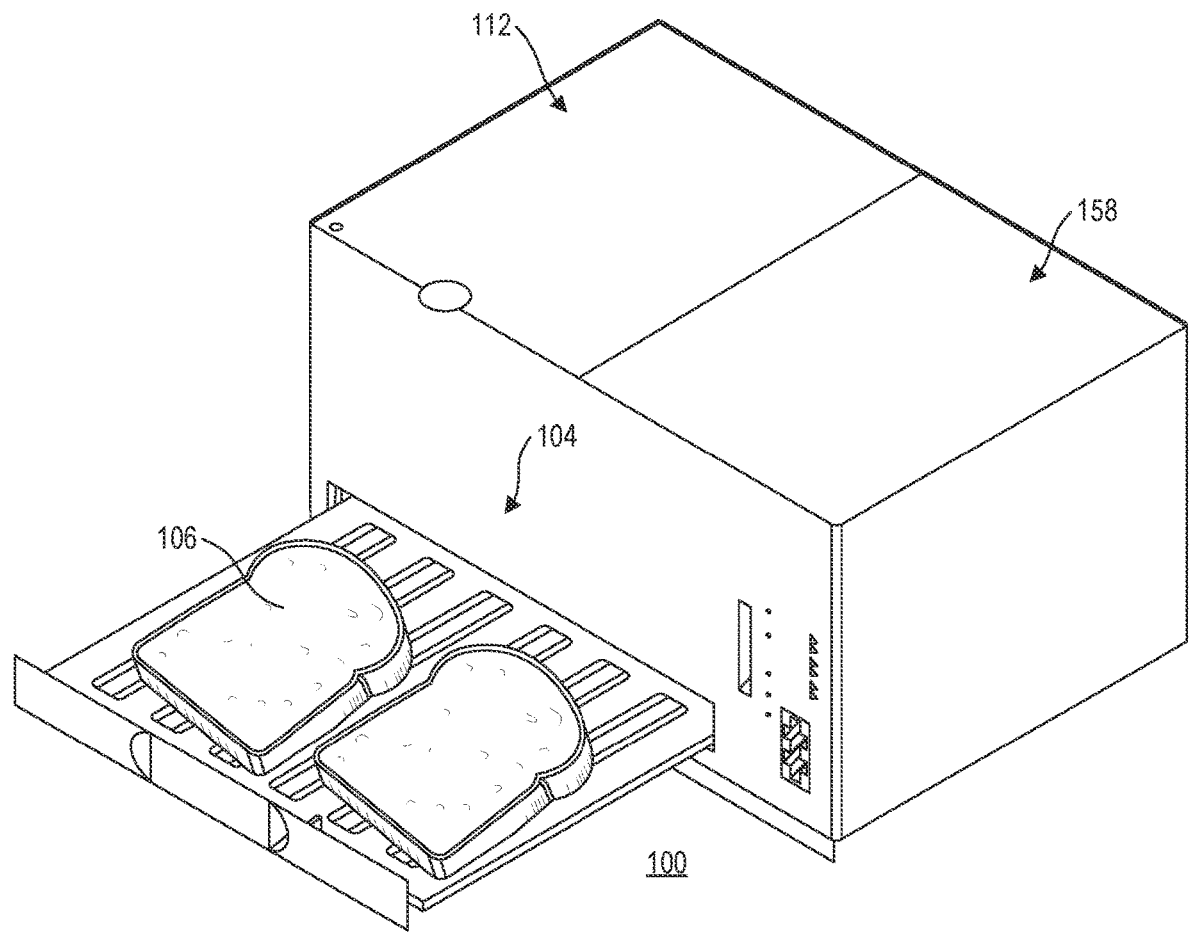

FIGS. 1I-1 and 1I-2 are non-limiting, exemplary illustrations of cooking selection for cooking and topping of an odd shaped larger sized base food item (e.g., a French bread) in accordance with one or more embodiments of the present invention. The method of cooking is exactly the same as that of two pieces of base food item described above in relation to FIGS. 1A to 1G-2.

FIGS. 1J-1 to 1J-3 are non-limiting, exemplary illustrations of cooking selection for cooking and topping of frozen base food item (e.g., frozen strudels) in accordance with one or more embodiments of the present invention. In general, the operation is similar to those described above. Simply place frozen base food item 106 onto main tray 104, and select the additional defrost button 138, which illuminates once activated. The operation will defrost and top base food item 106 as shown in FIG. 1J-3.

FIGS. 1K-1 to 1K-3 are non-limiting, exemplary illustrations of cooking selection for cooking and topping of a single piece base food item (e.g., toasting a single slice of bread) in accordance with one or more embodiments of the present invention. Cooking and topping a single piece base food item 106 is similar to cooking and topping two pieces of base food item 106 (FIGS. 1A to 1G-2), with the exception that the single piece food item 106 is positioned on main tray 104 at start position of topping dispenser mechanism 114. In this non-limiting, exemplary embodiment, the start position of topping dispenser mechanism 114 (detailed below) is configured to start at the illustrated left side of the main tray and hence, the single piece base food item 106 is positioned as shown.

It should be noted that the configuration of the start position of the topping dispenser mechanism 114 to commence dispensing of topping food items is arbitrary. That is, device 100 may easily be reconfigured to allow topping dispenser mechanism 114 to commence topping at the middle or the right side of main tray or at any position above main tray selected.

Referring back to FIG. 1K-2, to cook and top a single base food item 106 user may additionally select single button 136, which would enable cooking and or topping of single base food item 106 as shown in FIG. 1K-3, based on toast and or topping selection buttons.

FIGS. 1L-1 to 1L-7 are non-limiting, exemplary illustrations for cooking a base food item only (e.g., toasting a slice of bread) without topping in accordance with one or more embodiments of the present invention. If the user wishes to only cook a base food item without any topping (e.g., a simple toast with no topping), then users may simply position desired base food item 106 on main tray 104, and move it to close position.

Users must also make sure that topping cover 112 is closed. As shown in FIG. 1L-4, the user then actuates power ON button (assuming device 100 was OFF). Next, users may simply select and actuate toast button 126 only (FIG. 1L-5), and actuate cook-level user interface (or slider) 124 (FIG. 1L-6) to select the level of cooking (for example, level of darkness for toasting a bread). As shown in FIG. 1L-7, the process will result in cooked base food item without any topping.

Figures 1, 1M:
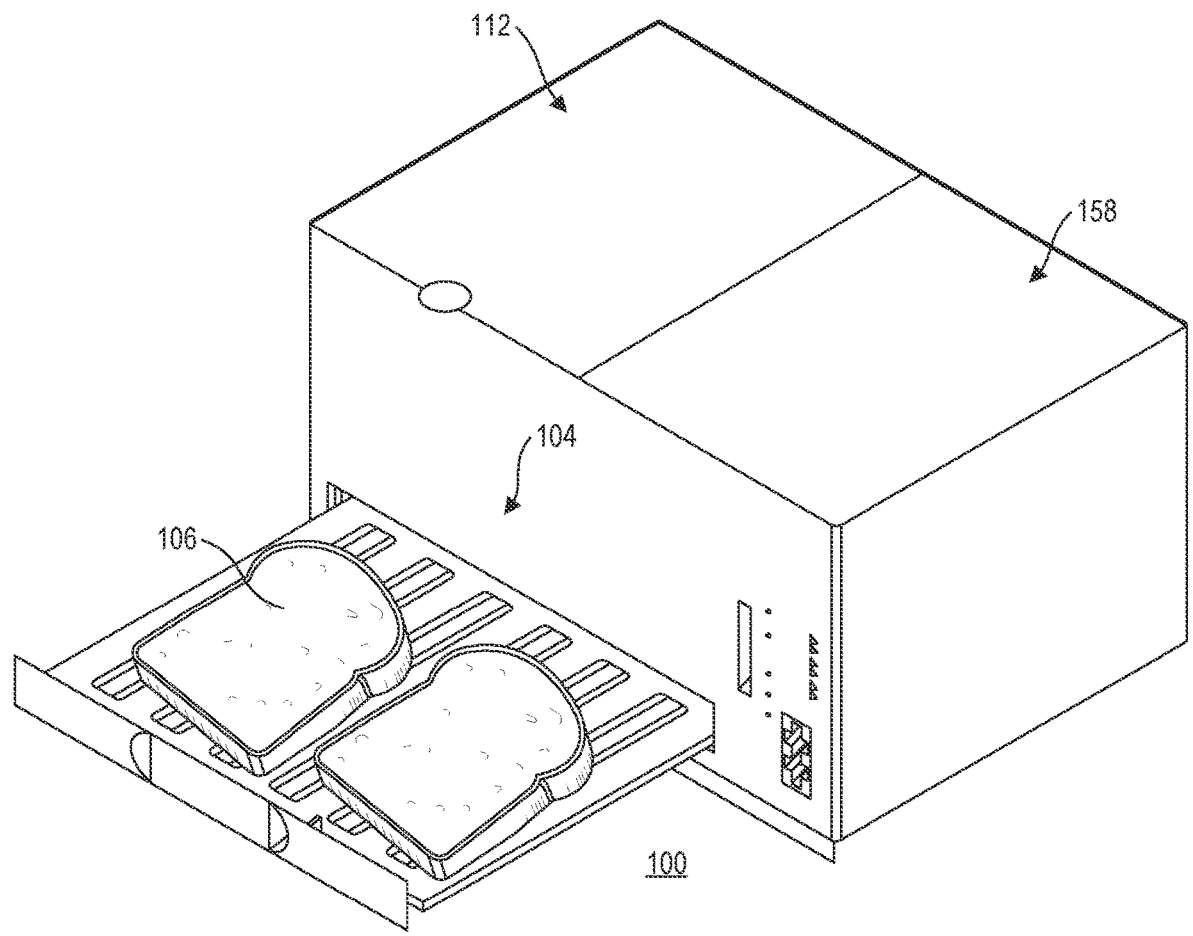
Figures 1, 1M, 2:
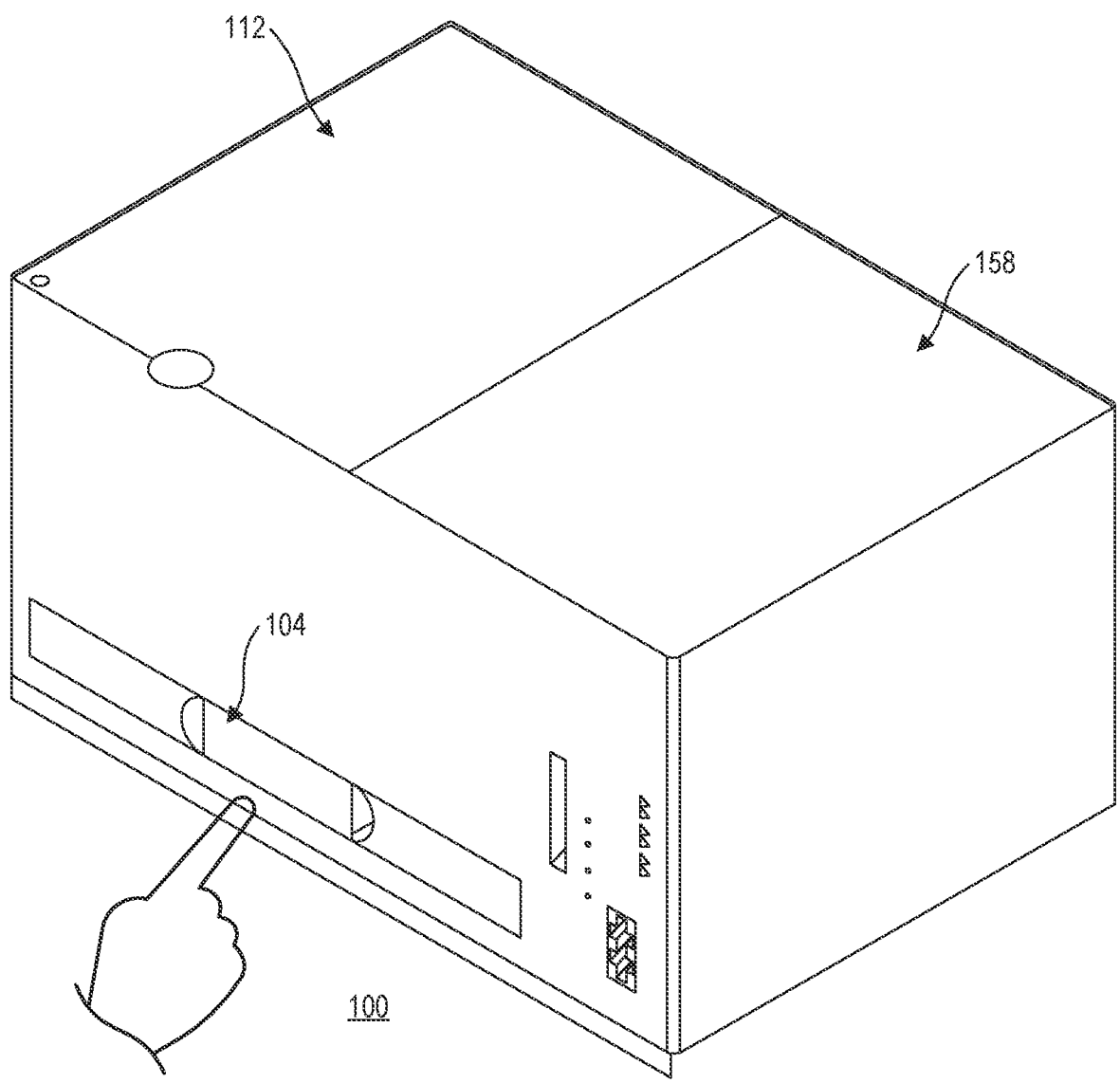
Figures 1, 1M, 2, 3:
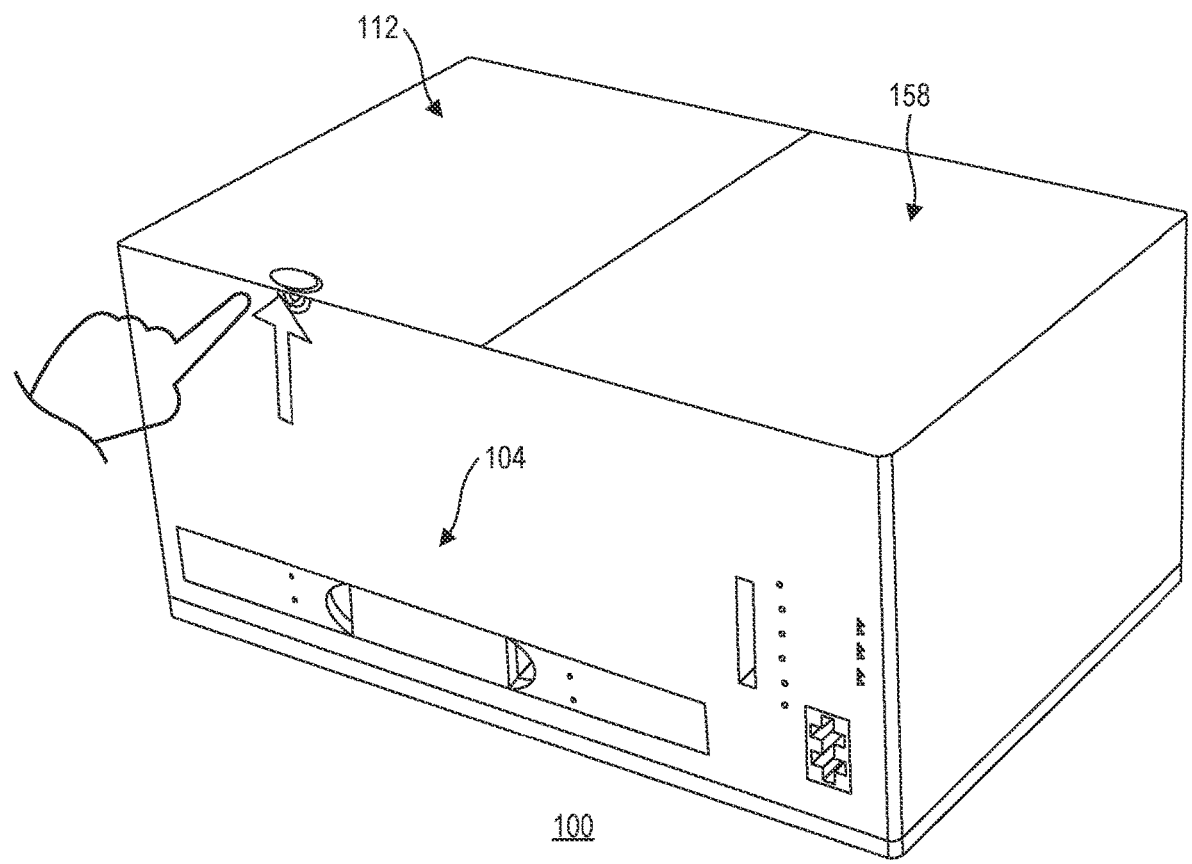
Figures 1, 1M, 2, 3, 4:
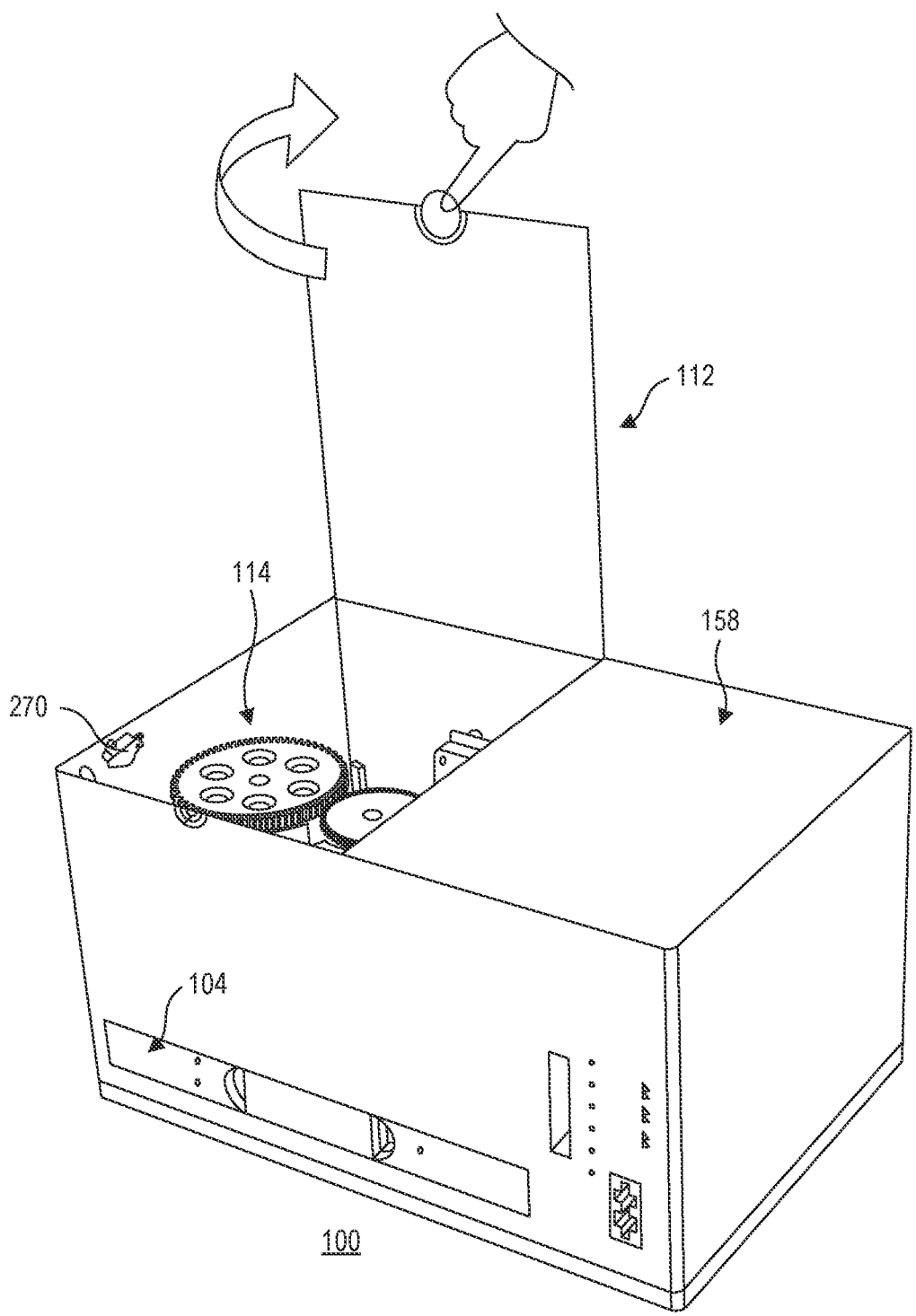
Figures 1, 1M, 2, 3, 4, 5:
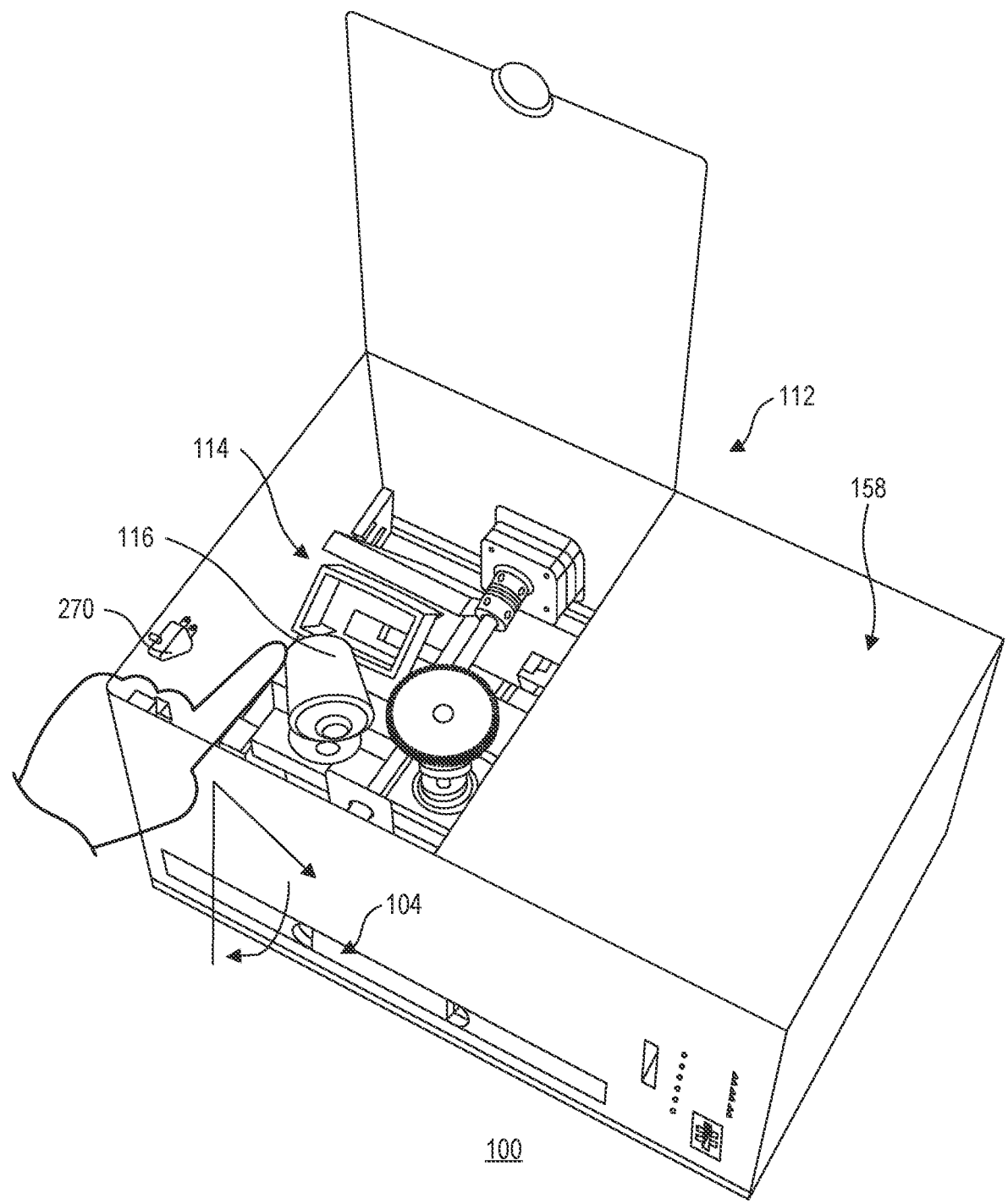
Figures 1, 1M, 2, 3, 4, 5, 6:
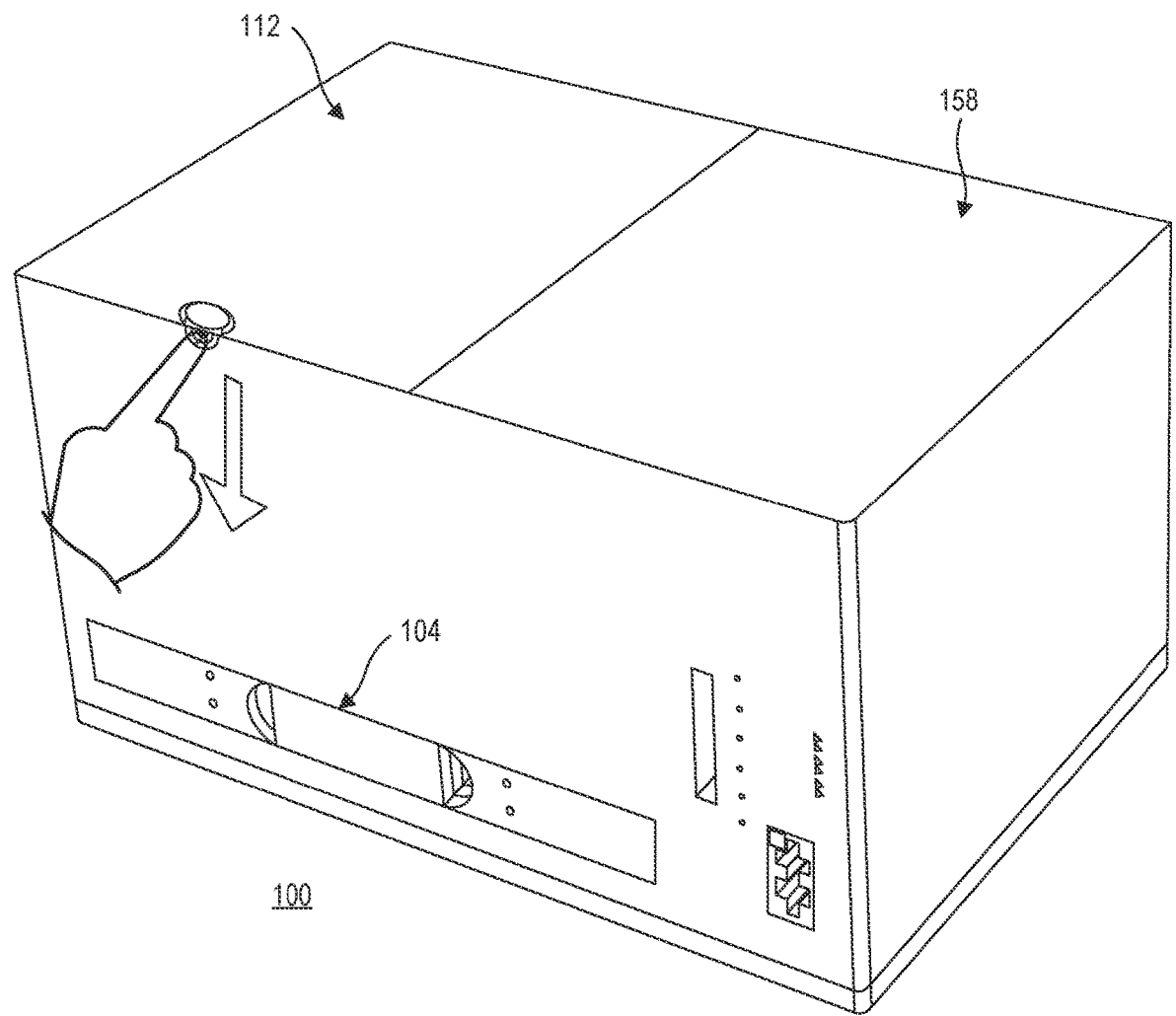
Figures 1, 1M, 2, 3, 4, 5, 6, 7:
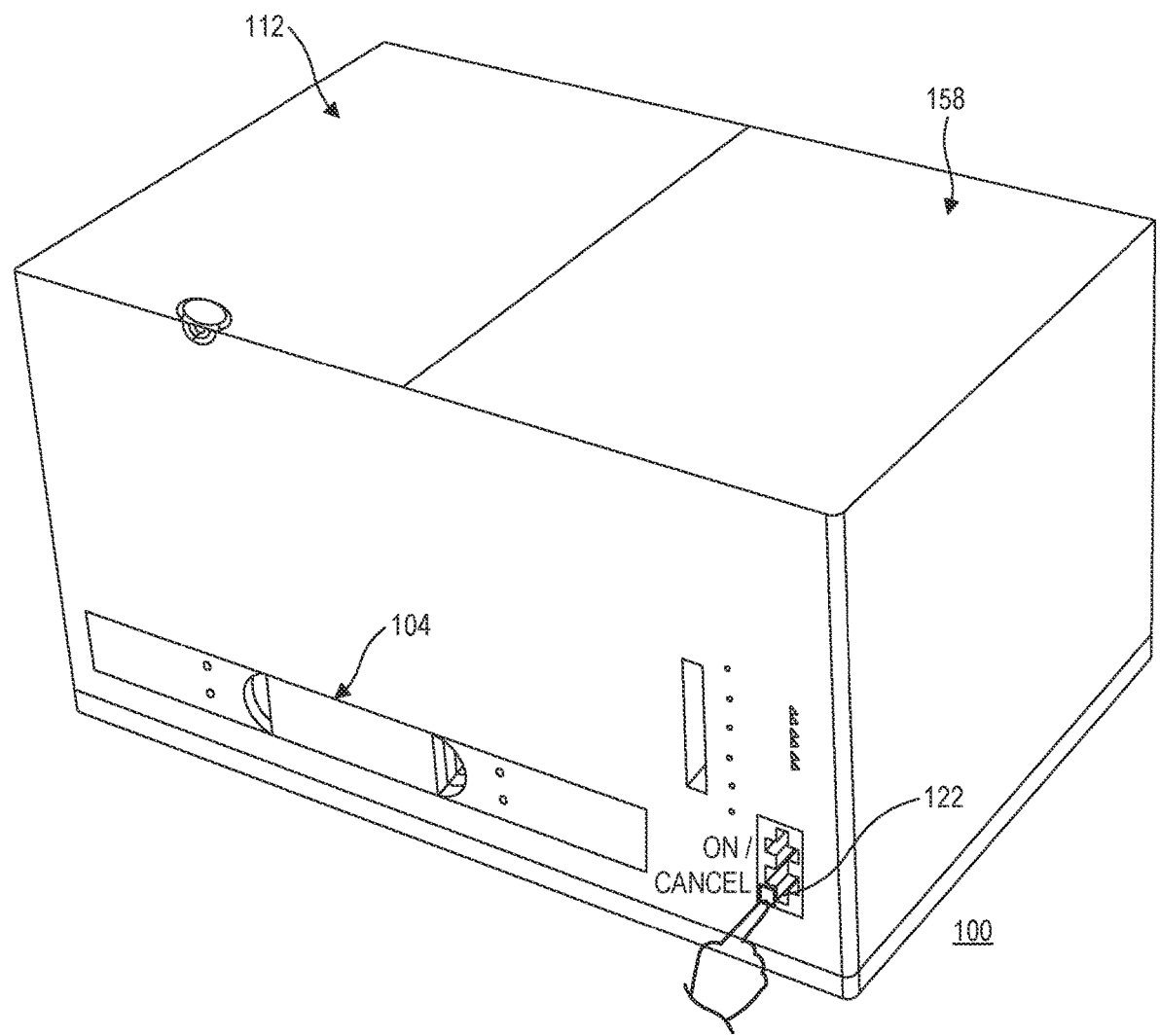
Figures 1, 1M, 2, 3, 4, 5, 6, 7, 8:
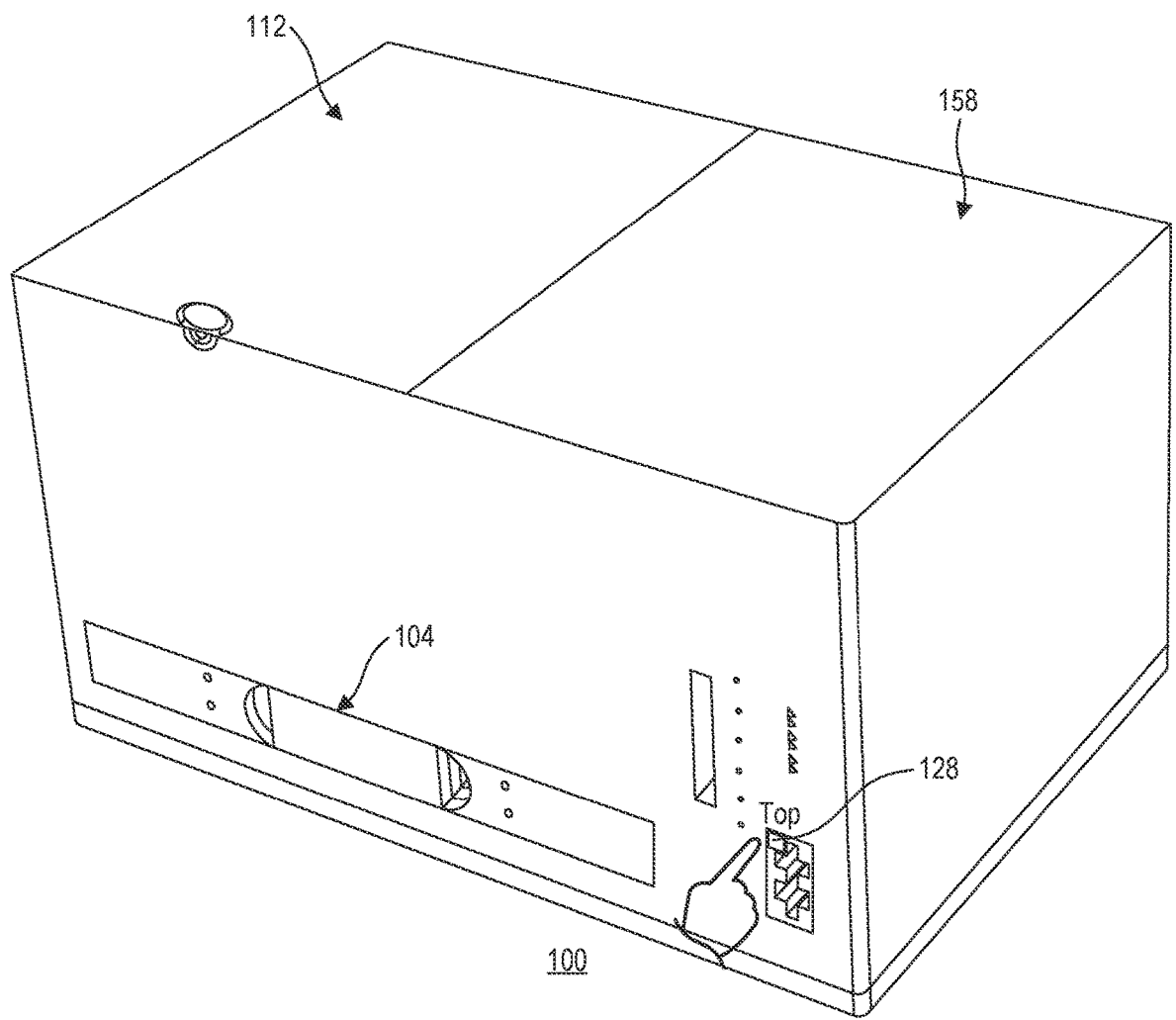
Figures 1, 1M, 2, 3, 4, 5, 6, 7, 8, 9:
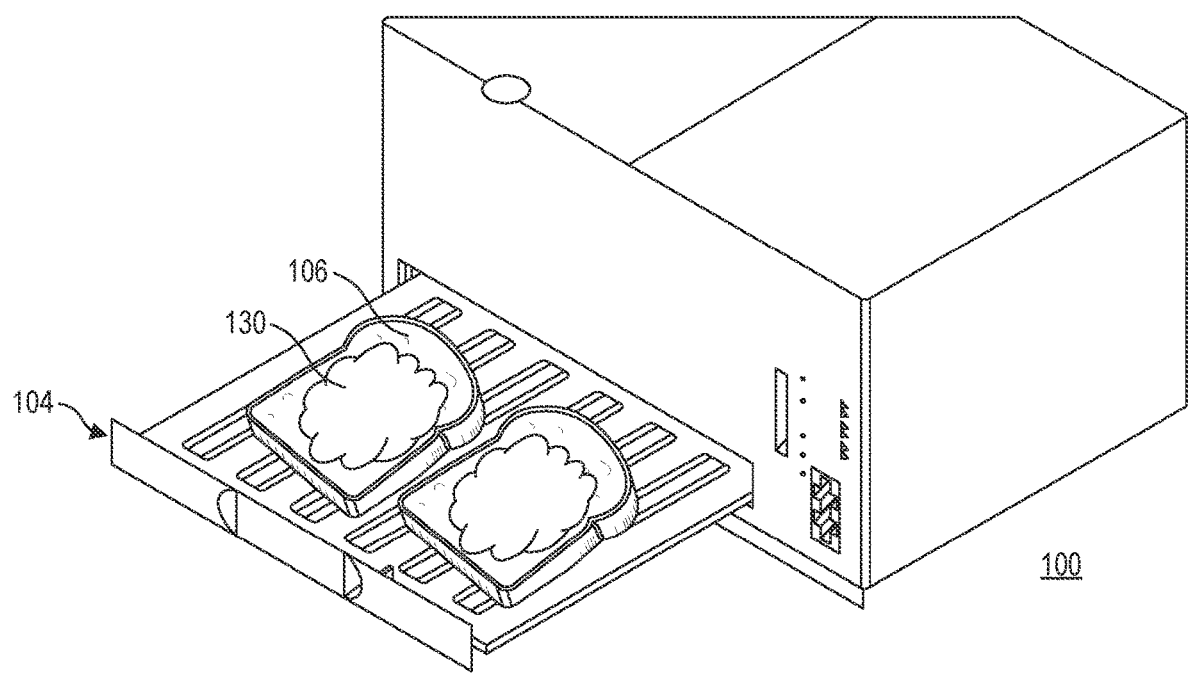

FIGS. 1M-1 to 1M-9 are non-limiting, exemplary illustrations for topping a base food item only (e.g., topping a slice of bread) but without cooking in accordance with one or more embodiments of the present invention. If the user wishes to only top a base food item with topping but without cooking it, then users may simply position desired base food item 106 on main tray 104, and move it to close position (FIGS. 1M-1 and 1M-2).

User would then open topping cover 112 (if closed) (FIGS. 1M-3 and 1M-4), and secure a topping container 116 into topping holder 632 (as detailed above in relation to FIGS. 1E-3 to 1E-6 and also shown in FIG. 1M-5), and close topping cover 112 (FIG. 1M-6).

As shown in FIG. 1M-7, the user then actuates power ON button (assuming device 100 was OFF). Next, the user may simply select and actuate topping button 128 only (FIG. 1M-8). As shown in FIG. 1M-9, the process will result in base food item 106 with topping but without it being cooked.

The following is a table for control user interface 102, which details user control combination sequence list and outcomes. It should be noted that the following table provides a non-limiting example of various sequence combinations and hence, should not be limiting. For example, cancel may be selected at any time during any operation (regardless of any sequence of button actuated) to cancel operations and in fact, turn OFF the device immediately.

Figure 17A:
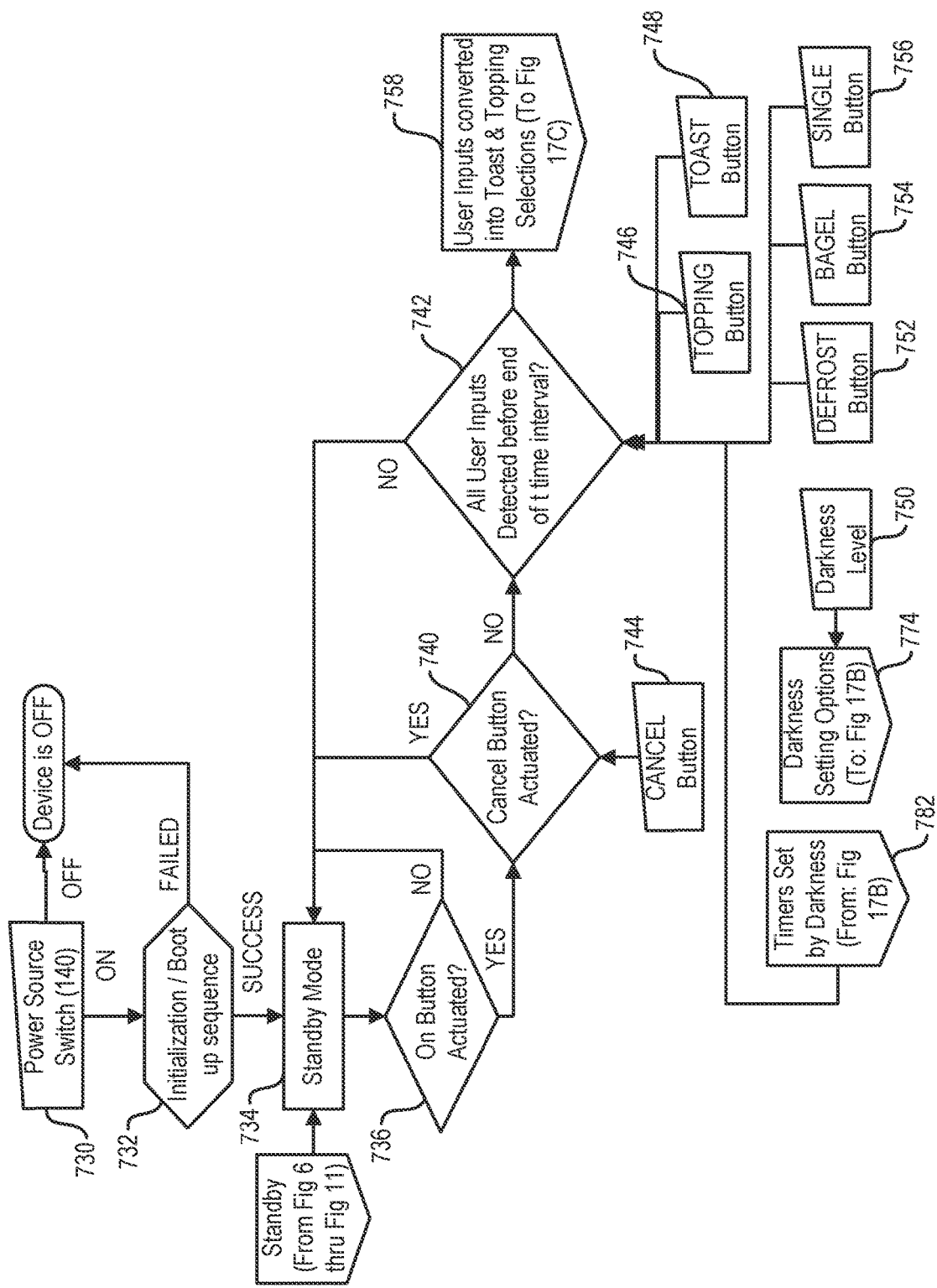
FIGS. 17A to 17R are non-limiting, exemplary illustrations of flow diagrams of controller unit operations of device shown in FIGS. 1A to 16B-2 in accordance with one or more embodiments of the present invention.

| Combination Sequence | Outcome |
| --- | --- |
| On/Cancel | Pressing ON/Cancel once moves Controller unit from Standby to active mode of operation; Pressing ON/Cancel twice (or again after ON/Cancel is pressed), places controller unit in Standby mode of operation, shutting power to the rest of Printed Circuit Boards. |
| On + Toast | Activates the toasting (e.g., cooking bread) process 766 (FIG. 17D) after the user input detection time 742 expires (FIG. 17A). The toasting time 780 is set according to the darkness level input 778 (FIG. 17B). |
| On + Topping | Activates the topping process 768 (FIG. 17E) after the user input detection time expires. |
| On + Toast + Topping | Activates the toasting and topping process 764 (FIG. 17G) after the user input detection time expires. The toasting time is set according to the darkness level input. Topping will begin after the delay time 780 set by the darkness level input 778 (FIG. 17B). |
| On + Bagel + Toast | Activates the toasting combination process 774 (FIG. 17F) after the user input detection time expires. The toasting time is set according to the darkness level input. The bottom heater is kept off. |
| On + Defrost + Toast | Activates the toasting combination process after the user input detection time expires. The toasting time is set according to the darkness level input. Applies defrost mode 798 (FIG. 17F). Defrost mode uses a model-based proportional-integral-derivative (PID) control function (e.g., PID controller without feedback) that provides power on/off cycling to the top and bottom heater relay switches resulting in a modulated temperature profile lower than what would normally operate. In addition, more |

-continued

| Combination Sequence | Outcome |
| --- | --- |
| | toasting time is added to allow the frozen content of the base food to melt before the outer surfaces overcook. |
| On + Bagel + Defrost + Toast | Activates the toasting combination process after the user input detection time expires. The toasting time is set according to the darkness level input. The bottom heater is kept off. Applies defrost mode. |
| On + Defrost + Bagel + Toast | Same as On + Bagel + Defrost + Toast because the sequence of Defrost and Bagel input selections do not change the outcome when pressed before the user input detection time expires. |
| On + Toast + Bagel | Same as On + Bagel + Toast. |
| On + Toast + Defrost | Same as On + Defrost + Toast. |
| On + Toast + Bagel + Defrost | Same as On + Bagel + Defrost + Toast because the sequence of Toast, Defrost and Bagel input selections do not change the outcome when pressed before the user input detection time expires. |
| On + Toast + Defrost + Bagel | Same as On + Bagel + Defrost + Toast because the sequence of Toast, Defrost and Bagel input selections do not change the outcome when pressed before the user input detection time expires. |
| On + Bagel + Topping | Activates the topping combination process after the user input detection time expires. The dispenser will not apply topping food item in the areas identified as to avoid 824 and 832 (FIG. 17I)<br>As an example, the dispenser will not apply topping food item over the hole in a bagel. |
| On + Single + Topping | Activates the topping combination process after the user input detection time expires. The dispenser will not apply topping food item in the areas identified as to avoid 828 (FIG. 17I)<br>As an example, the dispenser will only apply topping food item from the Starting position of the predefined passageway to the Mid position. |
| On + Bagel + Single + Topping | Activates the topping combination process after the user input detection time expires. The dispenser will not apply topping food item in the areas identified as to avoid 824 (FIG. 17I)<br>As an example, the dispenser will not apply topping food item over the hole in a bagel and dispenser will only apply topping food item from the Starting position of the predefined passageway to the Mid position. |
| On + Single + Bagel + Topping | Same as On + Bagel + Single + Top as the Bagel and Single buttons can be activated in either order. |
| On + Bagel + Toast + Topping | Combines On + Bagel + Toast sequence with On + Bagel + Topping sequence together. |
| On + Single + Toast + Topping | Combines On + Single + Toast sequence with On + Single + Topping sequence together. |
| On + Defrost + Toast + Topping | Combines On + Defrost + Toast sequence with On + Topping sequence together. |
| On + Bagel + Single + Toast + Topping | Combines On + Bagel + Toast sequence with On + Bagel + Single + Topping sequence together. |
| On + Bagel + Defrost + Toast + Topping | Combines Bagel + Defrost + Toast sequence with On + Bagel + Topping sequence together. |
| On + Single + Defrost + Toast + Topping | Combines On + Defrost + Toast sequence with On + Single + Topping sequence together. |
| On + Single + Defrost + Bagel + Toast + Topping | Combines On + Defrost + Bagel + Toast sequence with On + Single + Bagel + Topping sequence together. |
| On + any combination of Bage/Single/Defrost + Toast + Topping | Will combine the Bagel, Single, and Defrost modes as the order the inputs selections are made do not change the outcome when activated before the input detection time expires. Toast and Top process will execute along with the input combination as described in above similar combinations. |
| On + Topping + Bagel | Same as On + Bagel + Top. |
| On + Topping + Single | Same as On + Single + Top. |
| On + Topping + Bagel + Single | Same as On + Bagel + Single + Top. |
| On + Topping + Single + Bagel | Same as On + Single + Bagel + Top. |
| On + Topping + Toast | Same as On + Toast + Top. |
| On + Toast + Single (or On + Single + Toast) | Same as On + Toast because Single button has no affect on the toaster aspect of the system |
| On + Topping + Defrost (or On + Defrost + Topping) | Same as On + Top because Defrost button has no affect on the topping aspect of the system |
| On + Bagel | Will result in Standby mode after input detection time expires as Toast and/or Topping was not selected. |

| Combination Sequence | Outcome |
|---|---|
| On + Single | Will result in Standby mode after input detection time expires as Toast and/or Topping was not selected. |
| On + Defrost | Will result in Standby mode after input detection time expires as Toast and/or Topping was not selected. |
| On + any combination of Bagel/Single/Defrost | Will result in Standby mode after input detection time expires as Toast and/or Topping was not selected. |

Note 1:
The darkness slider is another user input to be used with the Toast mode.

FIGS. 2A to 2L are non-limiting, exemplary systems overview illustrations of the device shown in FIGS. 1A to 1M-9, illustrating details of the various components in accordance with one or more embodiments of the present invention. FIGS. 2A to 2L illustrate the cooperative working relationship, orientation, and positioning, of the various systems, subsystems, and components of device 100 in accordance with one or more embodiments of the present invention, with each system, subsystem, and component of device 100 further detailed below.

As illustrated in FIGS. 1A to 2L, device 100 is comprised of a cooker and a topper for cooking and topping of food. The food may include base food item 106 and a topping food item 130 wherein base food item 106 is cooked and also topped with topping food item 130 if both the cooker and the topper are operational. Additionally, base food item 106 may be cooked without any topping food item 130 if the cooker is operational and the topper is not operational. Further, base food item 106 may be topped with topping food item 130 without cooking if the topper is operational and the cooker is not operational.

In the non-limiting, exemplary instance shown, device 100 is comprised of various electronic Printed Circuit Boards (PCB) that provide power signal, image signal, and control signals to cooker, topper, and various other components (e.g., safety components such as tray/cover solenoids, limiter switches, etc.) of device 100, all of which are detailed below.

In general, the cooker is comprised of a heater system for cooking base food item 106 and the topper is comprised of motive system that moves topping dispenser mechanism 114 over base food item 106.

Heater system of device 100 is comprised of a first heater assembly 254 (e.g., bottom heater), a second heater assembly (e.g., top heater) 256, and associated electronic PCBs, such as power converter 262, power PCB 264, controller unit (CU) 260, and a relay PCB 258. Depending on base food item 106 and the type of cooking and or topping selected, power may be provided to one or both heater assemblies.

As further detailed below, second heater assembly 256 is supported by lateral supports 152 and 154 and a rear panel support 156, with first heater assembly 254 supported by lateral supports 152 and 154 only.

Figure 12A:
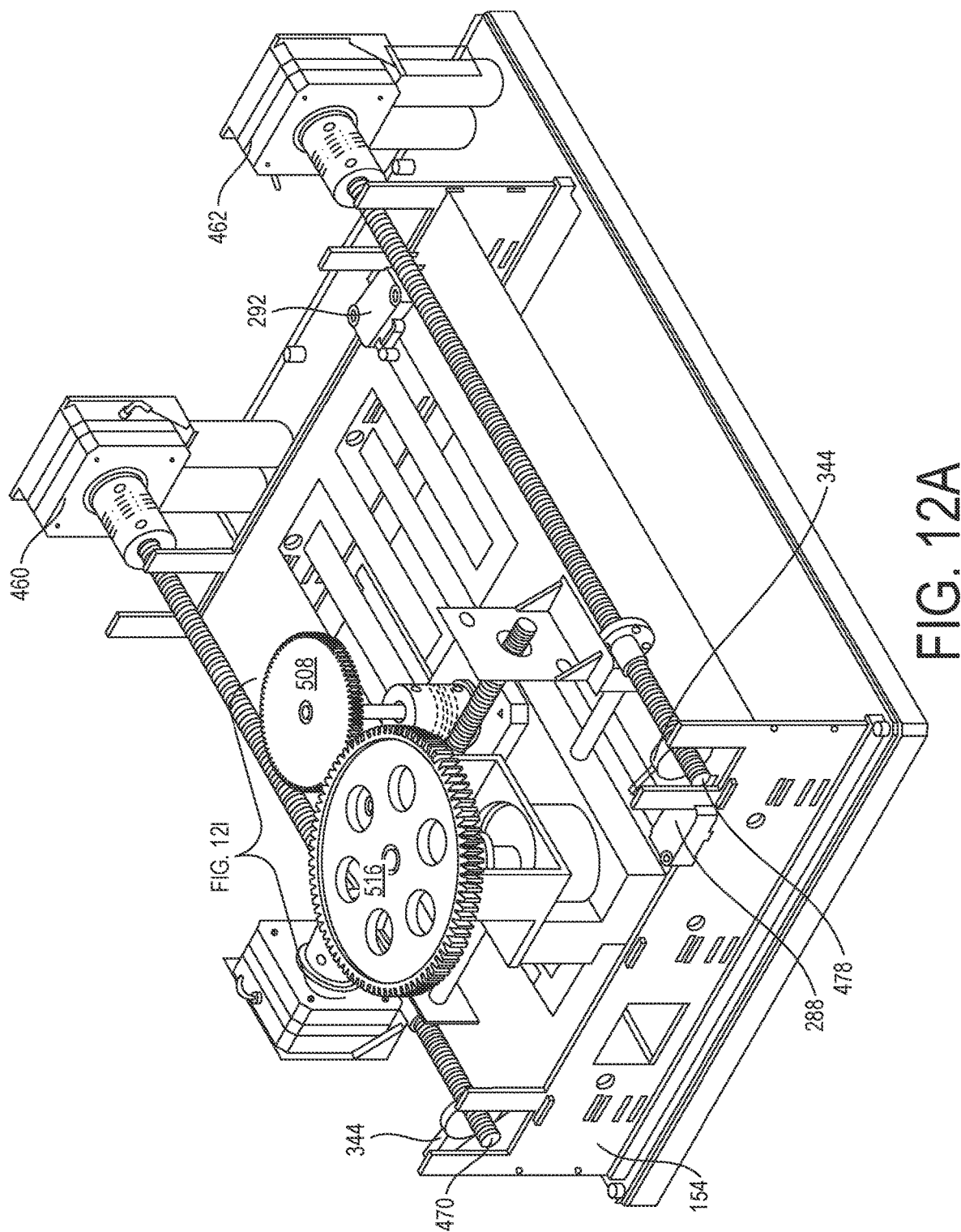
FIGS. 12A to 12L are non-limiting, exemplary illustrations of a motive system of device shown in FIGS. 1A to 11E in accordance with one or more embodiments of the present invention.
Figure 12B:
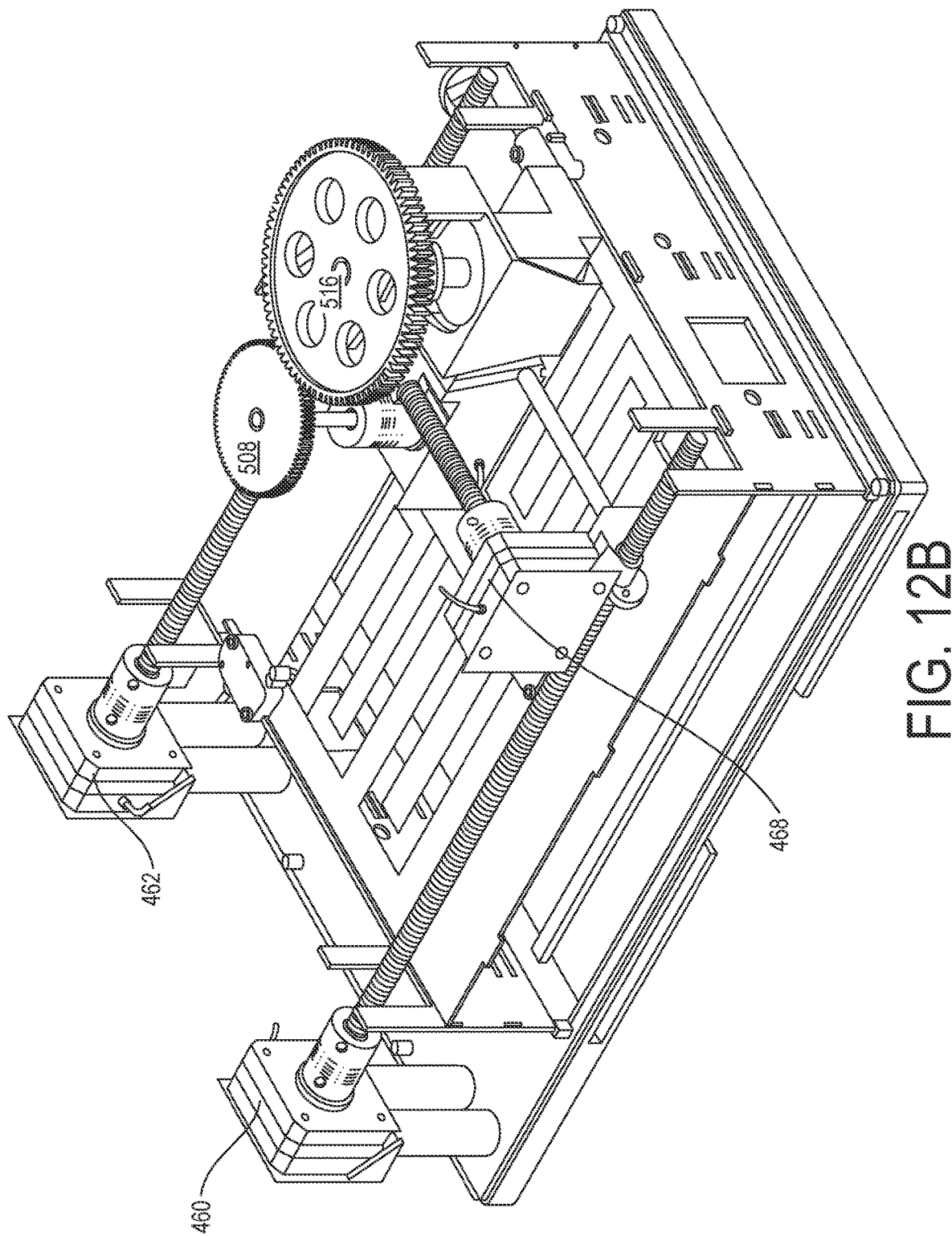
Figure 12C:
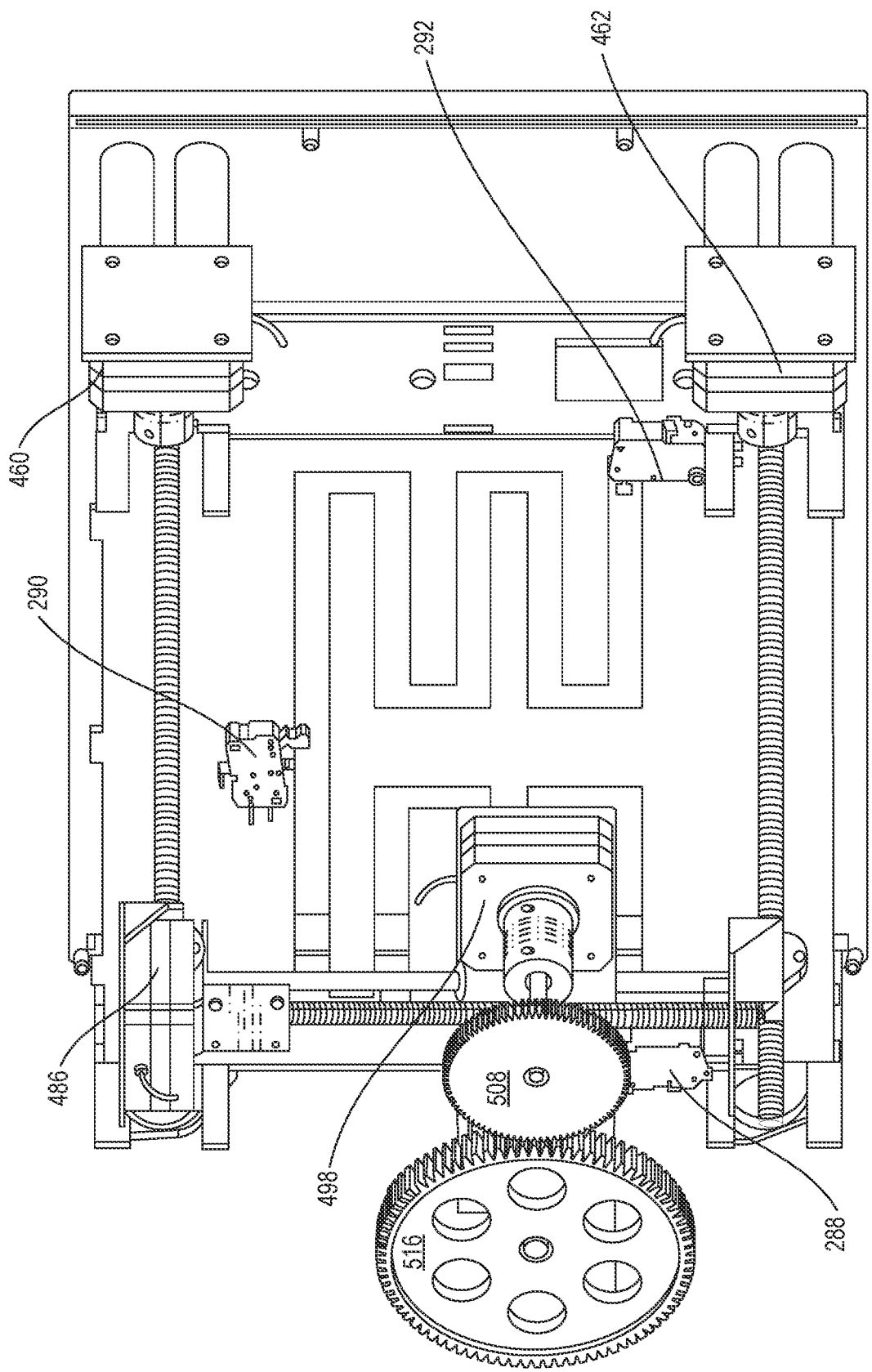
Figure 12D:
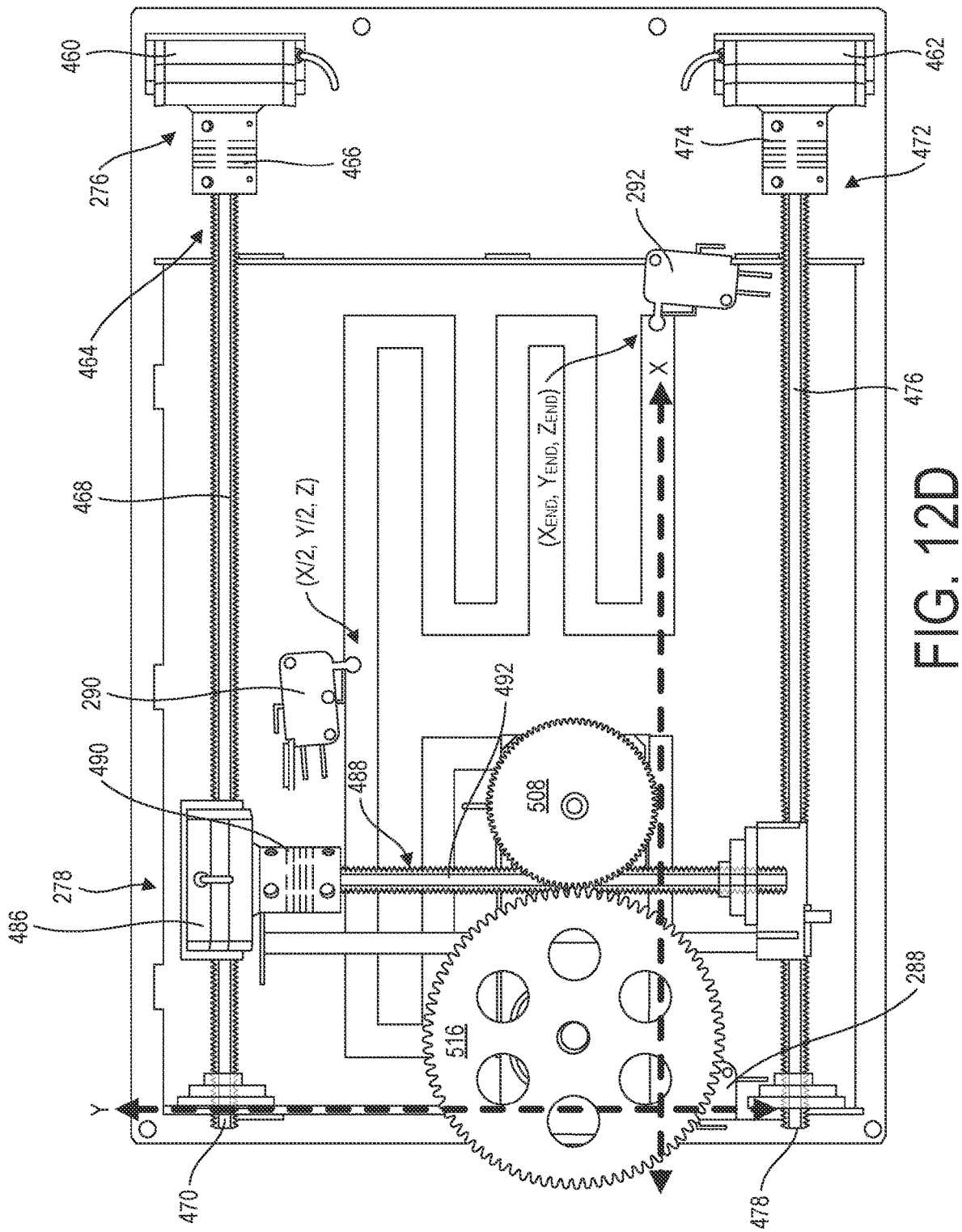
Figure 12E:
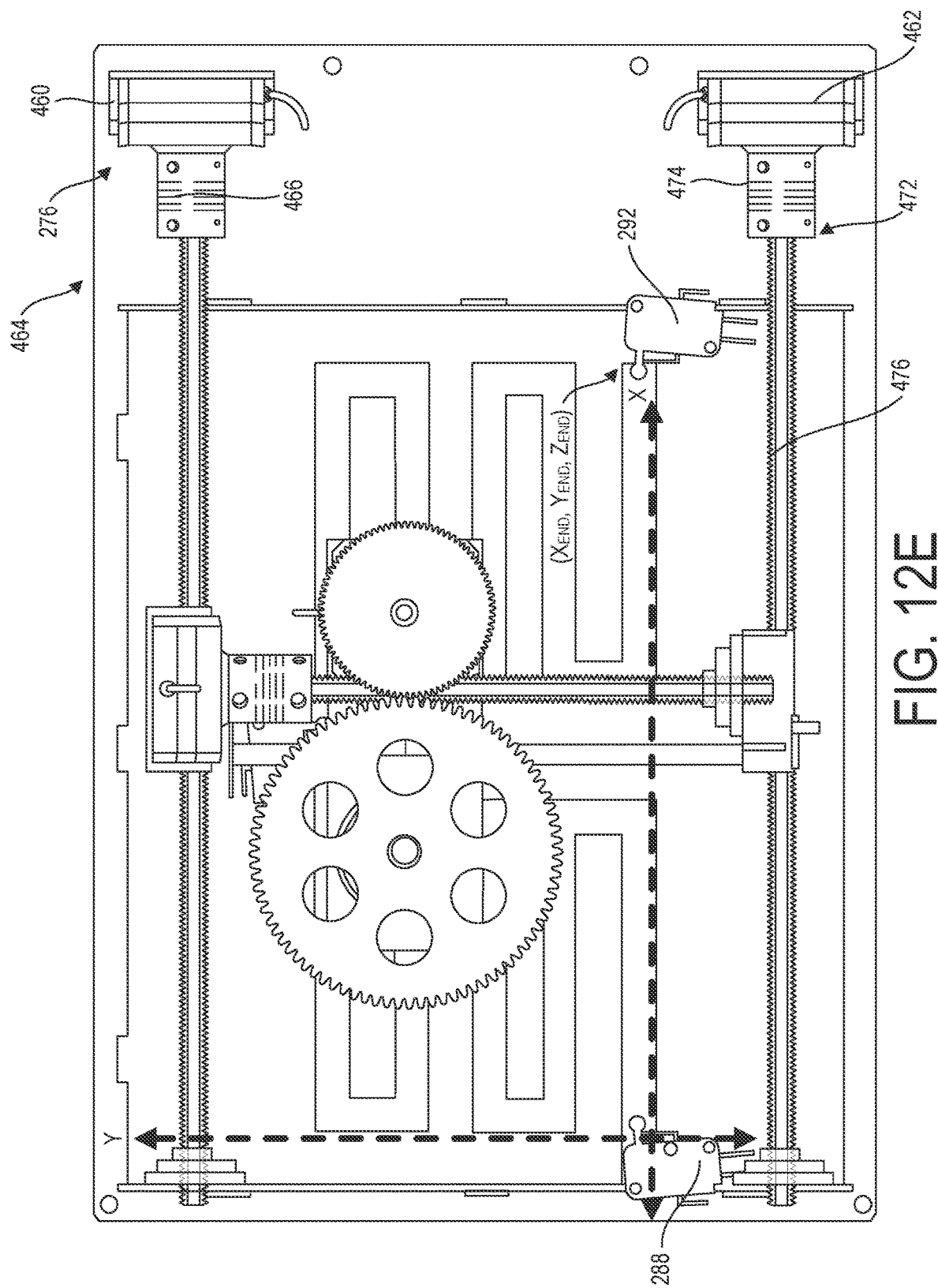
Figure 12F:
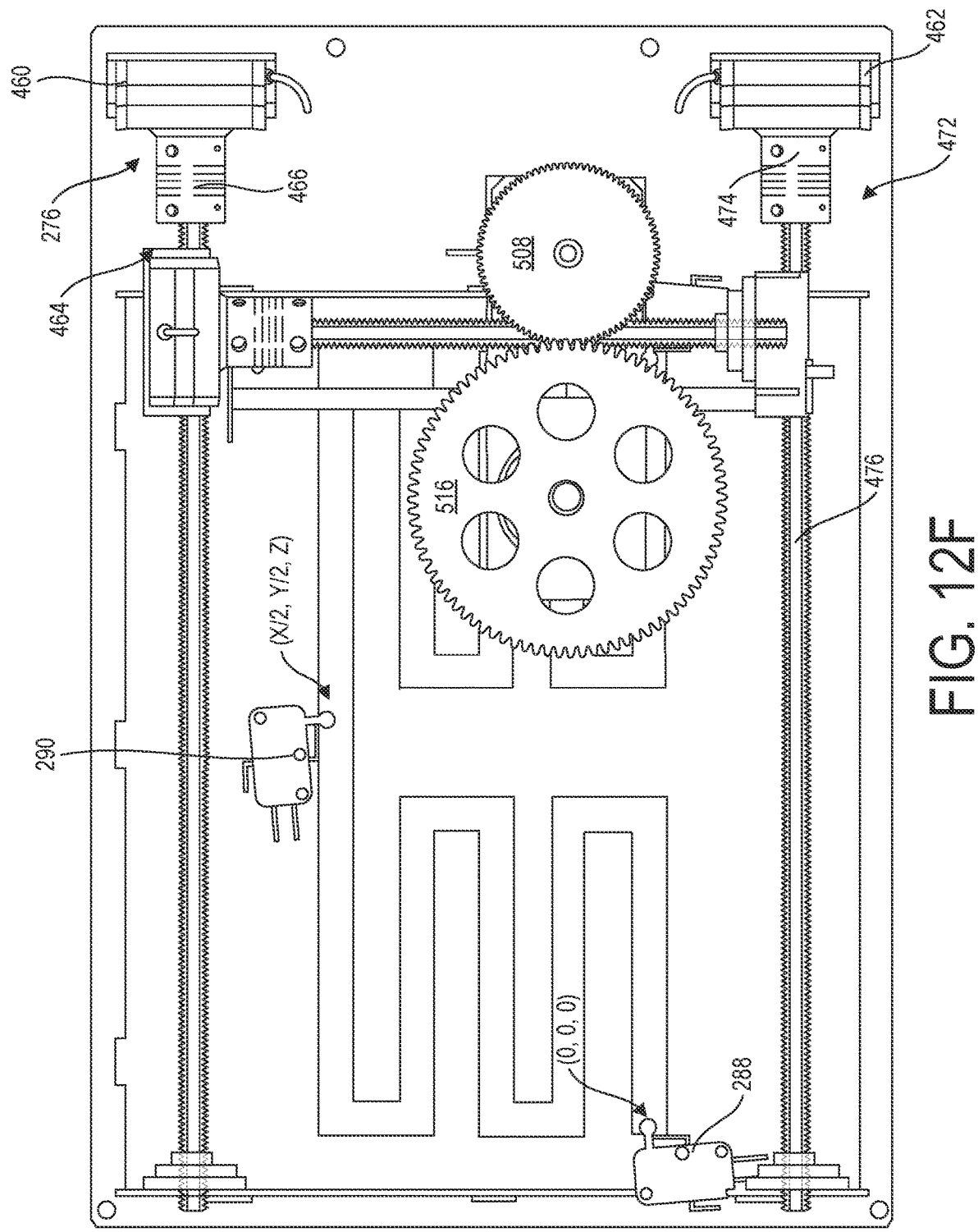
Figure 12G:
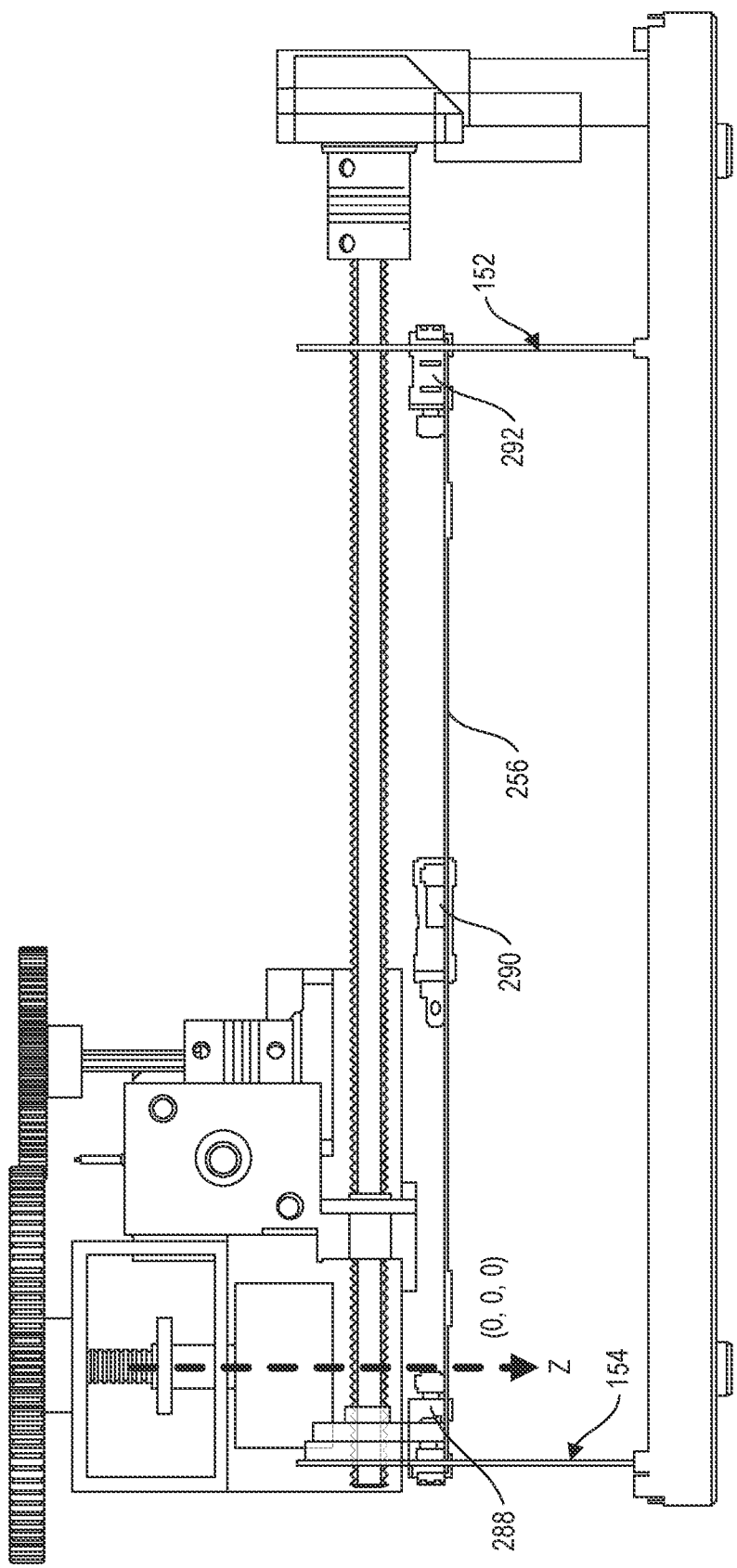
Figure 12H:
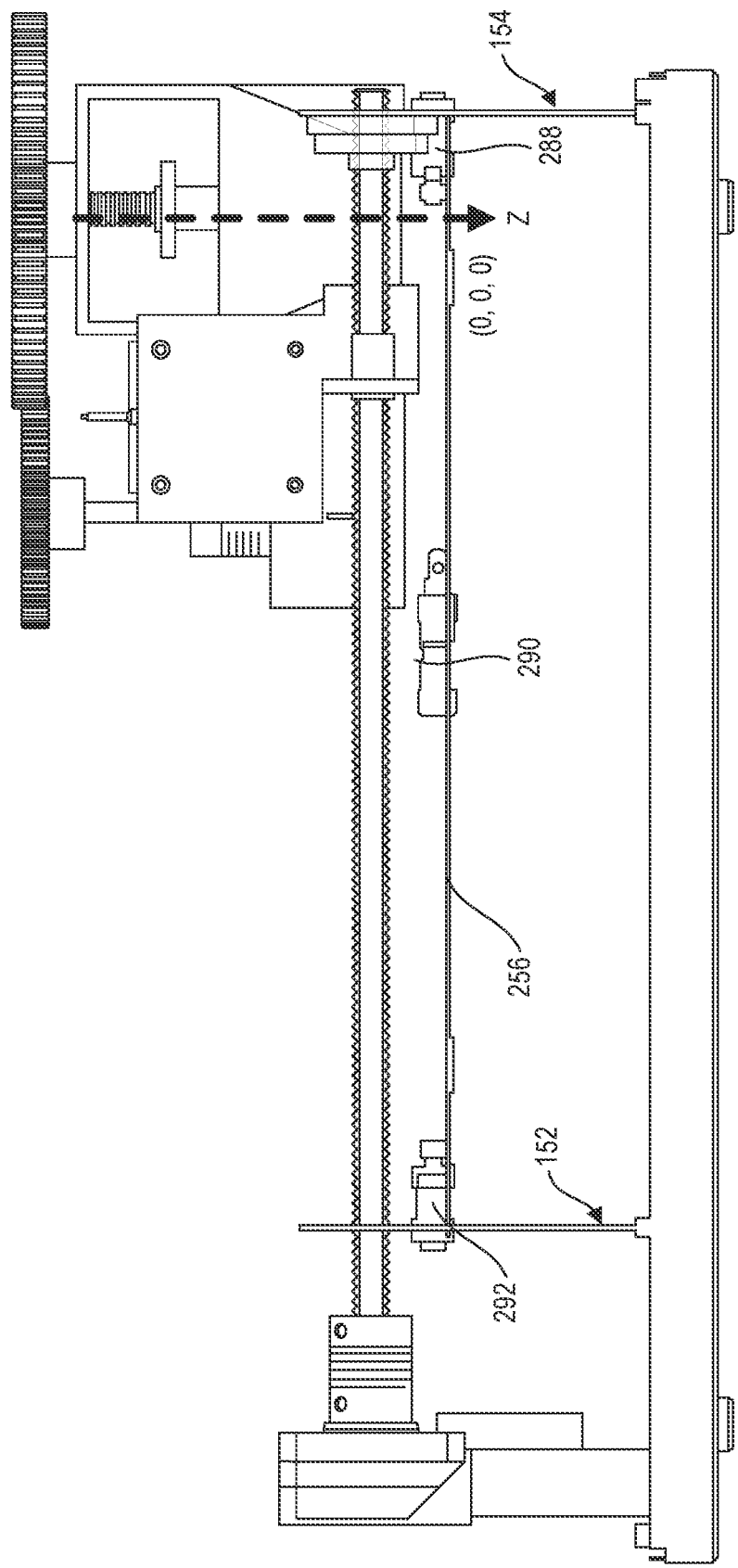
Figure 12I:
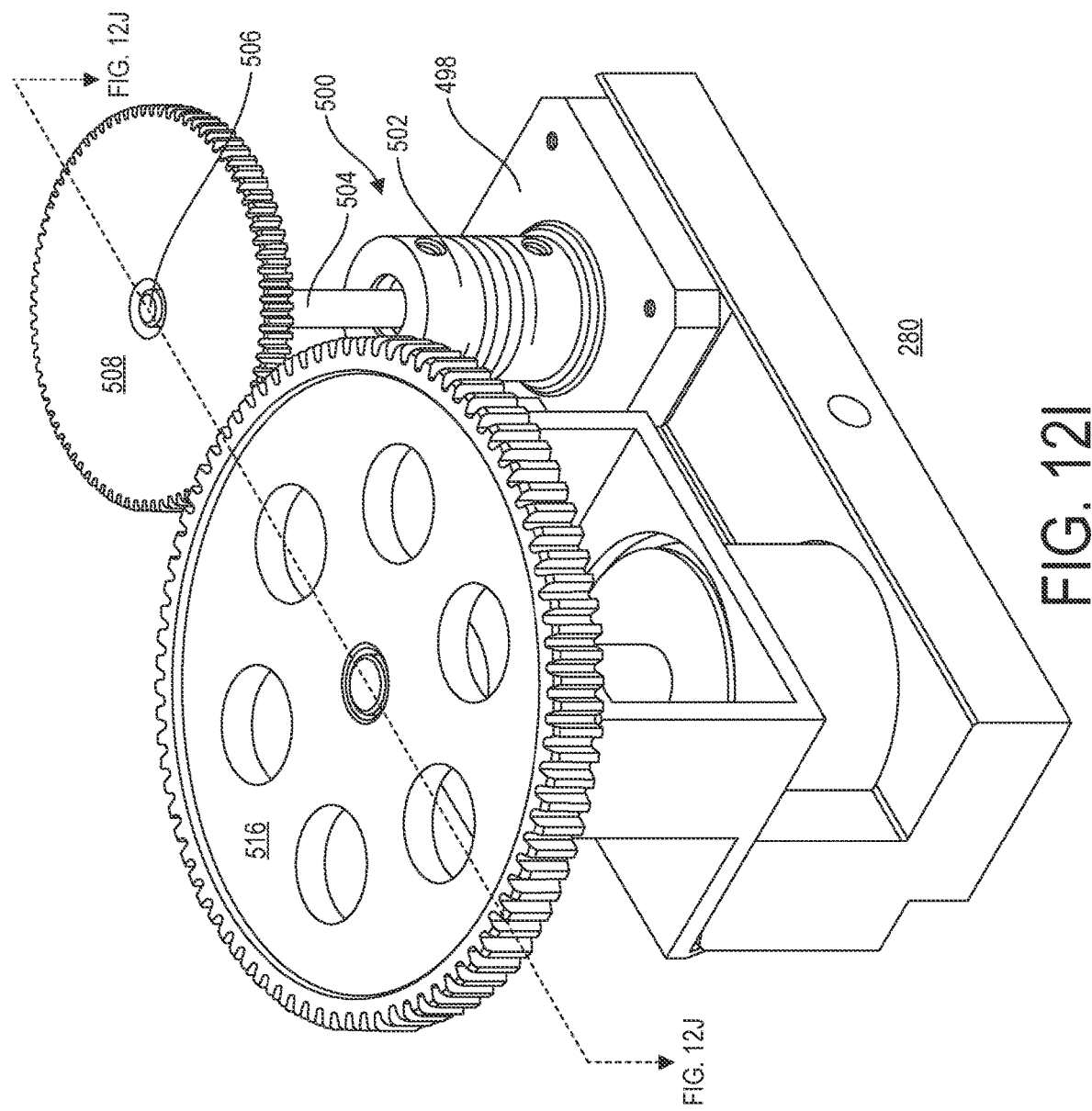
Figure 12J:
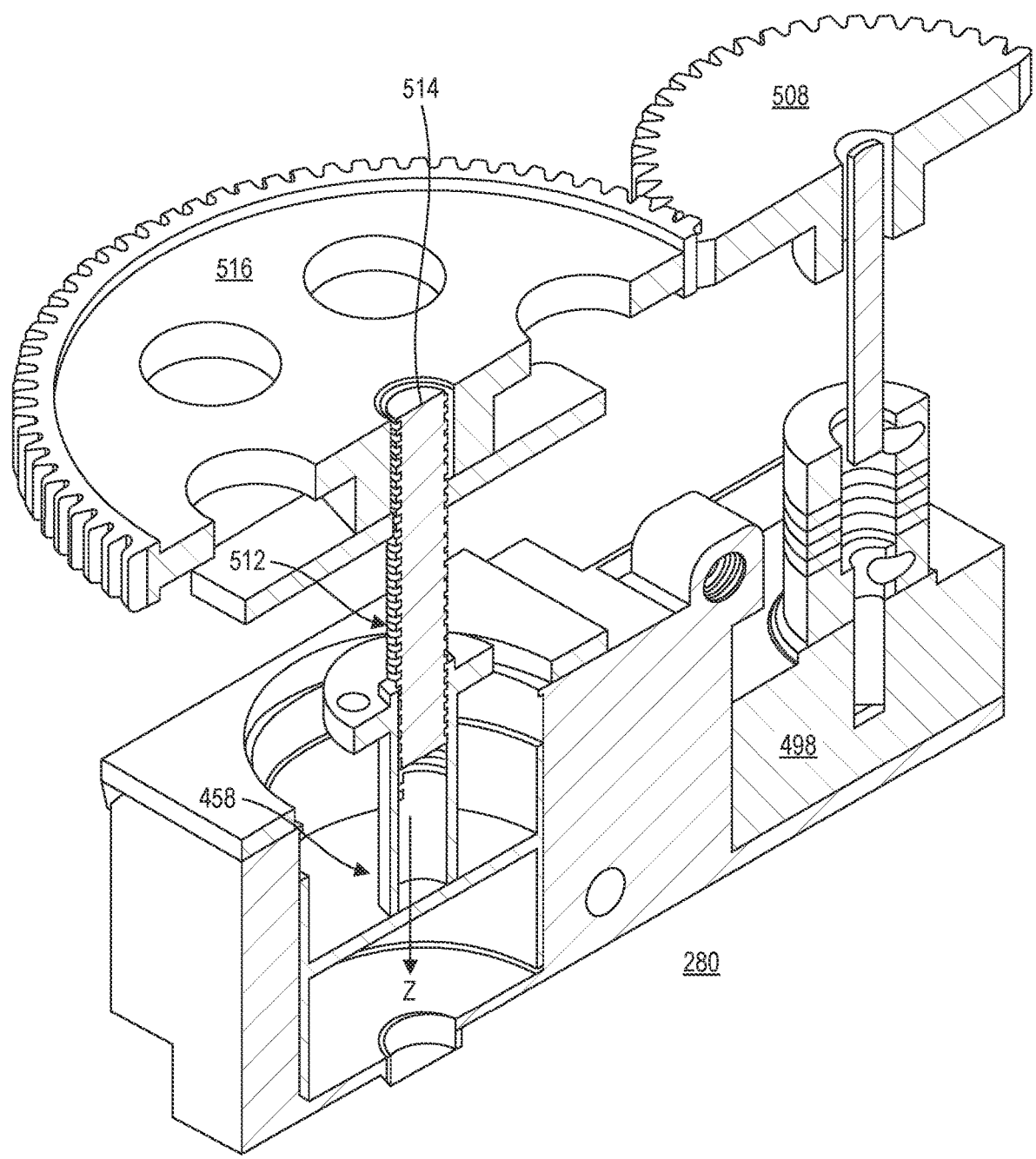
Figure 12K:
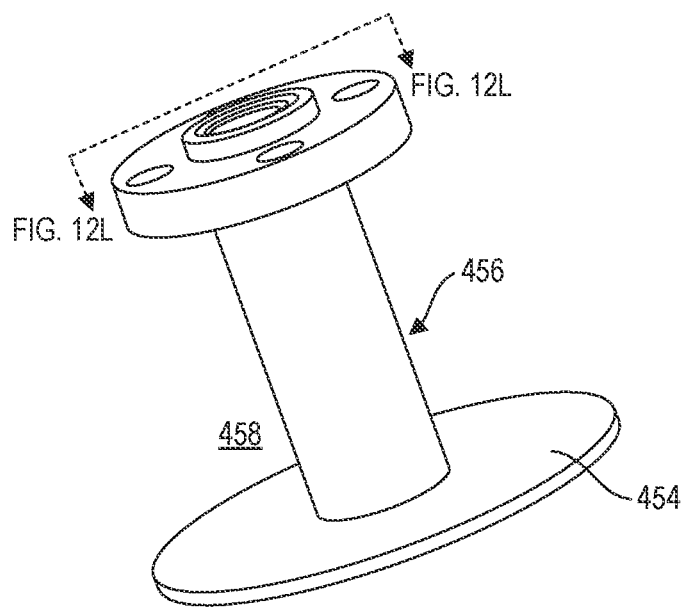
Figure 12L:
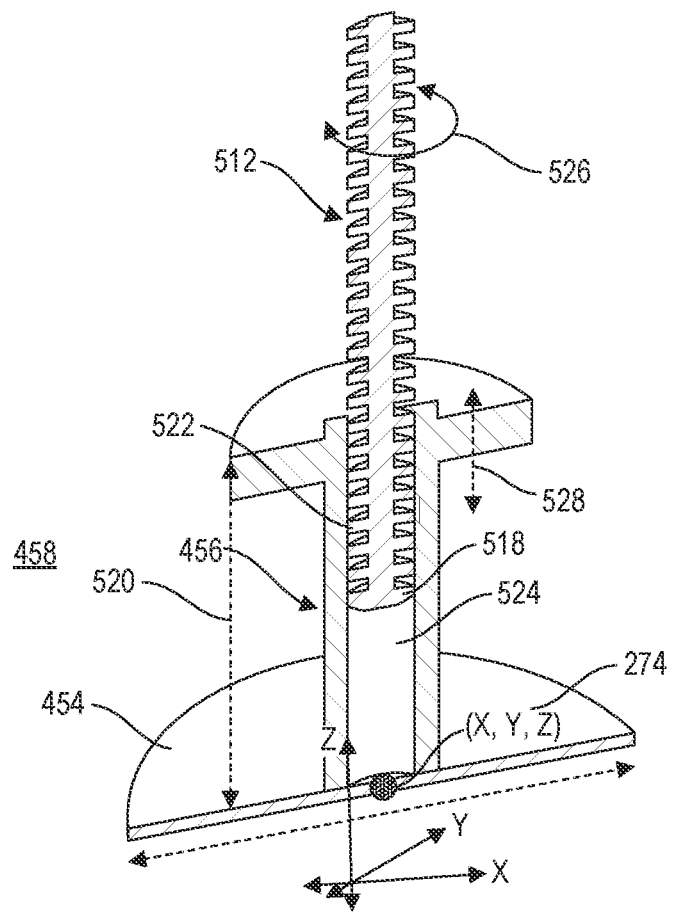

The motive system moves topping dispenser mechanism 114 to a motive dispensing point 274 within device 100, defined by a three-dimensional coordinate system. It should be noted that actual dispensing point 294 (FIG. 15A) is different from motive dispensing point 274 (FIG. 12L).

Actual dispensing point 294 is point (X, Y, $Z_{FIXED}$) at egress portal 296 of cartridge 116 through which topping food item 130 is actually dispensed. Actual dispensing point 296 is defined by an X-axis value, a Y-axis value, and a fixed Z-axis value. On the other hand, motive dispensing point 274 is point (X, Y, Z) defined by an X-axis value, a Y-axis value, and a Z axis value that is not fixed.

The motive system is comprised of an X-direction motive force mechanism 276, a Y-direction motive force mechanism 278, a Z-direction motive force mechanism 280, associated electronic PCBs, and an optional image capturing system 282.

As further detailed below and shown in FIG. 16A to 16B-2, electronics associated with motive system include controller unit 260, optional image capturing system 282, motor driver PCB 284, electrical (stepper) motors 286, a start limiter switch 288, middle limiter switch 290, and end limiter switch 292. --

In general, motive dispensing point 274 within device 100 is defined by an X-positioning coordinate value, a Y-positioning coordinate value, and a Z-positioning coordinate value represented by point (X, Y, Z).

Topper dispensing mechanism 114 is reached to a dispensing point (X, Y, Z) by X-direction motive force mechanism 276, a Y-direction motive force mechanism 278, and the Z-direction motive force mechanism 280 under the control of the various electronic PCBs (detailed below), which may include optional image capturing system 282.

As illustrated, topping dispenser mechanism 114 is positioned above second heater assembly (top heater) 256. As detailed below, second heater assembly 256 includes patterned passageway opening 452 for allowing topping food item 130 to dispense through and onto base food item 106. Main tray 104 is positioned below second heater assembly (top heater) 256 and above first heater assembly (bottom heater) 254.

Main tray 104 is moved from open to close (and vice versa) on a set of rails 298 mounted onto interior facing side 300 of lateral support panels 152 and 154. When main tray 104 is in fully closed position, it actuates electric limiter switch (detailed below) 266, which transmits a "main tray closed" signal to controller unit PCB 260 to enable operation of device 100. As indicated above, a tray solenoid switch 268 when powered, maintains main tray 104 in closed position.

Further included (and detailed below) is a cover limiter switch 270 detects if topping cover 112 is fully closed. When topping cover (or lid) 112 is in fully closed position, cover or lid limiter switch 270 transmits a "lid closed" signal to controller unit PCB 260 to enable operation of device 100. Also included is lid or cover solenoid 272 that maintains lid 112 in a closed position during operation of device 100.

FIGS. 3A to 3D are non-limiting, exemplary overview illustrations of a chassis of device shown in FIGS. 1A to 2L in accordance with one or more embodiments of the present invention. As illustrated in FIGS. 1A to 3D, chassis 146 of device 100 is comprised a base 148 and a case structure 150 associated with base 148.

Chassis 146 further includes first lateral support 152 associated with base 148, positioned inside case structure 150, and a second lateral support 154 associated with base 148, positioned inside case structure 150. Further included is a rear (or back) support panel 156 associated with base 148, positioned inside case structure 150.

Chassis 146 further includes topping cover 112 detachably associated with case structure 150, and a removable maintenance cover 158 detachably associated with case structure 150.

FIGS. 4A to 4J are non-limiting, exemplary illustrations of a base of device shown in FIGS. 1A to 3D in accordance with one or more embodiments of the present invention. As illustrated in FIGS. 1A to 4J, base 148 is comprised of a top side 160 (FIGS. 4A to 4F) and a bottom side 162 (FIGS. 4G to 4J). Top side 160 is comprised of a raised periphery 164, behind which (interior facing side) bottom sides 166 (FIGS. 4B and 4C) of casing 150 are secured.

Top side 160 further includes a first elongated slot 168 that receives first lateral support 152. First elongated slot 168 is defined longitudinally by a first set of longitudinally extended, linear projections 170 that protrude in parallel from the top side of base 148, forming first parallel walls of first elongated slot 168. First elongated slot 168 is further defined transversely by a first internal flange 172 (FIGS. 4G and 4I-1) that extends partially (e.g., halfway) across first slot 168, extending longitudinally within first slot 168.

Top side 160 of base 148 further includes a second elongated slot 174 that receives second lateral support 154. Second elongated slot 174 is defined by a second set of longitudinally extended, linear projections 176 that protrude in parallel from the top side 160 of base 148, forming second parallel walls of second elongated slot 174. Second elongated slot 174 is further defined transversely by a second internal flange 178 shown in FIGS. 4G and 4I-3 (identical to first internal flange 172) that extends partially (e.g., halfway) across second slot 174, extending longitudinally within second slot 174.

First and the second elongated slots 168 and 174 are parallel in relation to one another and extend longitudinally along a transvers axis 180 of base 148. First and second internal flanges 172 and 178 have a set of fastener openings 182 (FIGS. 4G and 4I-1 to 4I-4) that when parallel with fastener openings 184 of lateral supports 152 and 154 enable securing lateral supports 152 and 154 within first and the second elongated slots 168 and 174.

Figure 4A:
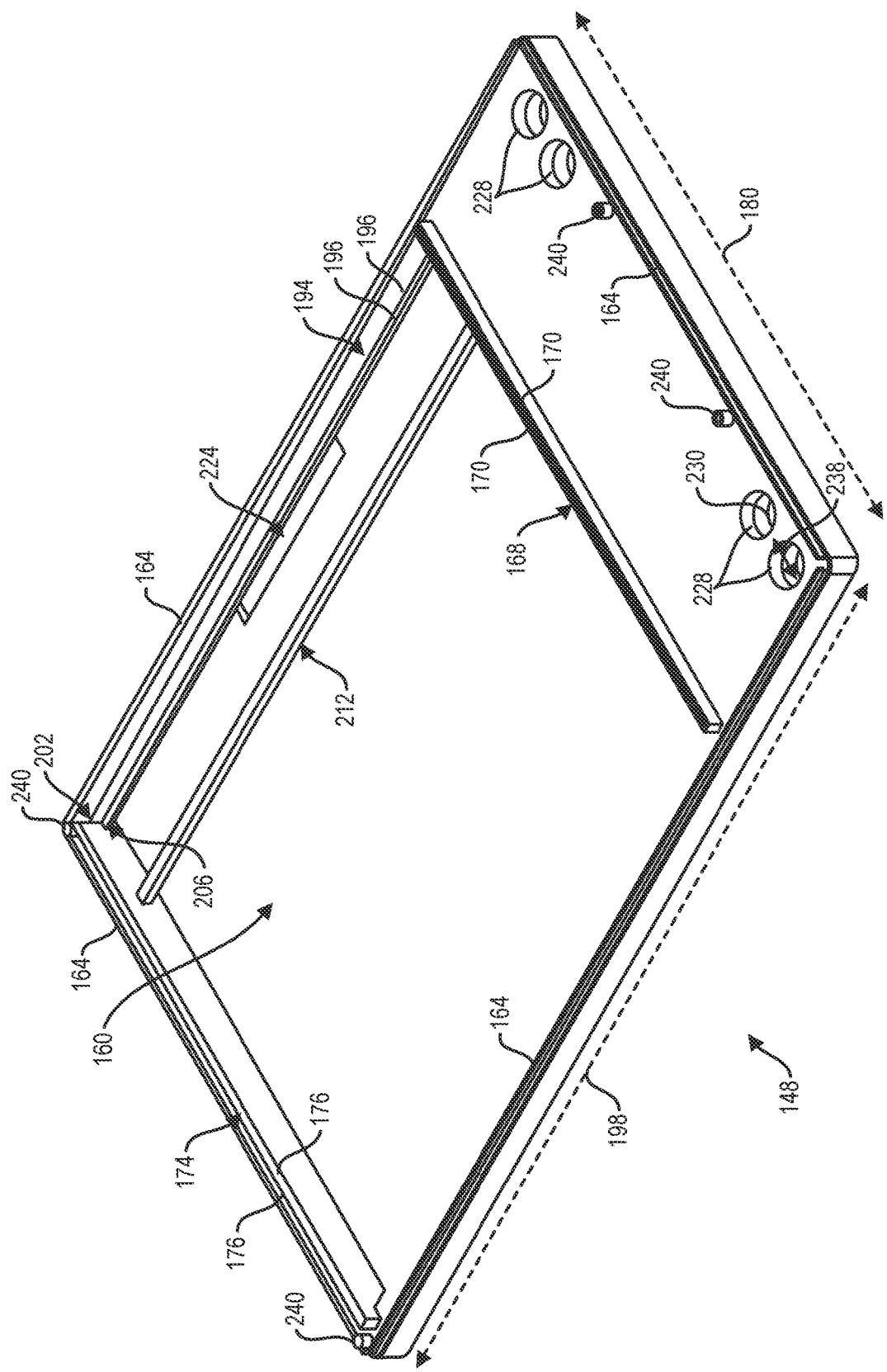
FIGS. 4A to 4J are non-limiting, exemplary illustrations of a base of device shown in FIGS. 1A to 3D in accordance with one or more embodiments of the present invention.
Figure 4B:
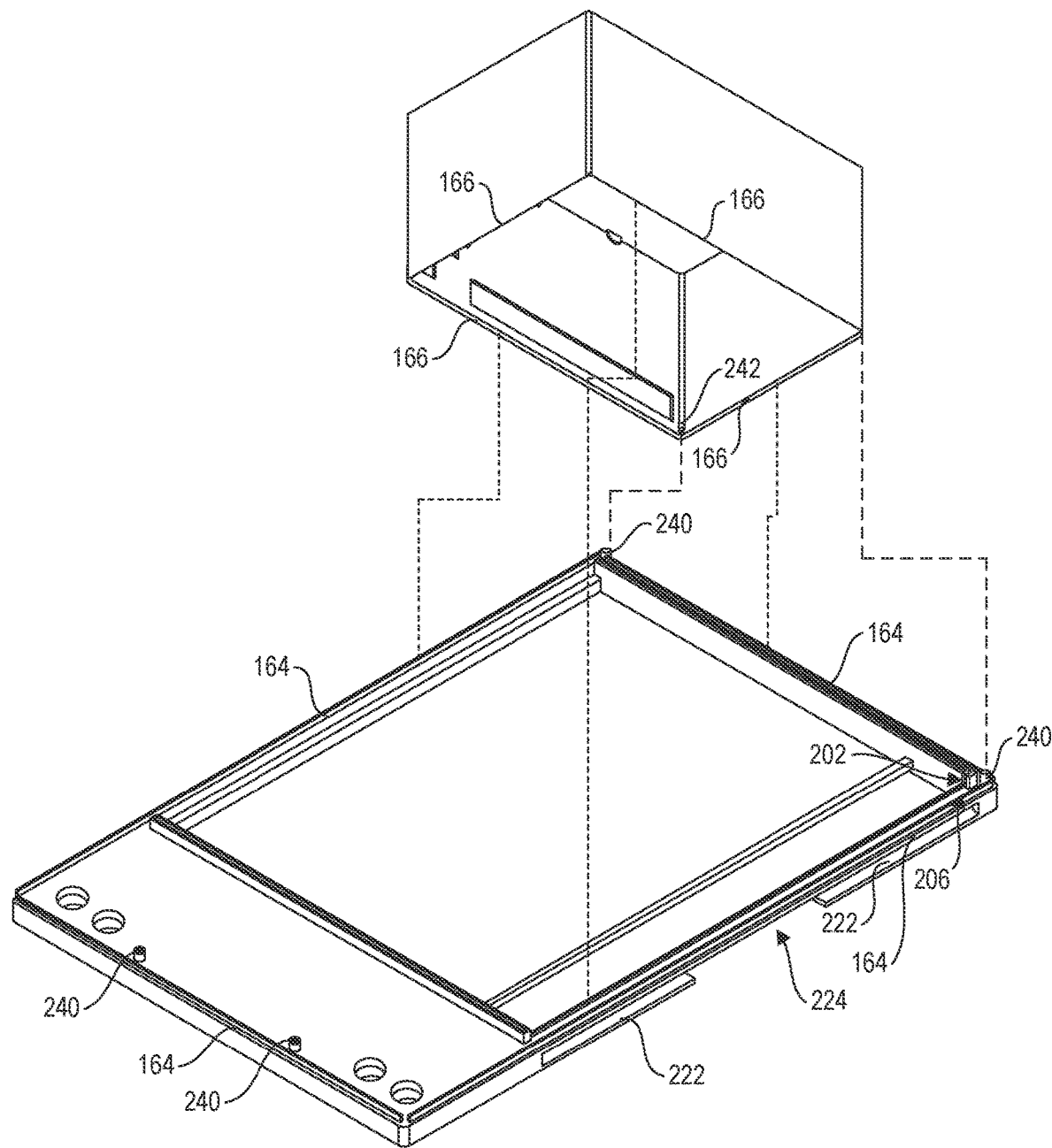
Figure 4C:
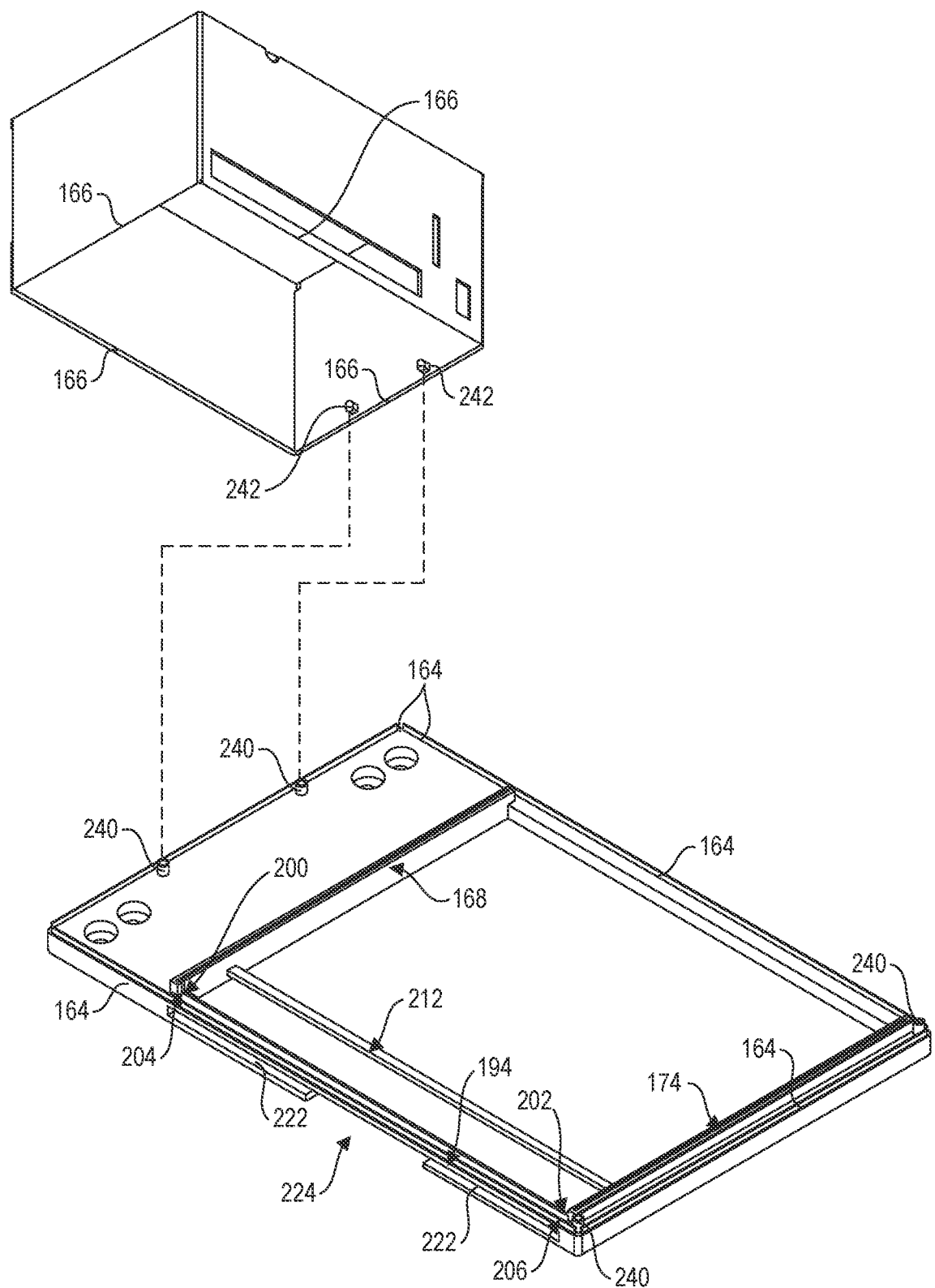
Figure 4D:
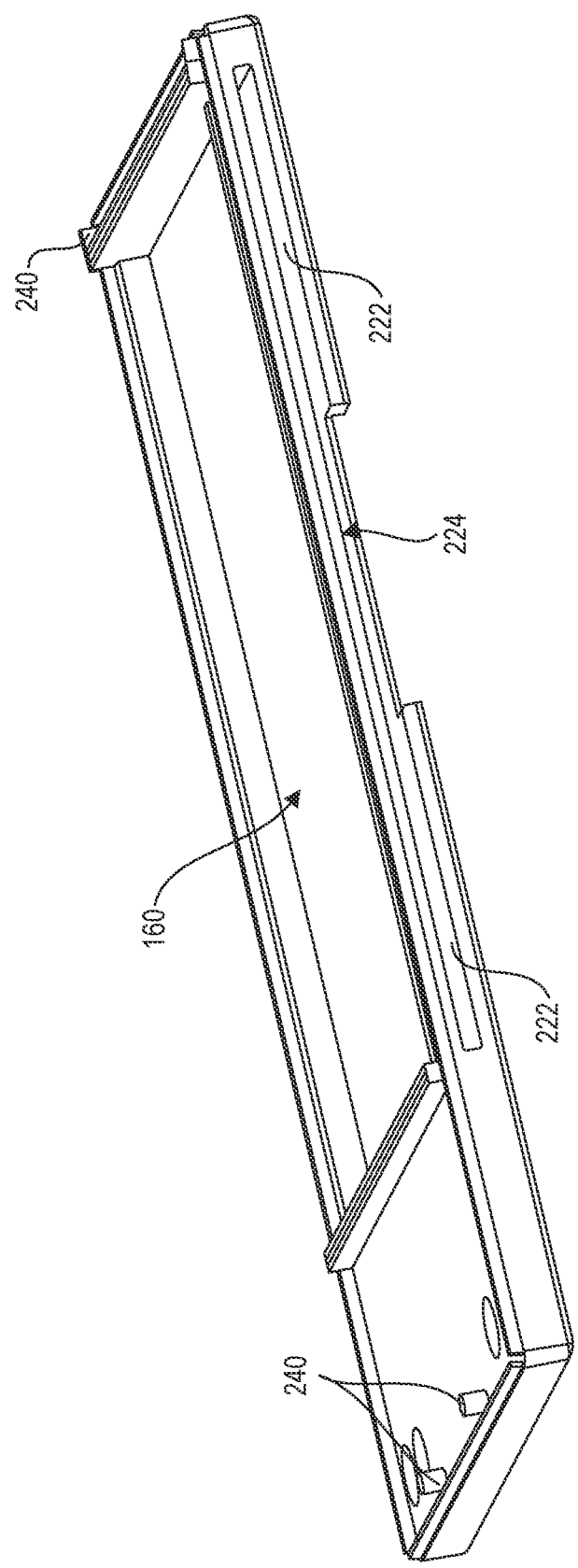
Figure 4E:
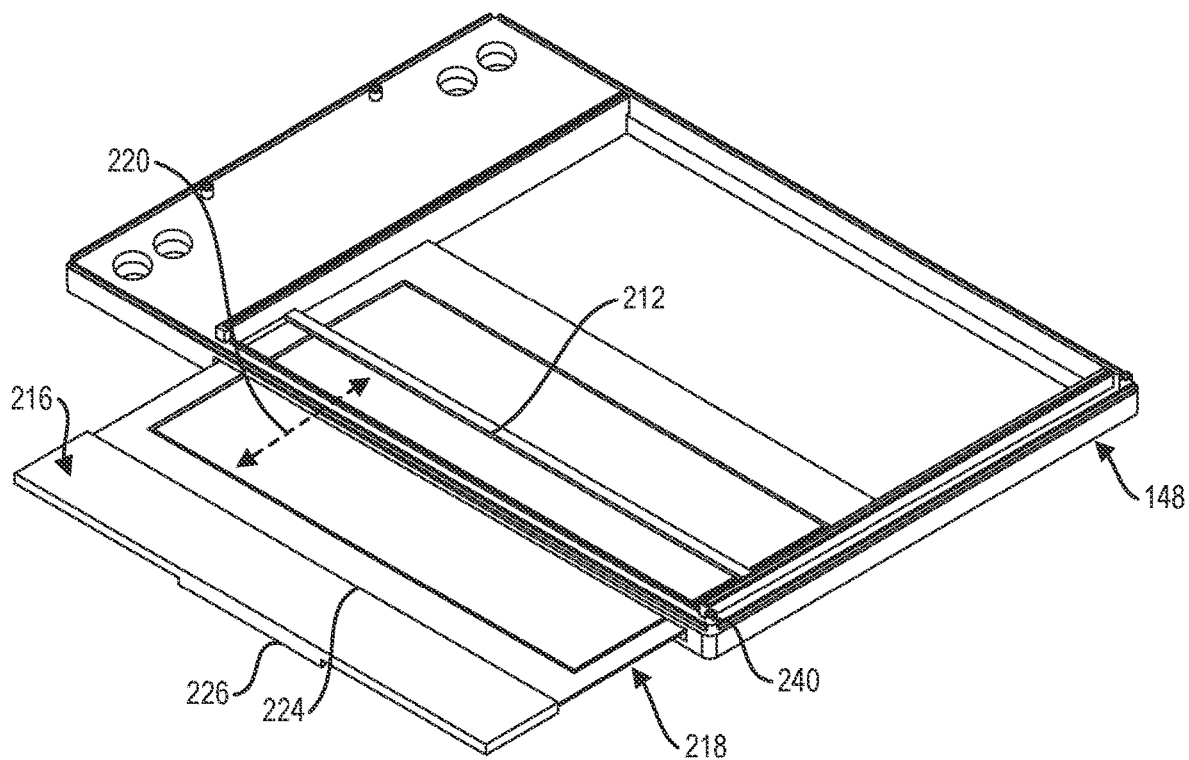
Figure 4F:
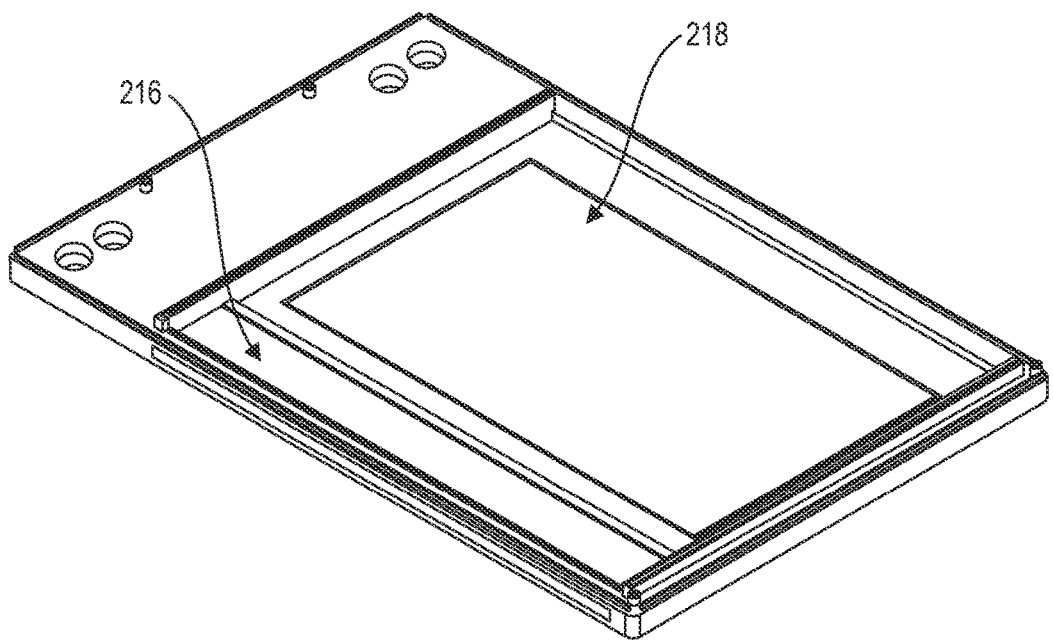
Figure 4G:
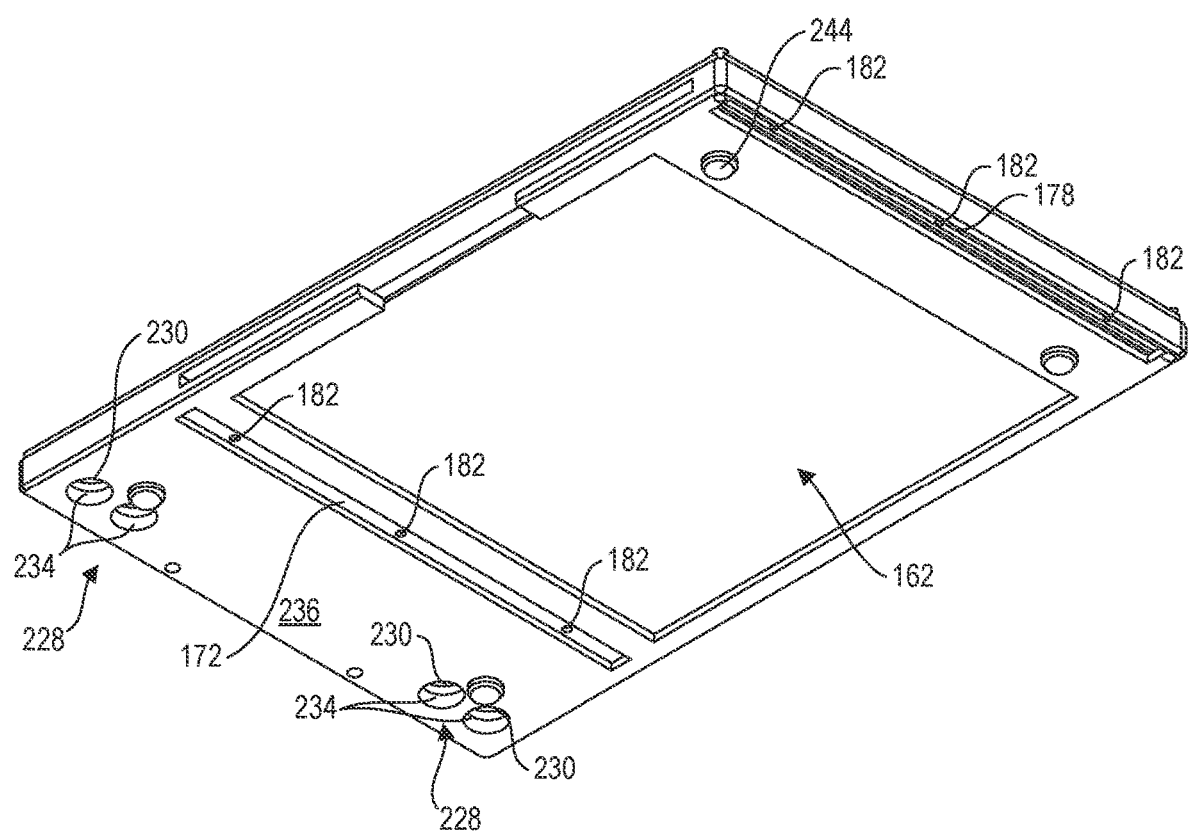
Figure 4H:
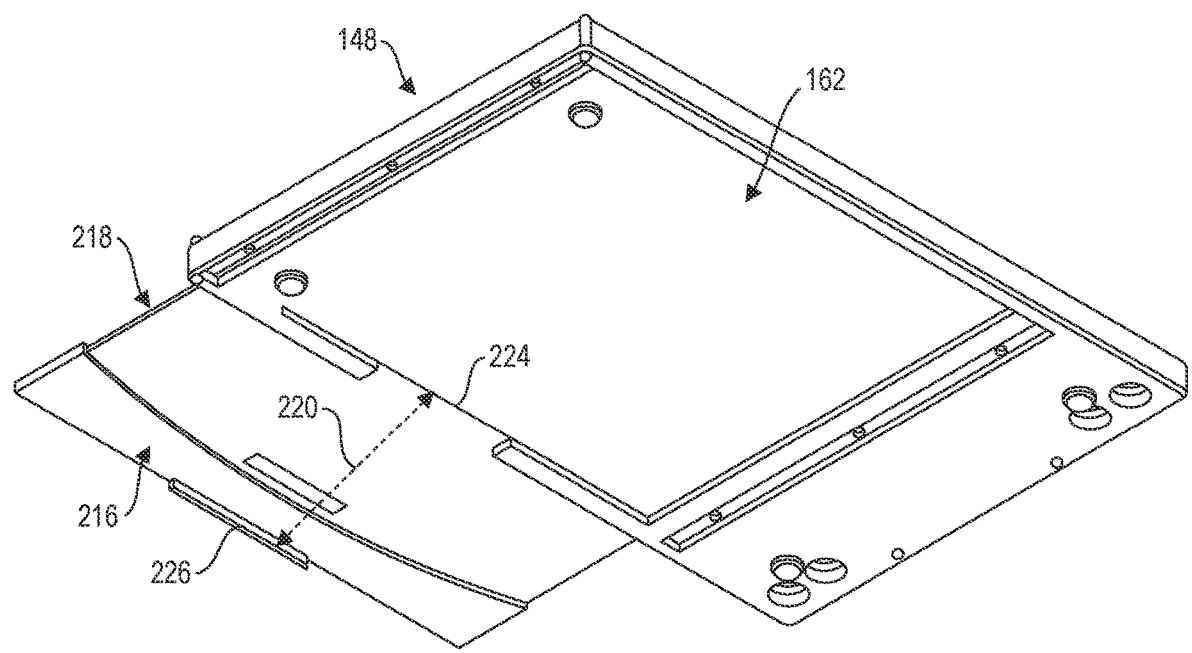
Figures 1, 4I:
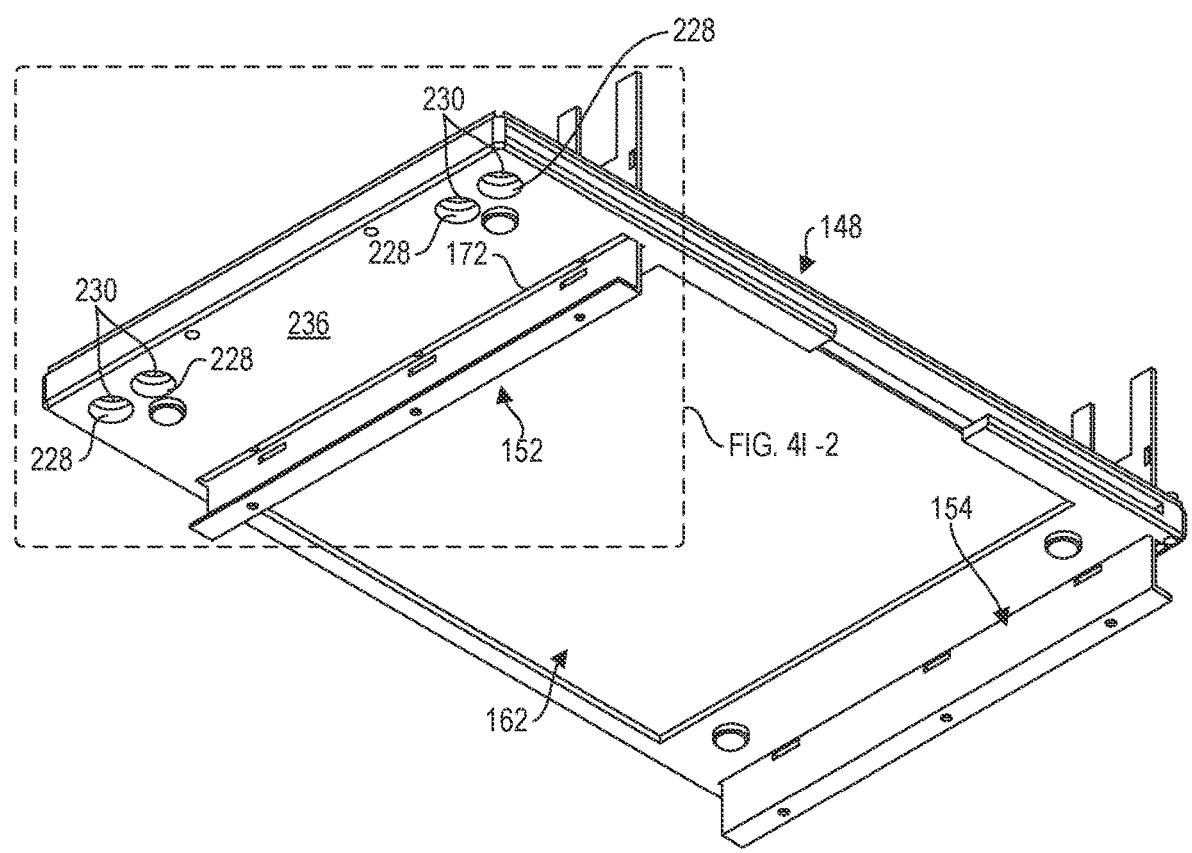
Figures 2, 4I:
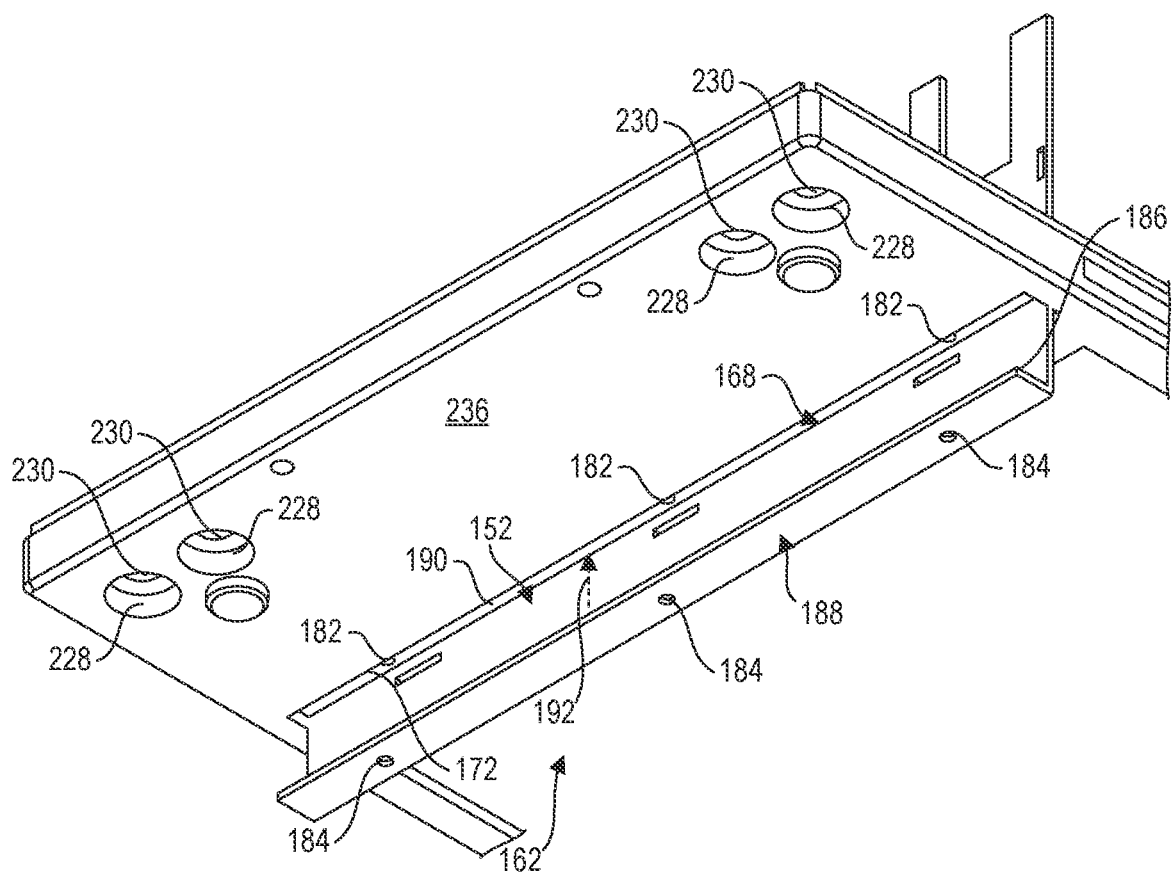
Figures 3, 4I:
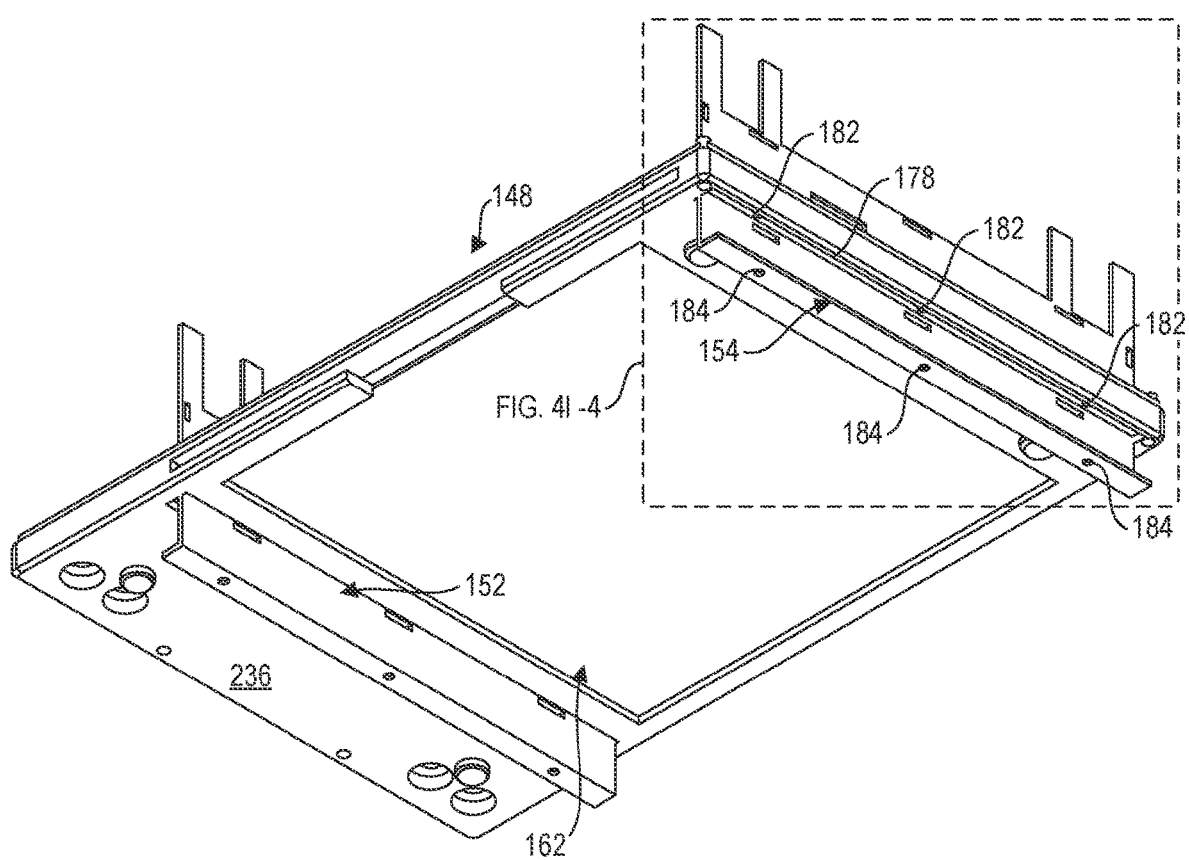
FIGS. 15A to 15N-3 are non-limiting, exemplary illustrations of Z-motive force platform of device shown in FIGS. 1A to 14H in accordance with one or more embodiments of the present invention.
Figures 4, 4I:
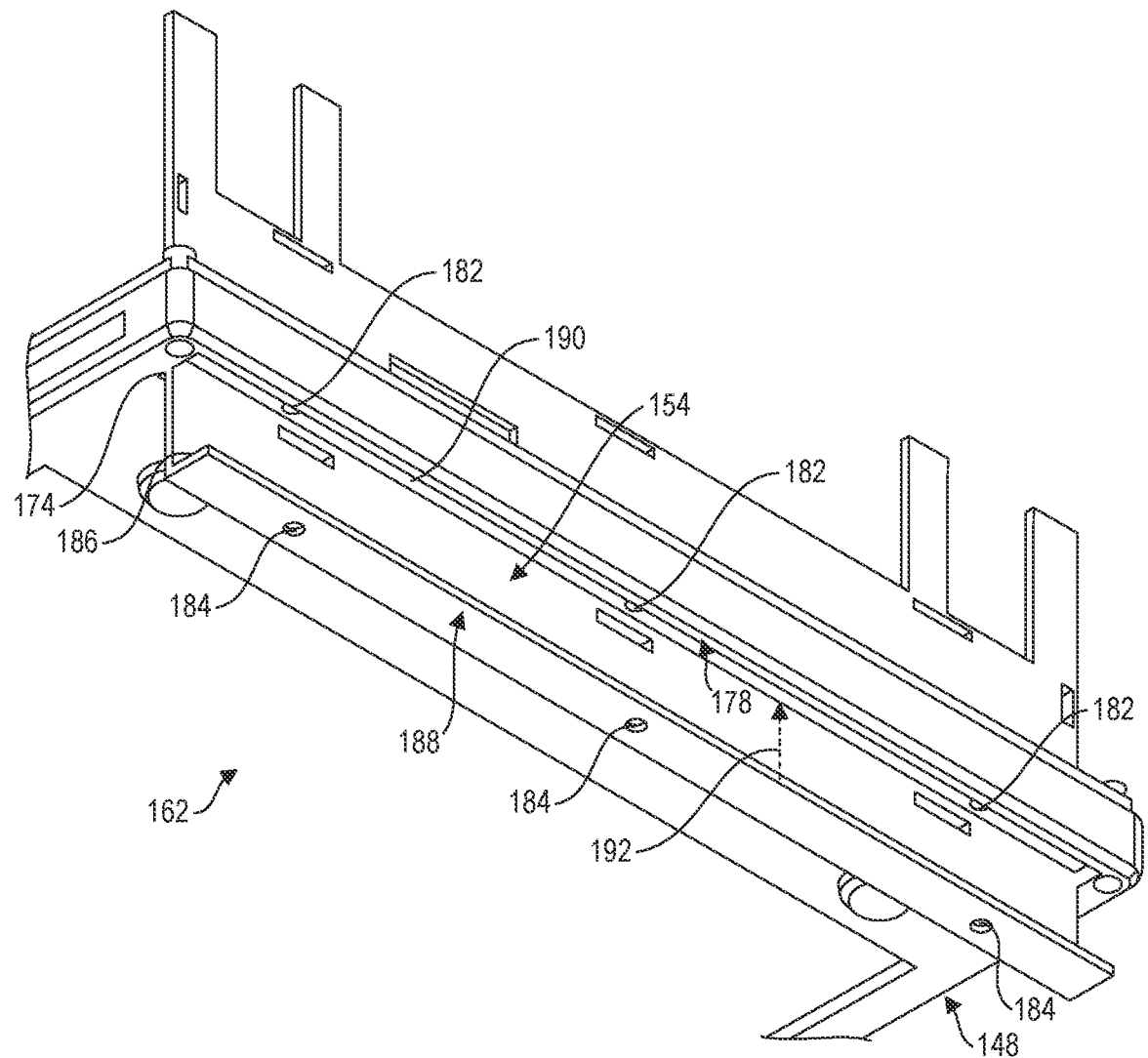
Figure 4J:
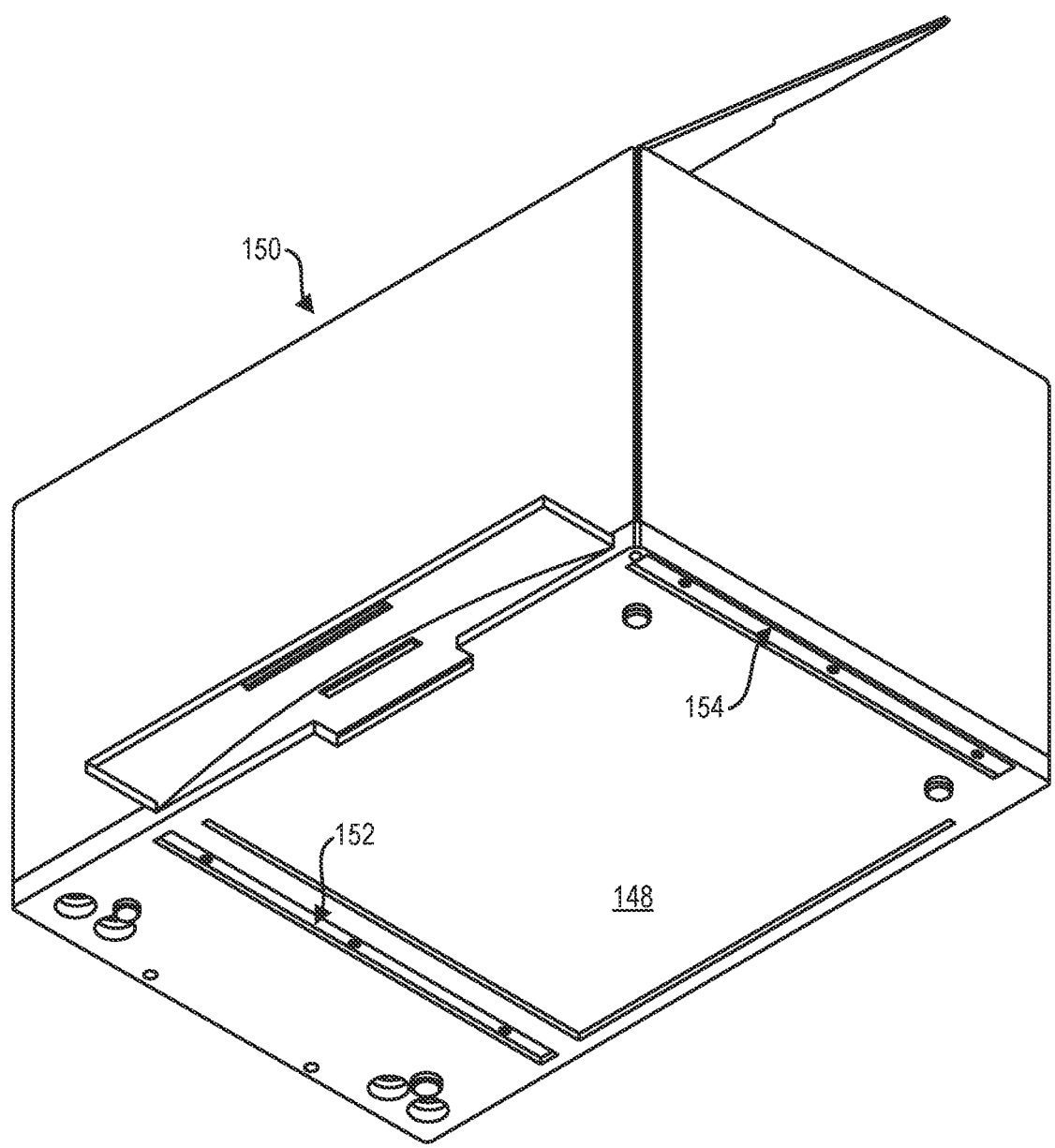

As best illustrated in FIGS. 4I-1 to 4I-4, lateral supports 152 and 154 are inserted as shown by arrows 192 from bottom side 162 of base 148 through bottom side of first and second elongated slots 168 and 174 until top surface 186 of securing portion (fastener flange) 188 of lateral supports 152 and 154 contacts bottom surface 190 of internal flange 172 and 178. Fastener openings 182 of flanges 172 and 178 align with fastener openings 184 of securing portion 188 to receive securing fasteners.

Top side 160 of base 148 further includes a third elongated slot (or cavity) 194 that receives the rear (or back) panel support 156. It should be noted that the rear panel support 156 is mounted within slot 194 from top side 160 of base 148 since it is closed at the bottom. That is, third elongated slot cavity 194 is not a through-opening slot, but a compartment or a cavity and hence, bottom edge 302 of rear support panel 156 rests at a bottom of slot 194.

Third elongated slot 194 is defined by a third set of longitudinally extended, linear projections 196 that protrude in parallel from top side 160 of base 148, forming the third parallel walls of third elongated slot 194.

Third elongated slot 194 extends longitudinally along a longitudinal axis 198 of base 148 and hence, is perpendicular to first and the second elongated slots 168 and 174. First distal ends 200 and 202 of respective first and the second elongated slots 168 and 174 are open to distal ends 204 and 206 of third elongated slot 194 for insertion of the rear panel support. That is, bottom lateral ends 208 and 210 of rear panel support 156 partially encroach within first distal ends 200 and 202 of first and the second elongated slots 168 and 174.

Top side 160 of base 148 further includes a stopper 212 protruding from base 148, and extending longitudinally between first and second parallel (interior facing) walls 170 and 176 of first and second elongated slots 168 and 174, along longitudinal axis 198 of base 148. As best shown in FIGS. 4E and 4F, back edge 214 of crumb tray handle 216 of crumb tray 218 when fully inserted (as shown by arrow 220) on top of base 146 contacts stopper 212.

Top side 160 of base 148 further includes lateral insertion guide slots 222 (best shown in FIG. 4D) for receiving crumb tray 218. Crumb tray handle opening 224 is positioned in between lateral insertion guide slots 222 for receiving grip portion 226 (best shown in FIG. 4H) of crumb tray handle 216 so to allow crumb tray 218 to be flush with case structure 150 of device 100.

As further illustrated, base 148 includes dual side recessed openings 228 configured as counterbores (top and bottom sides 160 and 162 of base 148) that lead to through-openings 230 at top and bottom sides 160 and 162 of base 148.

Figure 13A:
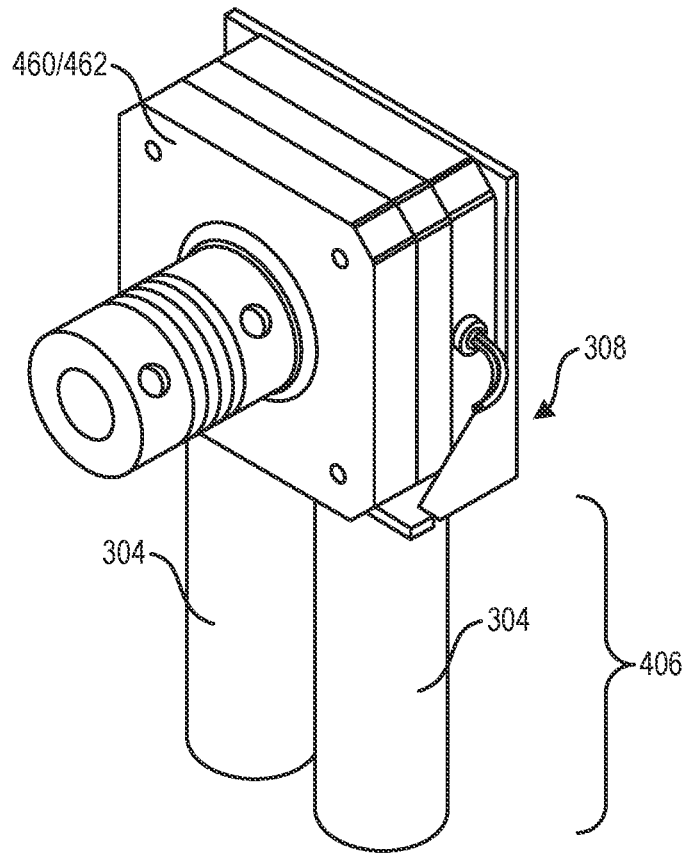
FIGS. 13A to 13F are non-limiting, exemplary illustrations of X-motive force platform support of device shown in FIGS. 1A to 12L in accordance with one or more embodiments of the present invention.
Figure 13B:
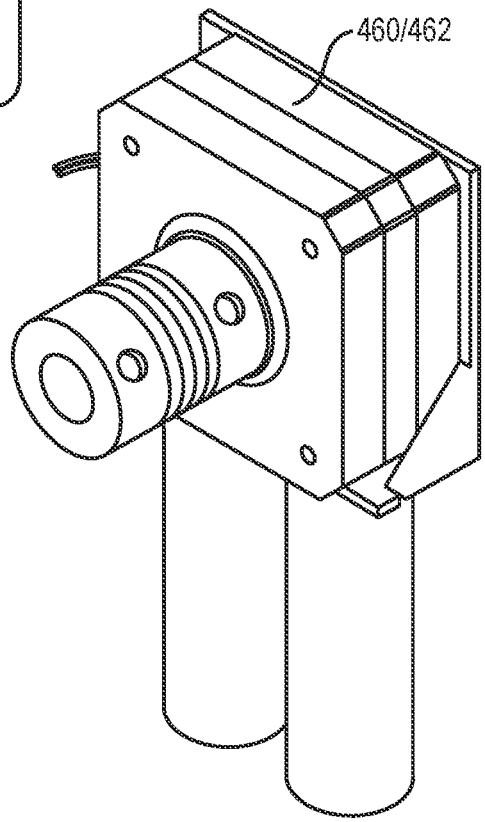
Figure 13C:
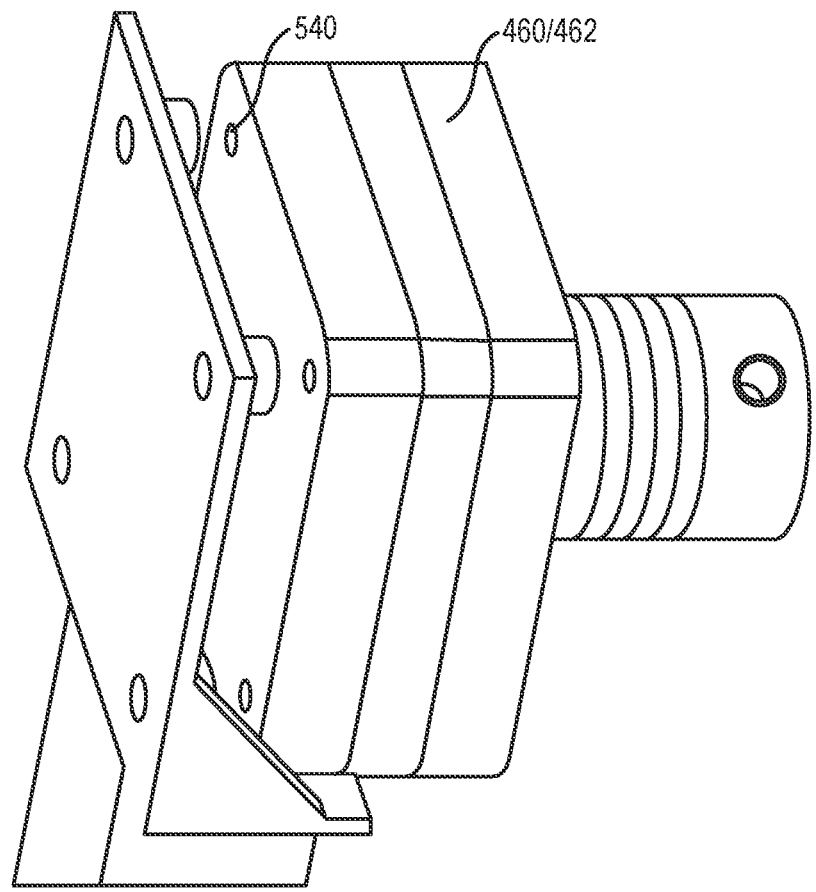
Figure 13D:
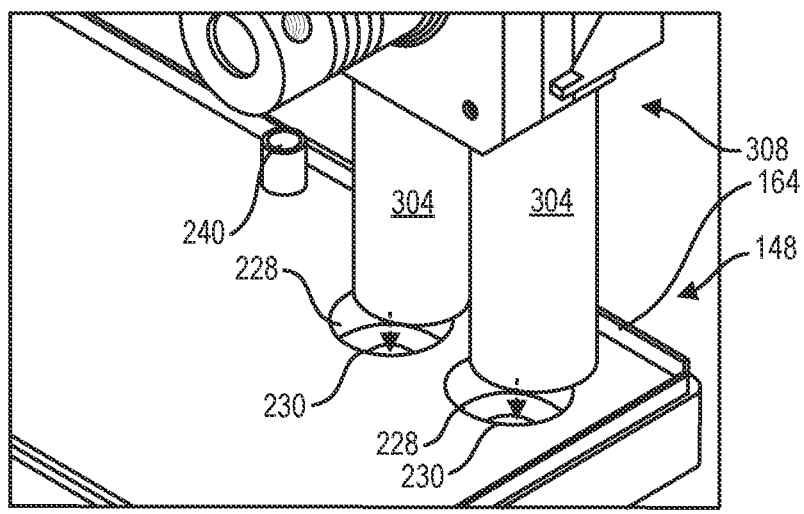
Figure 13E:
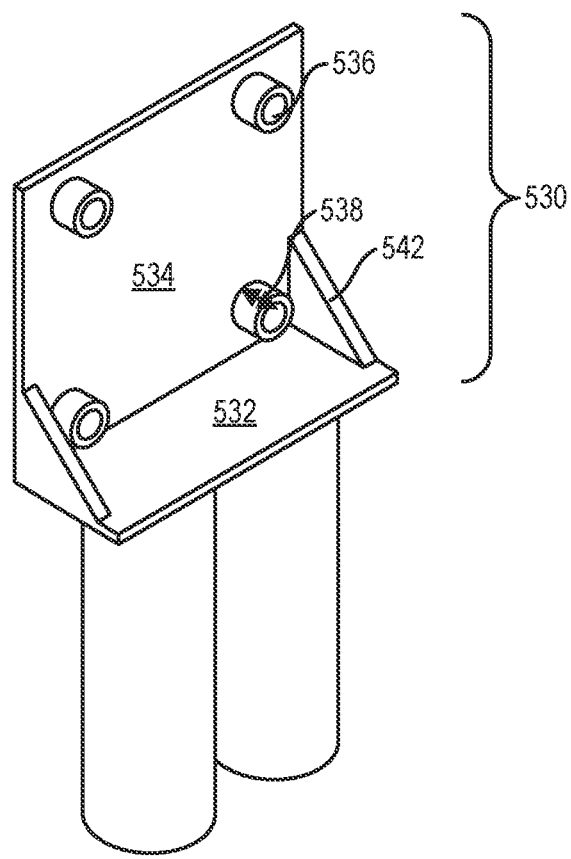
Figure 13F:
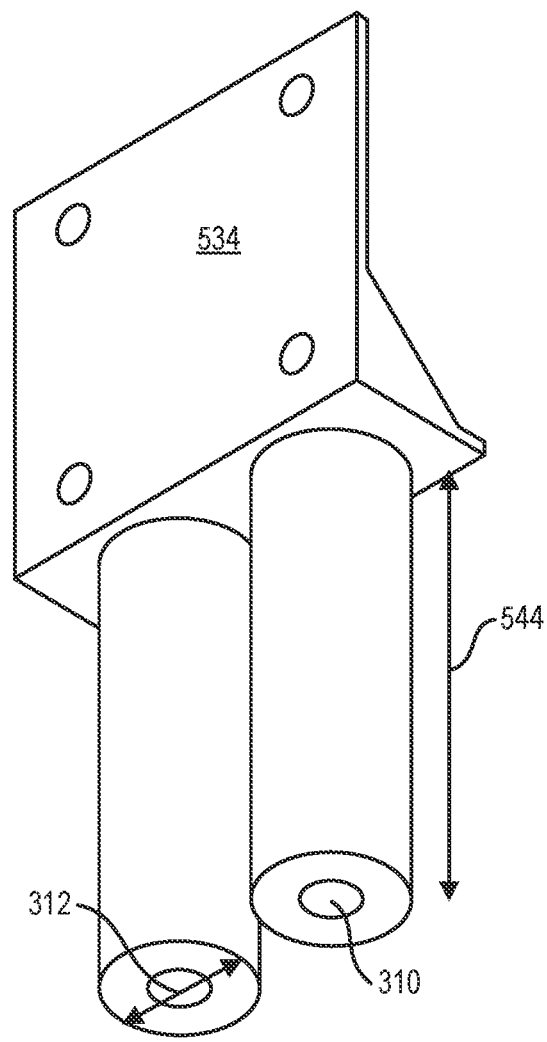

Top recessed openings 228 receive a first and second columns 304 of a stand portion 306 of X-motive force platform 308 within (best shown in FIG. 13D) to thereby prevent wobbling of X-motive force platform 308, while through-openings 230 receive fastener to fasten X-motive force platform 308 to base 148.

Bottom recess openings 230 (FIG. 4G) receive fasteners and allow fastener heads to be secured and flush with bottom side surface 236 of base 148. In this non-limiting, exemplary instance, four top and bottom recessed openings 228 are used, one for each first and second columns 304 of each stand 306 of X-motive force platform 308. Fasteners inserted through-openings 230 from bottom recess openings 228, extended through top recessed openings 228, and fastened to interior threaded openings 310 of first and second columns 304.

Counterbores of top and bottom recessed openings 228 have an inner diameter 238 that is greater than an outer diameter 312 of first and second columns 304 of the stand 306 of X-motive force platform 308 and hence, allows insertion of lower portion 314 of first and second columns 304 within top recessed openings 228.

Base 148 further includes securing through-openings (or couplers) 240 for fastening case structure 150 onto base 148. Securing through-openings 240 are positioned on transvers lateral sides of base 148 and when aligned with a corresponding number of internally threaded cylindrical sockets (or couplers) 242 of case structure 150, enable securing of case structure 150 onto base 148 using fasteners. Bottom side 162 base 148 includes bumps 244 that support base 148 (and hence, the entire device 100).

FIGS. 5A to 5E are non-limiting, exemplary illustrations of lateral supports of device shown in FIGS. 1A to 4J in accordance with one or more embodiments of the present invention. As illustrated in FIGS. 1A to 5E, first lateral support 152 and second lateral support 154 are identical, mirror images of one another and include a bracket 246 with an L-shaped cross-section (FIG. 5C), with bracket 246 having a length 248, a height 250, and a width 252.

Bracket 246 has a securing portion 188 (fastener flange), the span of which defines the overall width 252 of bracket 246 and includes connector openings 184 along length 248 of bracket 246 for connection with base 148.

Bracket 246 has a first set of mounting slots 322 for receiving connecting mounting tabs 318 of a second heater panel 320 of second heater assembly (or top heater) 256. Bracket 246 has a second set of mounting slots 324 for receiving connecting mounting tabs 326 of a first heater panel 328 of first heater assembly (or bottom heater) 254.

Bracket 246 further includes one or more cable routing openings 330, and a viewing window opening 332 for an image capturing device 334 of image capturing system 282. Lateral edges 336 of bracket 246 include a third set of mounting slots 338 for receiving connecting mounting tabs 340 of rear support panel 156.

Figure 2A:
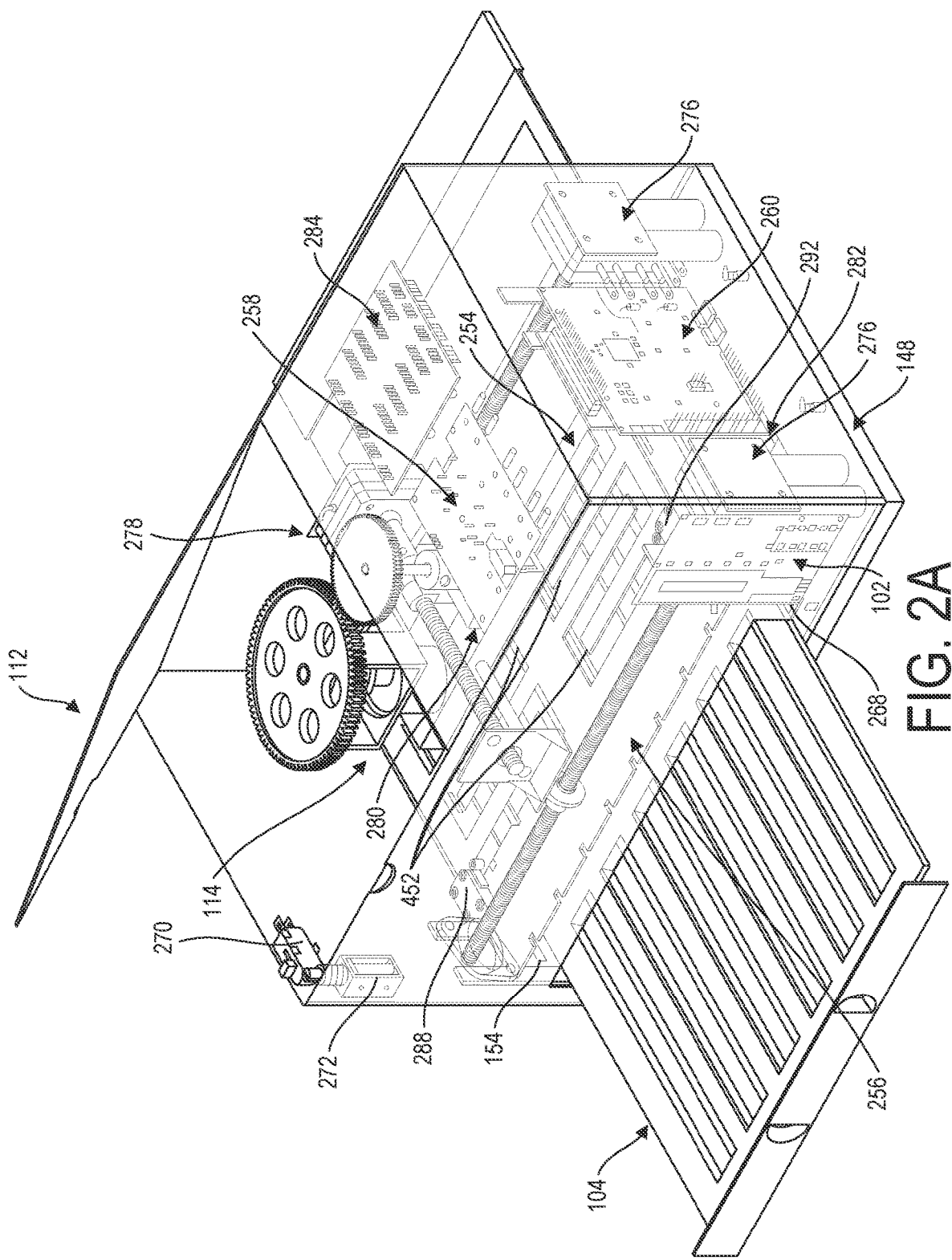
Figure 2B:
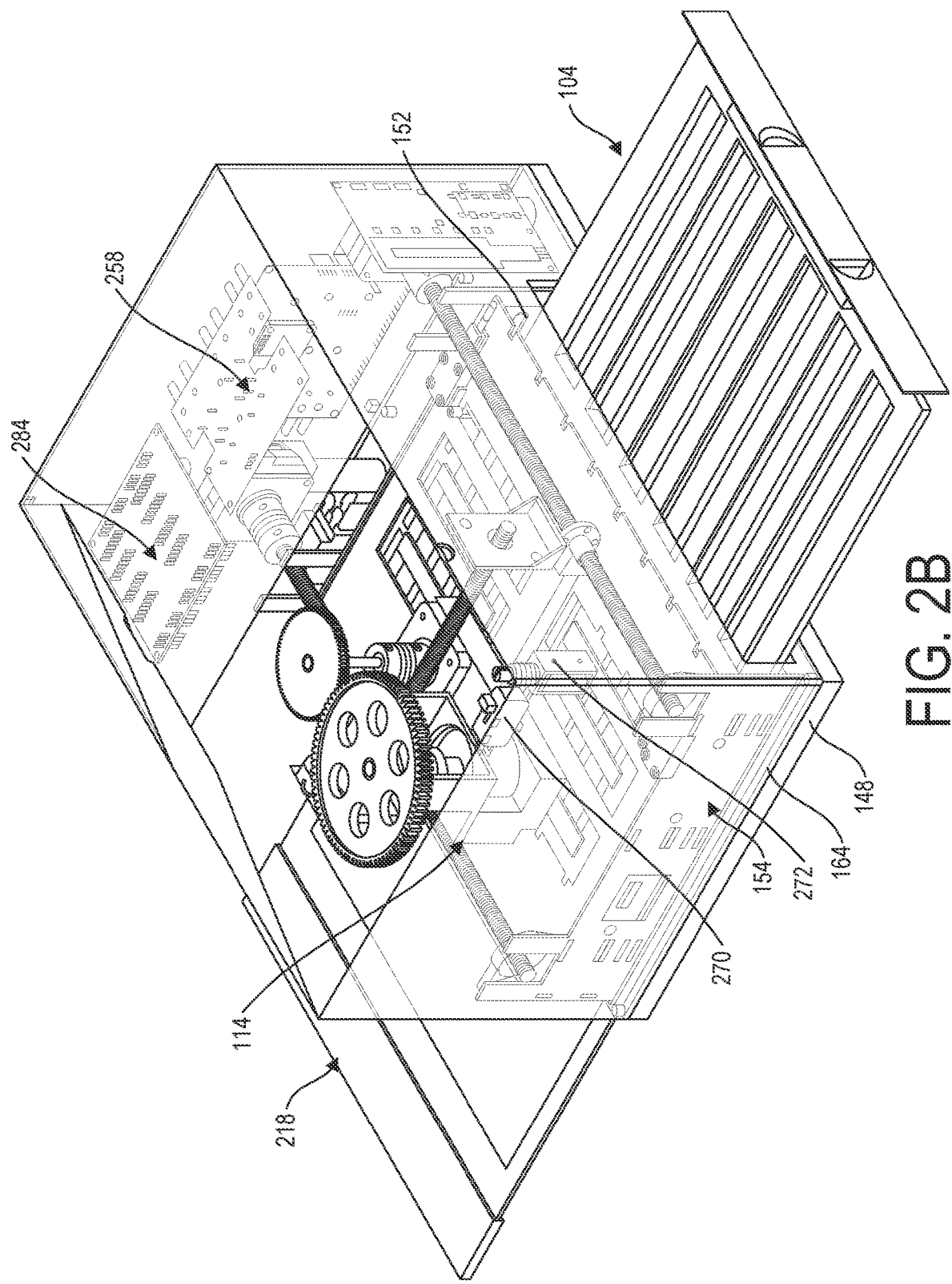
Figure 2C:
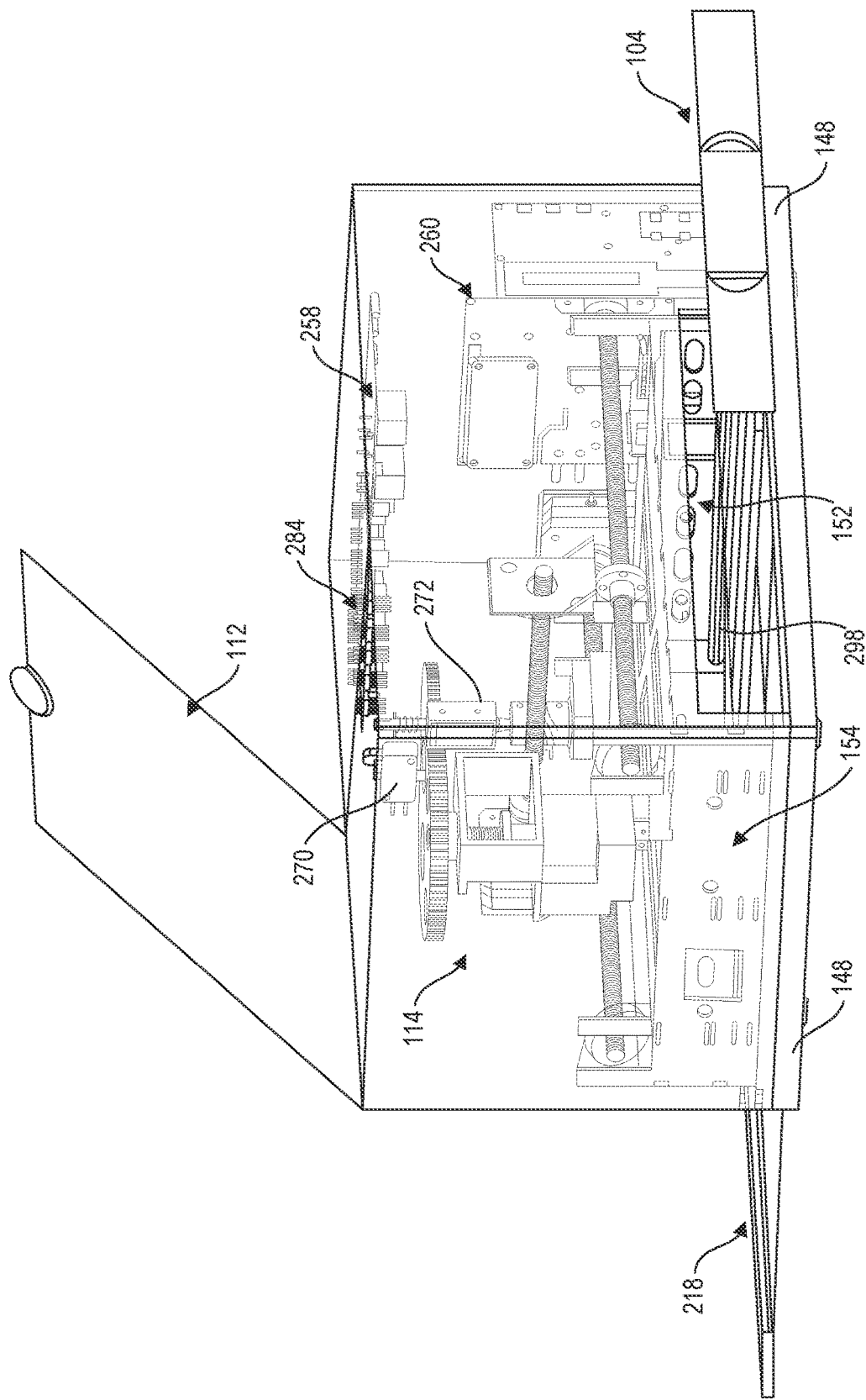
Figure 2D:
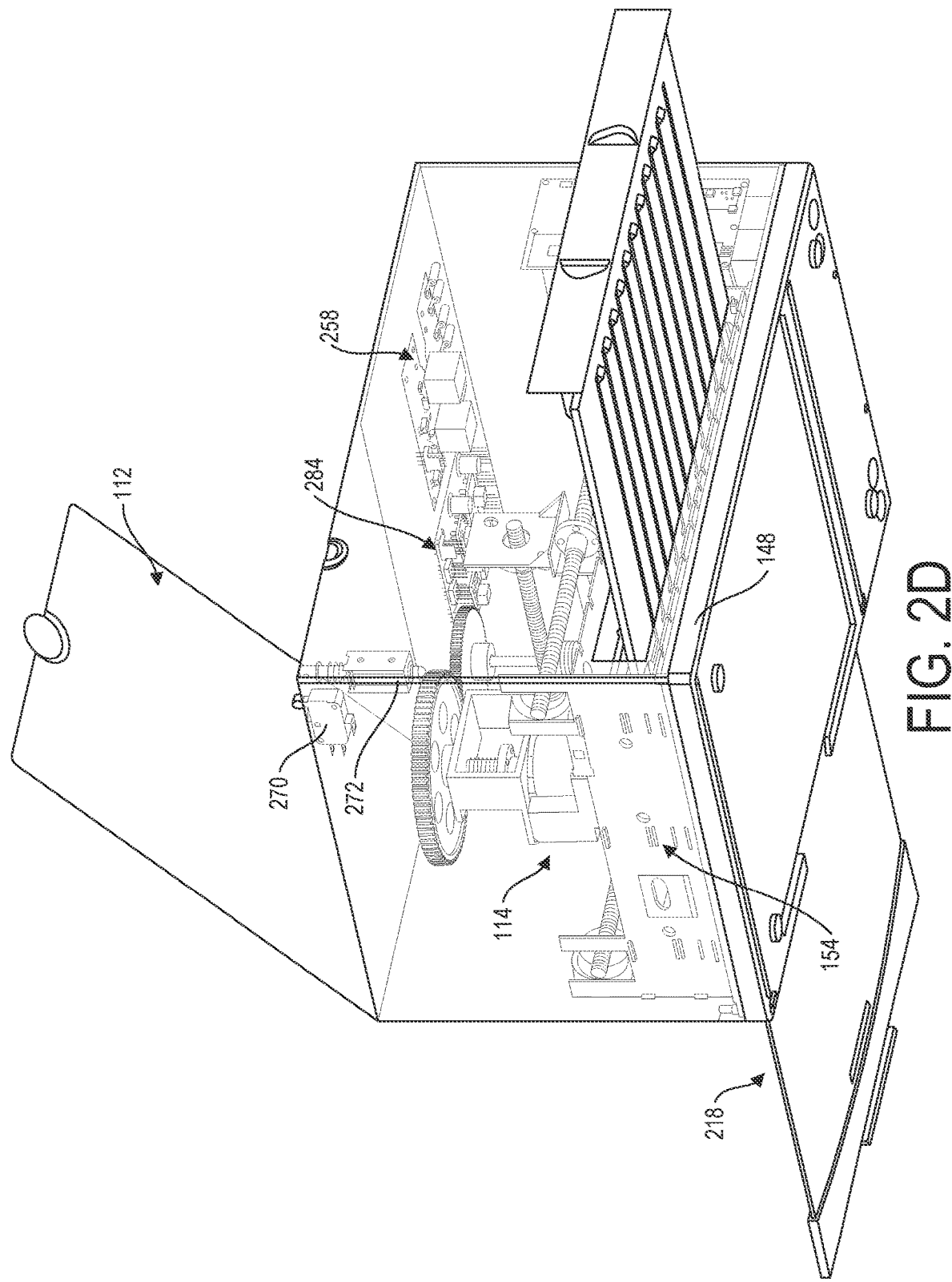
Figure 2E:
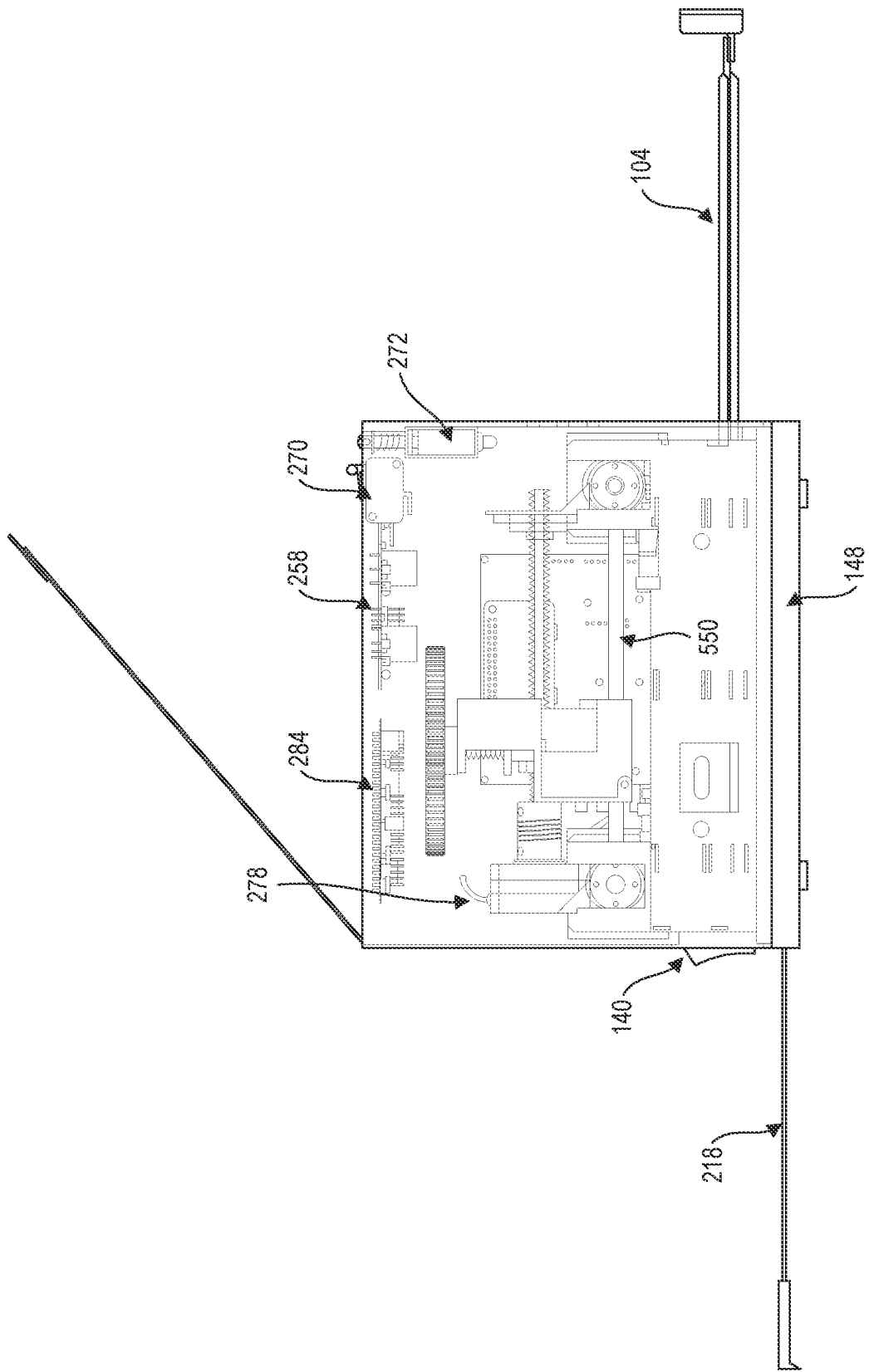
Figure 2F:
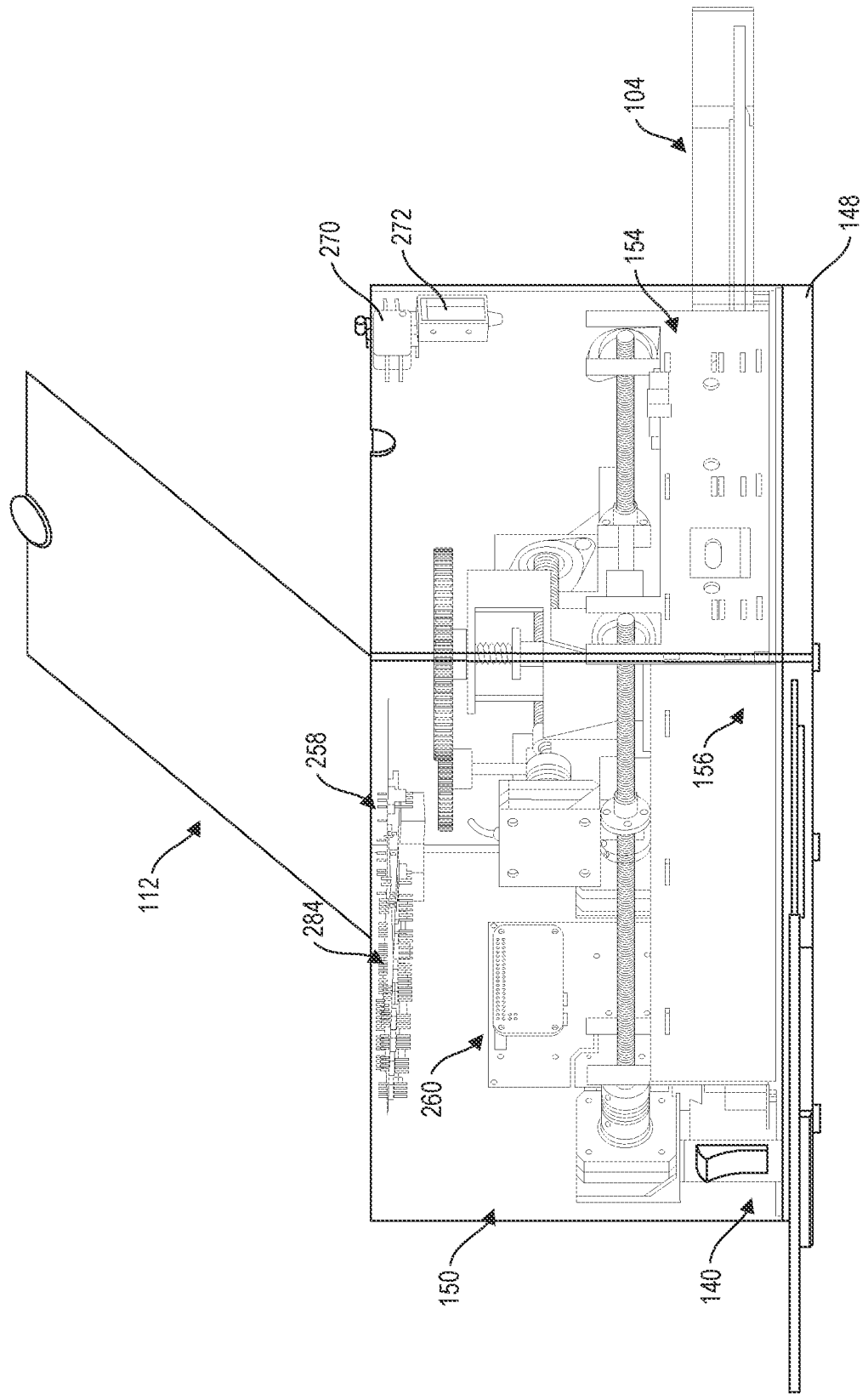
Figure 2G:
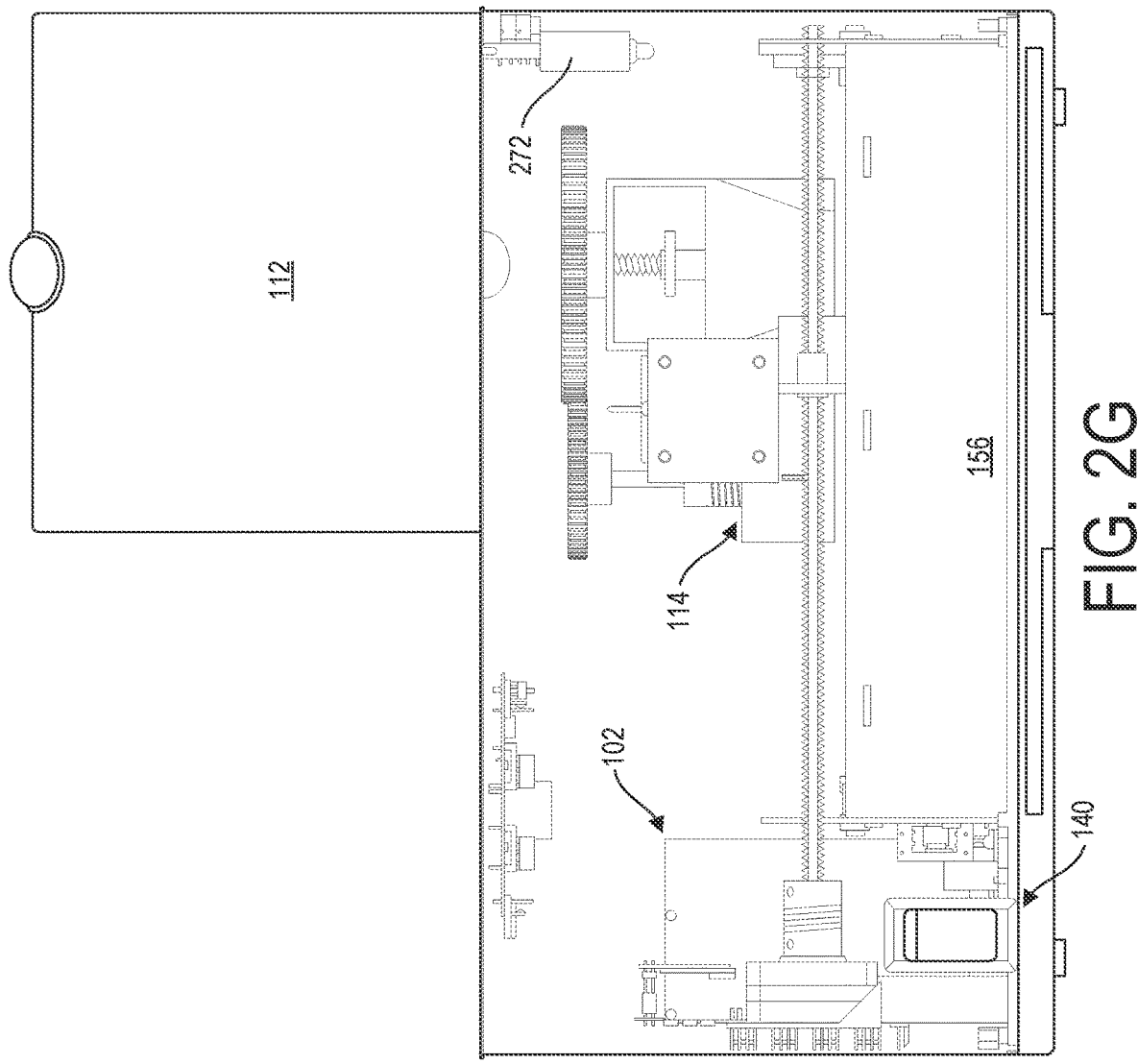
Figure 2H:
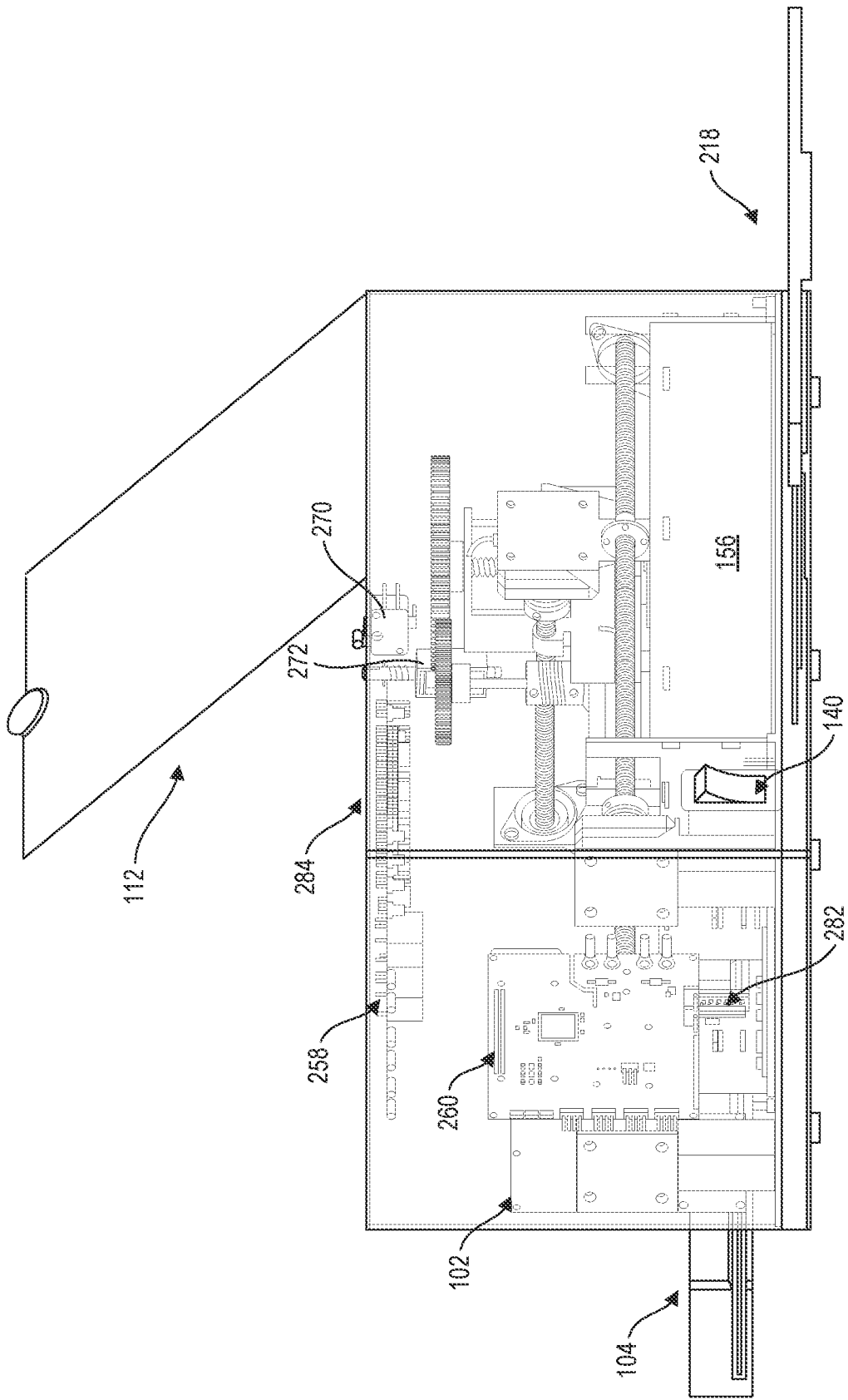
Figure 21:
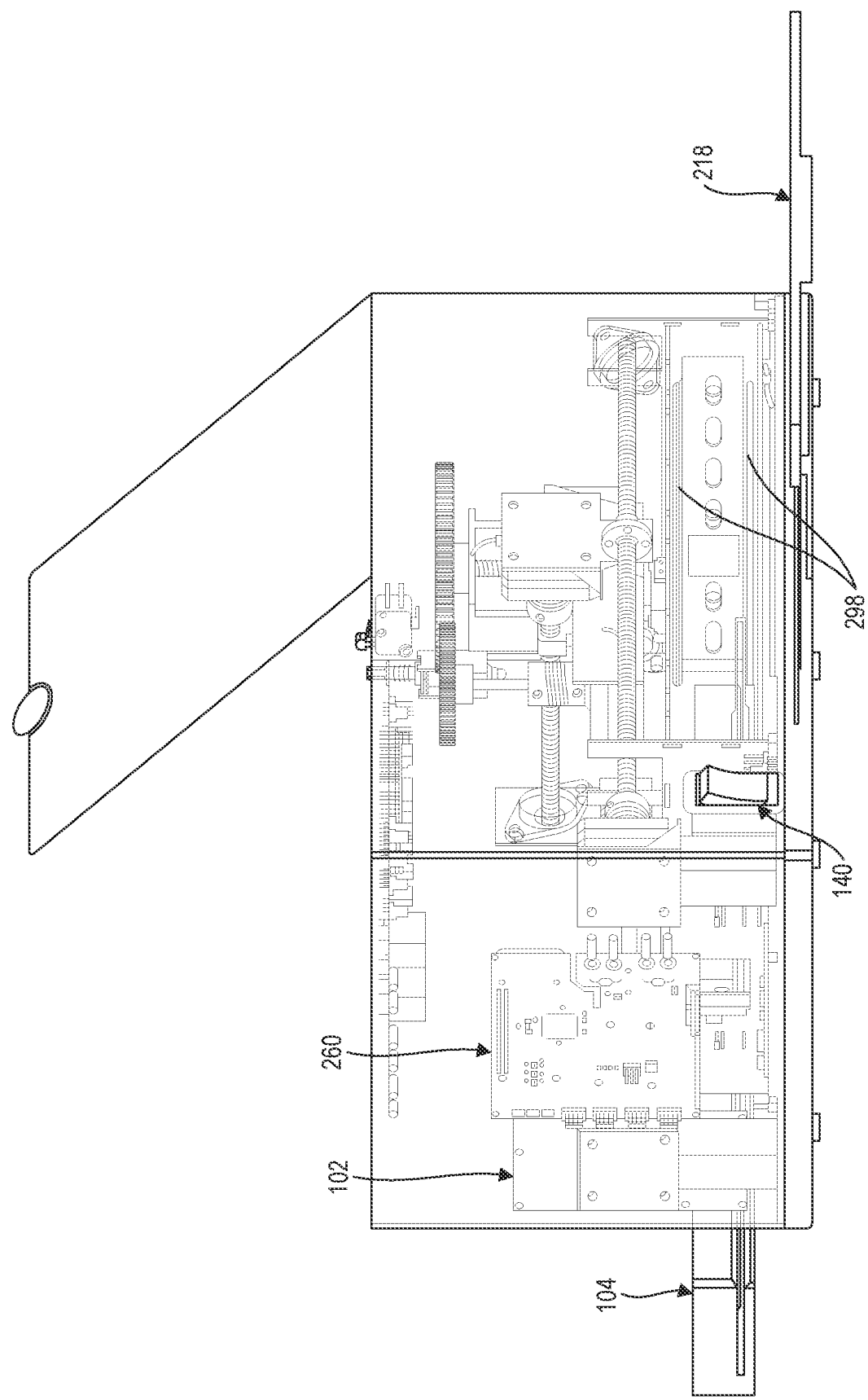
Figure 2J:
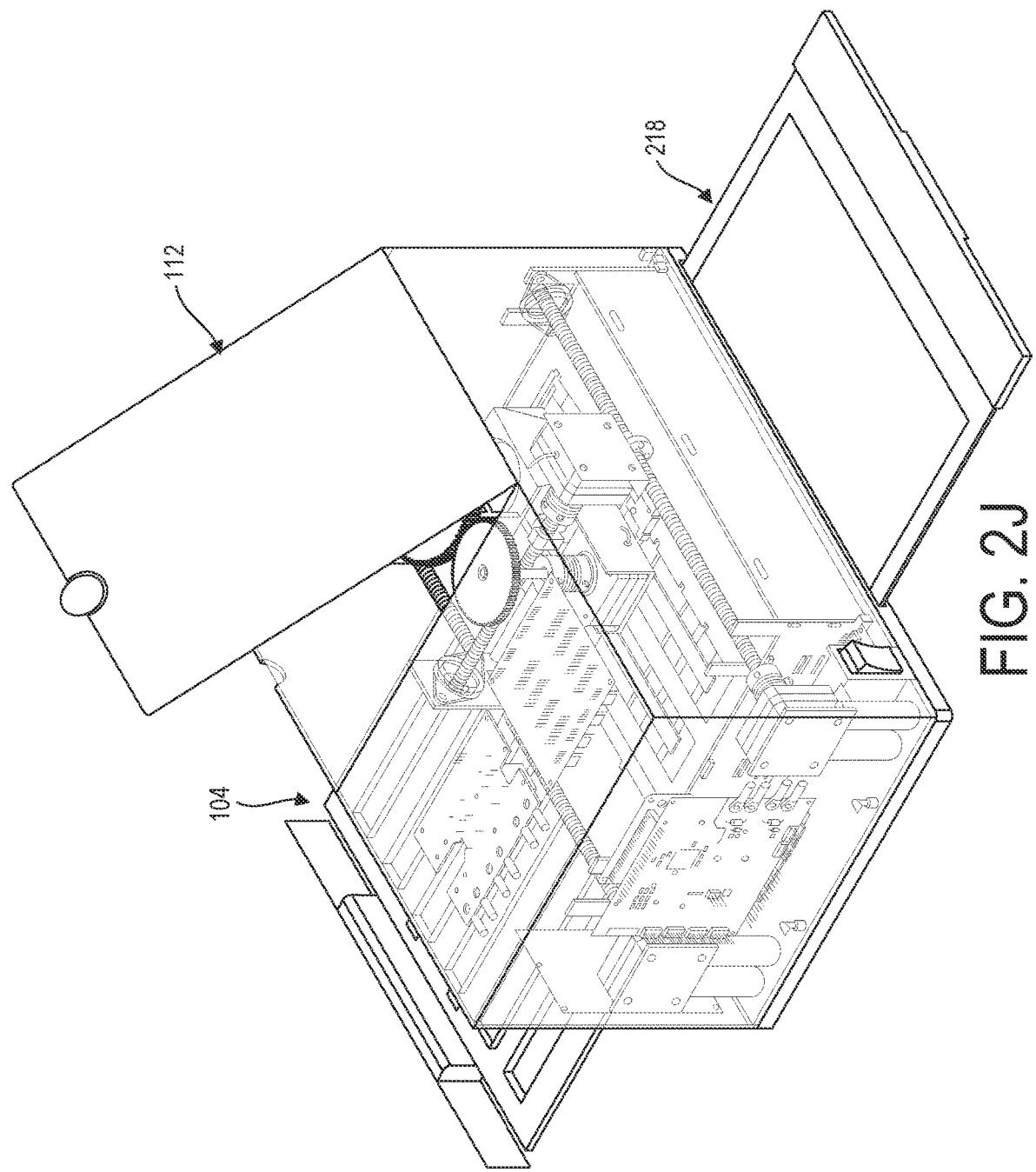
Figure 2L:
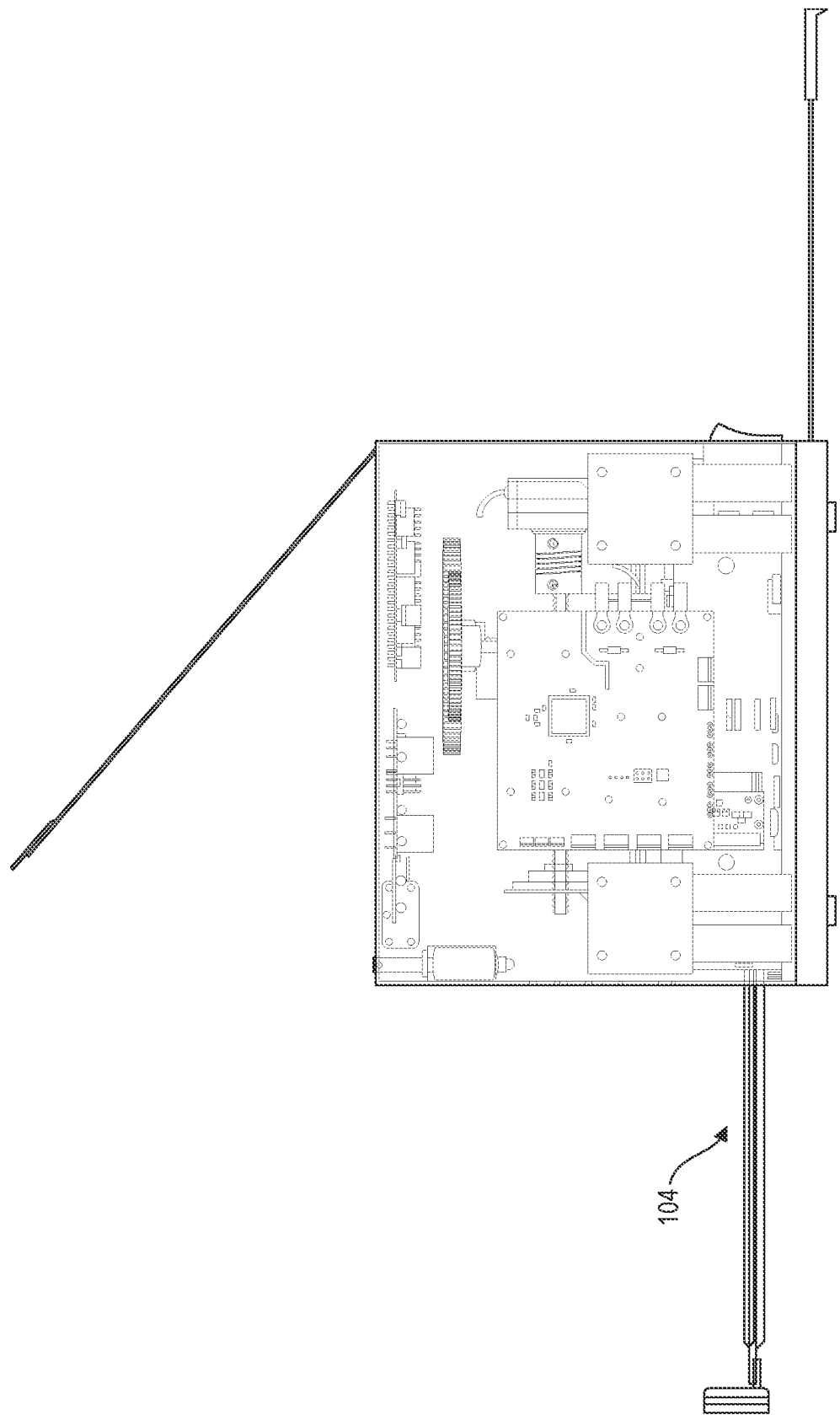
Figure 3A:
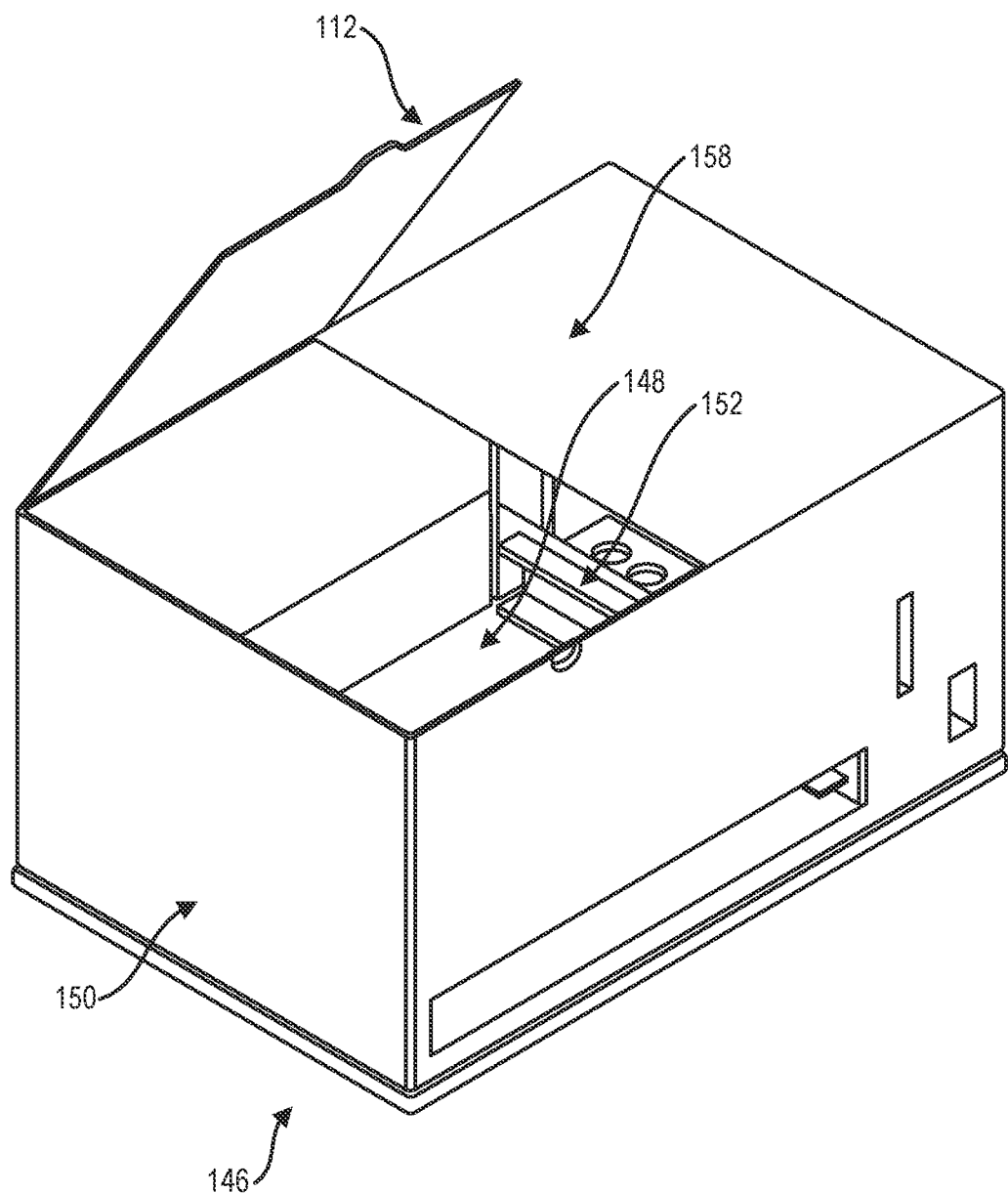
FIGS. 3A to 3D are non-limiting, exemplary overview illustrations of a chassis of device shown in FIGS. 1A to 2L in accordance with one or more embodiments of the present invention.
Figure 3B:
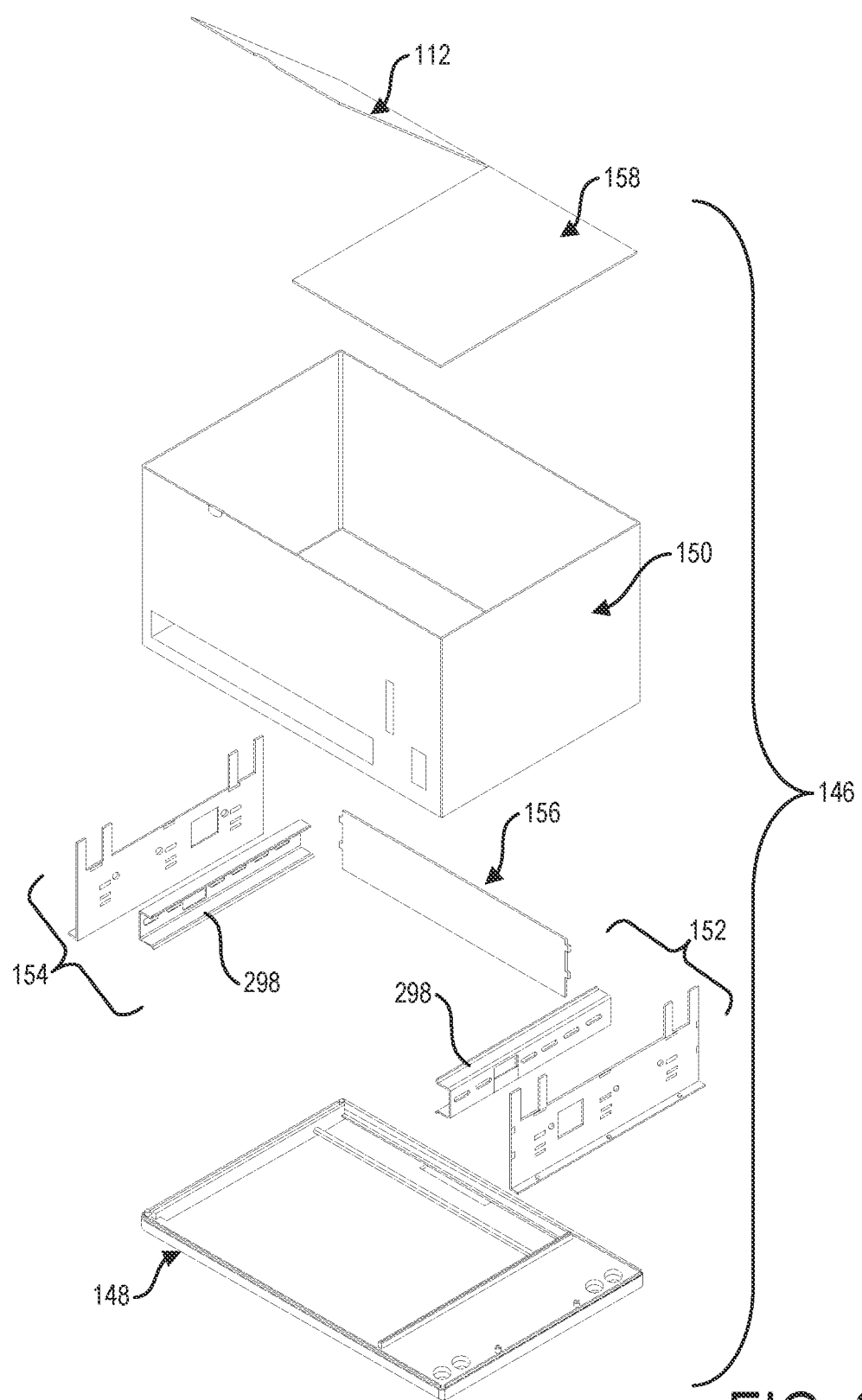
Figure 3C:
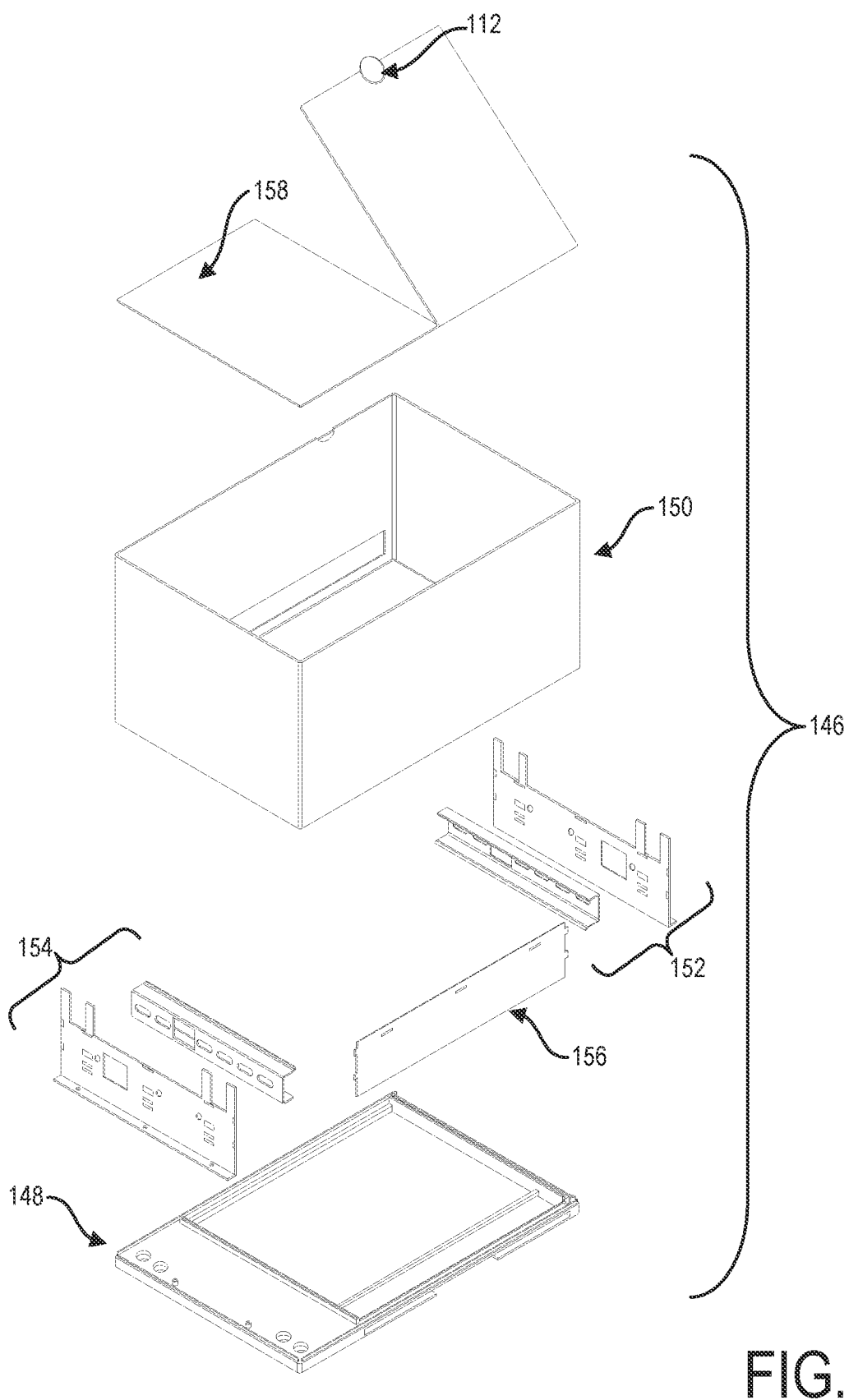
Figure 3D:
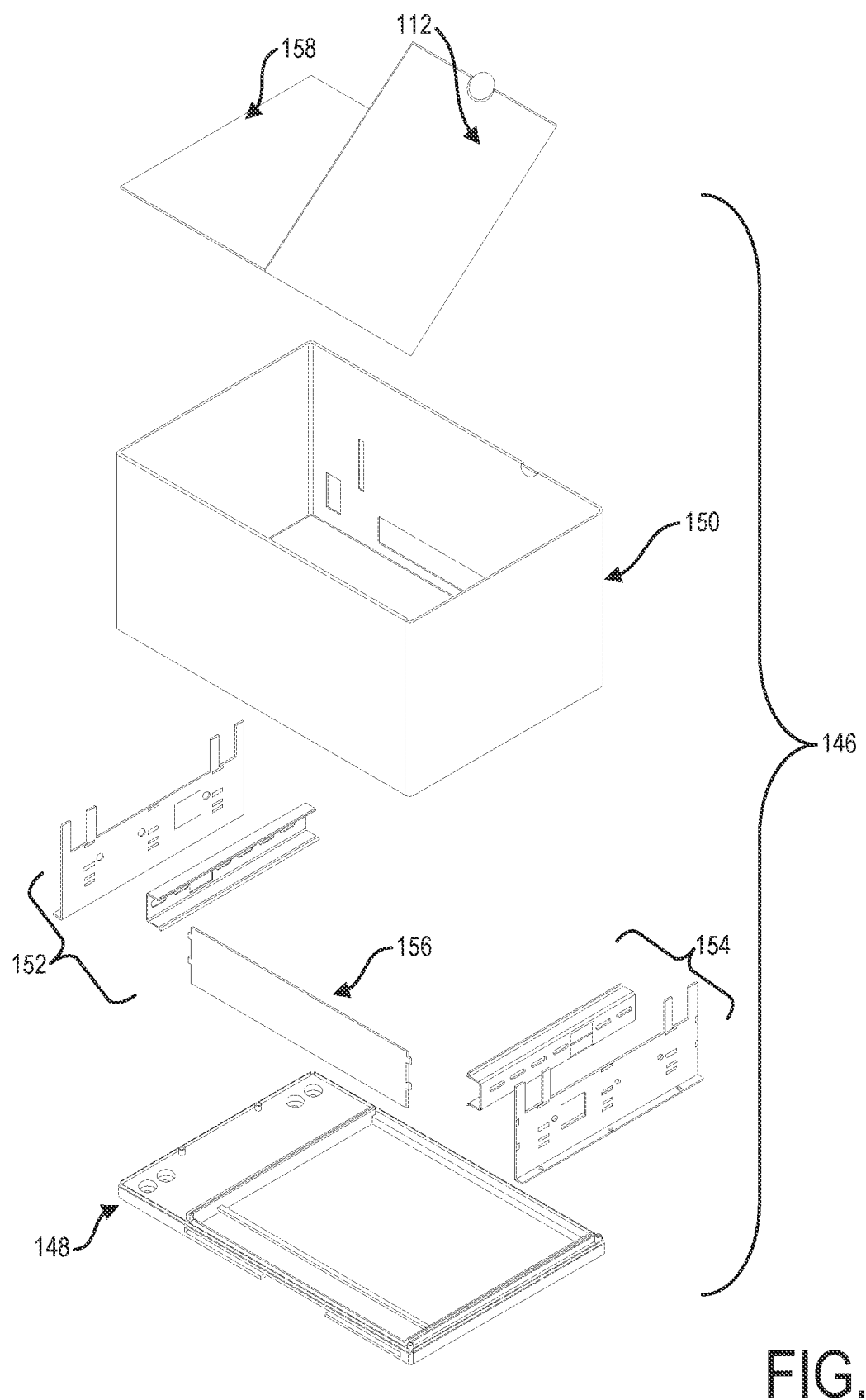
Figure 5A:
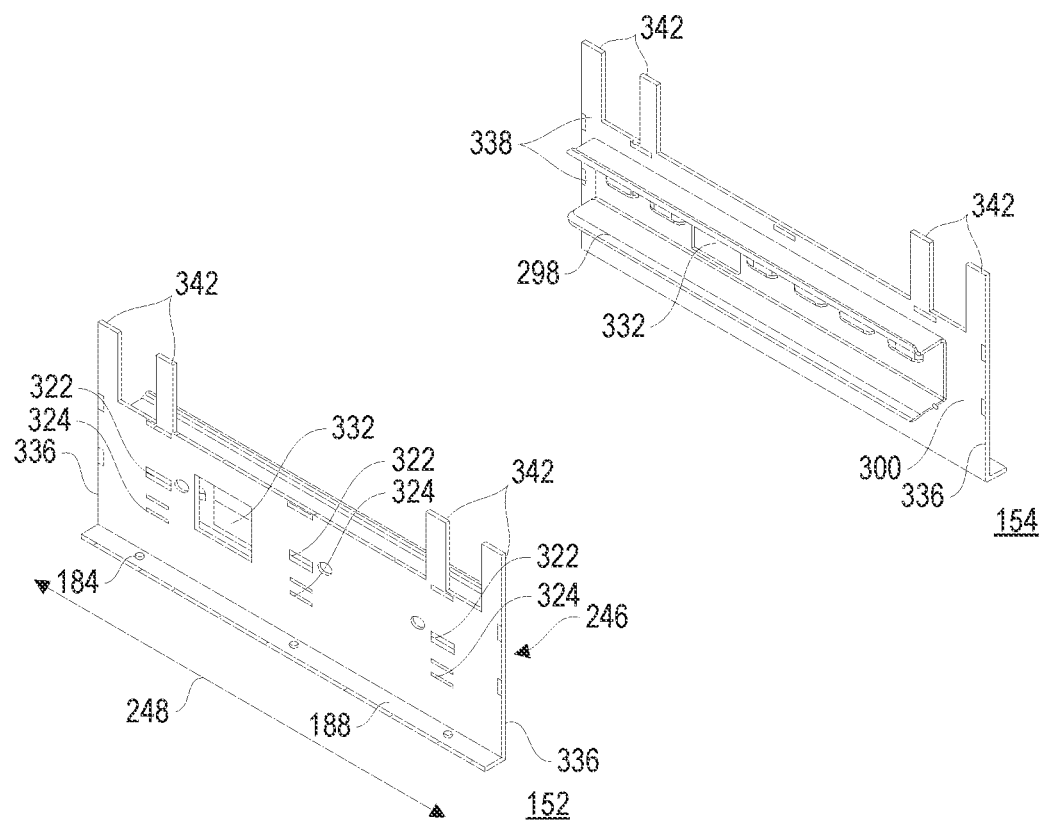
FIGS. 5A to 5E are non-limiting, exemplary illustrations of lateral supports of device shown in FIGS. 1A to 4J in accordance with one or more embodiments of the present invention.
Figure 5B:
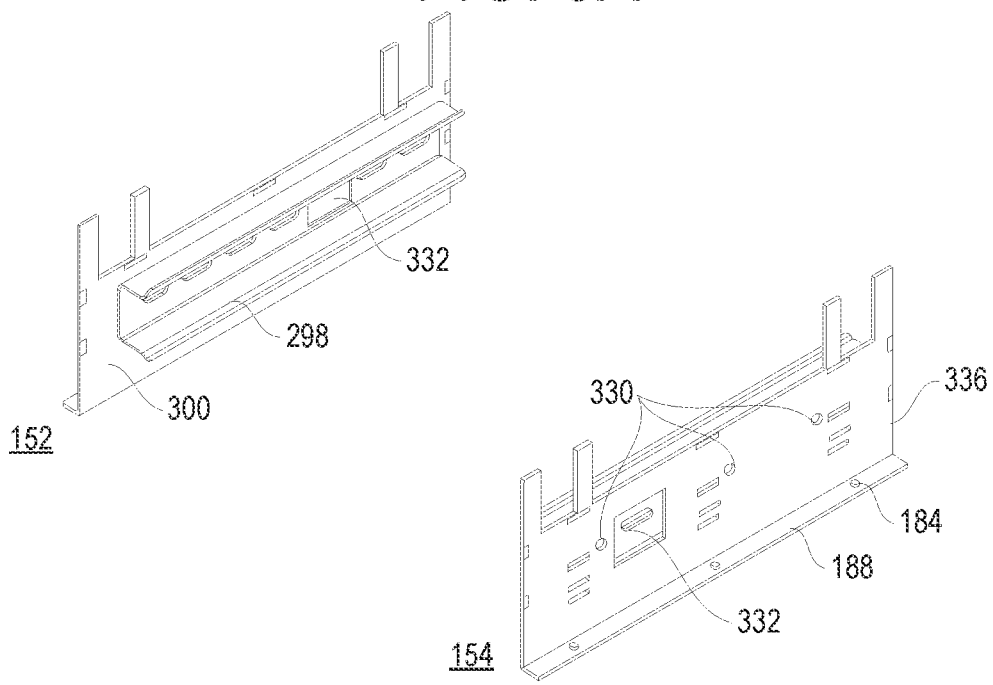
Figure 5C:
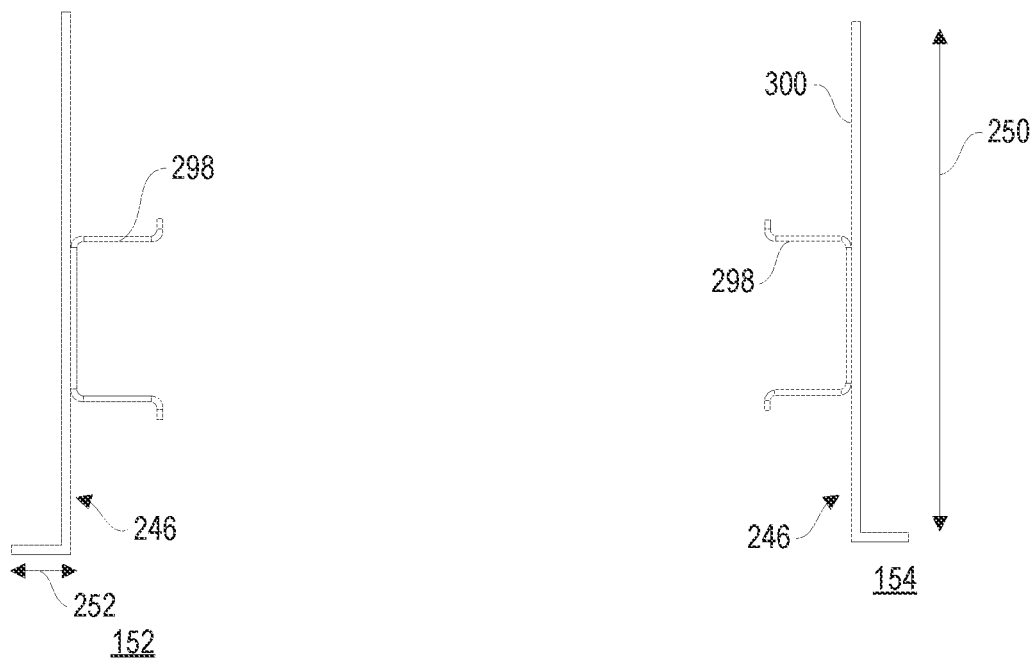
Figure 5D:
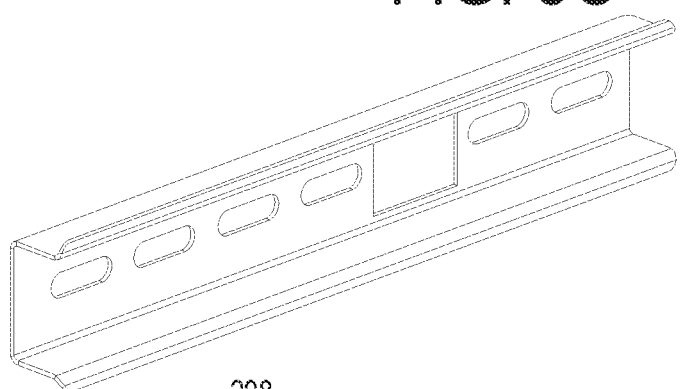
Figure 5E:
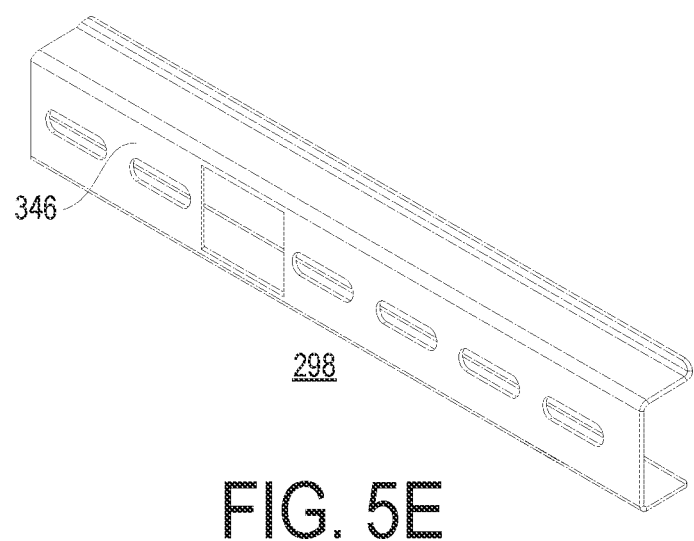
Figure 14A:
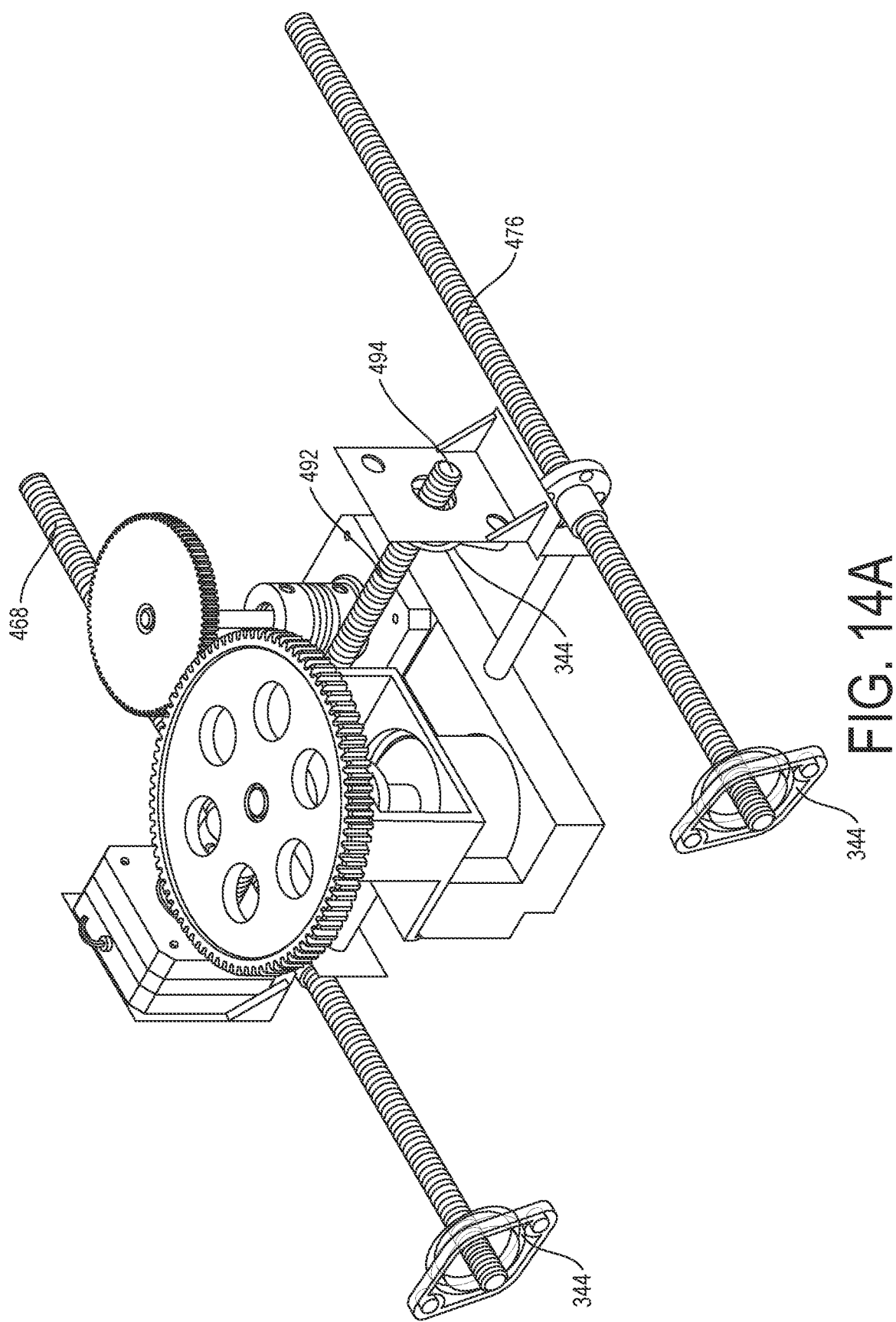
Figure 14B:
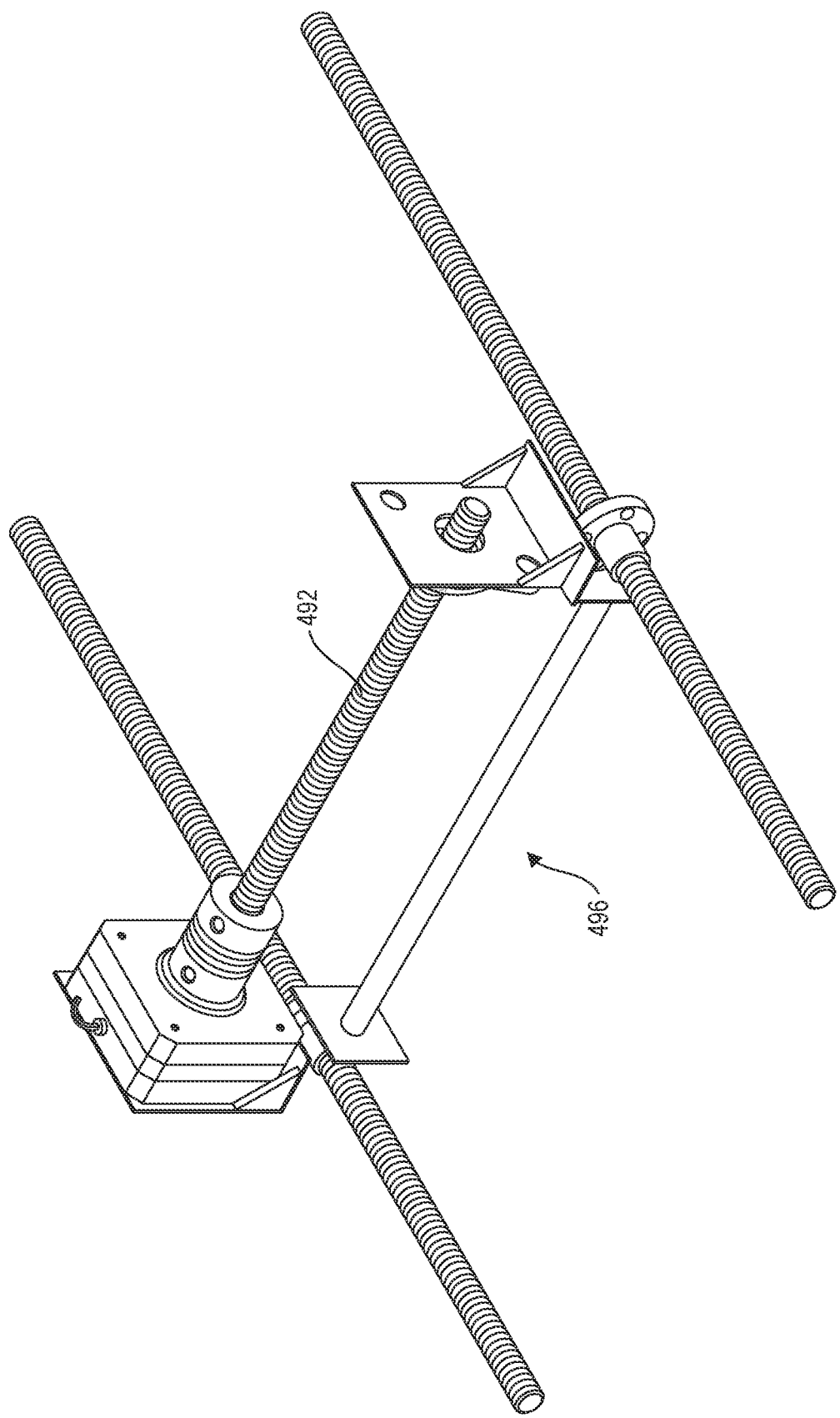
Figure 14C:
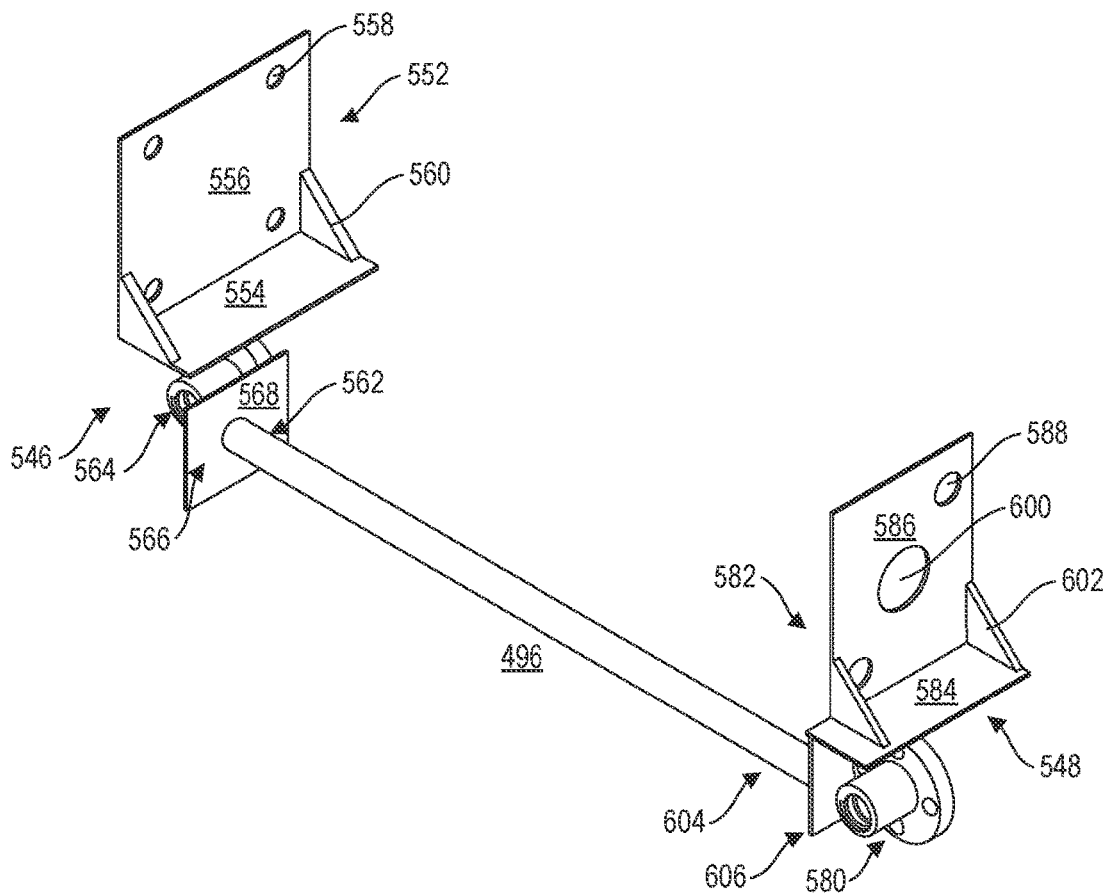
Figure 14D:
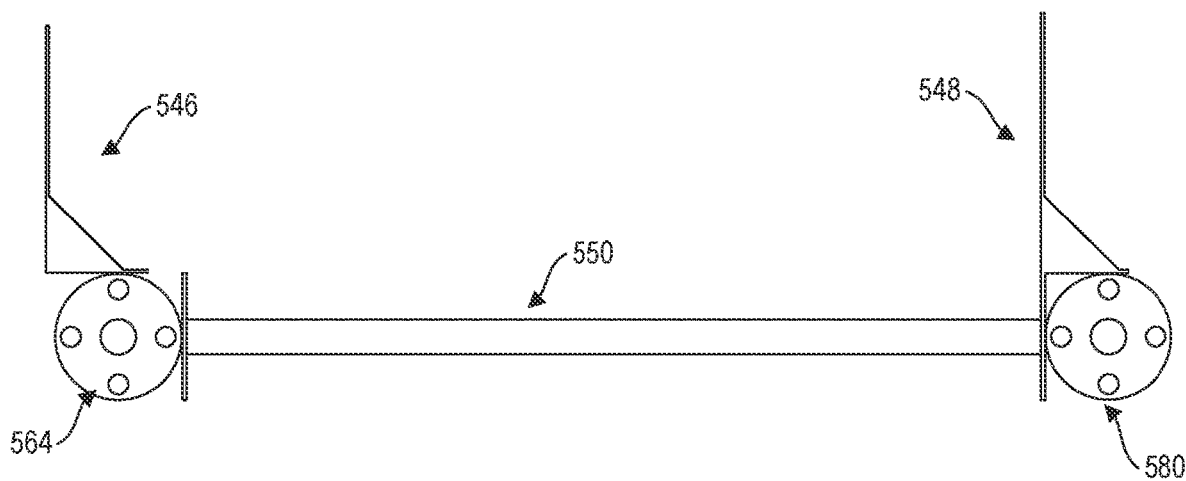
Figure 14G:
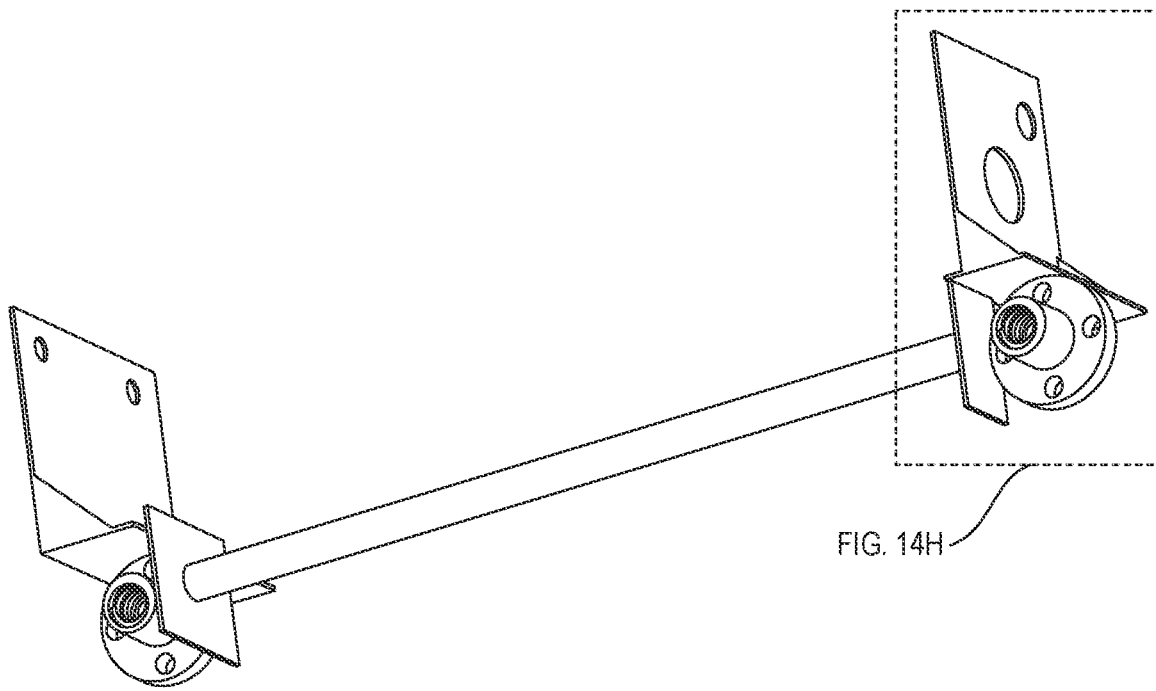
Figure 14H:
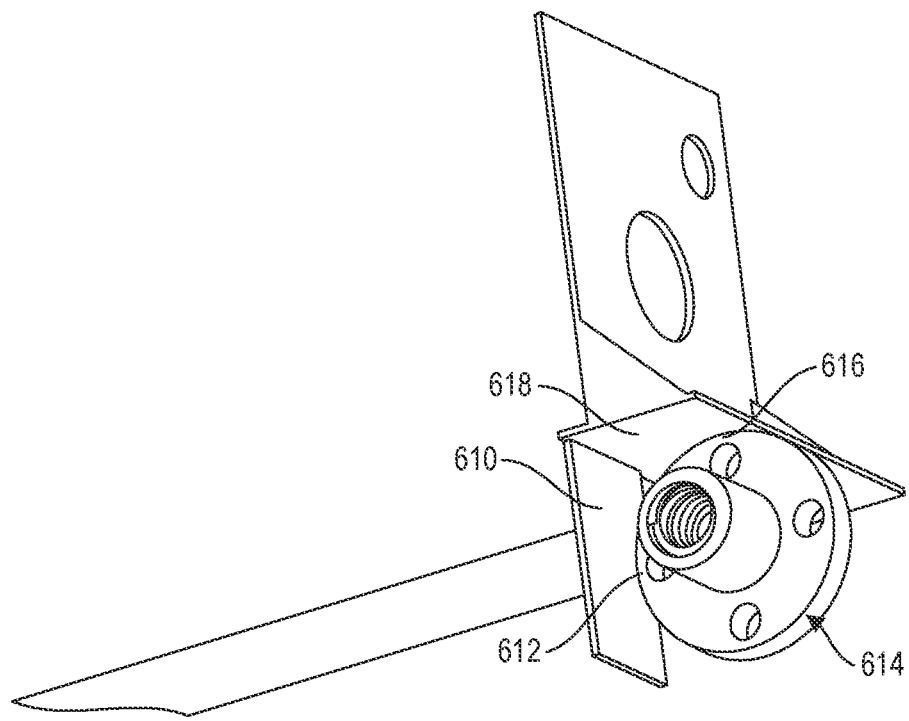

As best illustrated in FIGS. 5A and 5B, a set of projections 342 extend along height 250 of bracket 246 of second lateral support 154 for securing a bushing 344 (FIG. 14A) of the motive system. In this non-limiting, exemplary instance, set of projections 342 of first lateral support 152 are not used (as shown in FIG. 2B).

An interior facing side 300 of bracket 246 includes rail 298 for ease of insertion and removal of main tray 104. Rails 298 are identical and connect with interior facing side 300 of bracket 246 with their connection side 346. As illustrated, rails 298 have openings that when connected with bracket 246 continue to allow full through accesses to various openings on bracket 246.

Figure 6A:
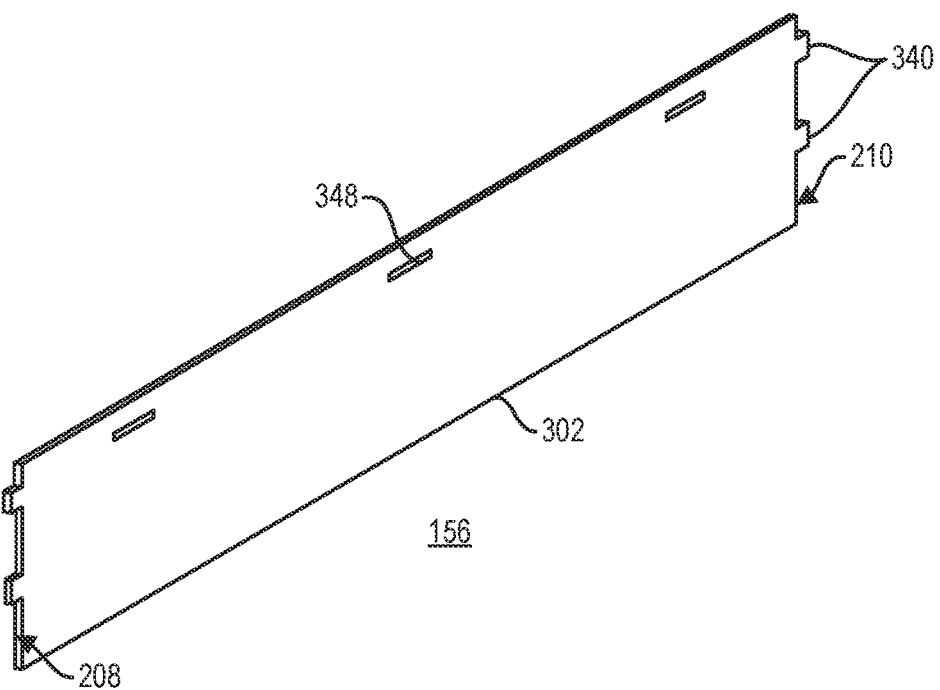
FIGS. 6A and 6B are non-limiting, exemplary illustrations of a rear panel support of device shown in FIGS. 1A to 5E in accordance with one or more embodiments of the present invention.
Figure 6B:
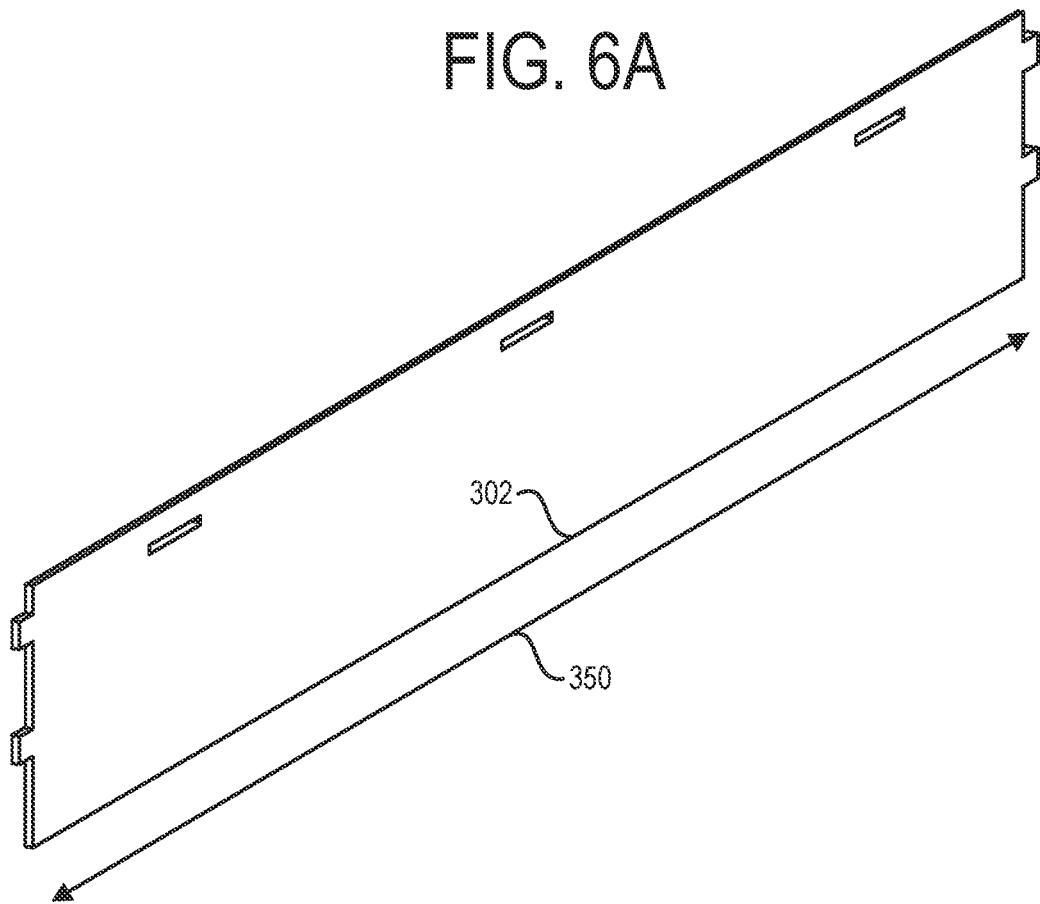

FIGS. 6A and 6B are non-limiting, exemplary illustrations of a rear panel support of device shown in FIGS. 1A to 5E in accordance with one or more embodiments of the present invention. As illustrated in FIGS. 1A to 6B, front side (FIG. 6A) and back side (FIG. 6B) of rear panel support 156 are identical. Rear support panel 156 is comprised of one or more mounting slot 348 for receiving connecting mounting tabs 318 of heater second panel 320 of second heater assembly (top heater) 256.

Further illustrated are a set of mounting tabs 340 extending from lateral sides 208 and 210 of rear support panel 156, along a longitudinal axis 350 for connection with third set of mounting slots 338 of first and second lateral supports 152 and 154.

Figure 7A:
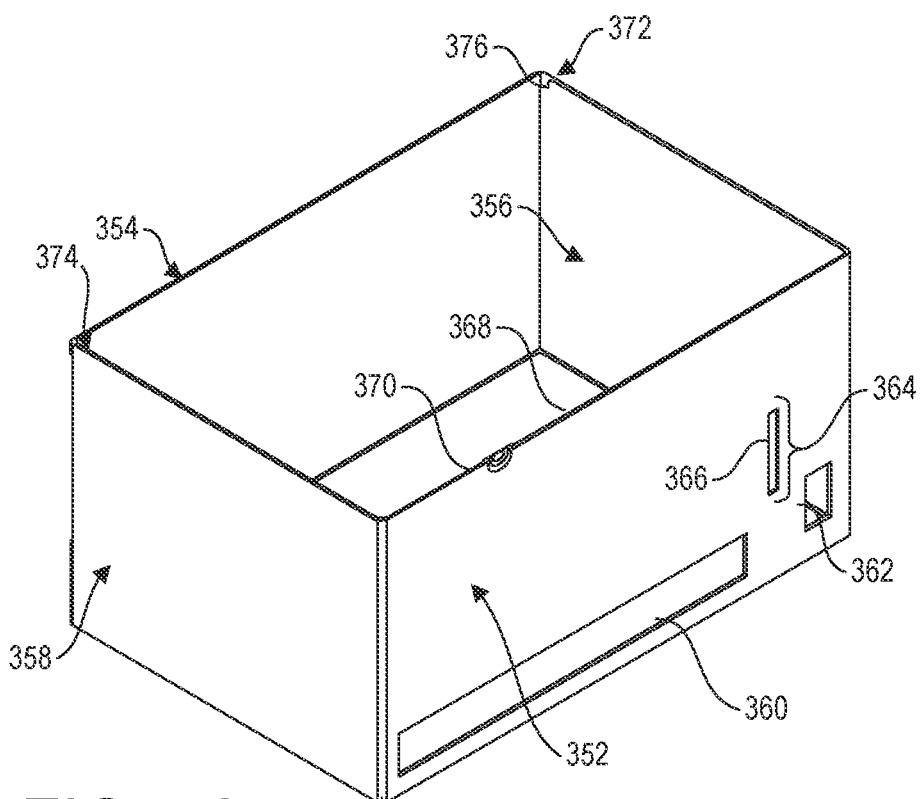
FIGS. 7A to 7H are non-limiting, exemplary illustrations of case structure of device shown in FIGS. 1A to 6B in accordance with one or more embodiments of the present invention.
Figure 7B:
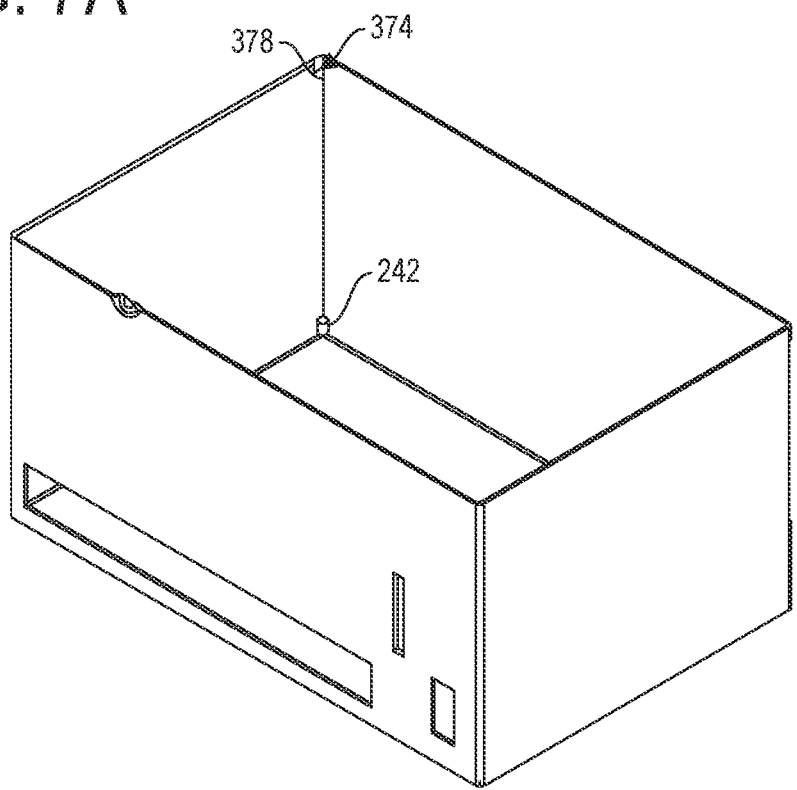
Figure 7C:
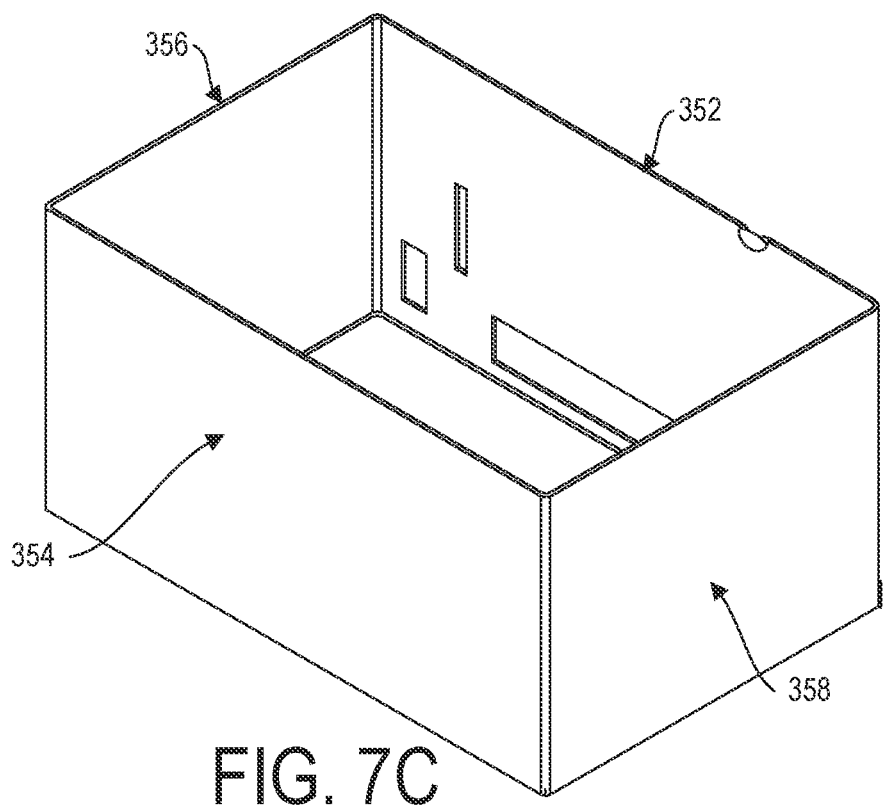
Figure 7D:
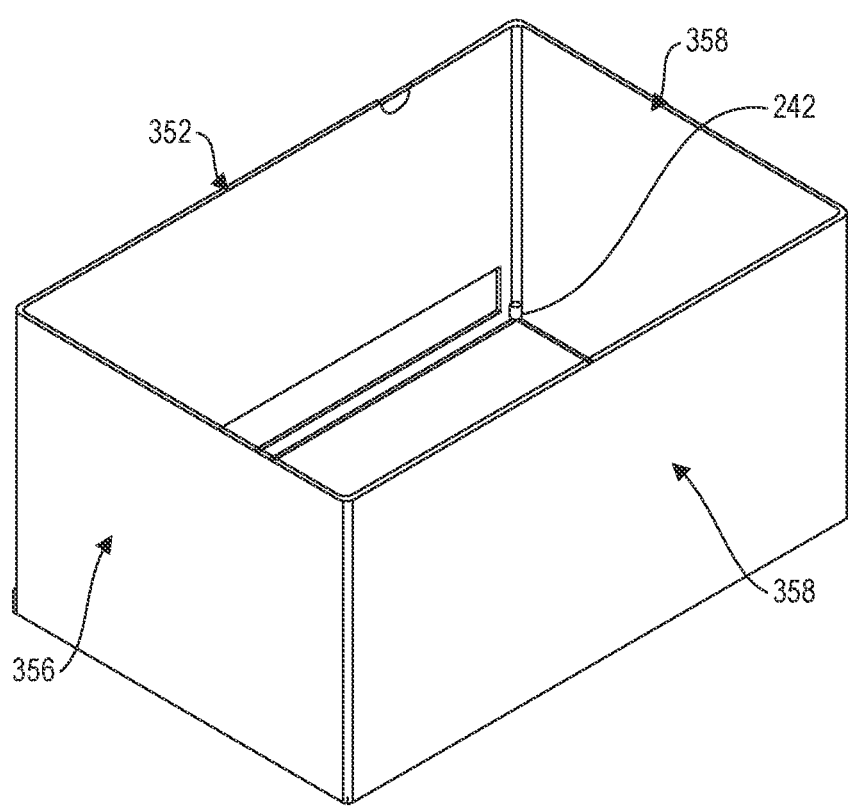
Figure 7E:
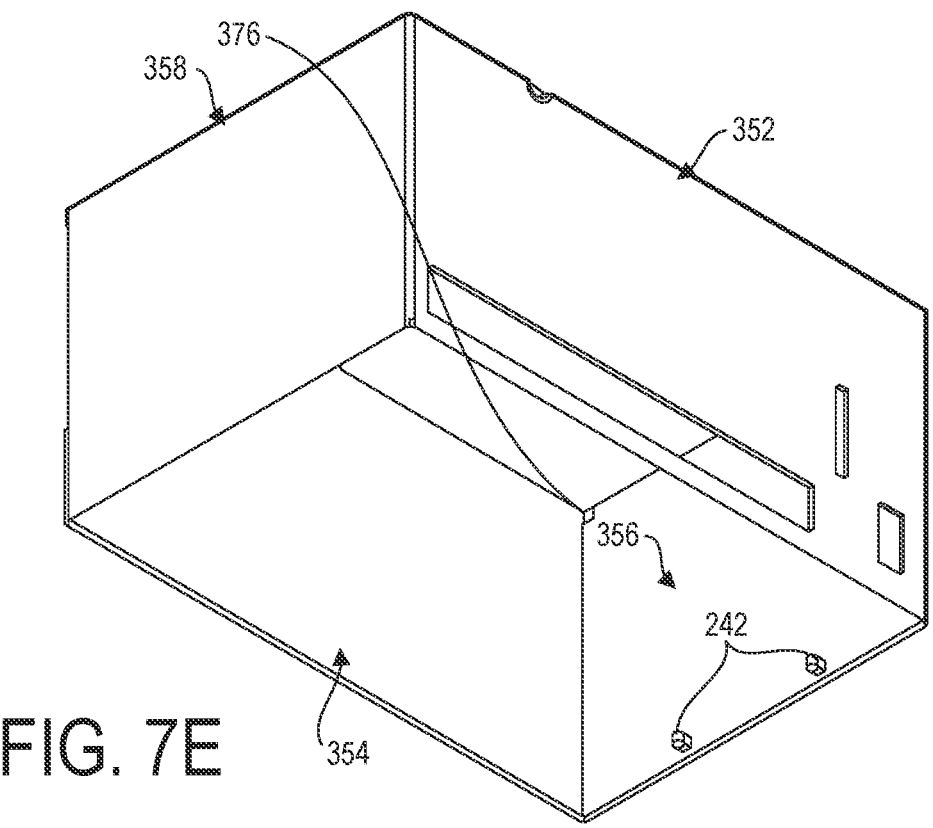
Figure 7F:
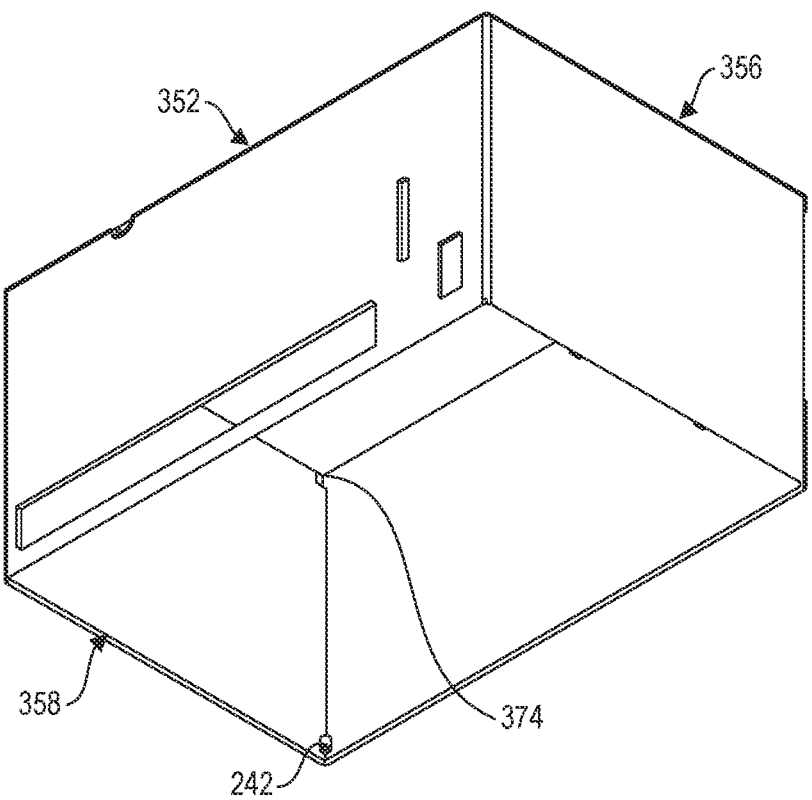
Figure 7G:
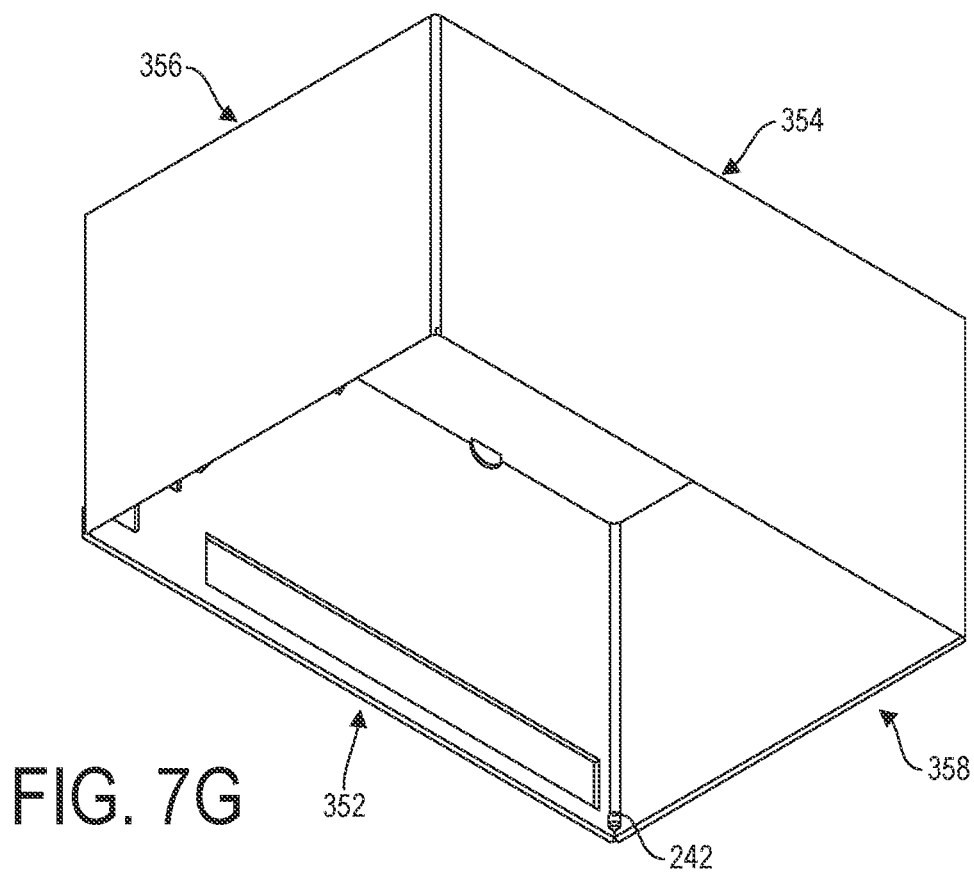

FIGS. 7A to 7H are non-limiting, exemplary illustrations of case structure of device shown in FIGS. 1A to 6B in accordance with one or more embodiments of the present invention. As illustrated in FIGS. 1A to 7H, case structure 150 includes an open top (FIGS. 7A to 7D) and an open bottom (FIGS. 7E to 7G). Case structure 150 further includes a front 352, a back side 354, and lateral sides 356 and 358.

Front side 352 includes a first opening 360 for insertion and removal of main tray 104. Front side 352 also includes a second opening 362 for interface control buttons. Further included are a third openings 364 for illuminating mechanisms in a form of LEDs, and a fourth opening 366 for cook-level user interface control 102. Top edge 368 of front side 352 further includes a relief 370 that functions ergonomically to allow opening of top cover 112.

Interior of case structure 150, near bottom lateral sides 356 and 358 includes internally threaded cylindrical sockets (or couplers) 242 that when aligned with corresponding number of couplers 240 of base 148 enable case structure 150 to be secured with base 148 using fasteners. Couplers 242 of case structure 150 are comprised of internally threaded cylindrical sockets for receiving fasteners.

Figure 7H:
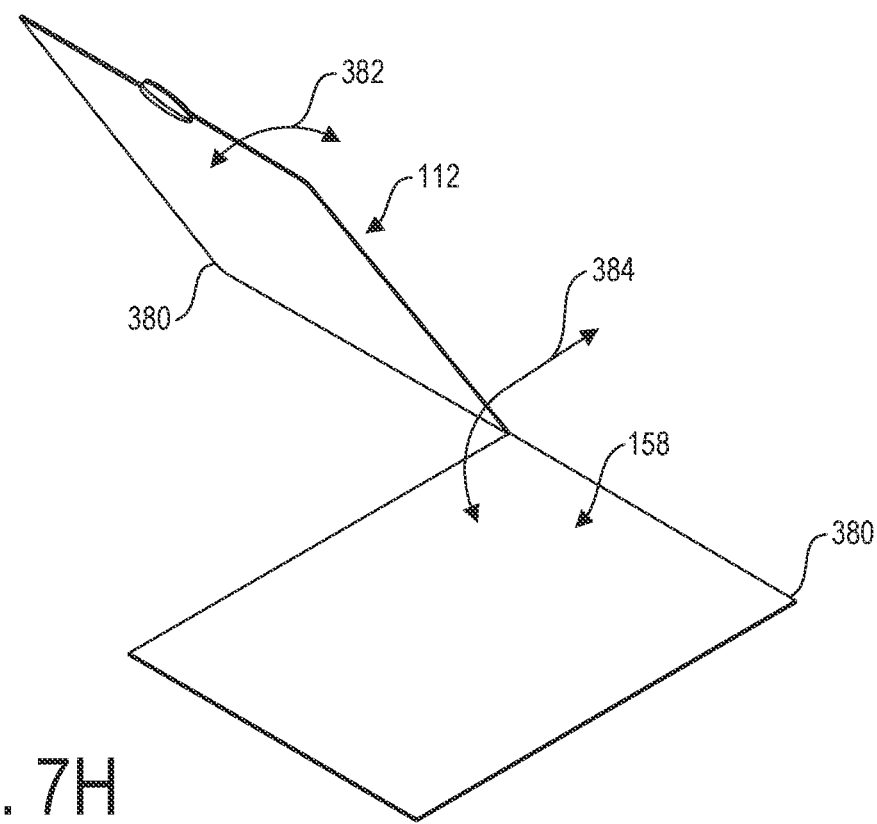
Figure 8A:
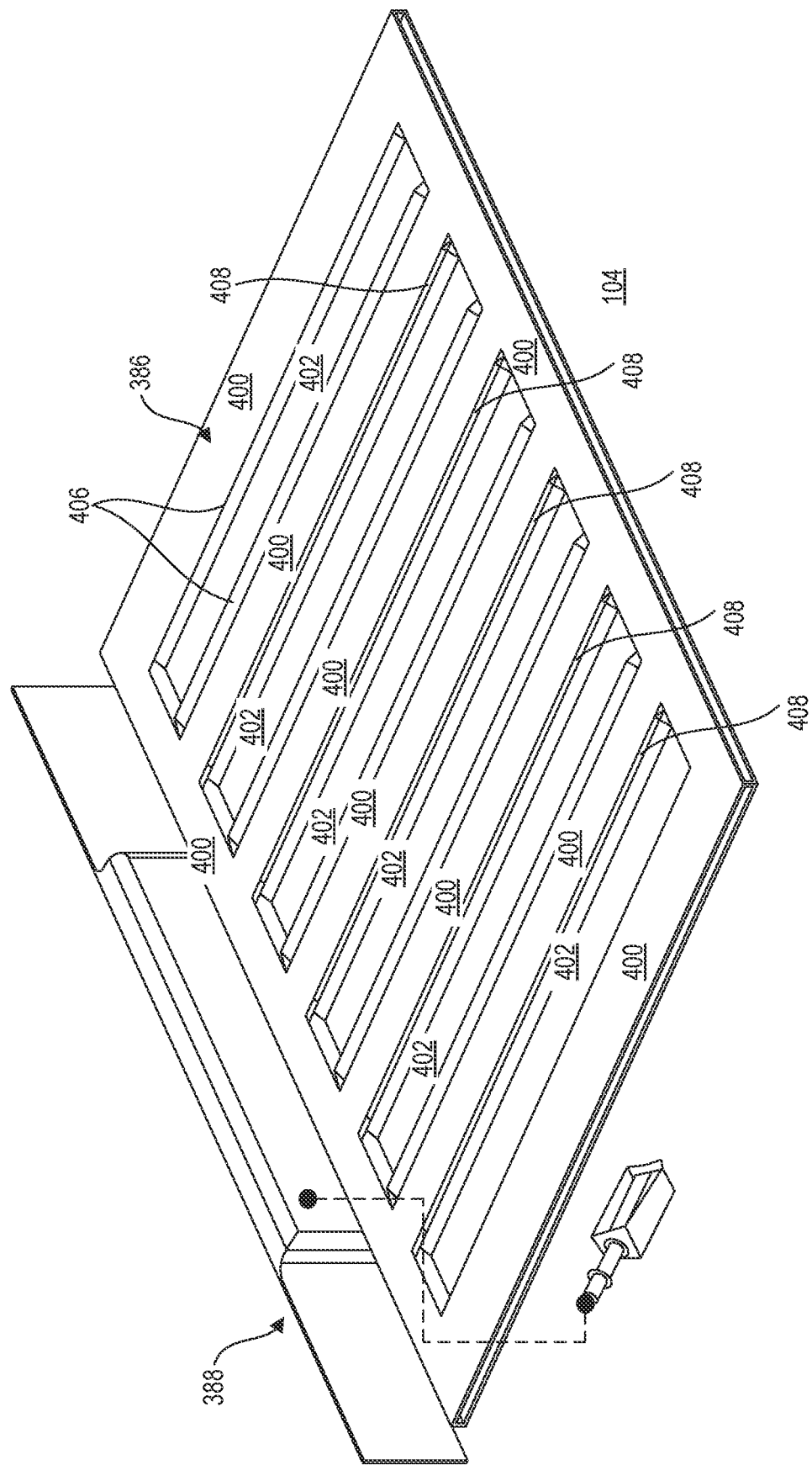
Figure 8B:
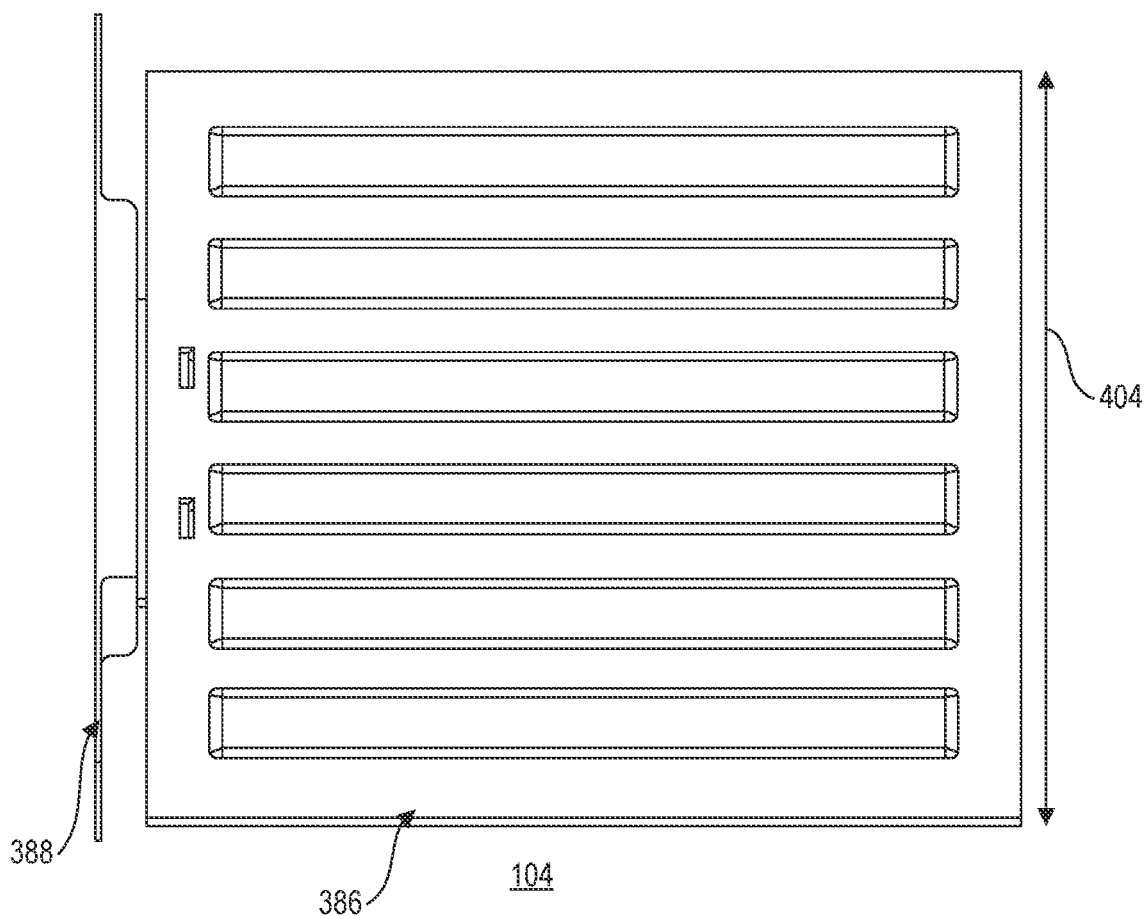
Figure 8C:
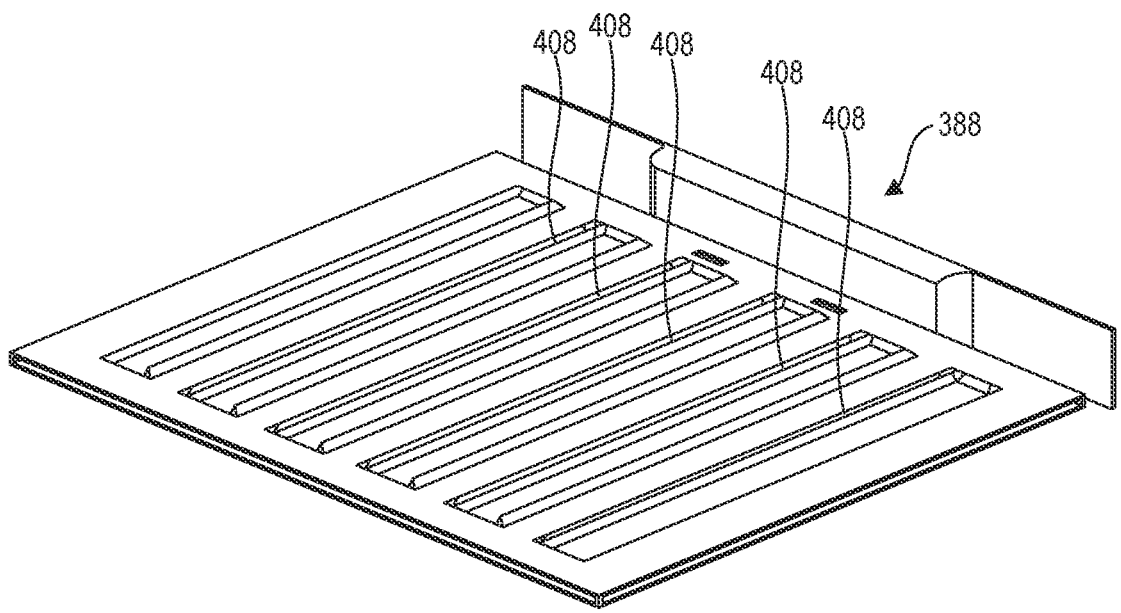
Figures 1, 8D:
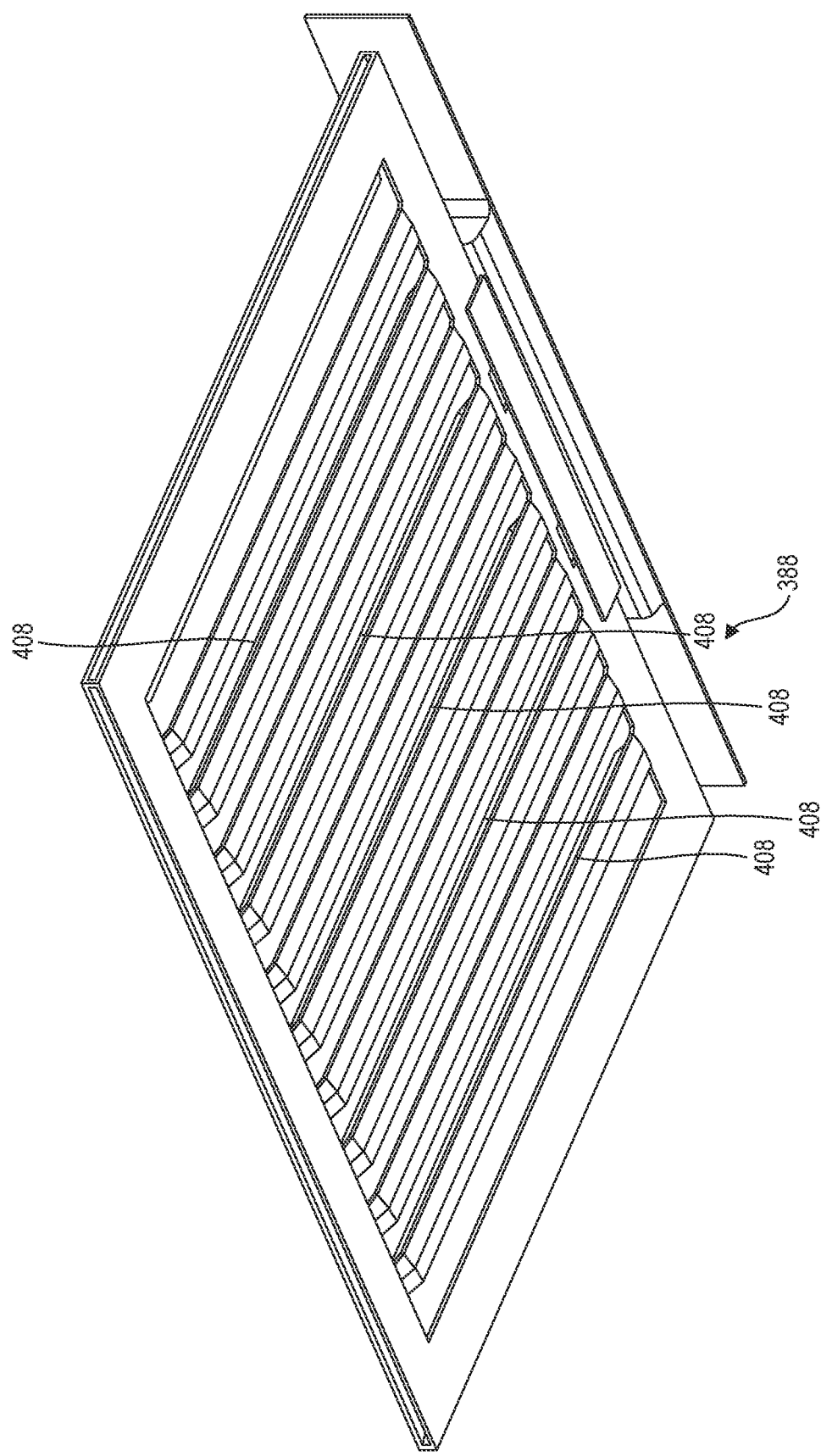
Figures 2, 8D:
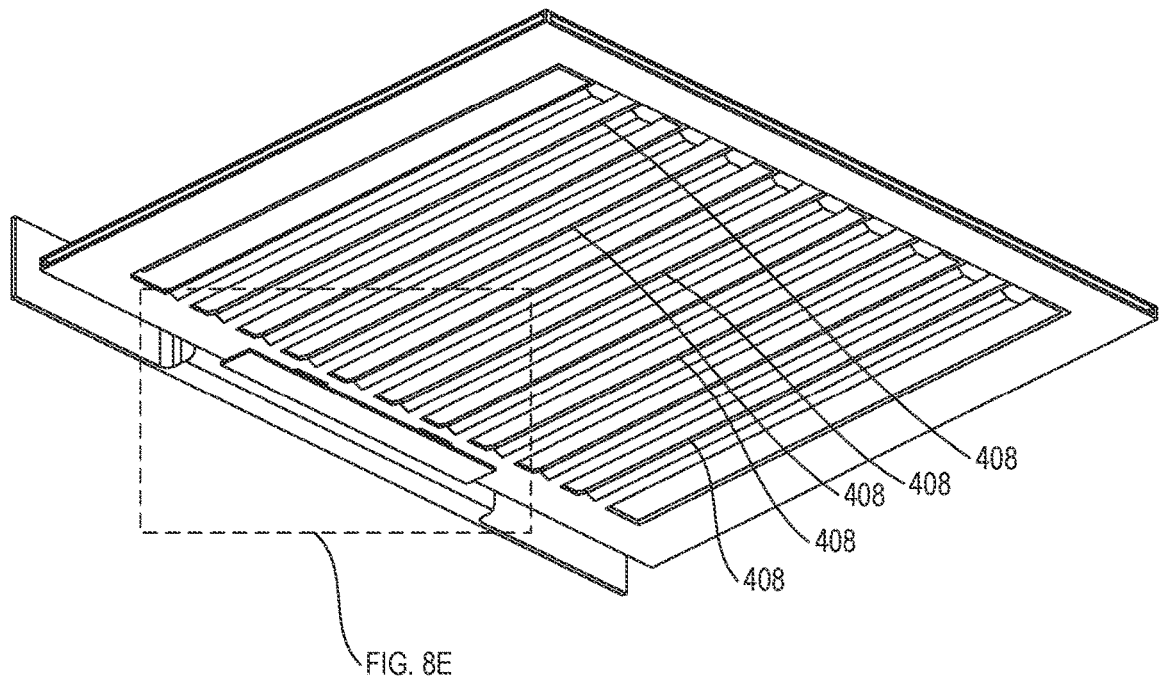
Figure 8E:
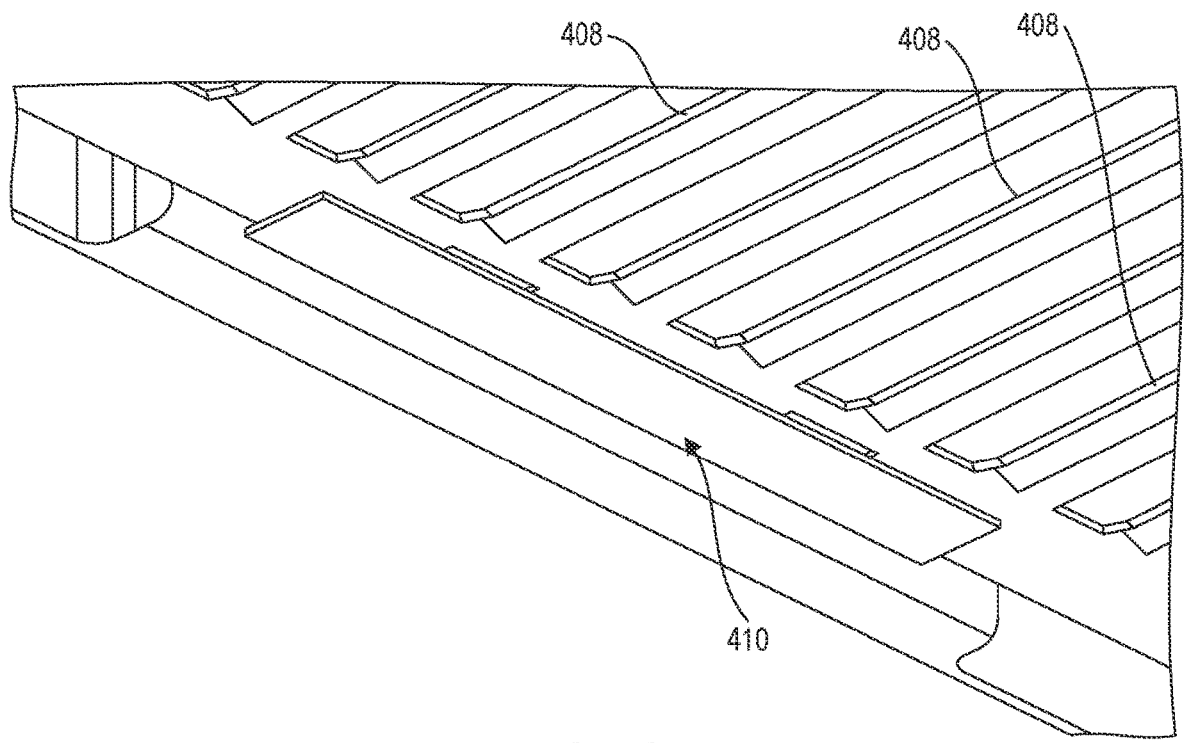
Figure 8F:
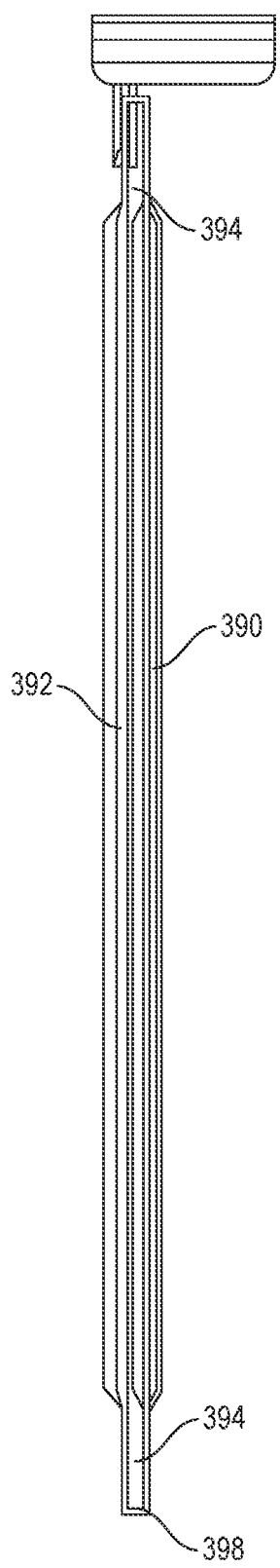
Figure 8G:
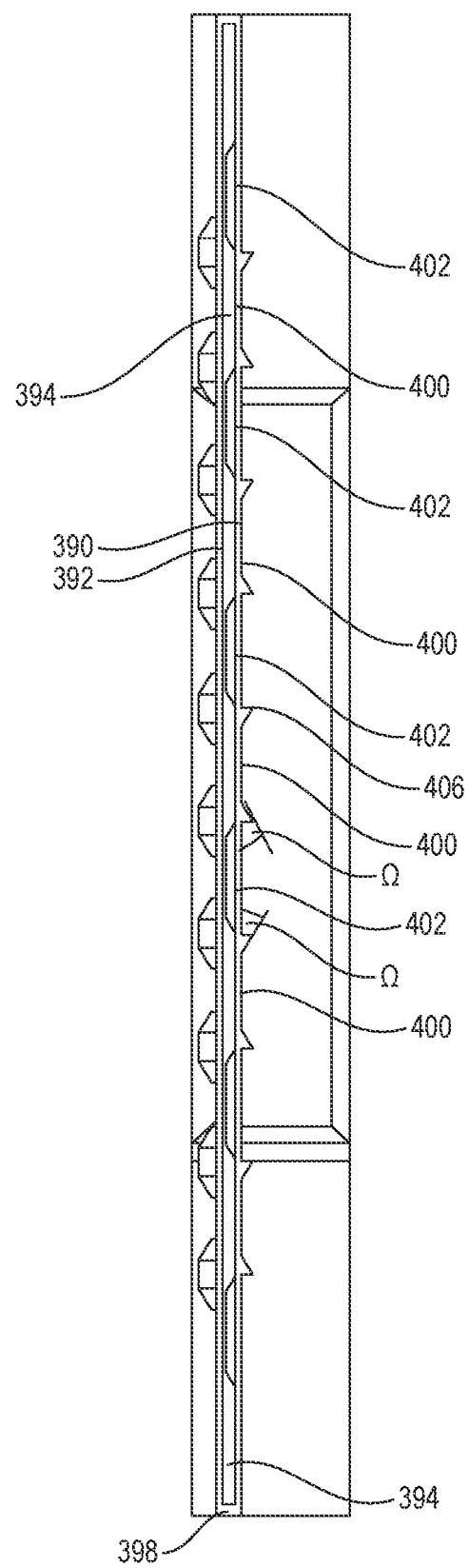
Figure 8H:
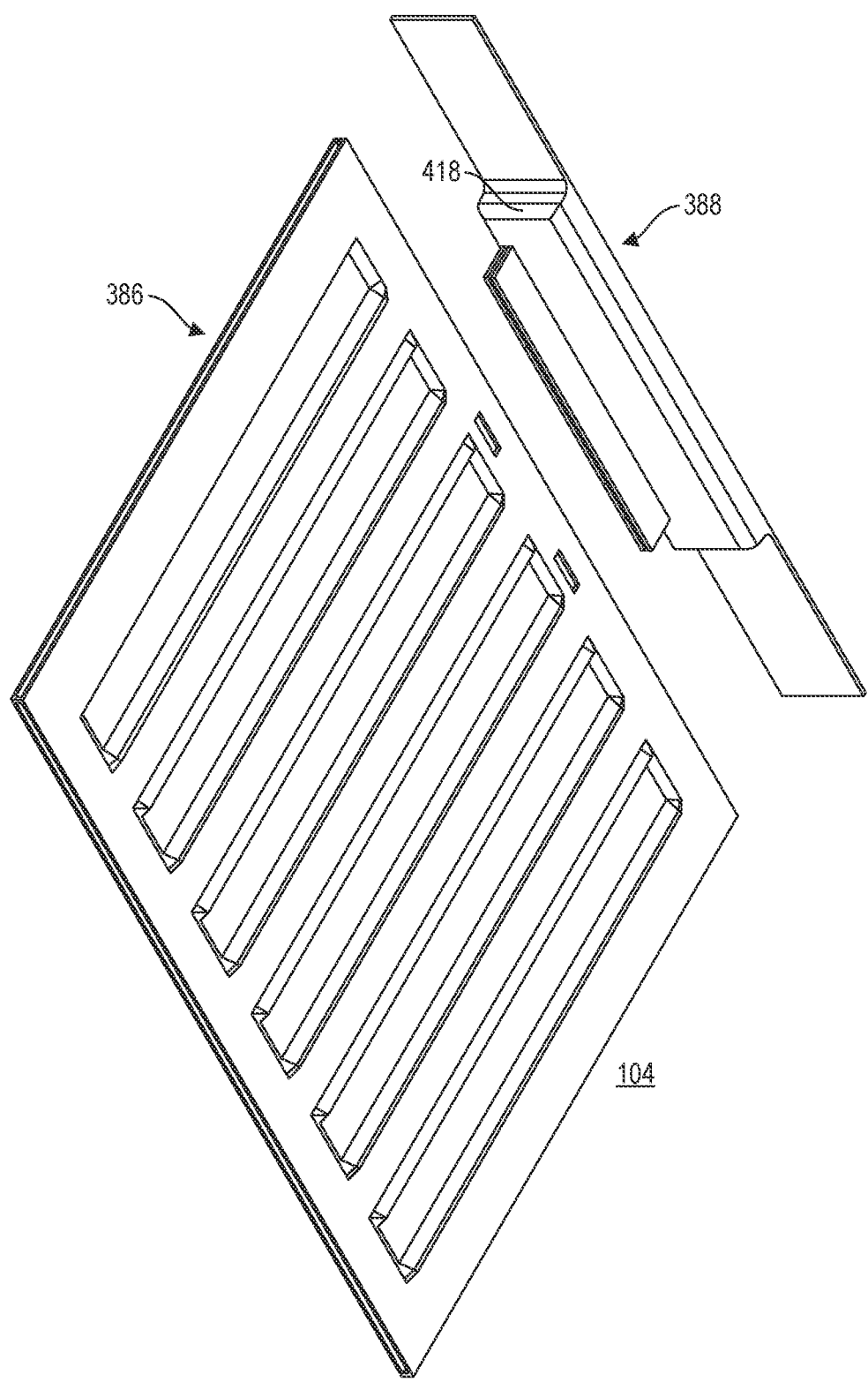
Figure 81:
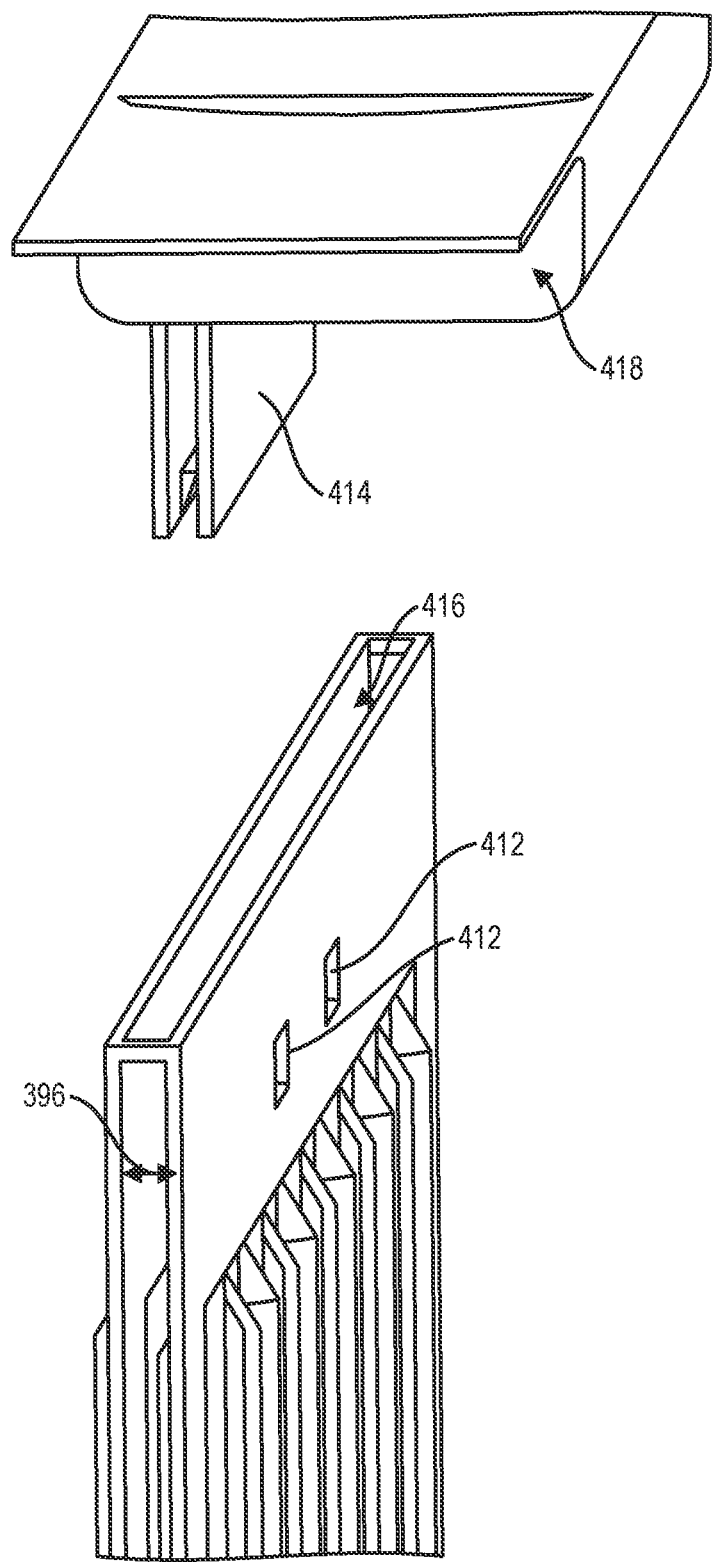
Figure 9A:
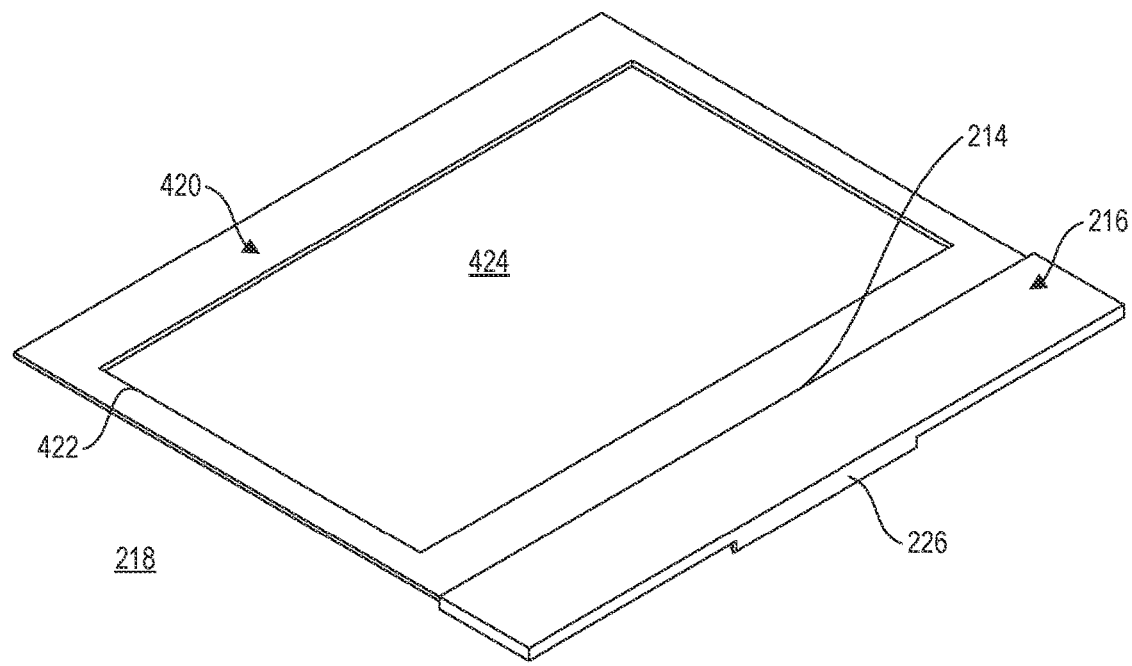
FIGS. 9A to 9D are non-limiting, exemplary illustrations of crumb tray of device shown in FIGS. 1A to 8J in accordance with one or more embodiments of the present invention.
Figure 9B:
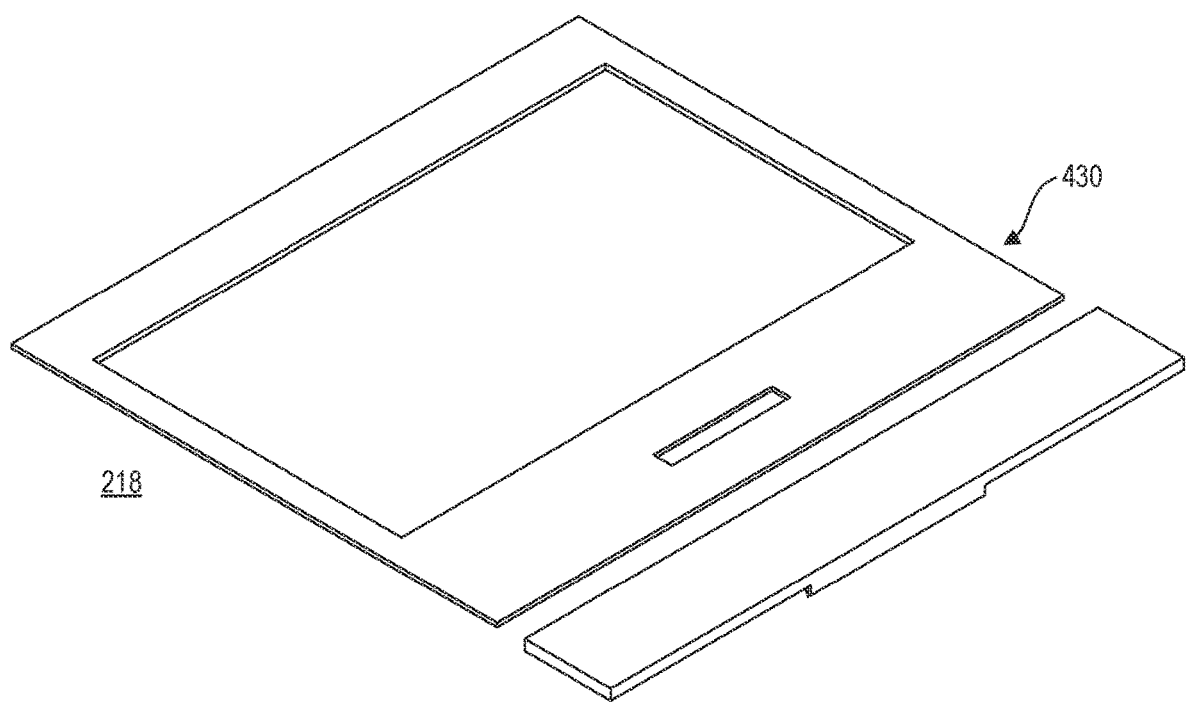
Figure 9C:
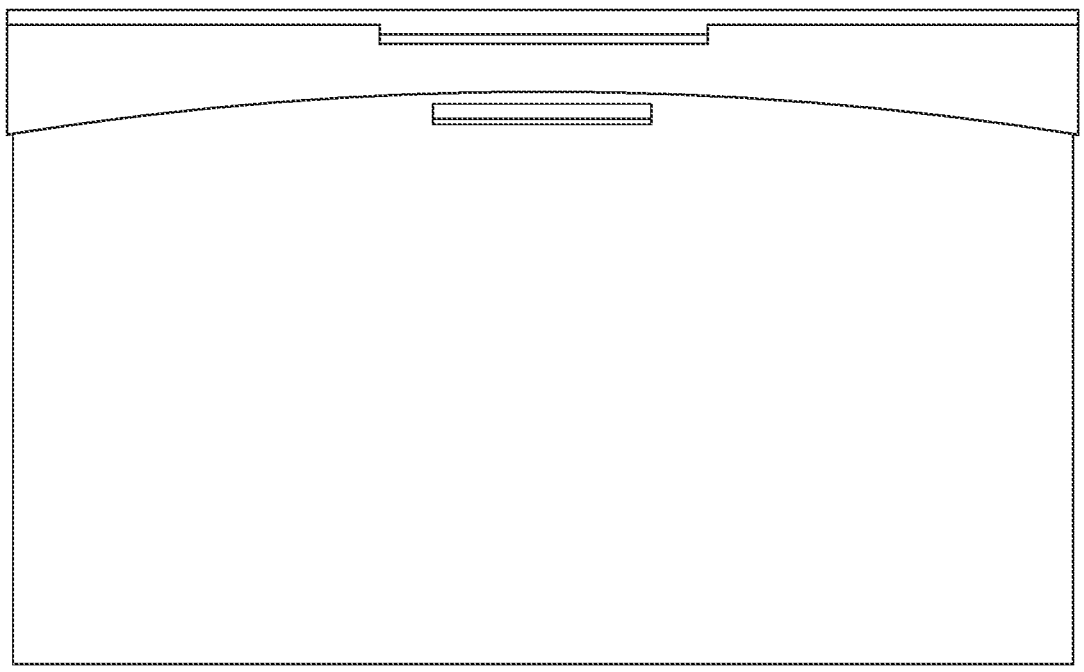
Figure 9D:
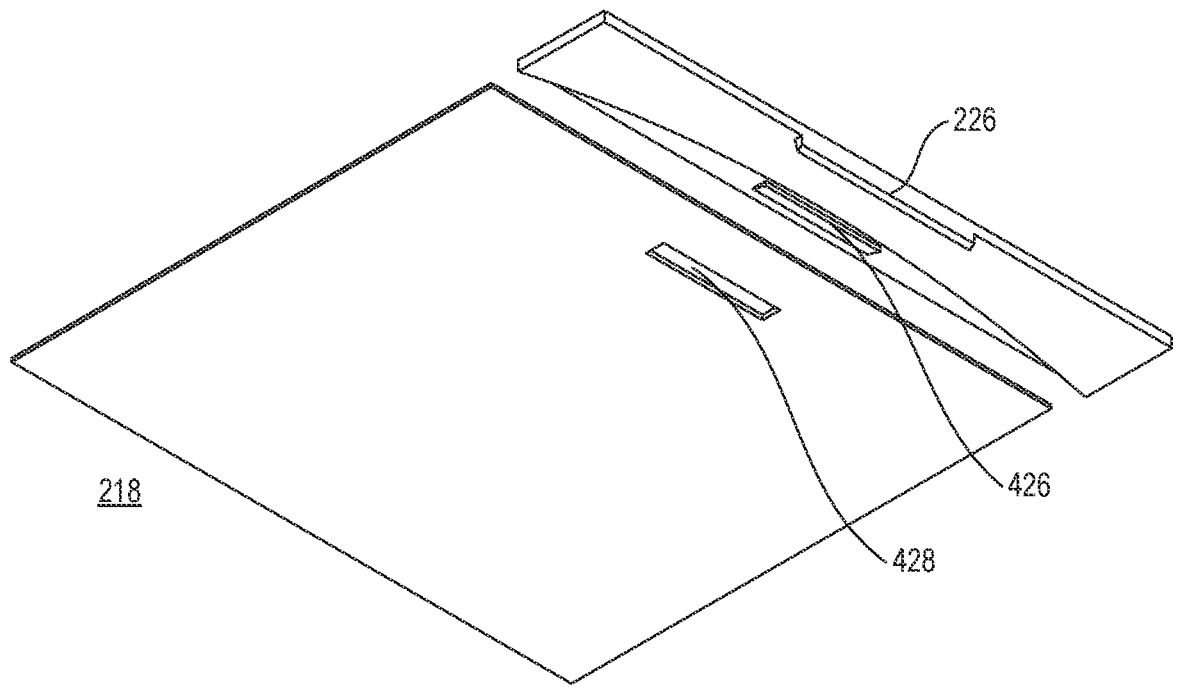

Top distal ends 372 and 374 of lateral sides 356 and 358 near back side 354 of case structure 150 include interlocking recessed portions (or notches) 376 and 378 that receive interlocking projections 380 (e.g., hinge pin), combination of which provide a hinge function for topping cover 112 (best shown in FIG. 7H). As illustrated, cover 112 may be opened as shown by arrow 382 to allow access to topping dispenser mechanism 114, while maintenance access panel cover 158 may be removed as shown by arrow 384 to allow for maintenance or repair. It should be noted that in this non-limiting, exemplary instance, relay PCB 258 and driver PCB 284 are connected to the underside (interior facing side) of access panel cover 158.

FIGS. 8A to 8J are non-limiting, exemplary illustrations of main tray of device shown in FIGS. 1A to 7H in accordance with one or more embodiments of the present invention. As illustrated in FIGS. 1A to 8J, main tray 104 includes a tray platform 386 for positioning a base food item 106 on tray platform 386, and a handle 388 detachably associated with tray platform 386.

Tray platform 386 is comprised of a single piece unitary construction that is folded, defining an upper tray member 390 positioned over a lower tray member 392, with an air gap 394 between upper tray member 390 and lower tray member 392.

Upper tray member 390 and lower tray member 392 are separated at a distance 396 by connectors 398, which in general define air gap 394 between upper tray member 390 and lower tray member 392.

Upper tray member 390 and lower tray member 392 are comprised of a tray member base 400 having a plurality of longitudinally extending elongated recesses, defining a plurality of elongated troughs 402 to enable fallen debris (e.g., bread crumbs) from base food item 106 to settle within plurality of troughs 402. Plurality of troughs 402 are oriented perpendicular a transvers axis 404 of main tray 104.

A plurality of elongated, longitudinally extending ridges 406 protruded from plurality of troughs 402 and tray member base 400 at an angle 1, defining a set of elongated heat exchange openings 408.

Plurality of ridges 406 define the elongated sides of plurality of troughs 402 and hence, are oriented perpendicular transvers axis 404 or width of main tray 104. Plurality of ridges 406 form elevated surfaces above tray member base 400 and troughs 402, enabling placement of base food item 106 for processing.

Heat exchange openings 408 are comprised of elongated slits extending longitudinally. Heat exchange openings 408 allow for distribution of heat above, over upper tray member 390, air gap 394 between upper tray member 390 and lower tray member 392, and below lower tray member 392.

Both upper tray member 390 and lower tray member 392 have heat exchange openings 408. Upper tray member heat exchanger openings 408 are parallel with respect to one another. Lower tray member heat exchanger openings 408 are parallel with respect to one another.

Upper tray member heat exchanger openings and lower tray member heat exchanger openings are non-aligned in relation to one another and hence, are laterally offset in relation to one another, thus preventing food debris from falling onto first (or bottom) heater assembly 254 while allowing for distribution of heat.

Handle 388 of main tray 104 includes a set of connection tabs 410 that are inserted into a corresponding set of connection openings 412 on main tray platform 386. Handle 388 further includes a flange 414 that is inserted into an open end 416 of tray platform 386 of main tray 104, within gap 394.

Handle 388 further includes a bulging 418 that functions as a spacer that contacts a main tray limiter 266 (further detailed below), which when actuated provides a "tray closed" signal to controller unit 260. Bulging 418 of handle 388 also functions to allow tray handle 388 to be flush with opening 360 of front side 352 of casing structure 150 when closed.

FIGS. 9A to 9D are non-limiting, exemplary illustrations of a crumb tray of device shown in FIGS. 1A to 8J in accordance with one or more embodiments of the present invention. As illustrated in FIGS. 1A to 9D, crumb tray 218 that includes a plate member 420 with a top side 422 having a recessed area 424 that holds crumbs.

Further included is a handle 216 with a grip portion 226 and an interlocking projection 426. Interlocking projection 426 of handle 216 is removably associated with a corresponding interlocking opening 428 on a handle side 430 of plate member 420.

FIGS. 10A to 10D are non-limiting, exemplary illustrations of a first heater assembly of device shown in FIGS. 1A to 9D in accordance with one or more embodiments of the present invention. As illustrated in FIGS. 1A to 10D, Cooker of device 100 is comprised of a heater that includes a first heater assembly 254 and a second heater assembly 256.

Figure 10A:
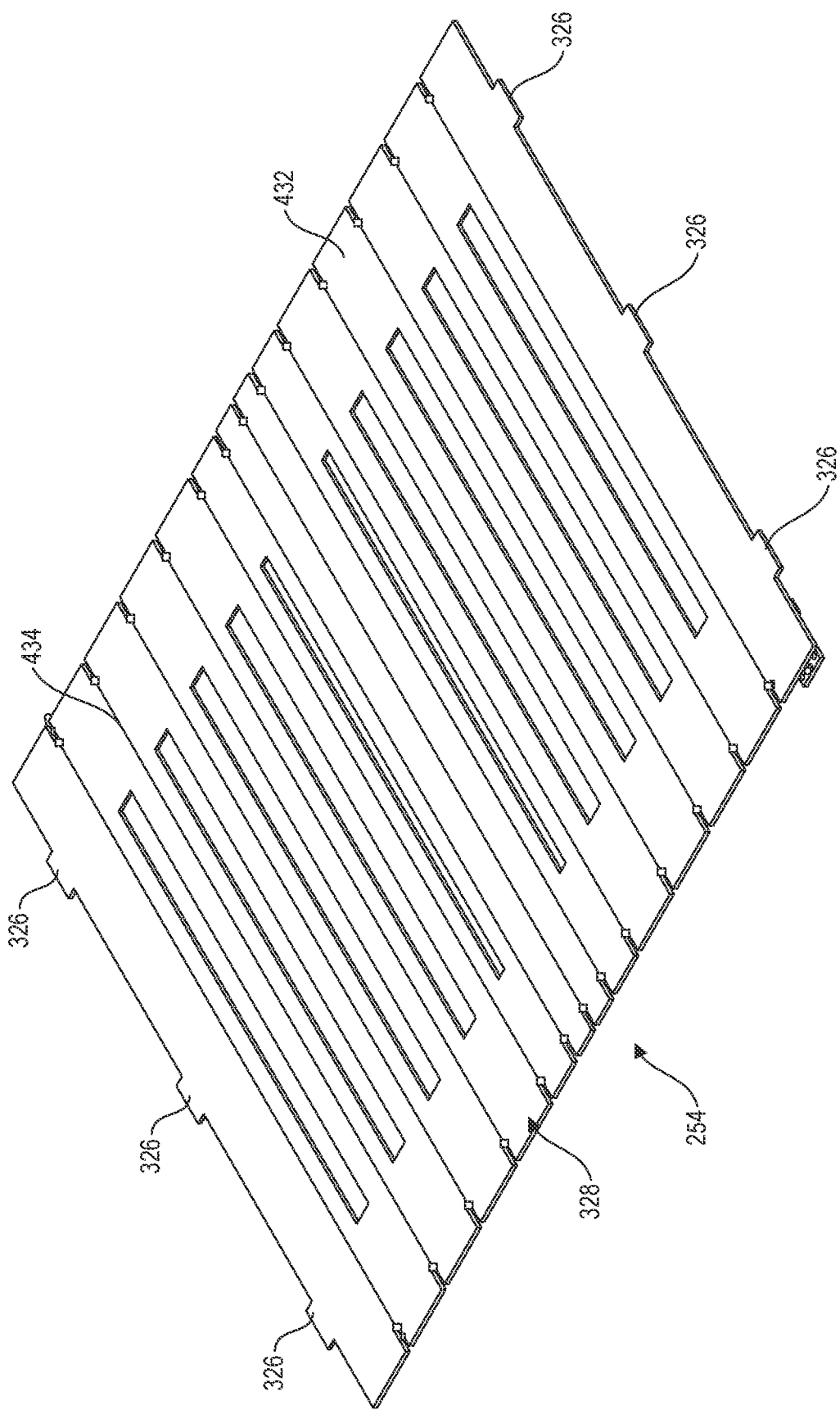
FIGS. 10A to 10D are non-limiting, exemplary illustrations of a first heater assembly of device shown in FIGS. 1A to 9D in accordance with one or more embodiments of the present invention.
Figure 10B:
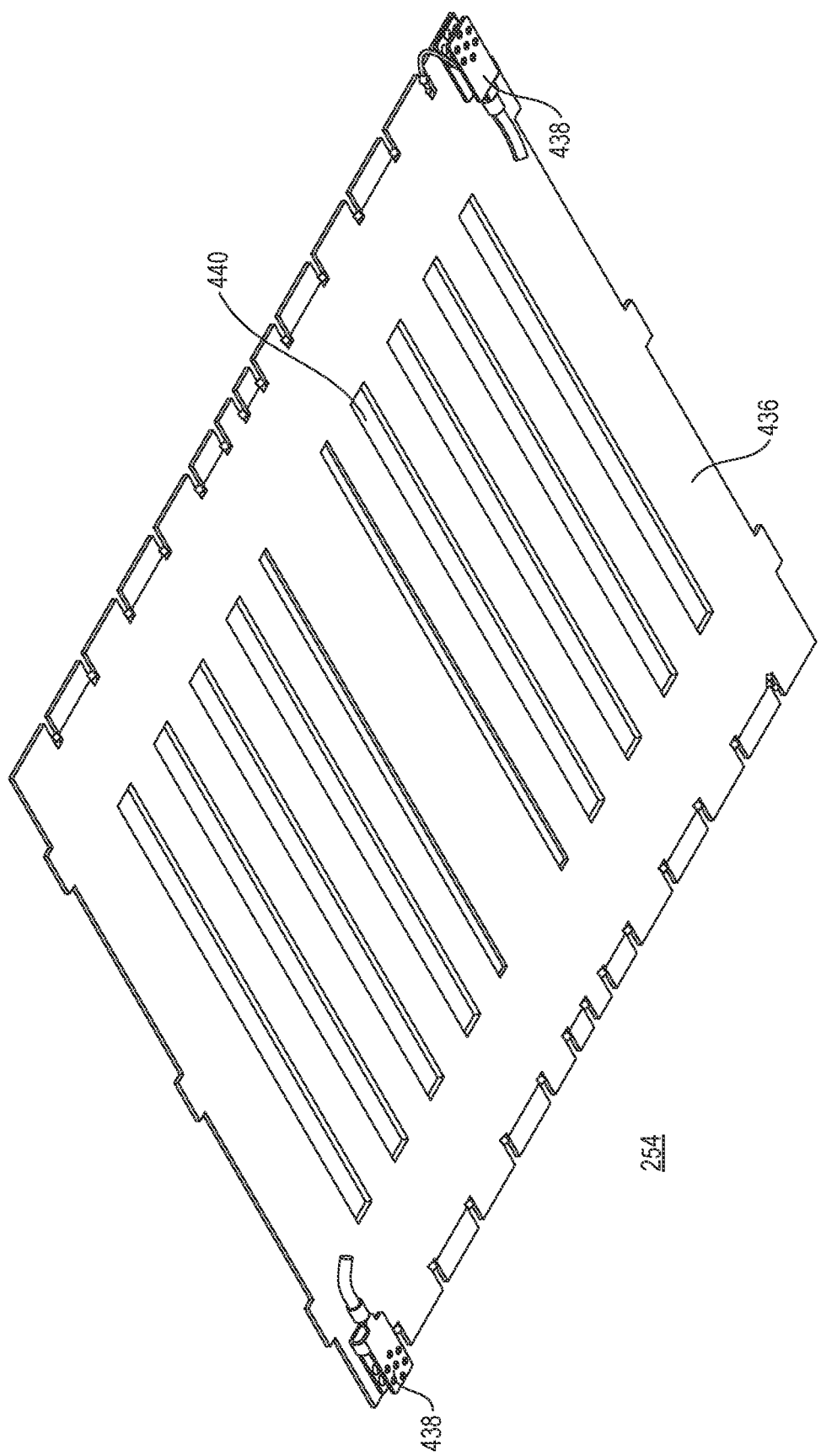
Figure 10C:
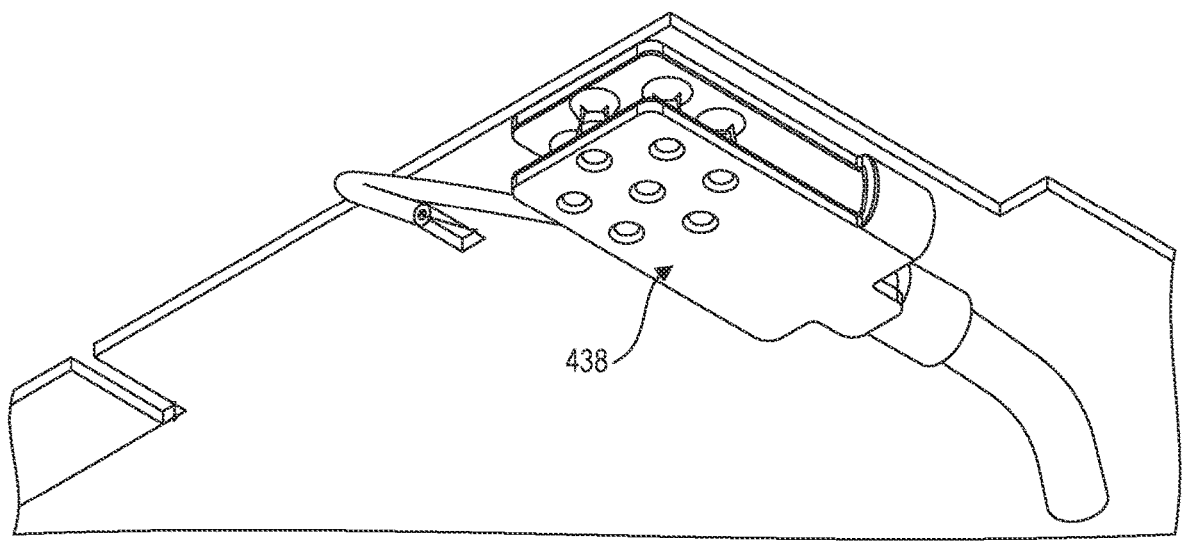
Figure 10D:
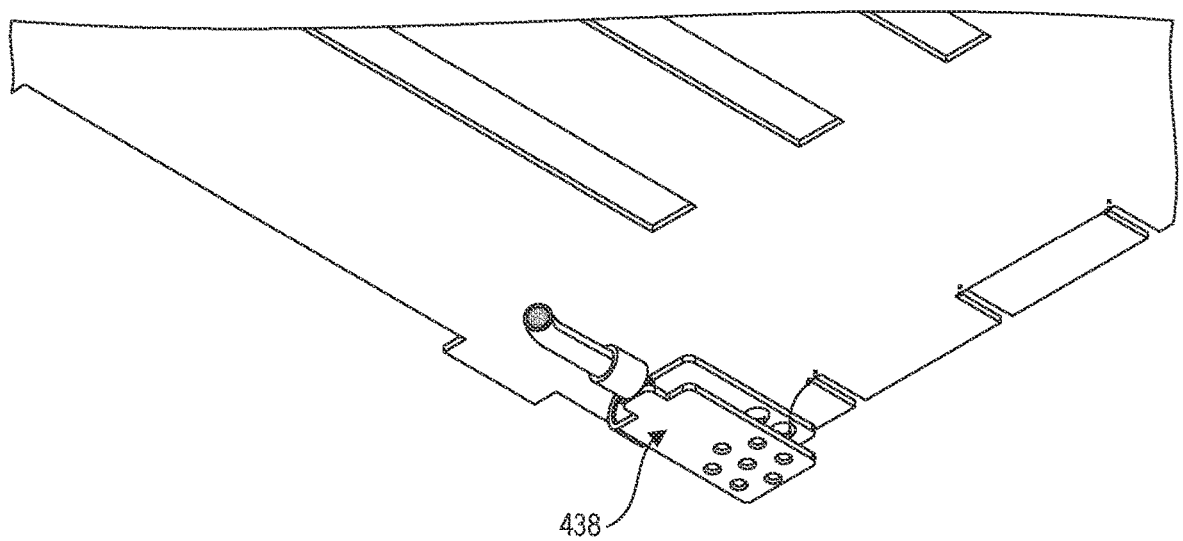
Figure 11A:
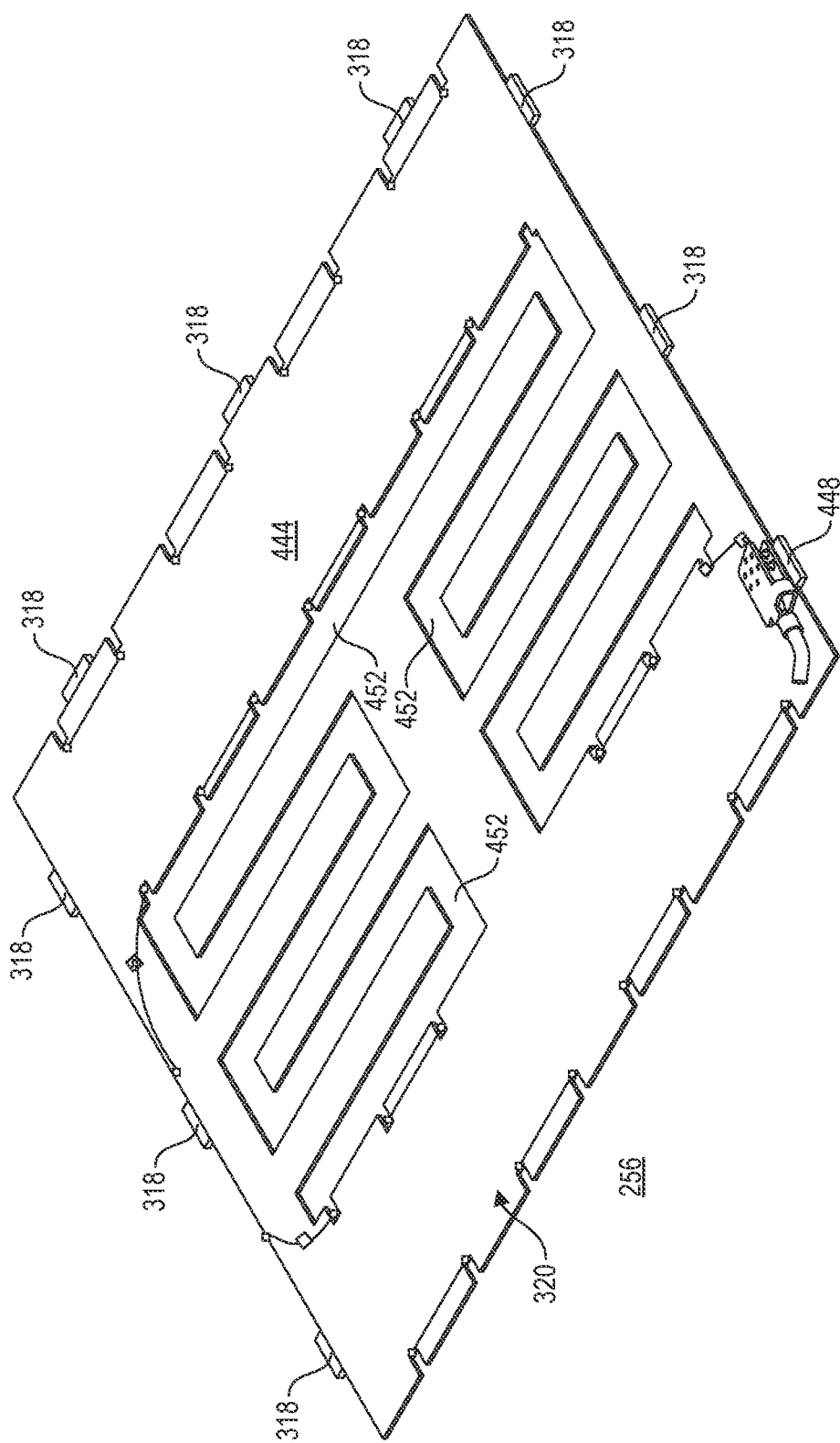
FIGS. 11A to 11E are non-limiting, exemplary illustrations of a second heater assembly of device shown in FIGS. 1A to 10D in accordance with one or more embodiments of the present invention.
Figure 11B:
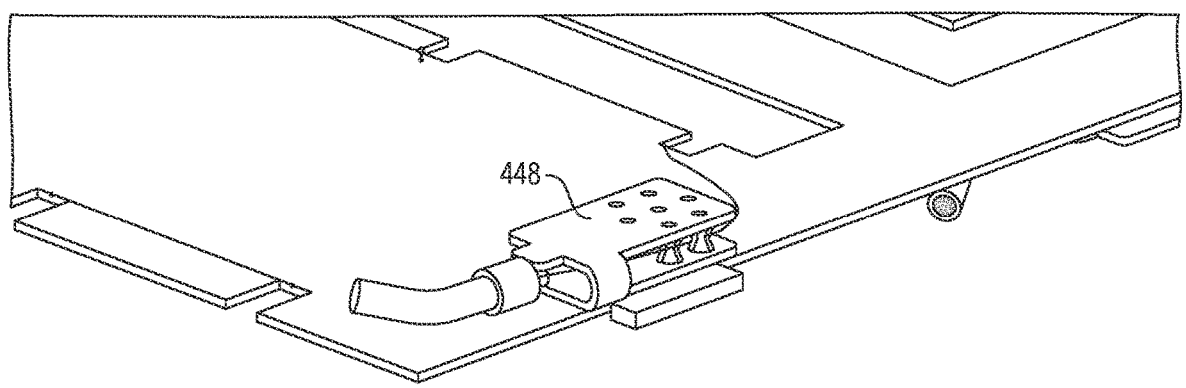
Figure 11C:
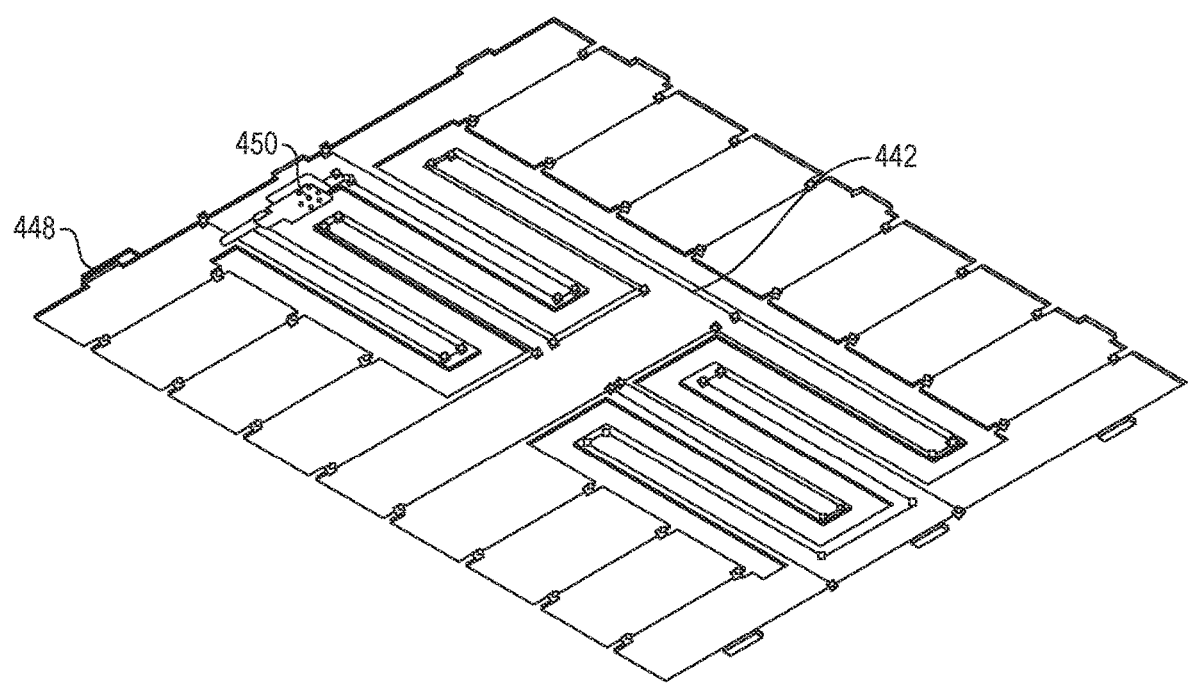
Figure 11D:
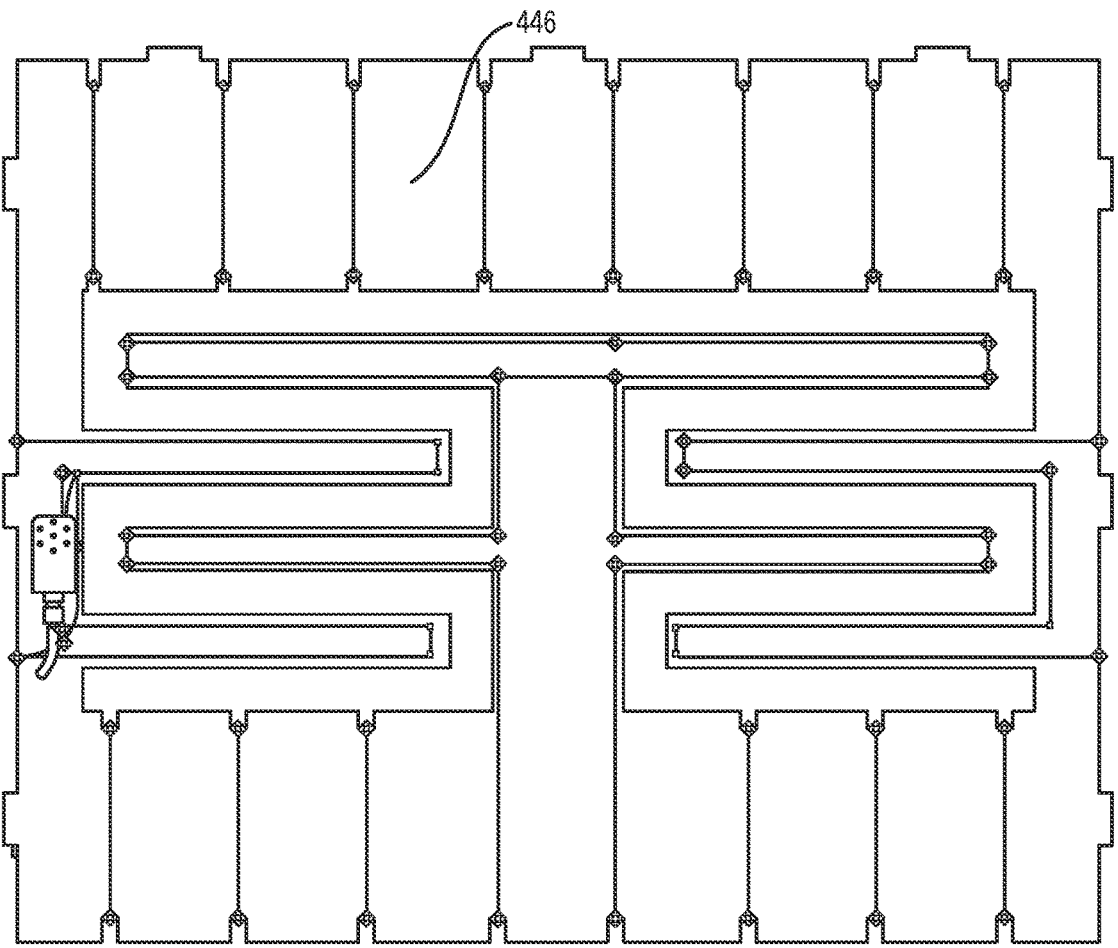
Figure 11E:
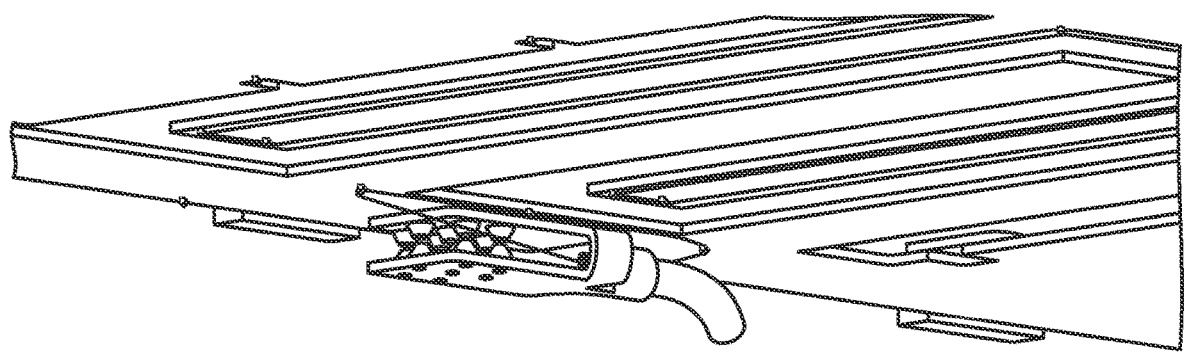

First heater assembly 254 is defined as the bottom heater and is comprised of a first heater panel 328 that supports a first heating element 434. The first heater assembly 254 has a top side 432 (FIG. 10A) and a bottom side 436 (FIG. 10B).

A top side 432 of first heater panel 328 includes first heating element 434, whereas bottom side 436 of first heater panel 328 includes terminals 438 of first heating element 434 wired for AC connection to power reply PCB 258.

First heater panel 328 includes heat distribution openings 440 for uniform distribution of heat and further, to allow passage for food debris to fall through onto crumb tray 218 below first heater assembly 254.

FIGS. 11A to 11E are non-limiting, exemplary illustrations of a second heater assembly of device shown in FIGS. 1A to 10D in accordance with one or more embodiments of the present invention. As illustrated in FIGS. 1A to 11E, second heater assembly (or top heater) 256 is comprised of a second heater panel 320 having a top side (FIGS. 11A and 11B) and a bottom side (FIGS. 11C to 11E) that support a second heating element 442.

Top side 444 (facing away from base food item 106) of second heater panel 320 includes a top second AC heater terminal 448. Bottom side 446 (facing the base food item 106) of second heater panel 320 includes second heating element 442 terminating at top and bottom second AC heater terminals 448 and 450 that are wired for AC connection to power reply PCB.

Second heater panel 320 includes predefined pattern passageway opening 452 through which an egress portal 296 of cartridge 116 is moved for dispensing of topping food item 130. In general, the predefined pattern may comprise of different patterns, including Zig Zag, etc., but it should be continuous in at least one portion. Egress portal 296 of cartridge 116 extends through predefined pattern passageway opening 452, below bottom side 444 of second heater panel 320.

FIGS. 12A to 12L are non-limiting, exemplary illustrations of a motive system of device shown in FIGS. 1A to 11E in accordance with one or more embodiments of the present invention. FIGS. 12A to 12L illustrate device 100 with many of its components removed for clarity and discussion.

As illustrated in FIGS. 1A to 12L, the topper of device 100 includes a motive system and a topping dispenser mechanism 114. The motive system moves topping dispenser mechanism 114 over base food item 106 while dispensing topping food item 130.

The motive system moves topping dispenser mechanism 114 to a motive dispensing point 274 within device 100, with the motive dispensing point defined by an X-positioning coordinate value (X, 0, 0) using an X-direction motive force mechanism 276, a Y-positioning coordinate value (0, Y, 0) using a Y-direction motive force mechanism 278, and a Z-positioning coordinate value (0, 0, Z) using a using a Z-direction motive force mechanism 280. Motive dispensing point 274 with value (X, Y, Z) is defined by a position of a compressor 454 of a compressor-driver 456 of a plunger 458 within a three-dimensional space of device 100.

X-direction motive force mechanism 276 enables X-direction translational motion of motive dispensing point 274 of topping dispenser mechanism 114.

Y-direction motive force mechanism 278 enables Y-direction translational motion of motive dispensing point 274 of topping dispenser mechanism 114.

Z-direction motive force mechanism 280 enables Z-direction translational motion of motive dispensing point 274 associated with topping dispenser mechanism 114.

X-direction motive force mechanism 276 is comprised of a first X-direction motor 460 driven (or powered) by a first X-direction motor driver (motor driver PCB 284), and a second X-direction motor 462 driven (or powered) by a second X-direction motor driver (motor driver PCB 284). Power to first and second X-motors 460 and 462 are synchronously applied to enable synchronous rectilinear motion of motive dispenser point 274 in the X-direction.

It should be noted note that Y-direction motive force mechanism 278 rides on X-direction motive force mechanism 276, and Z-direction motive force mechanism 280 rides on Y-direction motive force mechanism 278. Accordingly, any irregularities in the X-direction motion would translate into unwanted motion in both the Y and Z directions. Unwanted motion may generate an in-plane (X-Y plane) rotations for moveable topping dispenser mechanism 114 rather than provide a desired and proper rectilinear motion. Accordingly, two X-motors are used and actuated synchronously.

Use of two X-direction motors (first and second X-motors 460 and 462) eliminates unwanted torque that may be experienced at motive dispenser point 274. This elimination of torque prevents topping dispenser mechanism 114 from moving at an angle. As detailed below, elimination of in-plane torque prevents in-plane and out of plane rotational motion of topping dispenser mechanism 114.

In particular, the use and synchronous actuation of two X-motors 460 and 462 maintains alignment with dispensing path by preventing both in-plane and out of plane movement of topping dispenser mechanism 114. The Y-direction motive force mechanism 278 is positioned above X-direction motive force mechanism 276 and hence, X and Y direction motive force mechanisms 276 and 278 are not coplanar. This means that any asymmetric movement in the X-direction would translate into both in-plane and out of plane motion of topping dispenser mechanism 114.

Further, Z-direction motive force mechanism 280 is also not co-planer with X and Y direction motive force mechanisms 276 and 278 and hence, any asymmetric movement in the X direction would translate into both in-plane and out of plane motion of topping dispenser mechanism 114.

As further illustrated, X-direction motive force mechanism 276 is further comprised of a first X-gear-shaft assembly 464 that includes a first X-cylindrical link 466 for connecting a first distal end of a first X-linear motion shaft 468 (also known as first leadscrew or first translational screw) with first X-direction motor 460. As is well known, X-linear motion shaft 468 translates turning motion into a linear motion.

First X-linear motion shaft 468 extends longitudinally along a longitudinal axis 198 of base 148 of device 100. A first free distal end 470 of first X-linear motion shaft 468 is positioned and rests within a bushing structure 344 supported by second lateral support panel 154.

A second X-gear-shaft assembly 472 includes a second X-cylindrical link 474 for connecting a first distal end of a second X-linear motion shaft 476 with a second X-direction motor 462.

Second X-linear motion shaft 476 extends longitudinally along longitudinal axis 198 of base 148 of device 100, parallel first X-linear motion shaft 468 but separated by a distance defined by Y-direction motive force mechanism 278 of topping dispenser mechanism 114. A second free distal end 478 the second X-linear motion shaft 476 is positioned and rests within a bushing structure 344 supported by second lateral support panel 154.

Further illustrated are limiter switches 288, 290, 292 that as further detailed below, may be used to provide position information of topping dispenser mechanism 114 controller unit 260.

Y-direction motive force mechanism 278 is comprised of a Y-direction motor 486 driven (or powered) by a Y-direction motor driver (motor driver PCB 284). Y-direction motive force mechanism 278 is further comprised of a Y-gear-shaft assembly 488.

Y-gear-shaft assembly 488 includes a cylindrical link 490 for connecting a first distal end of a Y-linear motion shaft 492 with Y-direction motor 486. A free distal end 494 the Y-linear motion shaft 492 is positioned and rests within a bushing structure 344 supported by Y-motive force platform 496 (further detailed below).

Z-direction motive force mechanism 280 is comprised of a Z-direction motor 498 driven (or powered) by a Z-direction motor driver (motor driver PCB 284). Z-direction motive force mechanism 280 further includes a driver Z-gear-shaft assembly 500.

Driver Z-gear-shaft assembly 500 is comprised of a driver Z-cylindrical link 502 for connecting a first distal end of a driver Z-linear motion shaft 504 with the Z-direction motor 498. It should be noted that driver Z-linear motion shaft 504 may be replaced by any conventional shaft and need not be a leadscrew or translational screw. A free distal end 506 driver Z-linear motion shaft 504 is connected to a Z-driver gear 508.

Further included is a driven Z-gear-shaft assembly 510 that includes a driven Z-linear motion shaft 512, a first end 514 of which is connected to Z-driven gear 516, and a second end 518 of which is connected to a single, unitary piece plunger 458.

Plunger 458 is comprised of a compressor-driver 456 that is moved by driven Z-linear motion shaft 512, and compressor 454 that is attached to an end of compressor driver 456, with the attachment point defining motive dispenser point 274.

A height 520 of plunger 458 (compressor driver 456 and compressor 454) has a longer span than height 522 of cartridge 116. It should be noted that the linear distance traveled by compressor 454 in Z-direction is determined by the number of rotations of Z-direction motor 498 under the control of controller unit 260 and hence, no need or requirement for a limiter switches for Z-direction motion.

Compressor driver 456 is comprised of an internally threaded upper portion 522 that functions as coupler nut, and a lower portion 524 that is not threaded, but is there to add sufficient height 520 for compressor driver 456. As driven Z-linear motion shaft 512 rotates in direction shown by arrow 526, compressor-driver 456 is moved linearly along Z-direction (as shown by arrow 528).

FIGS. 13A to 13F are non-limiting, exemplary illustrations of X-motive force platform support of device shown in FIGS. 1A to 12L in accordance with one or more embodiments of the present invention. As illustrated in FIGS. 1A to 13F, X-direction motive force mechanism 276 is further comprised of a first and second X-motive force platforms 308 that are identical. Both the first and the second X-motive force platforms 308 are each comprised of a single piece unitary construction, having a securing bracket portion 530 and a stand portion 306.

Securing bracket portion 530 includes platform base 532 upon which X-direction motor 460 (and 462) is secured. A fastener plate 534 oriented perpendicular to platform base 532 includes cylindrical hollow openings 536 with sufficient height 538 span inserted into fastener openings 540 at a back of X-direction motor 460 and 462 for stability, to prevent in-plane rotation of X-direction motors 460 and 462 during operation. Further included are lateral support plates 542 connected to both fastener plate 534 and platform base 532, which provide added structural integrity to the securing bracket portion 530 by increasing rigidity.

Stand portion 306 of X-motive force platforms 308 includes a first column and a second column 304 that are identical. First and the second columns 304 are comprised of a top end that is connected to bottom side of platform base 530 of the X-motive force platforms 308, and a free end (or lower portion) 314 that is secured onto base 148 of device 100.

First and the second columns 304 have a threaded inner diameter 310 for receiving a fastener for connection with base 148. Outer Diameter (OD) 312 of columns 304 is smaller than Inner Diameter (ID) 238 of counterbores 228. This means that columns 304 are inserted into base openings 228, which providing a stable connection to thereby prevent wobbling of the entire X-direction support.

Two columns 304 allow for balance and stiffness. This way, when X-direction motors 460 and 462 are operating, the entire X-direction motive force mechanism 276 is not tilted or moved laterally. Further, since Y and Z direction motive force mechanisms 278 and 280 are supported by X-direction motive force mechanism 276, columns 304 and their connectivity must be of sufficient stiffness to maintain a stable movement of topping dispenser mechanism 114.

First and the second columns 304 have a height 544 of sufficient span to allow an egress portal 296 of a cartridge 116 to extend through predefined pattern passageway openings 452 of second heater assembly 256, below the bottom side 444 of second heater panel 320.

Columns 304 must be of a height 544 of sufficient span to raise the X-direction motive force mechanism 276 sufficiently above second heater assembly (top heater) 256 to allow for mounting of Y-direction motive force mechanism 278 on the X-direction motive force mechanism 276 and to allow for mounting of Z-direction motive force mechanism 280 on the Y-direction motive force mechanism 278 while also allowing for an egress portal 296 of cartridge 116 to extend through predefined pattern passageway openings 452 of second heater assembly 256, below bottom side 444 of second heater panel 320.

FIGS. 14A to 14H are non-limiting, exemplary illustrations of Y-motive force platform of device shown in FIGS. 1A to 13F in accordance with one or more embodiments of the present invention. As illustrated in FIGS. 1A to 14H, Y-direction motive force mechanism 278 is further comprised of a Y-motive force platform 496 that includes a motor-side support 546 that is connected to a shaft-end support 548 by a longitudinally extending guide rod 550.

Guide rod 550 is a low friction rod with sufficient rigidity for stable support of the Z-direction motive force mechanism 280 that is moved along rod 550. Guide rod 550 defines a Y-direction travel distance of motive dispensing point 274 of topping dispenser mechanism 114.

Motor-side support 546 of Y-motive force platform 496 include a first Y-securing bracket 552 comprising a first Y-platform base 554 upon which Y-direction motor 486 is secured.

Motor-side support 546 further includes a first Y-fastener plate 556 oriented perpendicular first Y-platform base 554 that includes openings 558 that aligned with fastener openings 540 at a back of Y-direction motor 486, to secure Y-direction motor 486 during operation. It should be noted that all directional motors (X, Y, and Z direction motors) are identical. In this non-limiting, exemplary instance, fastener openings 558 do not require the cylindrical structure (used for the X-direction motor 536 connections) for stability as they do not carry the weight of the entire motive system (unlike the X-direction motive force mechanism 276).

First Y-lateral support plates 560 is connected to both first Y-fastener plate 554 and first Y-platform base 556, which provide added structural integrity to Y-securing bracket portion 552 by increasing rigidity.

First Y-securing bracket 552 is connected to a first end 562 of longitudinally extending guide rod 550 by a first coupler nut 564 and a first interface plate 566.

First end 562 of guide rod 550 is connected to a first side 568 of first interface plate 566, with a second side 570 of first interface plate 566 is connected to a first section 574 of a lateral side 576 of first coupler nut 564. A second section 578 of lateral side 576 of first coupler nut 564 is coupled with a bottom side 572 of first Y-platform base 554.

Coupler nuts 564 and 580 are identical and are well known and are internally threaded to allow the entire Y-direction motive force mechanism 278 (and hence, also the Z-direction motive force mechanism 280) to ride on X-direction motive force mechanism 276 and move rectilinearly along X-direction.

More specifically, first coupler nut 564 is internally threaded and receives first X-linear motion shaft 468. As first X-linear motion shaft 468 is rotated (or turns) by first X-direction motor 460, first coupler nut 564 is moved linearly in X-direction. That is, first X-linear motion shaft 468 (or translation screw) is used as a linkage in the device to translate its rotational motion into X-direction linear motion of the entire Y-direction motive force mechanism 278 and Z-direction motive force mechanism 280.

As indicated above, Y-motive force platform 496 also includes shaft-end support 548, includes a second Y-securing bracket 582, comprising second Y-platform 584.

Further included is a second Y-fastener plate 586 oriented perpendicular second Y-platform base 584 that includes openings 588 for mounting a bushing 344 to support a free end 494 of Y-linear motion shaft 492, and a main opening 600 for receiving the free end 494 of the Y-linear motion shaft 492.

Second Y-lateral support plates 602 are connected to both second Y-fastener plate 586 and second Y-platform base 584, which provide added structural integrity to second Y-securing bracket portion 582 by increasing rigidity.

Second Y-securing bracket 582 is connected to a second end 604 of guide rod 550 by second coupler nut 580 and a second interface plate 606. Second end 604 of guide rod 550 is connected to a first side 608 of second interface plate 606, with a second side 610 of second interface plate 606 connected to a first section 612 of a lateral side 614 of second coupler nut 580. A second section 616 of lateral side 614 of second coupler nut 580 is coupled with a bottom side 618 of second Y-platform base 584.

Second coupler nut 580 (identical to first coupler nut 564) is internally threaded and receives second X-linear motion shaft 476. As second X-linear motion shaft 476 is rotated by second X-direction motor 462, second coupler nut 580 is moved linearly in the X-direction. That is, second X-linear motion shaft (or translation screw) 476 is used as a linkage in the device to translate its rotational motion into X-direction linear motion of the entire Y-direction motive force mechanism 278 and Z-direction motive force mechanism 280.

Figure 15A:
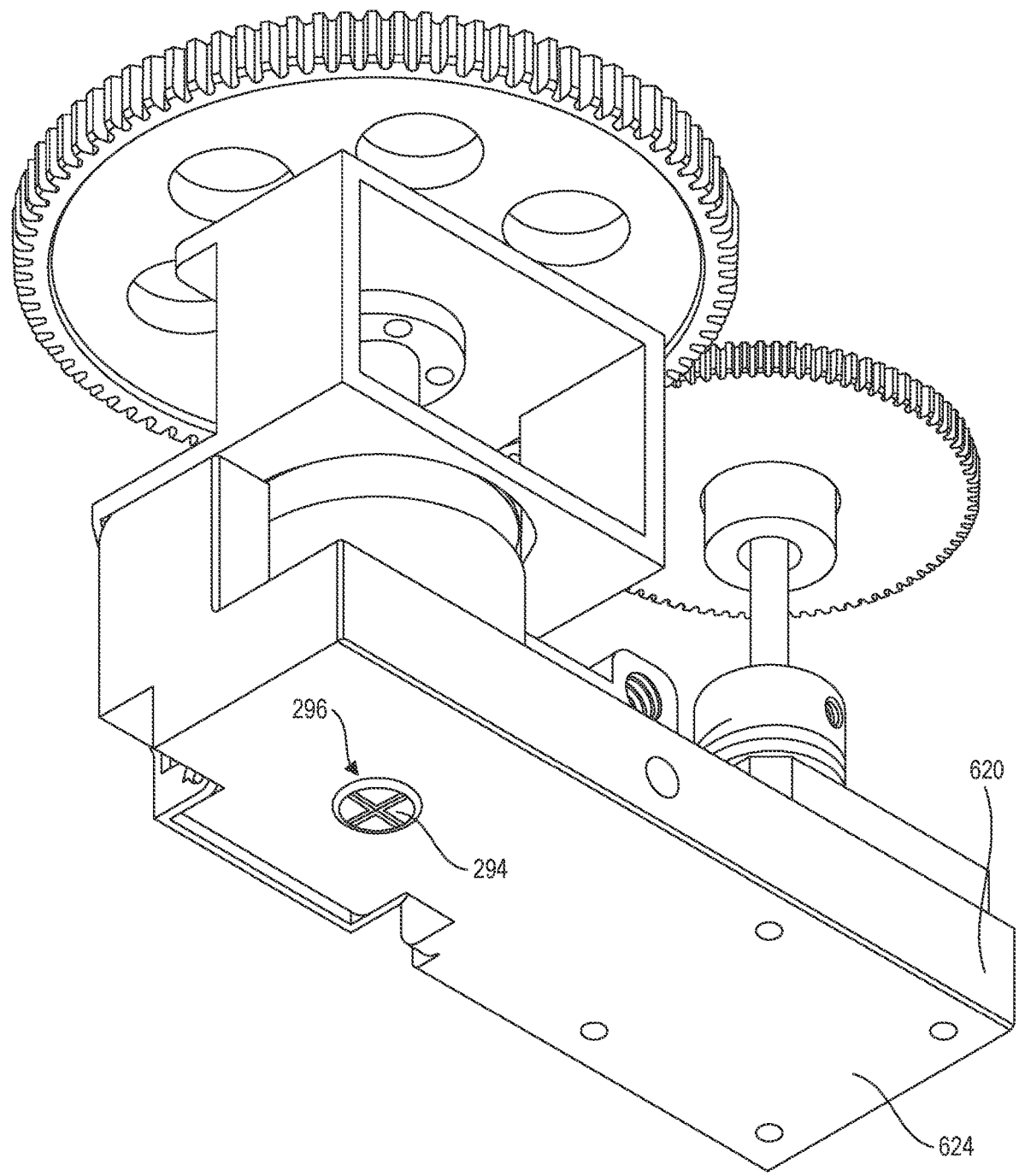
Figure 15B:
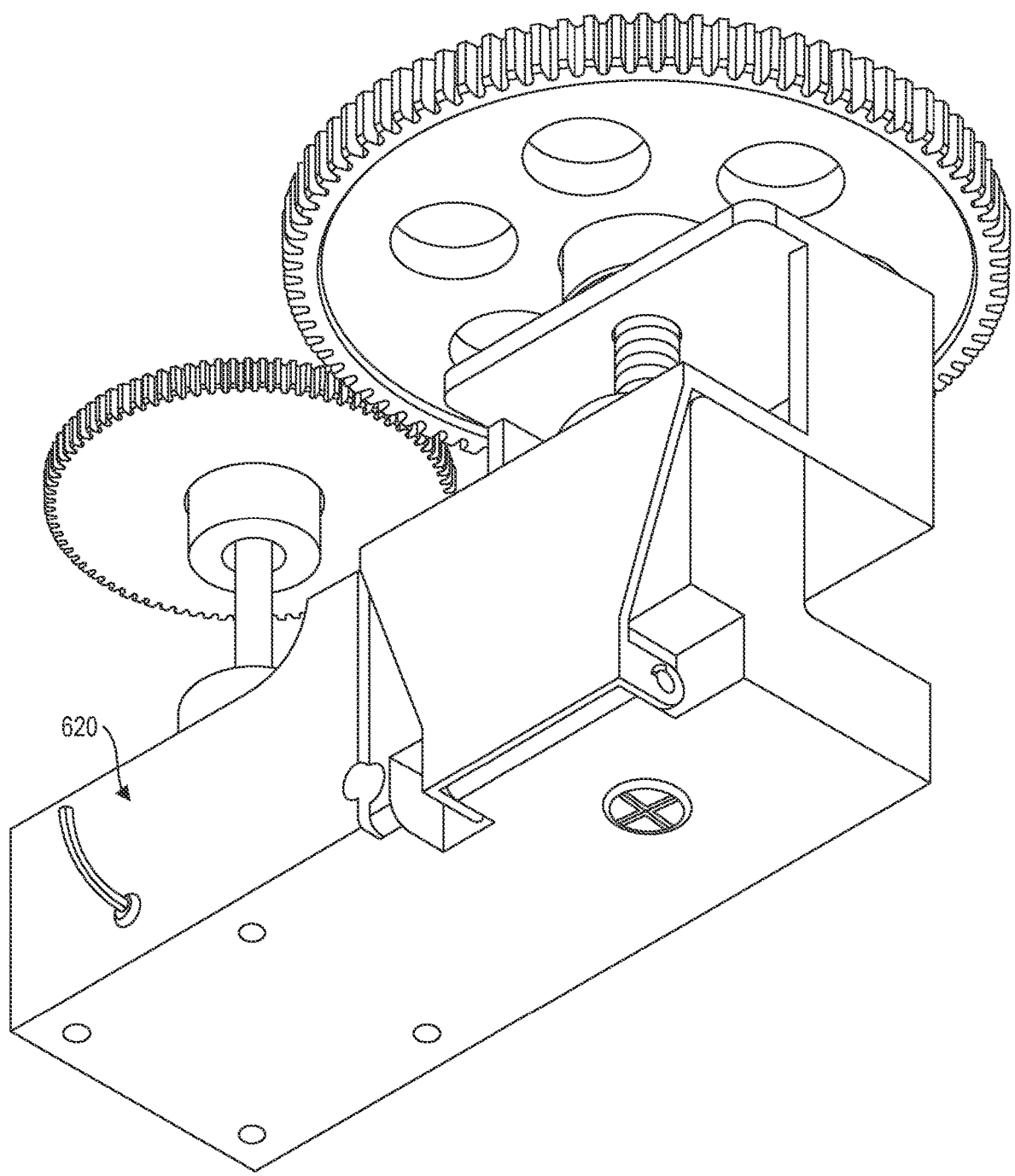
Figure 15C:
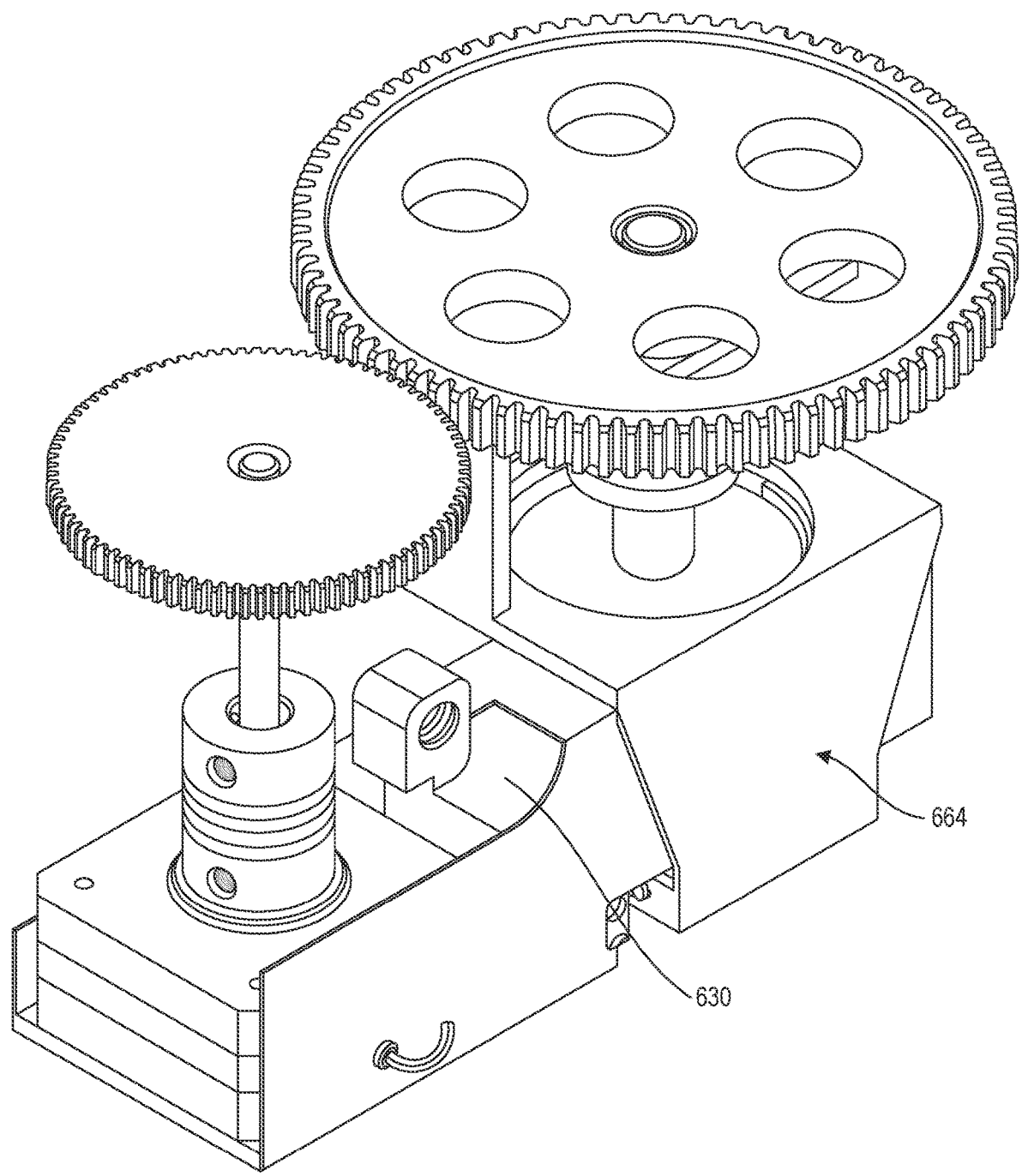
Figure 15D:
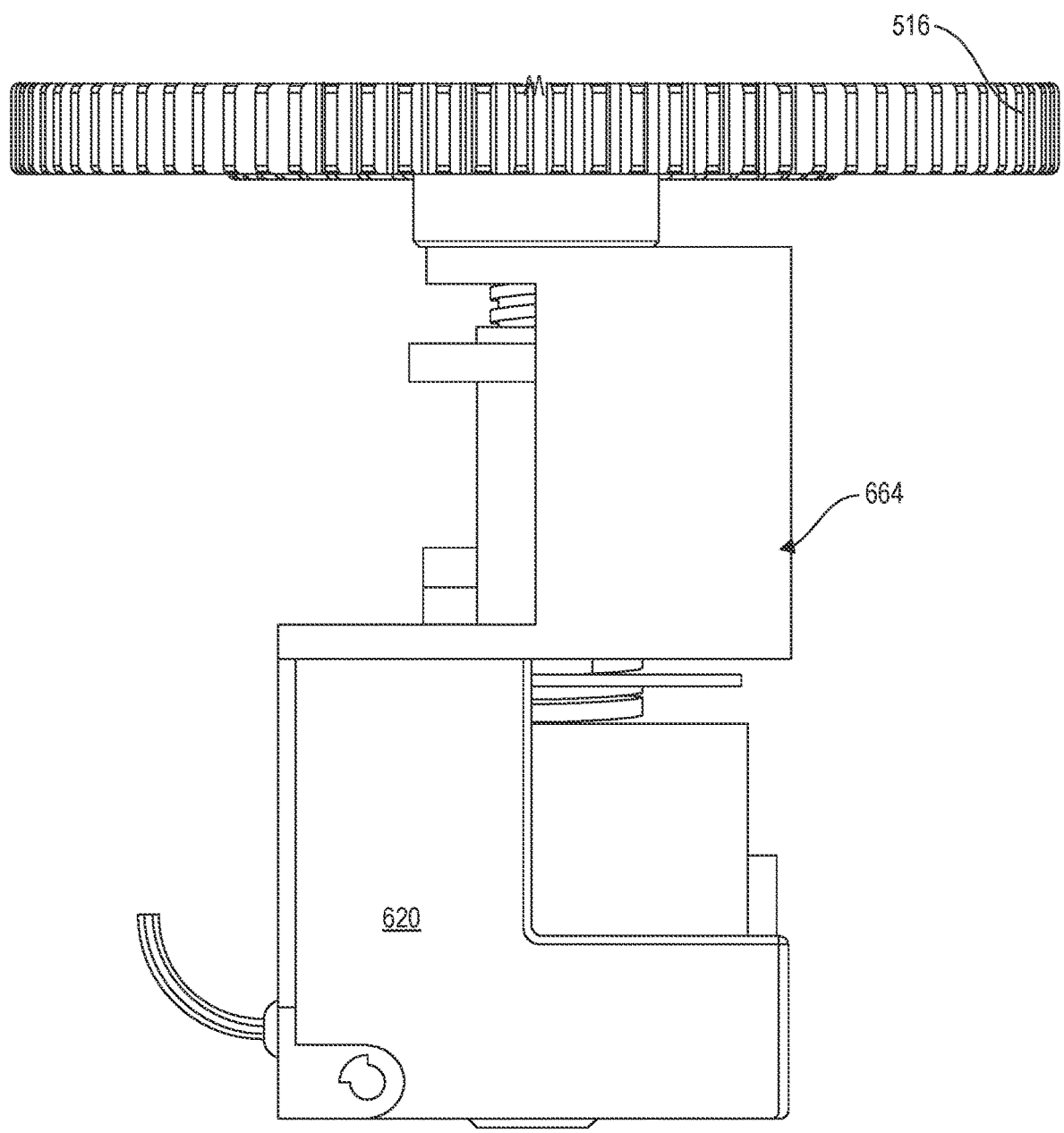
Figure 15G:
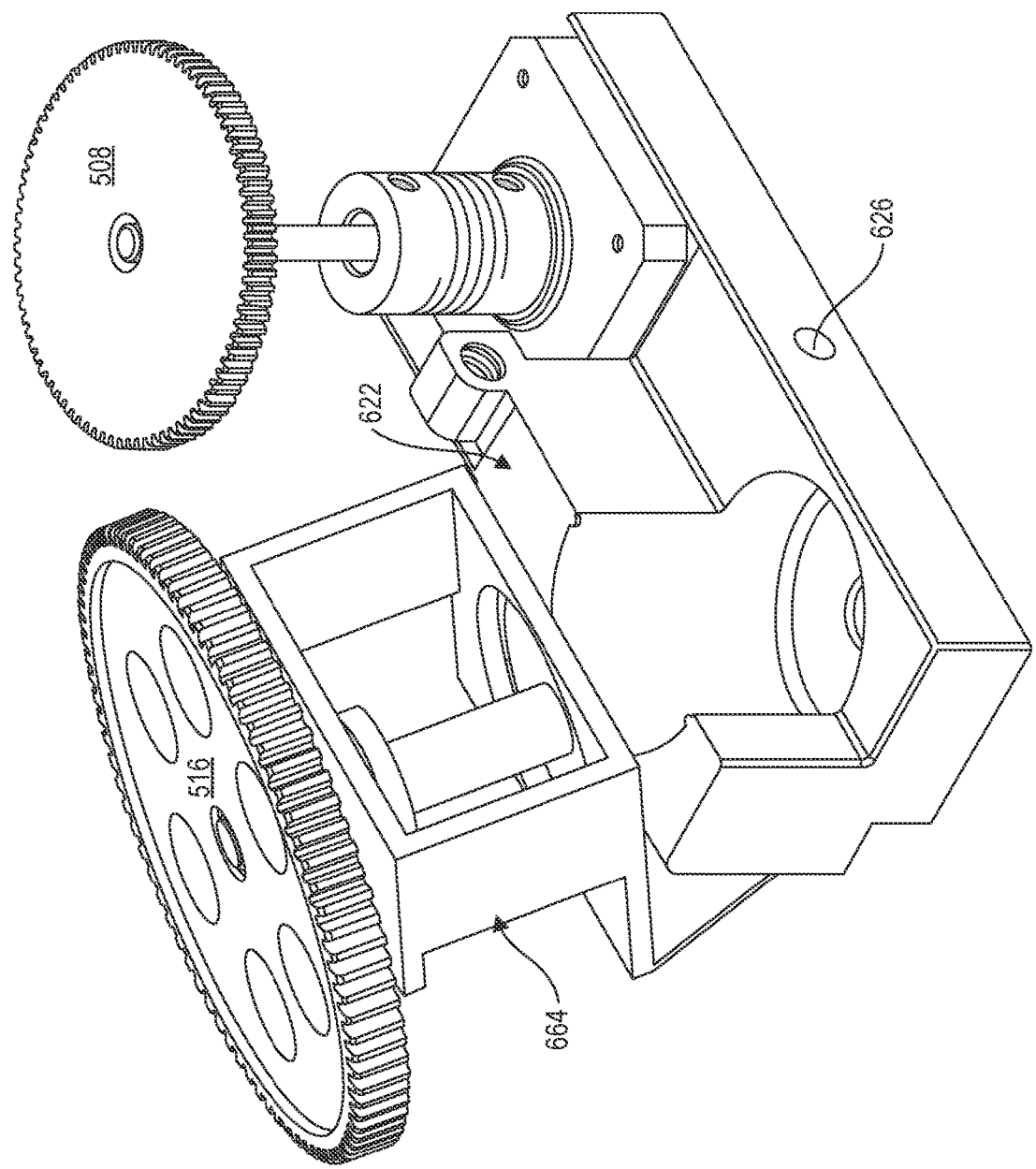
Figures 1, 15J:
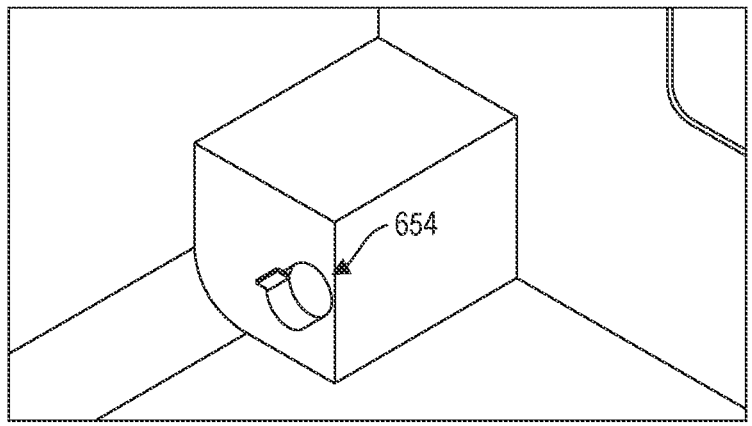
Figures 2, 15J:
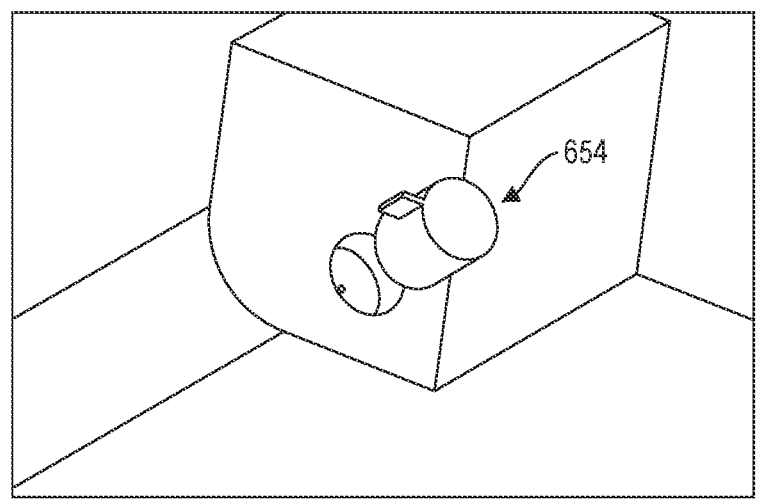
Figures 3, 15J:
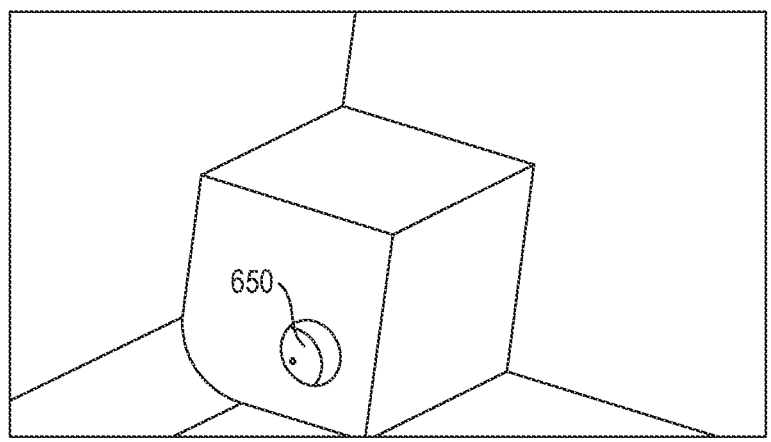
Figures 1, 15K:
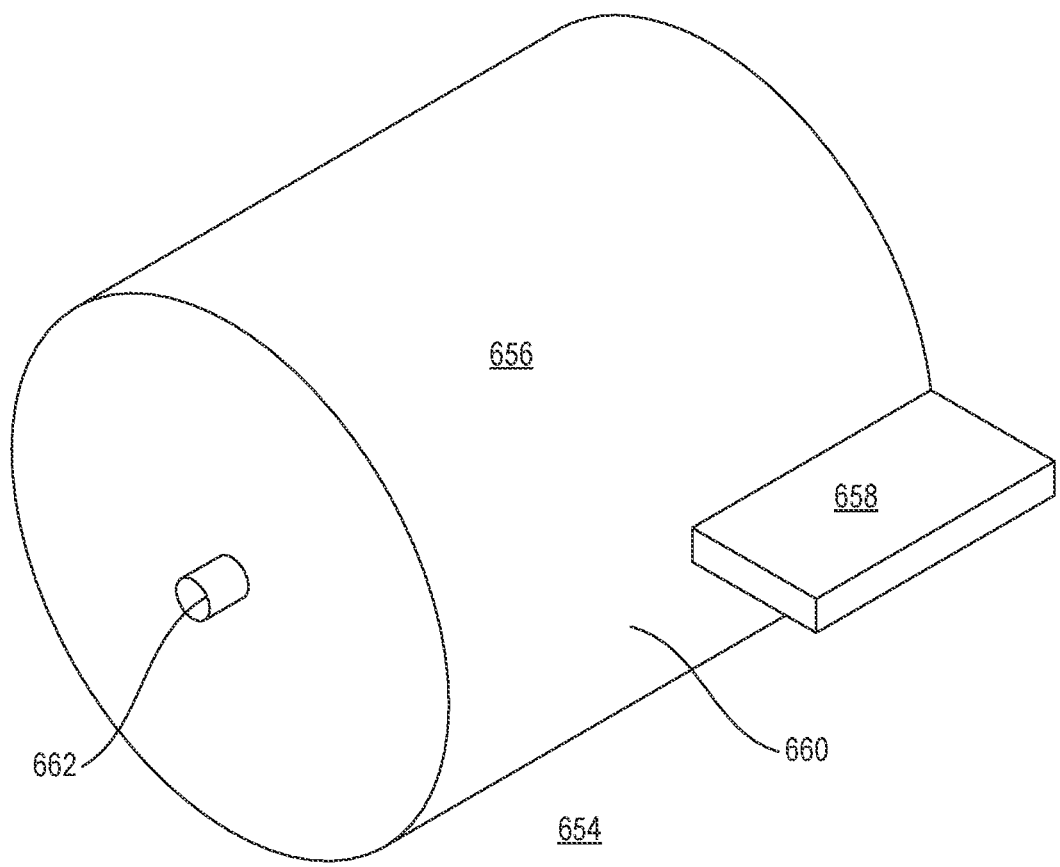
Figures 2, 15K:
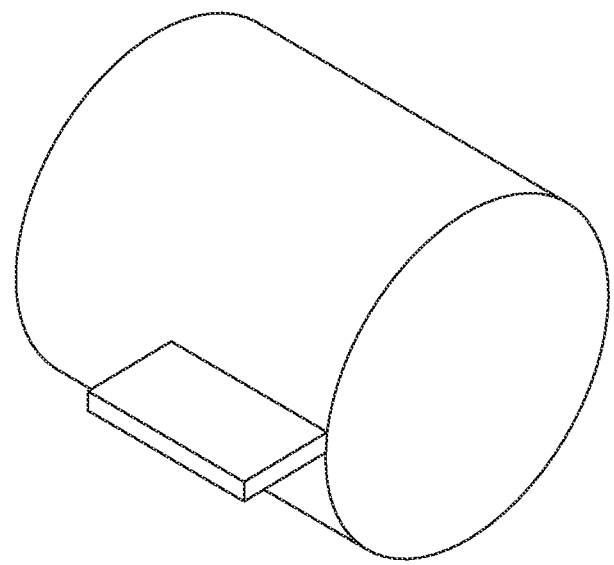
Figures 1, 15L:
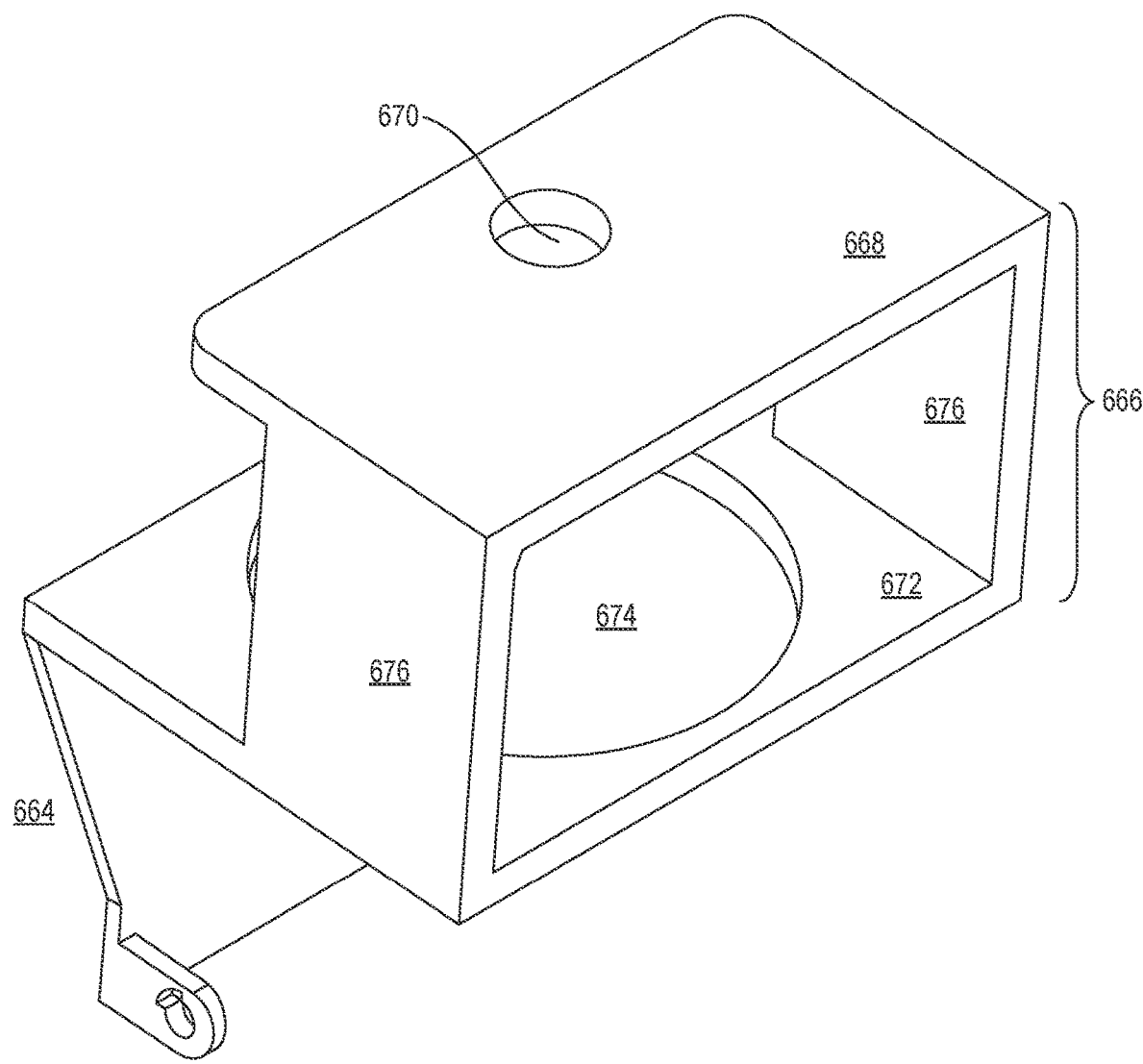
Figures 2, 15L:
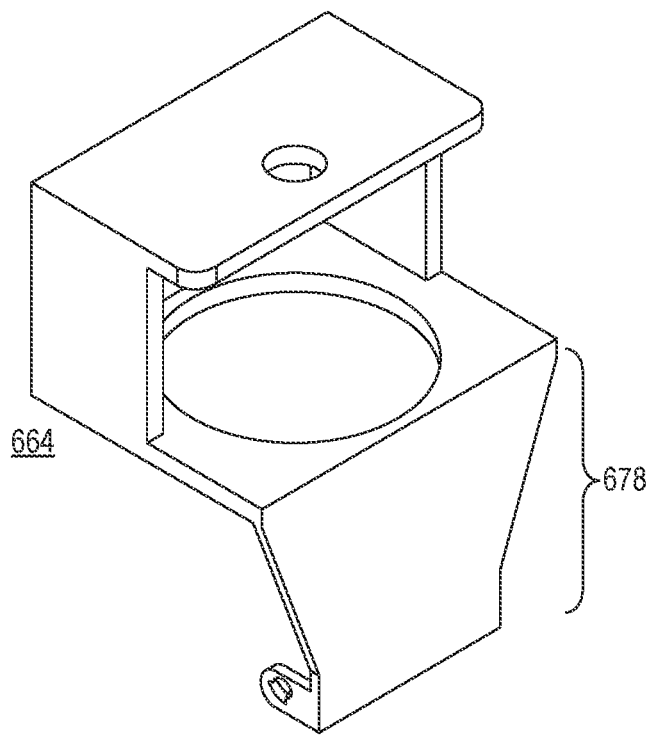
Figures 3, 15L:
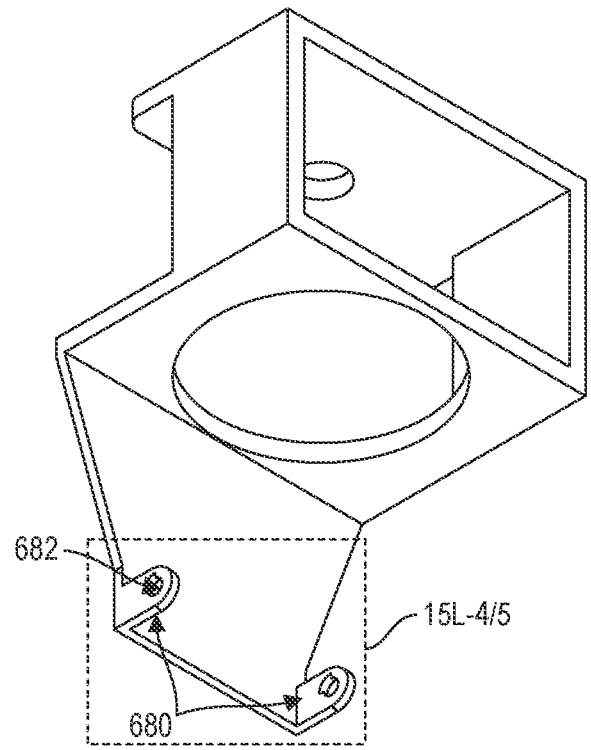
Figures 4, 15L:
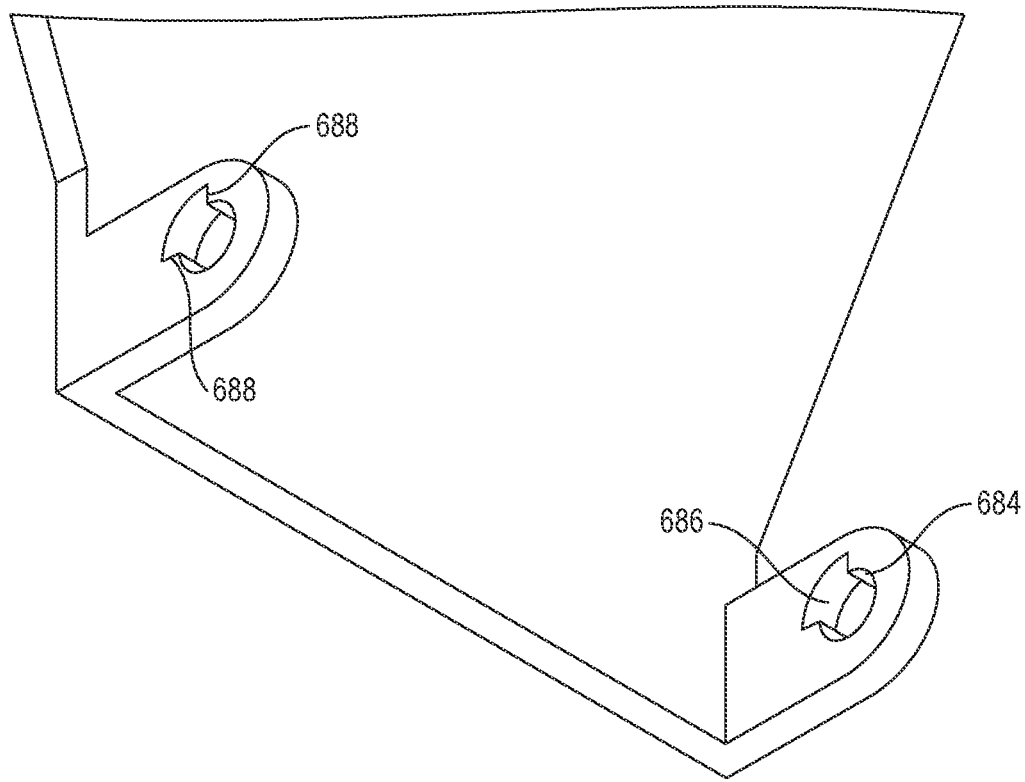
Figures 5, 15L:
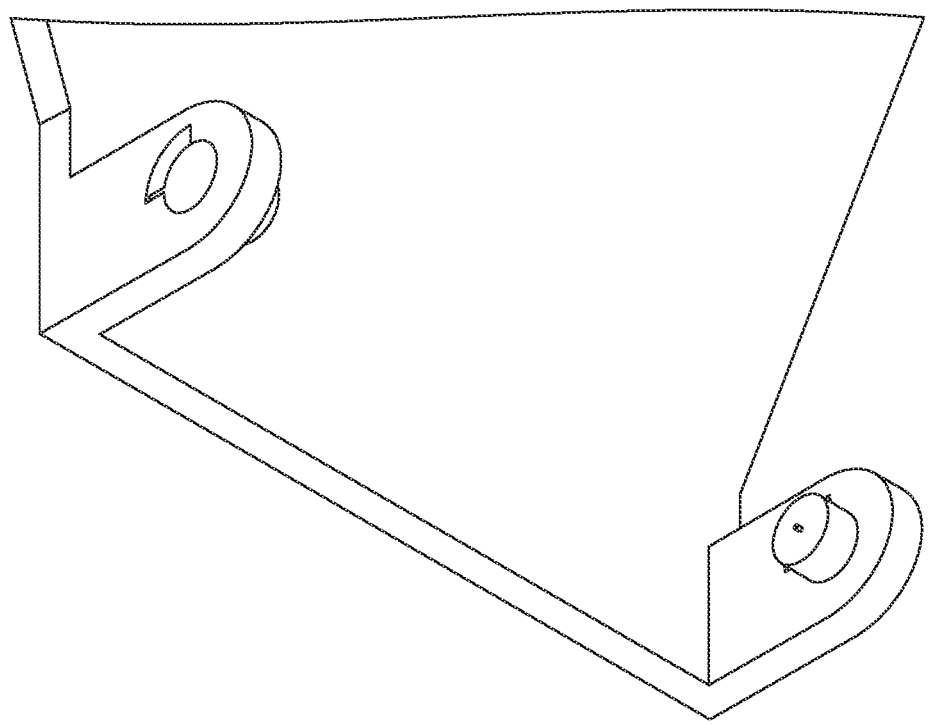
Figures 1, 15M:
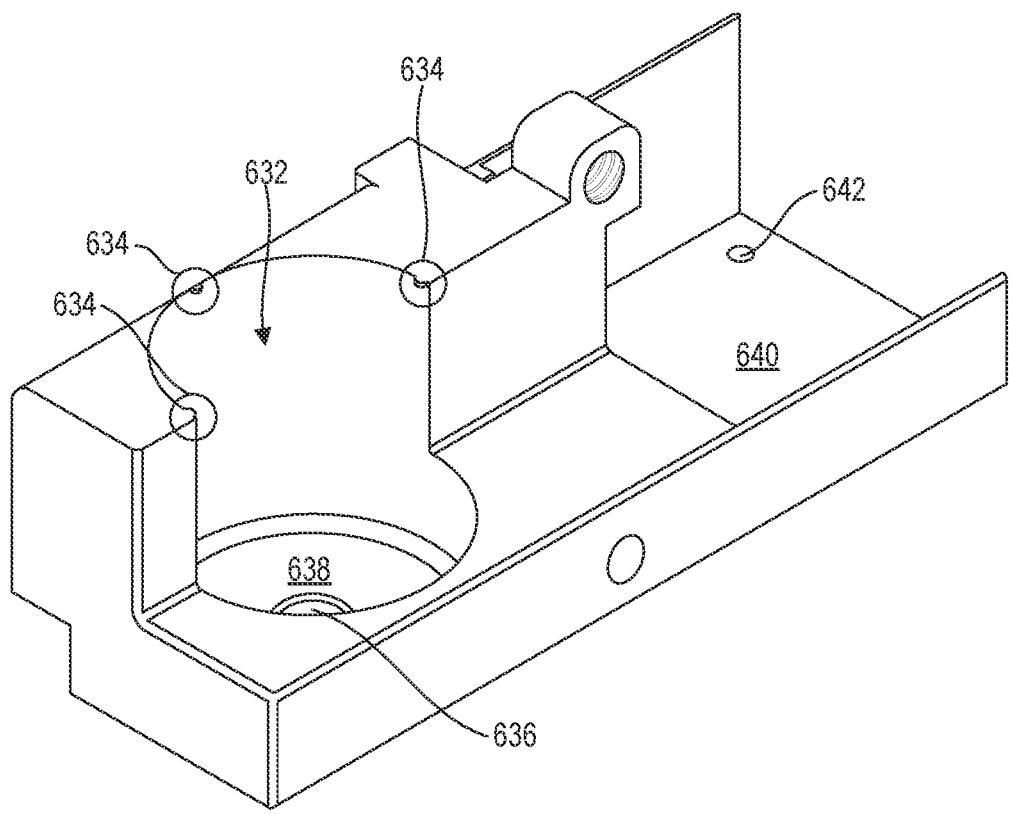
Figures 2, 15M:
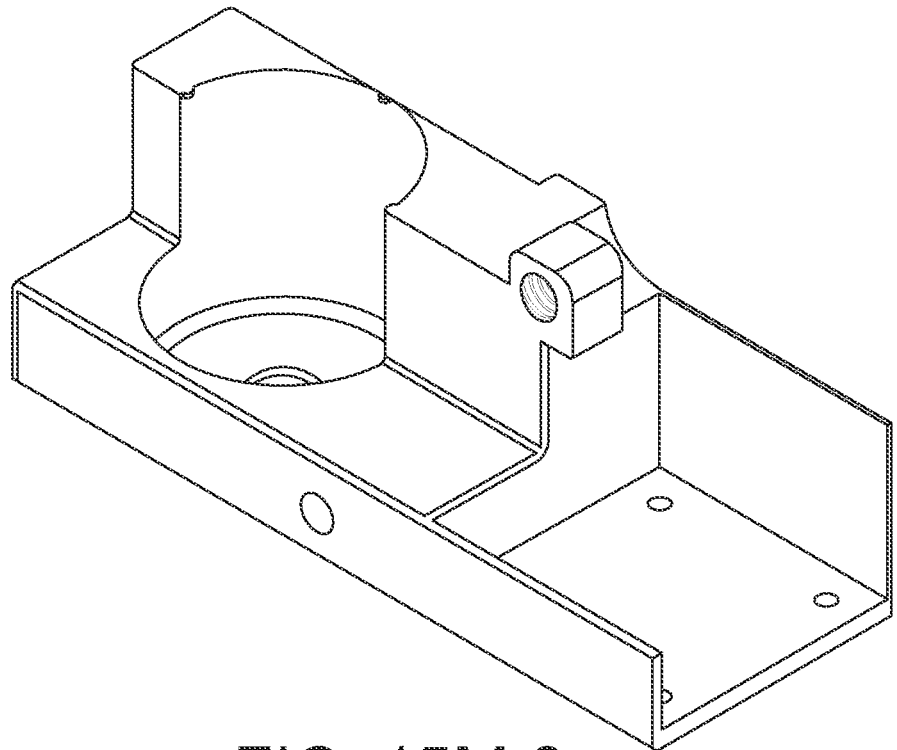
Figures 3, 15M:
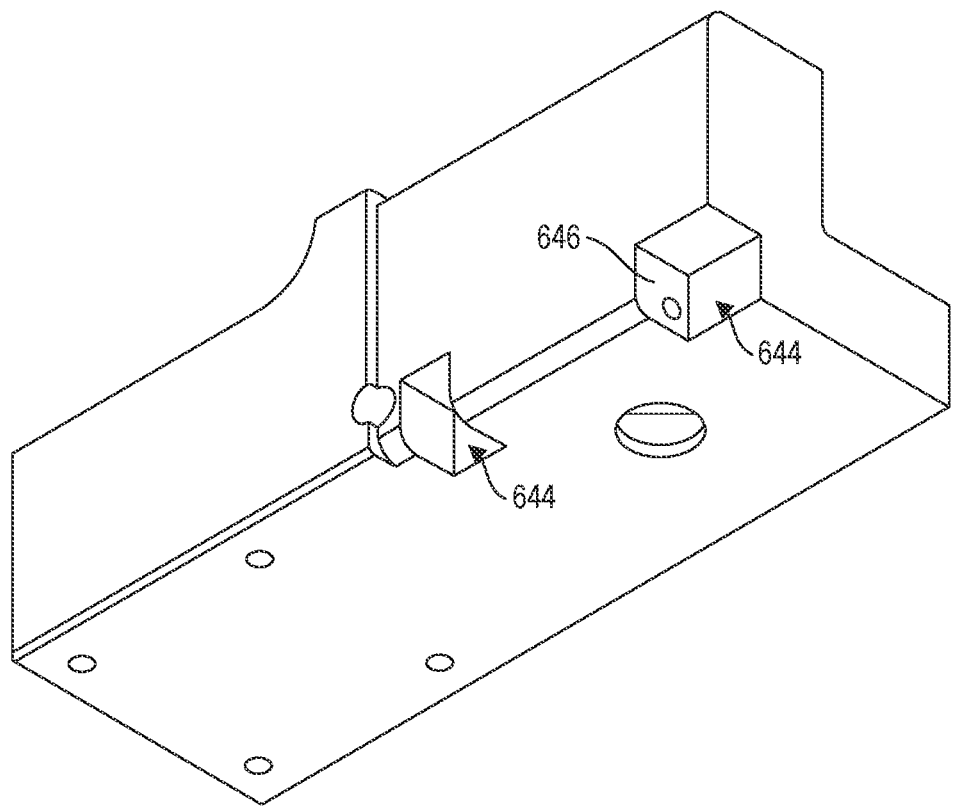
Figures 4, 15M:
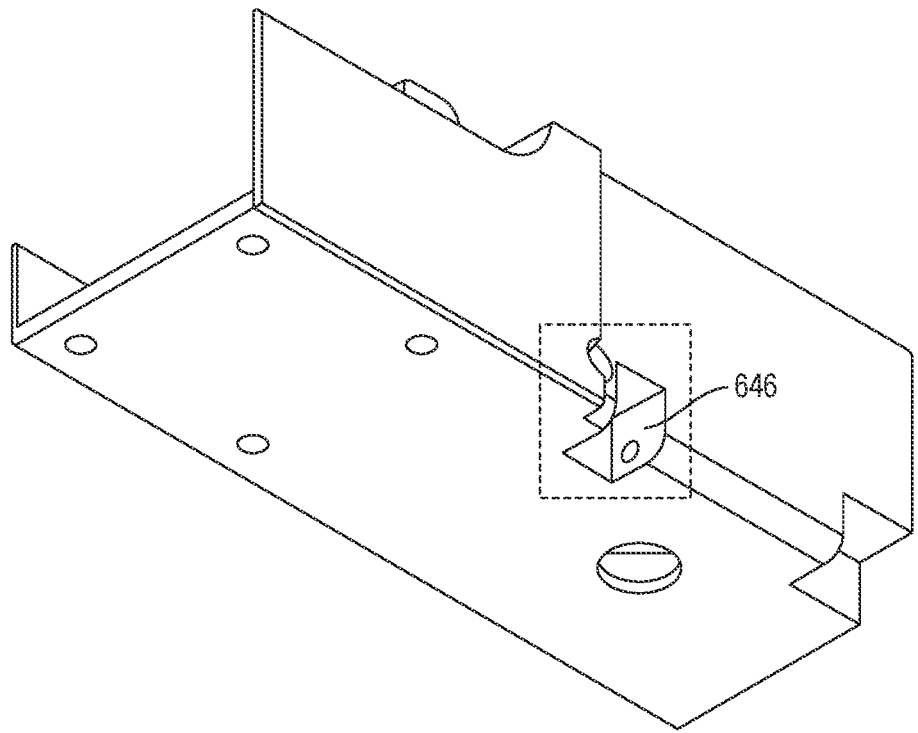
Figures 5, 15M:
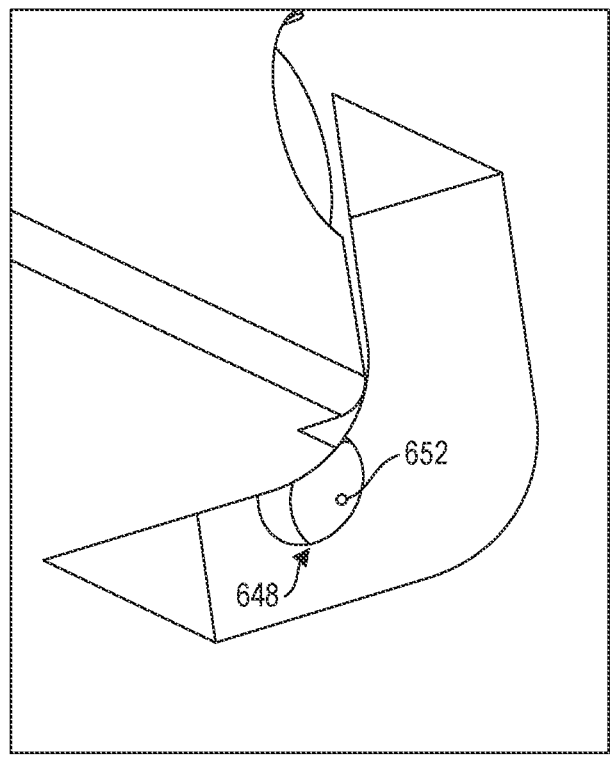
Figures 1, 15N:
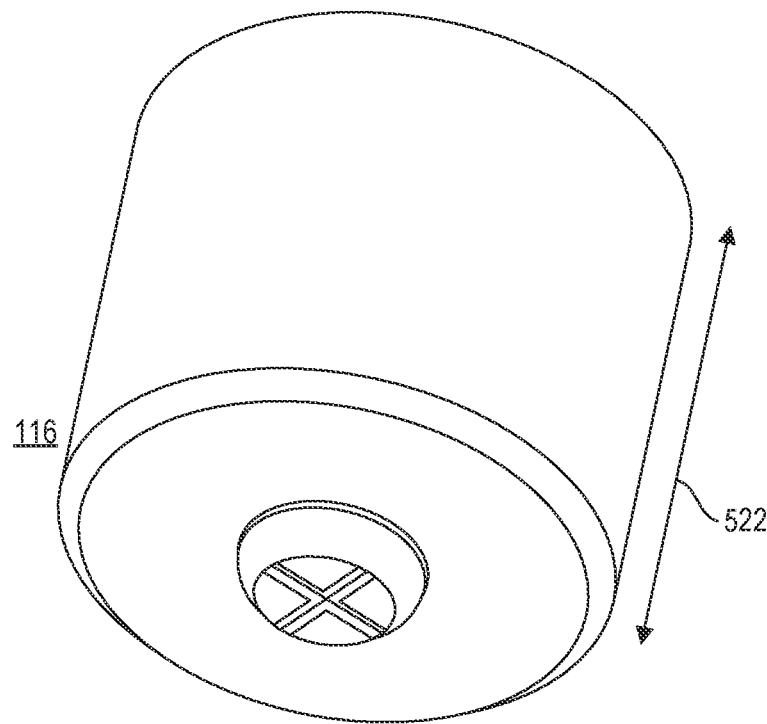
Figures 2, 15N:
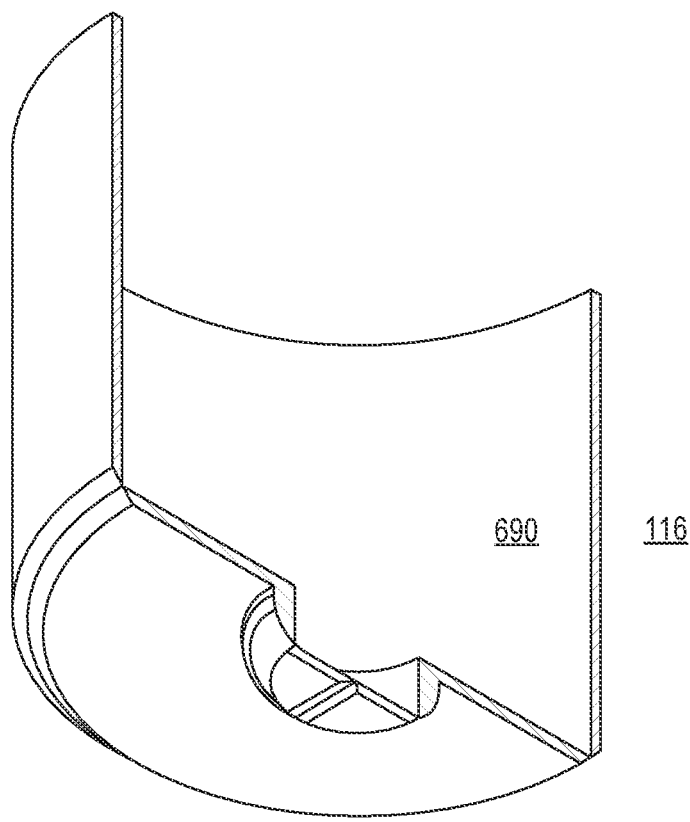
Figures 3, 15N:
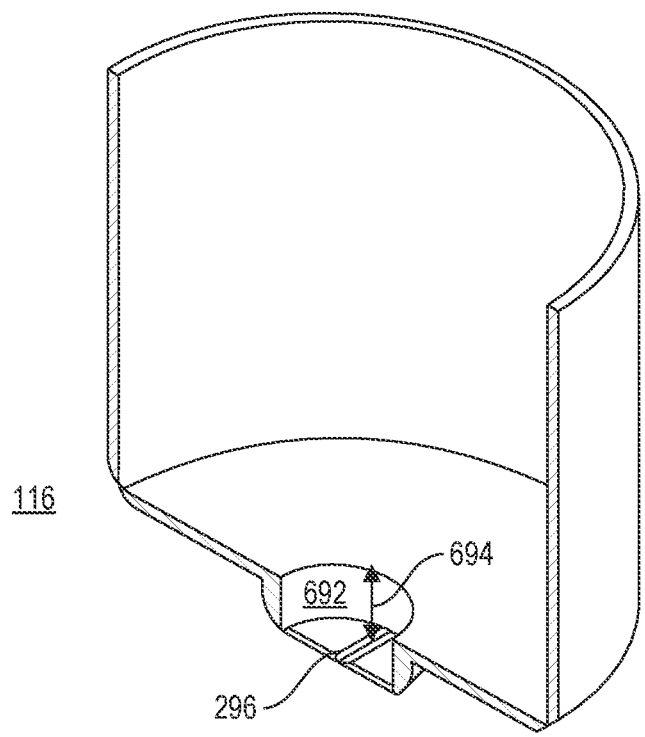

FIGS. 15A to 15N-3 are non-limiting, exemplary illustrations of Z-motive force platform of device shown in FIGS. 1A to 14H in accordance with one or more embodiments of the present invention. As illustrated in FIGS. 1A to 15N-3, Z-direction motive force mechanism 280 is further comprised of a Z-motive force platform 620 that includes a top side 622 and a bottom side 624.

Top side 622 of Z-motive force platform 620 is comprised of an opening 626 that receives guide rode 550 of Y-direction motive force mechanism 278, allowing the entire Z-motive force platform 620 to move along a Y-direction.

An internally threaded opening 628 (which functions as a coupler nut) is provided to allow Z-motive force platform 620 to ride on Y-direction motive force mechanism 278. More specifically, internally threaded opening 628 receives Y-linear motion shaft 492. As Y-linear motion shaft 492 is rotated by Y-direction motor 486, internally threaded opening 628 is moved linearly in Y-direction (and hence, the entire Z-direction motive force mechanism 280). That is, Y-linear motion shaft (or translation screw) 492 is used as a linkage in the device to translate its rotational motion into Y-direction linear motion of the entire Z-direction motive force mechanism 280 using the internally threaded opening 628. Behind the internally threaded opening 628 is a translational screw relief 630 to allow horizontal association with Y-linear motion shaft 492.

Cartridge housing (or holder) 632 for removably securing cartridge 116. Cartridge housing 632 has configuration to accommodate the shape of cartridge 116.

Cartridge housing 632 further includes securing and indexing tabs 634 to secure cartridge 116 and provide indexing for proper mounting of cartridge 116. Tabs 634 force users to first title cartridge 116 and then inserted or position it into cartridge housing 632.

Cartridge housing 632 further includes an egress opening 636 at a bottom 638 thereof through which an egress port 296 of cartridge 116 extends through the passageway 452 of second heater panel 320 of second heater assembly 256.

Z-motive force platform 620 further included a recessed section 640 with fastener openings 642 for securing Z-direction motor 498. Bottom side 624 of Z-motive force platform 620 is comprised of limiter reliefs 644 at a rear bottom side of Z-motive force platform 620, lateral sides 646 of which include limiter housing 648 configured as a counterbore 650, leading to a pin shaft connector opening 652.

Z-motive force platform 620 also includes a limiter 654, which is comprised of a single piece unitary structure, having a cylindrical disc portion 656 with a stopper limiter flange 658 extending from a circumferential side 660 of cylindrical disc portion 656. Further included is a connection pin 662 that friction fits into a pin opening 652 of Z-motive force platform 620.

Z-motive force platform 620 further includes a single piece unitary gate 664 to enable access to cartridge housing 632 when tilted. Gate 664 includes an upper structure 666 for titling gate 664 to an open position to enable access to cartridge housing 632.

Upper structure 666 of gate 664 further includes a top side 668 with a top side opening 670 through which driven Z-linear motion shaft 512 extends to connect with Z-driven gear 516.

A bottom side 672 of upper structure 666 of gate 664 includes bottom side opening 674 through which plunger 458 extends towards cartridge housing 632. Bottom side opening 674 has a sufficiently large diameter to enable passage of disc configured compressor 454 of plunger 458. Lateral sides 676 of upper structure 666 connect to lateral edges of top and bottom side 668 and 672.

Bottom side 672 of upper structure 666 is further connected to Z-motive force platform 620 by a lower structure 678 of gate 664.

Lower structure 678 of gate 664 includes a pair of extenders 680 with distal end opening 682 that receive a corresponding limiter 654. Distal end openings 682 are comprised of an opening 684 for receiving a cylindrical disc portion 656 of limiter 654, and a stopper relief 686. Stopper relief 686 has a circumferential span that defines the range of tilting motion of gate 664, with stopper relief 686 receiving a stopper limiter flange 658 of limiter 654. It should be noted that it is not limiter 654 that rotates, but gate 664 that rotates and tilts to a point where its stopper relief ends 688 contact stopper limiter flange 658 of limiter 654. In other words, limiter 654 is a stationary member.

Limiter 654 is comprised of a single piece unitary structure, having a cylindrical disc portion 656 with a stopper limiter flange 658 extending from the cylindrical disc portion 660, and a connection pin 662 that friction fits into a pin opening 652 of dispenser platform 620.

Cartridge 116 is configured as a replaceable cartridge, comprising a single piece unitary construction having a primary compartment 690 that stores sufficient amount of topping food item 130 for topping an average area span of most base food items 106. Cartridge 116 also includes a secondary compartment 692 that includes an egress portal 296.

Secondary compartment 692 has a height 694 of sufficient span to extend beyond a bottom side egress opening 636 of Z-platform 620, extending out therefrom to below second heater assembly 256. Egress portal 296 is configured as a cross-slit with a seal covering comprised of a plastic membrane that is broken open when topping food item 130 egresses egress portal 296.

Figure 16A:
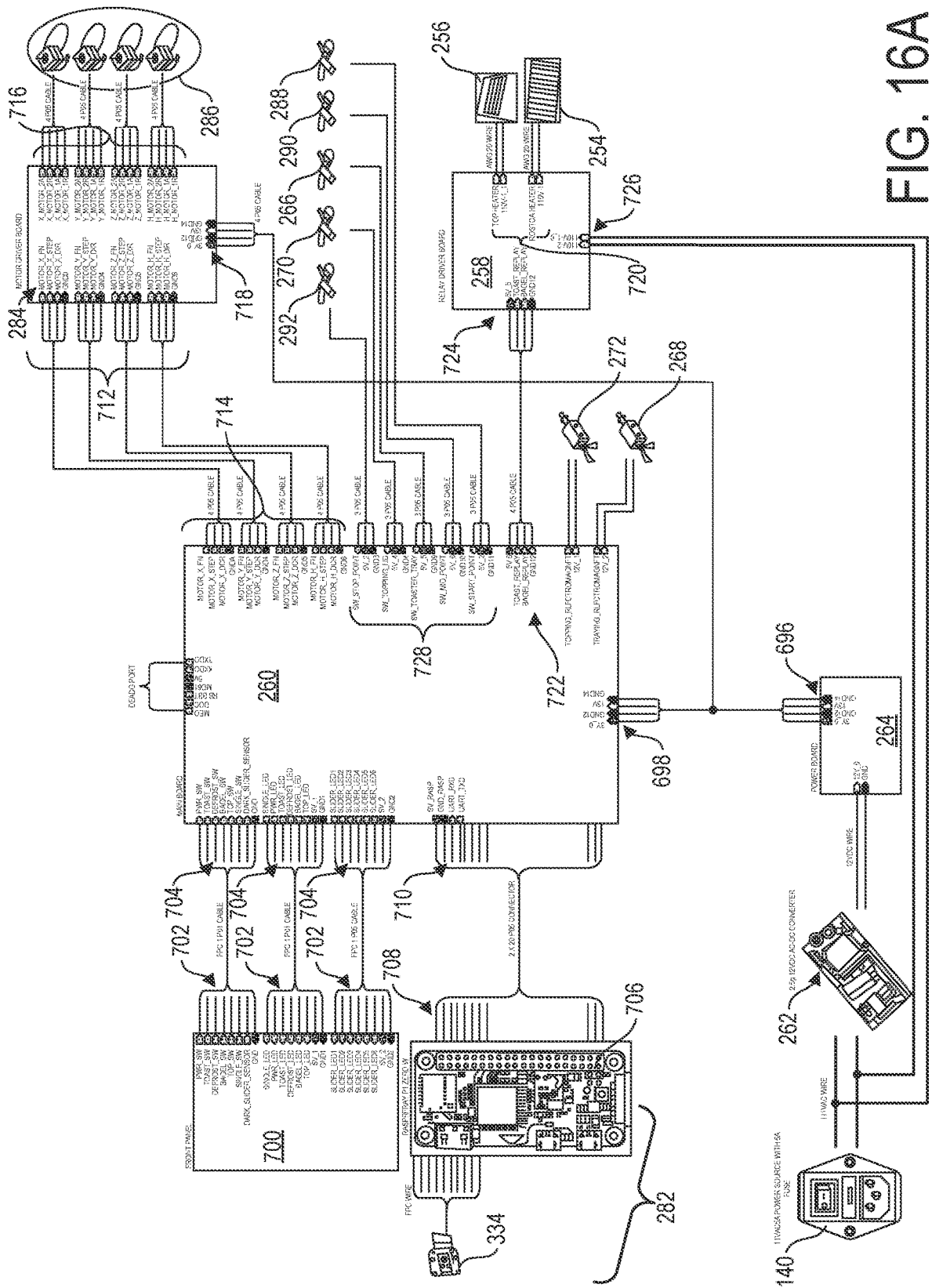
FIGS. 16A to 16B are non-limiting, exemplary illustrations of electrical circuitry of device shown in FIGS. 1A to 15N-2 in accordance with one or more embodiments of the present invention.
Figures 1, 16A:
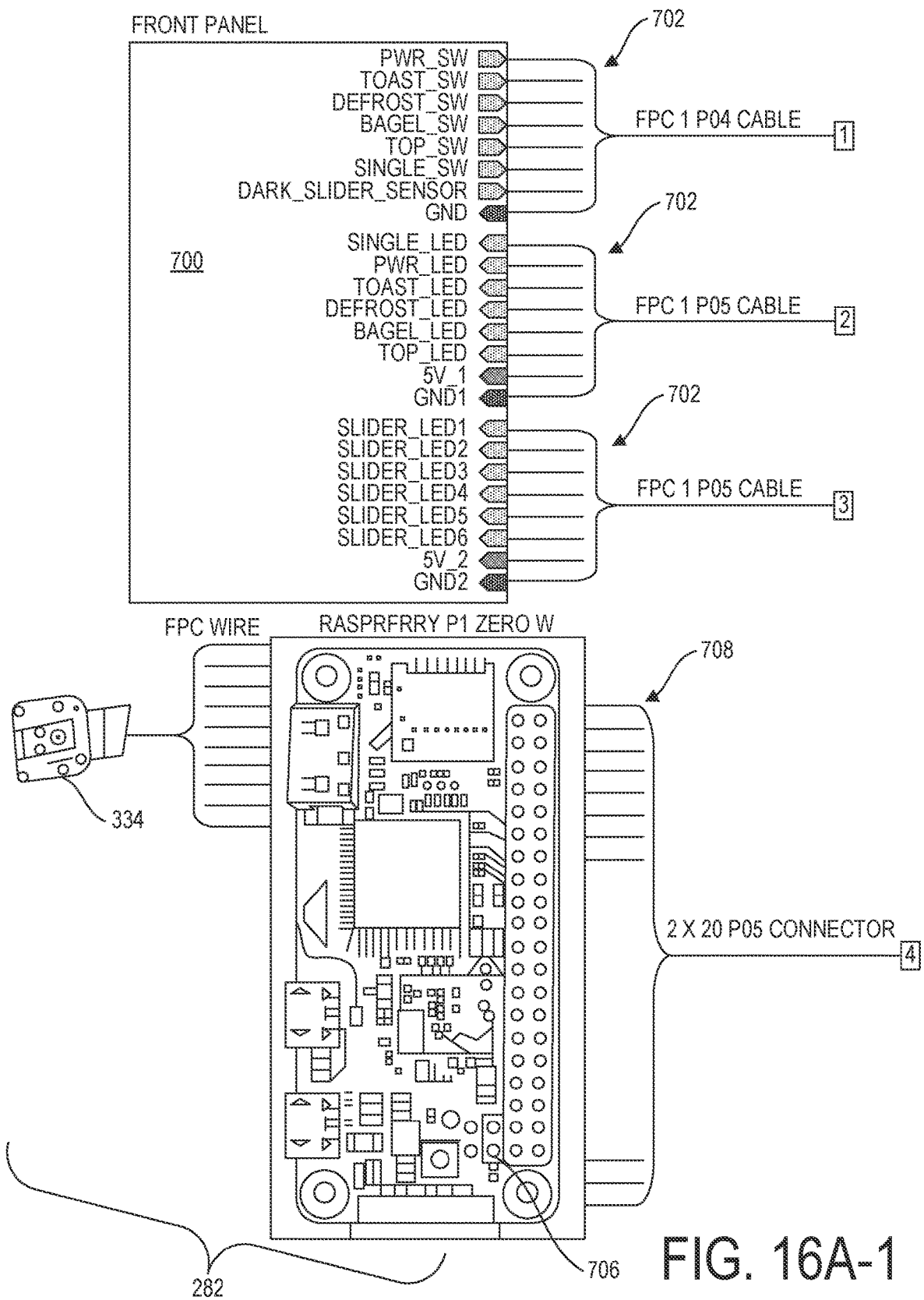
Figures 2, 16A:
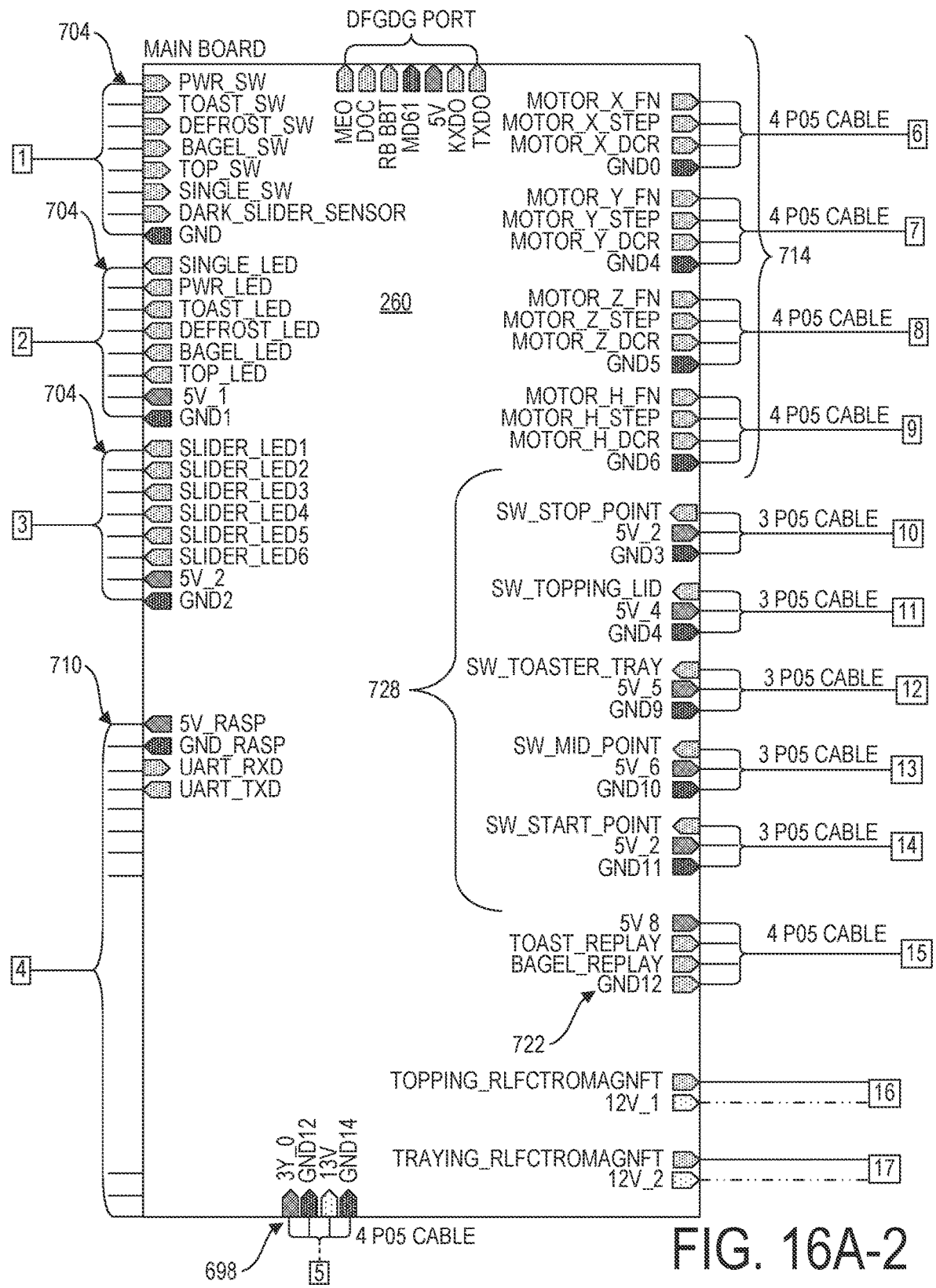
Figures 3, 16A:
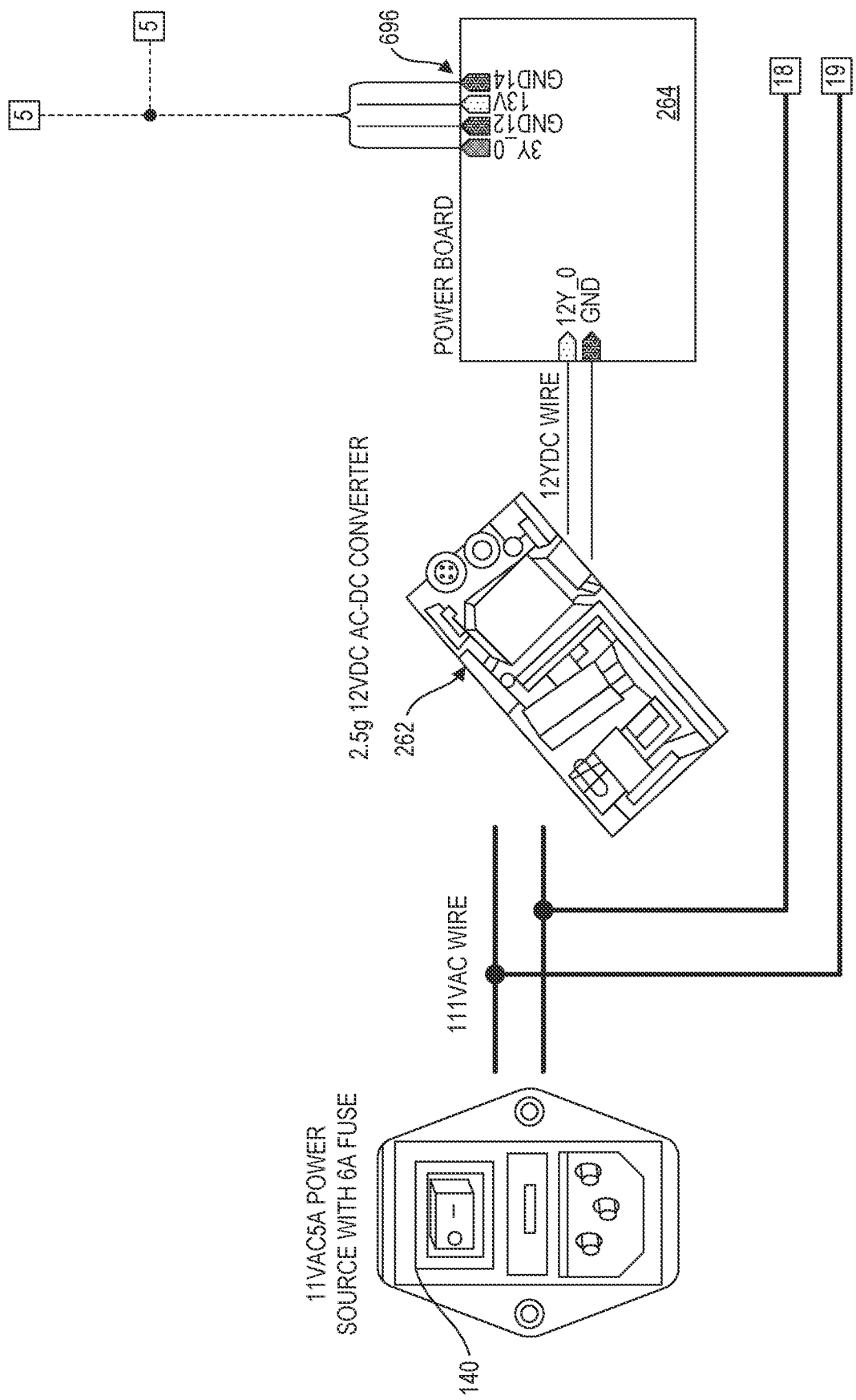
Figures 4, 16A:
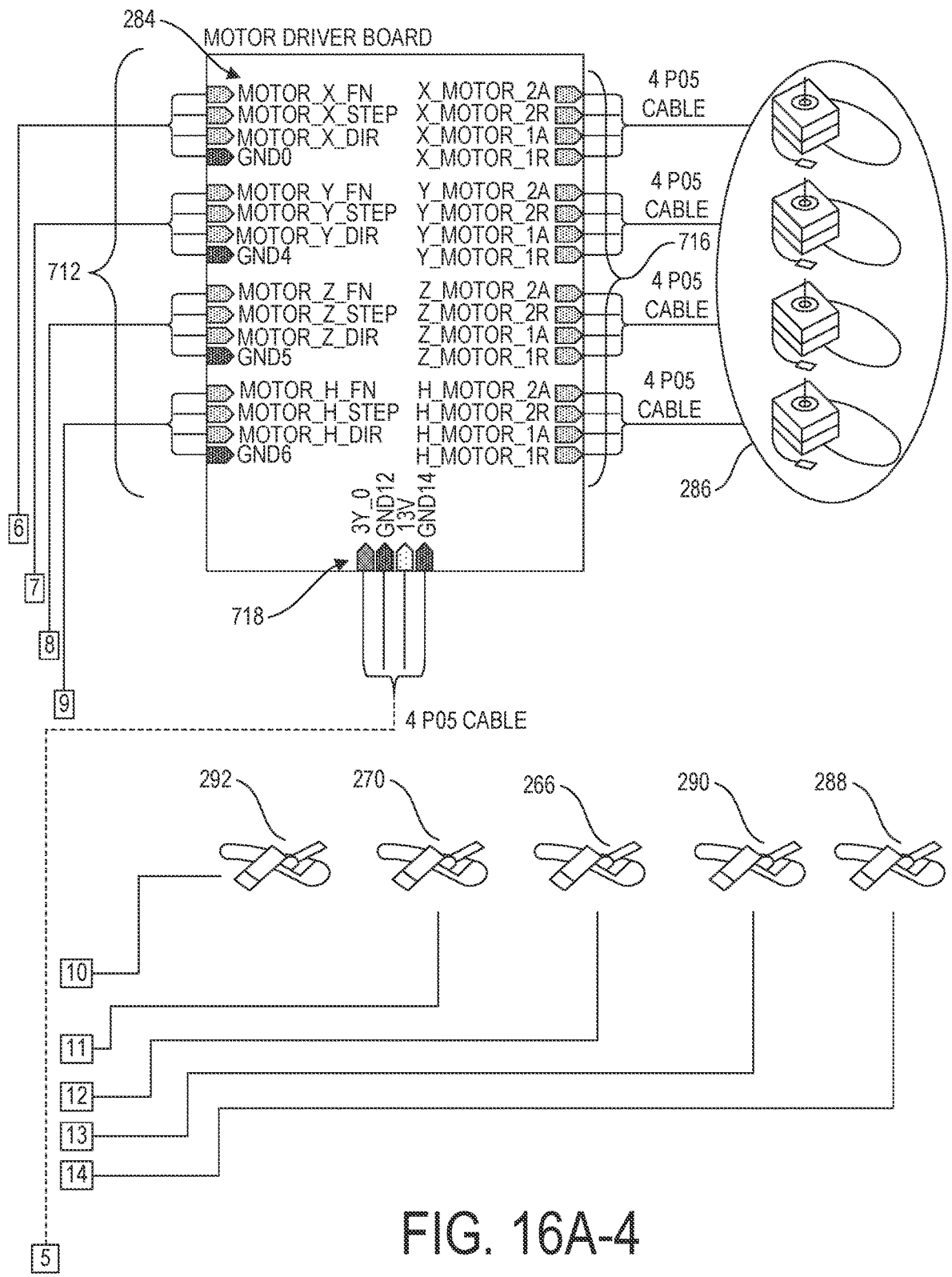
Figures 5, 16A:
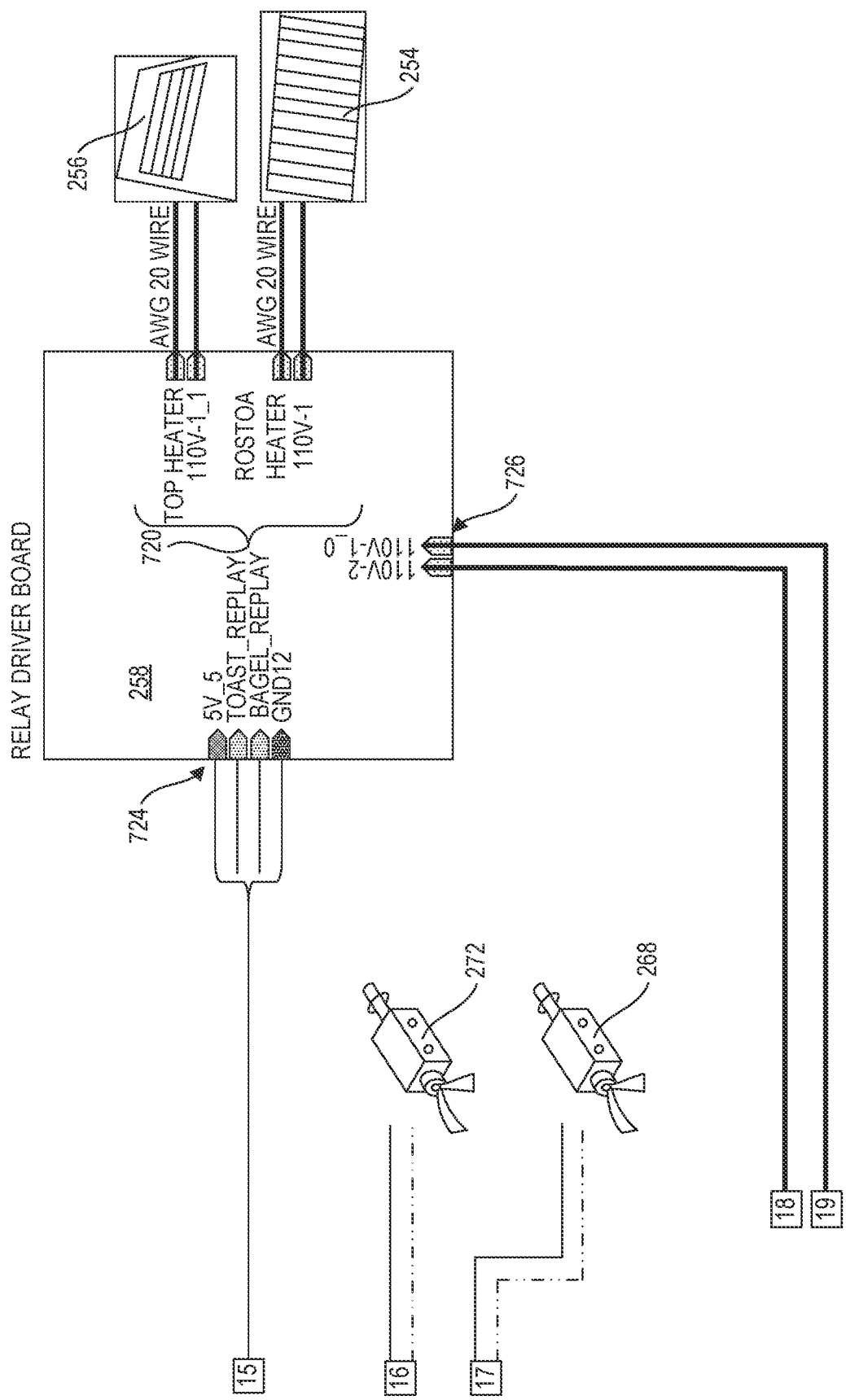
Figure 16B:
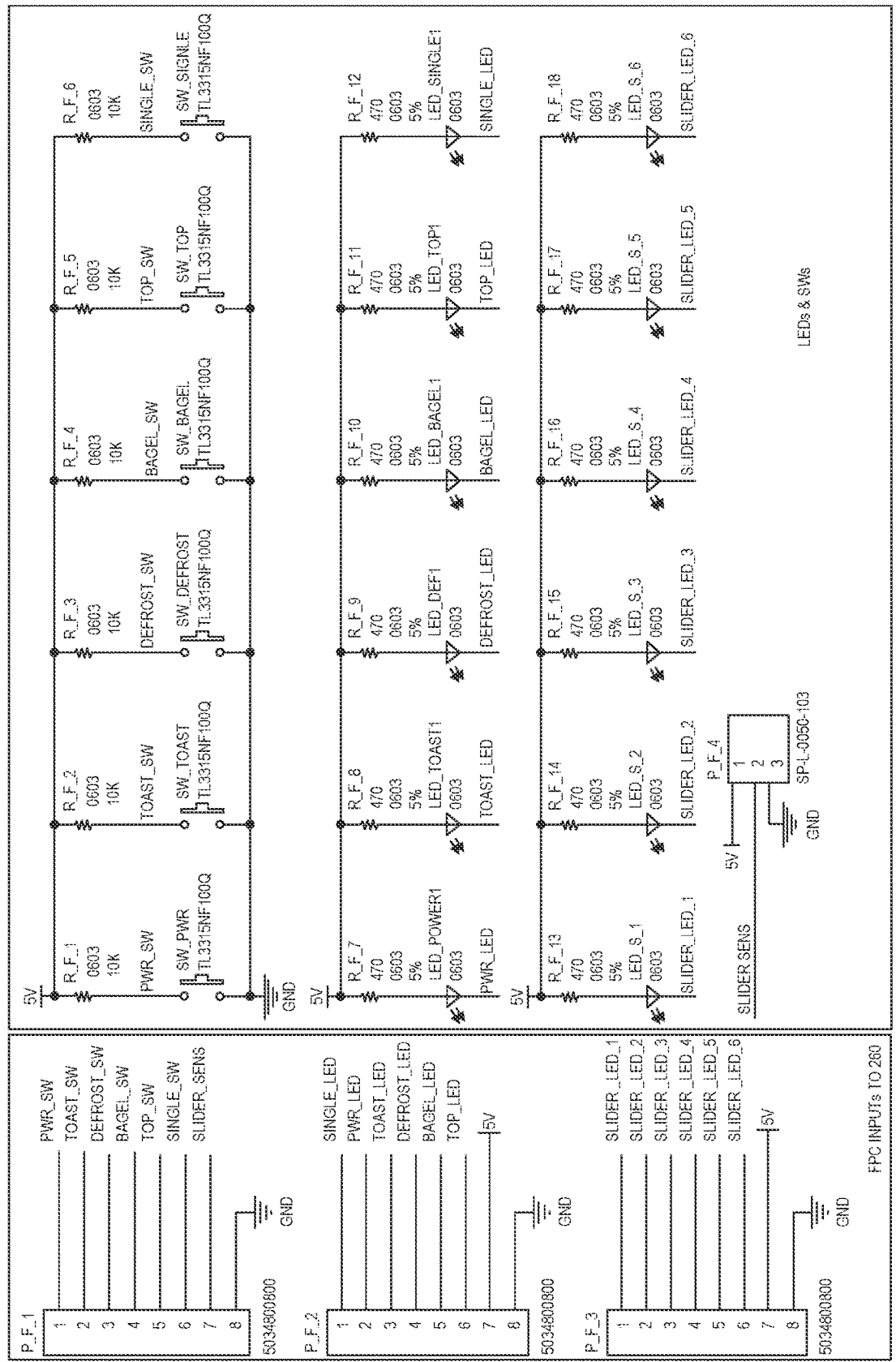
Figures 1, 16B:
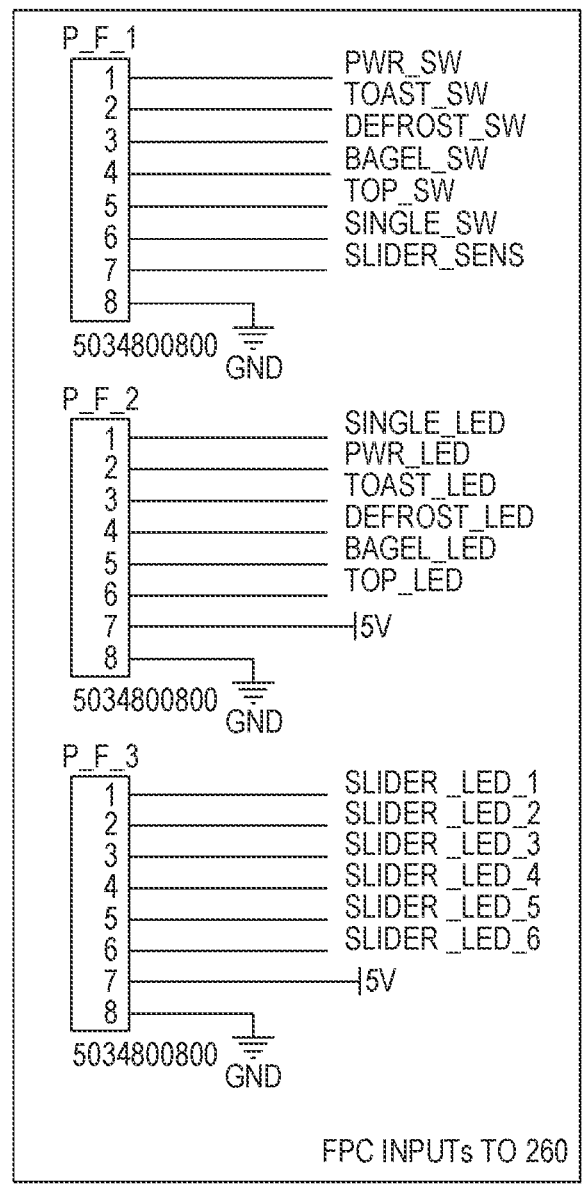
Figures 2, 16B:
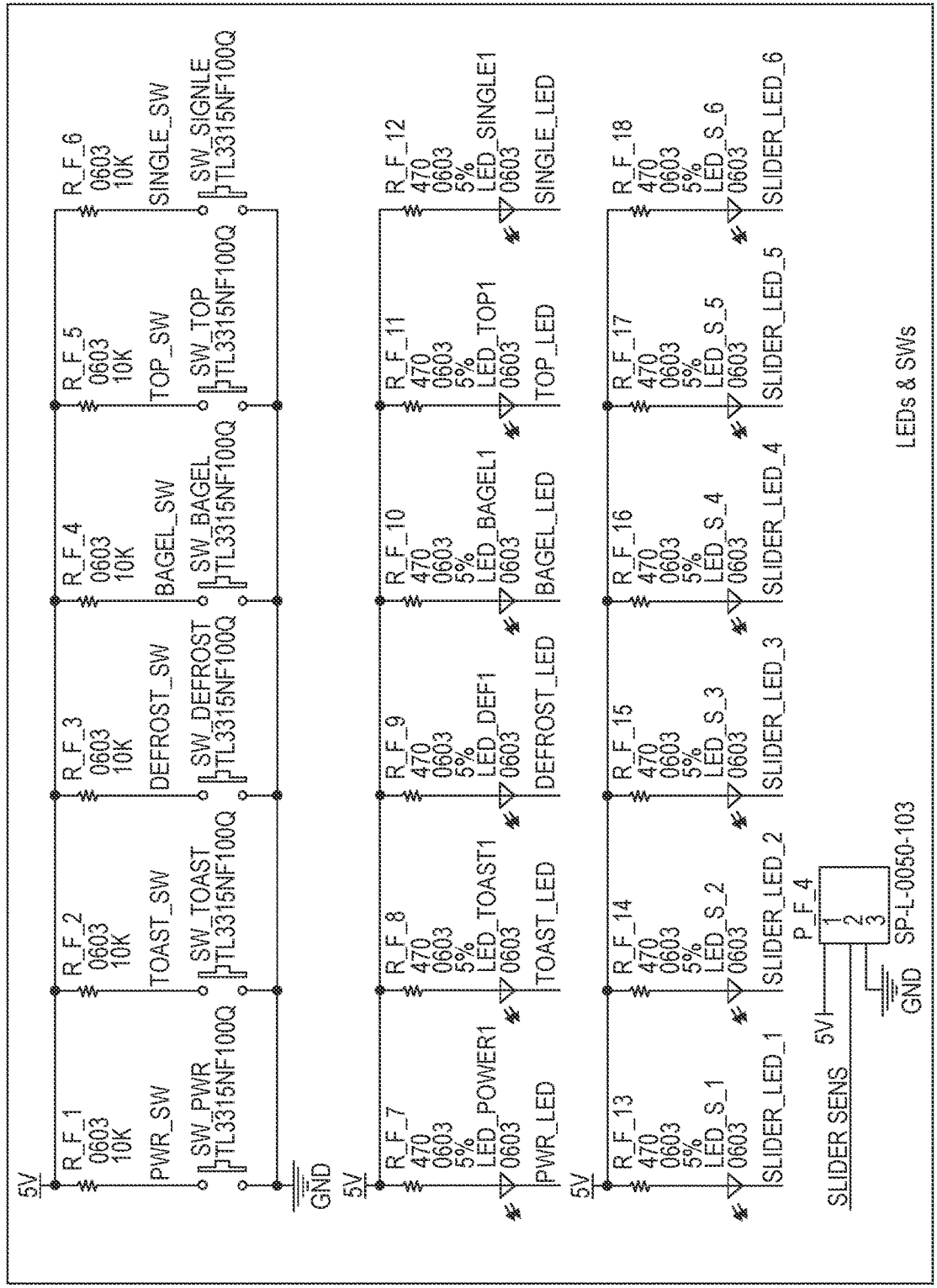

FIGS. 16A to 16B-2 are non-limiting, exemplary illustrations of electrical circuitry of device shown in FIGS. 1A to 15N-2 in accordance with one or more embodiments of the present invention. As illustrated in FIGS. 1A to 16B-2, main component of the electrical circuitry of device 100 is controller unit 260 (for example, an Electrical Erasable Programmable Read Only Memory (EEPROM)).

Further included is a power converter module 262 associated with a power Printed Circuit Board (PCB) 264, with power PCB 264 having a set of power output terminals 696 connected to controller unit 260 power input terminal 698.

Further included is a front panel PCB 700 having user control output terminals 702 connected to a corresponding set of controller unit 260 user control input terminals 704. As shown in FIG. 16B to 16B-2, front panel PCB 700 is comprised of switches that when closed illuminate a corresponding set of LEDs, and further includes a pressure sensor for detecting a setting of a cooking level for a base food item.

An image capture PCB 706 associated with an image capture device 334 with the image capture PCB 706 having image capture output terminals 708 is connected to controller unit image capture input terminals 710.

Electrical circuitry of device 100 further includes a motor driver PCB 284 that includes a set of motor driver input terminal 712 that receive motor driver output control signals from controller unit 260 motor driver output terminals 714, and output motor driver control signals 716 to a set of motors 286. Motor PCB 284 also includes a power input terminal 718 that receive input power signals from power PCB 296.

A relay PCB 258 is also included signal input terminals 724 that receives input signals from output terminals 722 of controller unit 260 and AC power directly from an AC source is received at power input terminals 726. Relay PCB 258 has a set of output terminals 720 connected to first and second heater assembly 254 and 256. Further included are limiter switches 292, 270, 266, 290, 288 that provide a set of limiter switch signals to controller unit limiter switch input terminals 728.

Figure 17C:
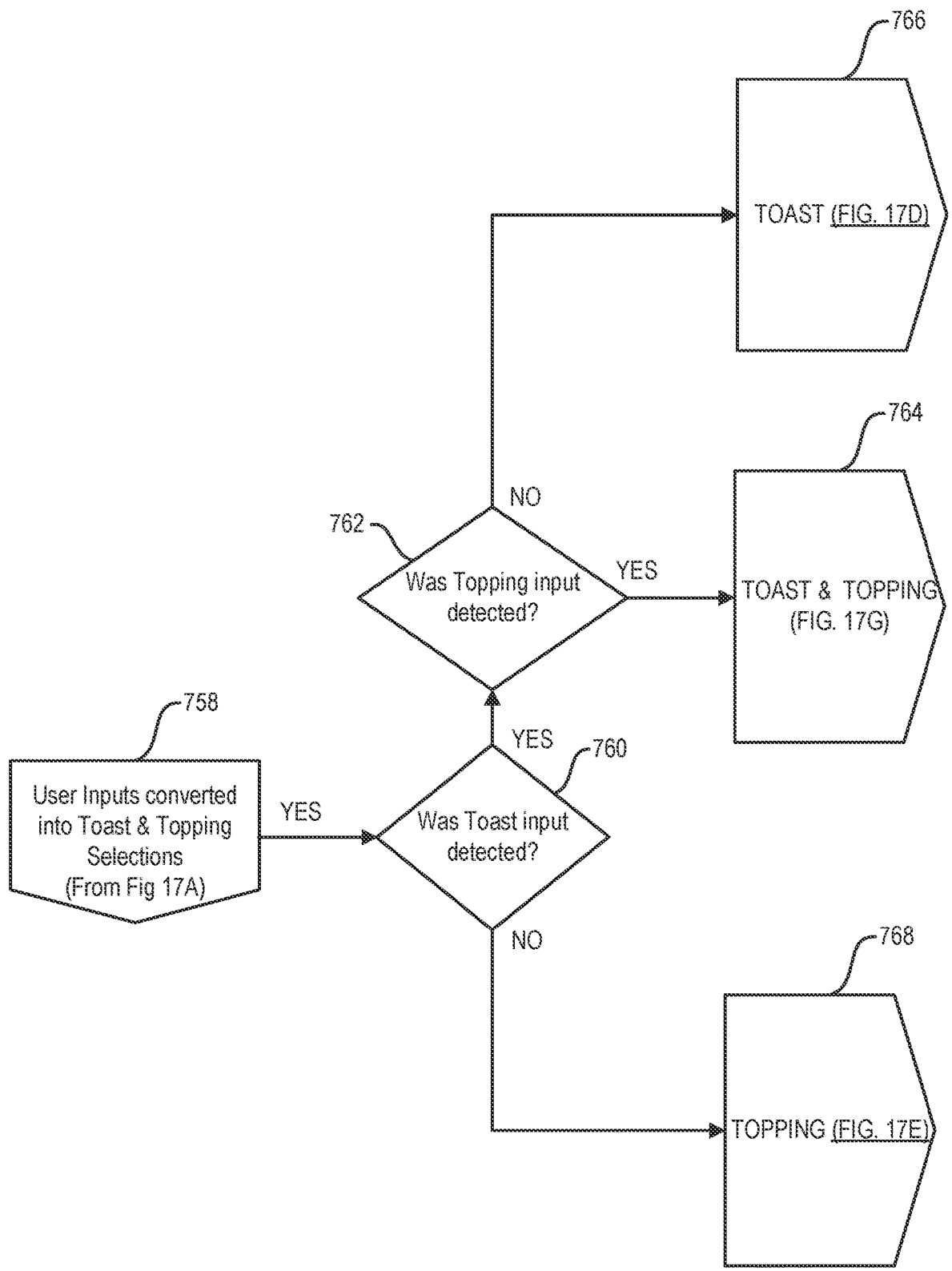
Figure 17D:
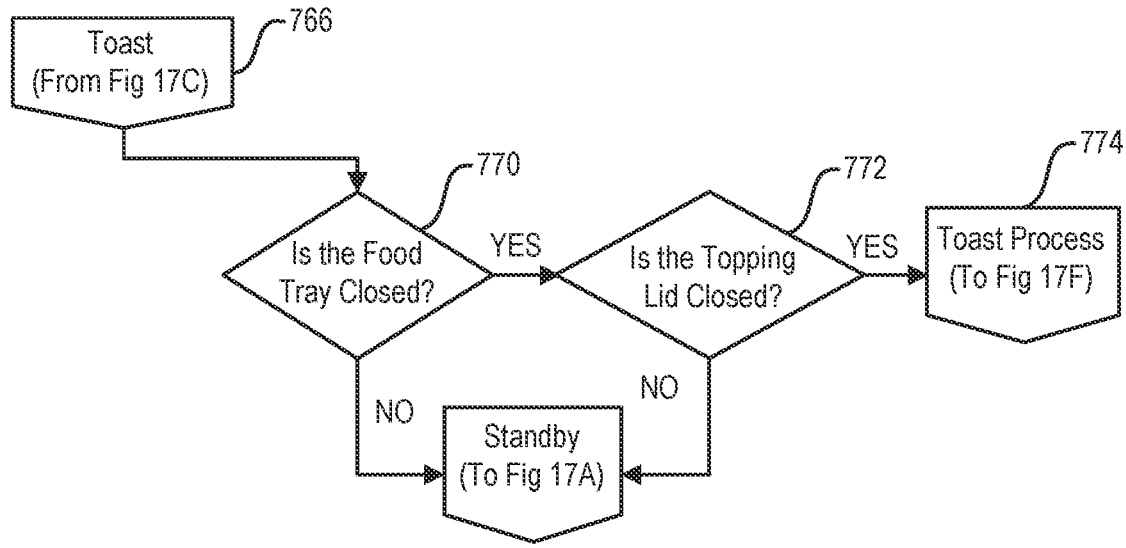
Figure 17E:
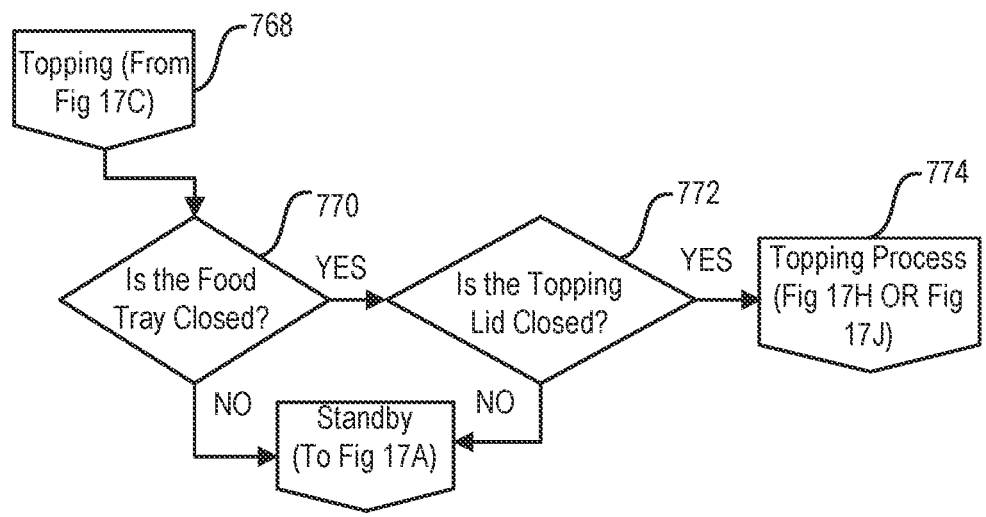
Figure 17F:
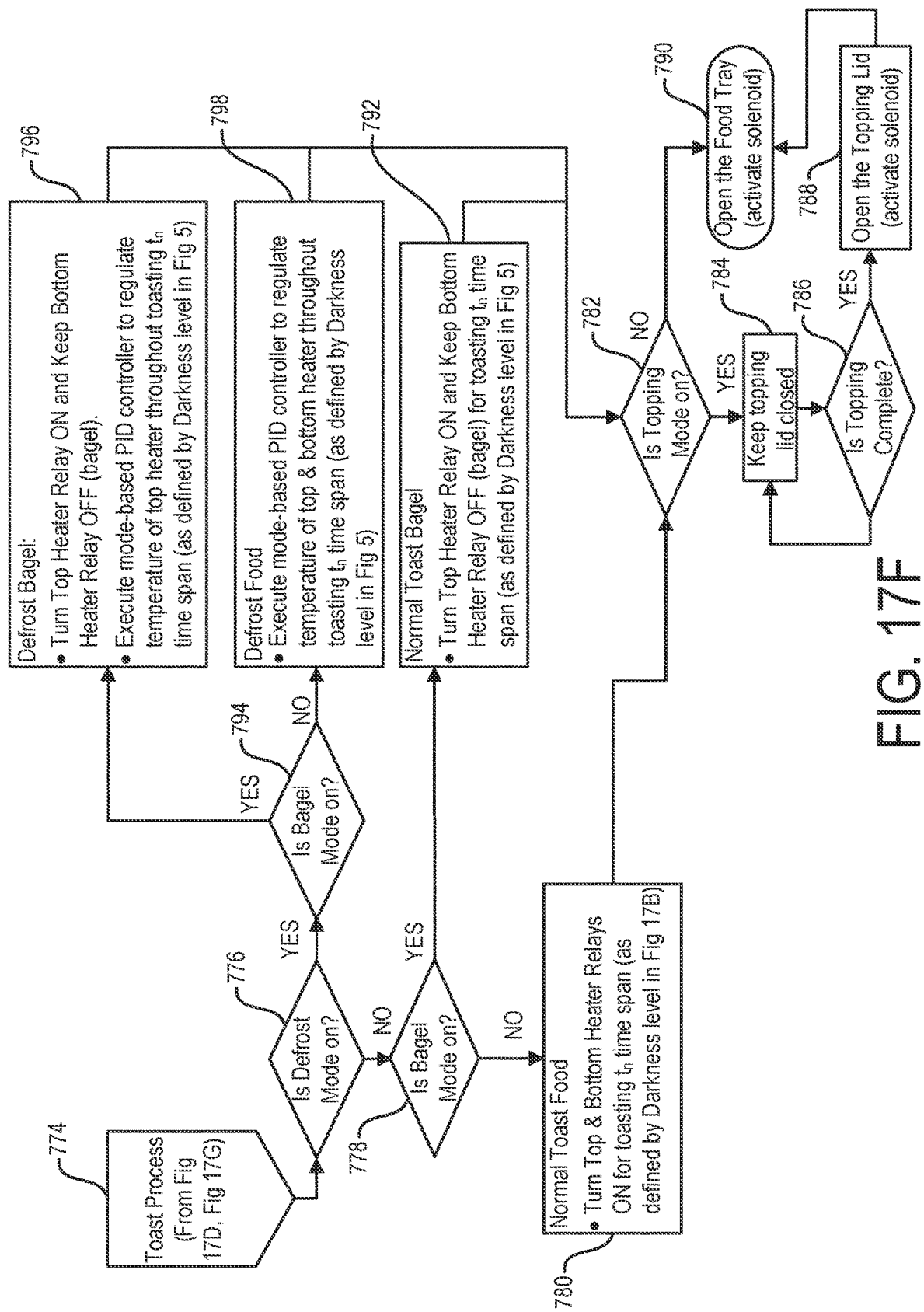
Figure 17G:
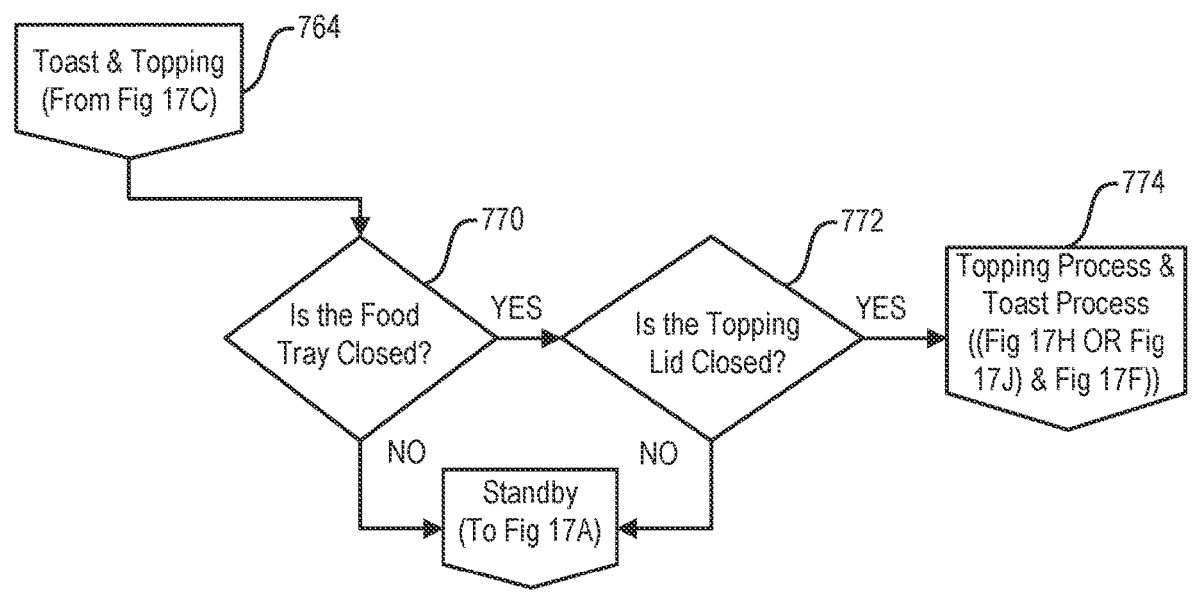
Figure 17H:
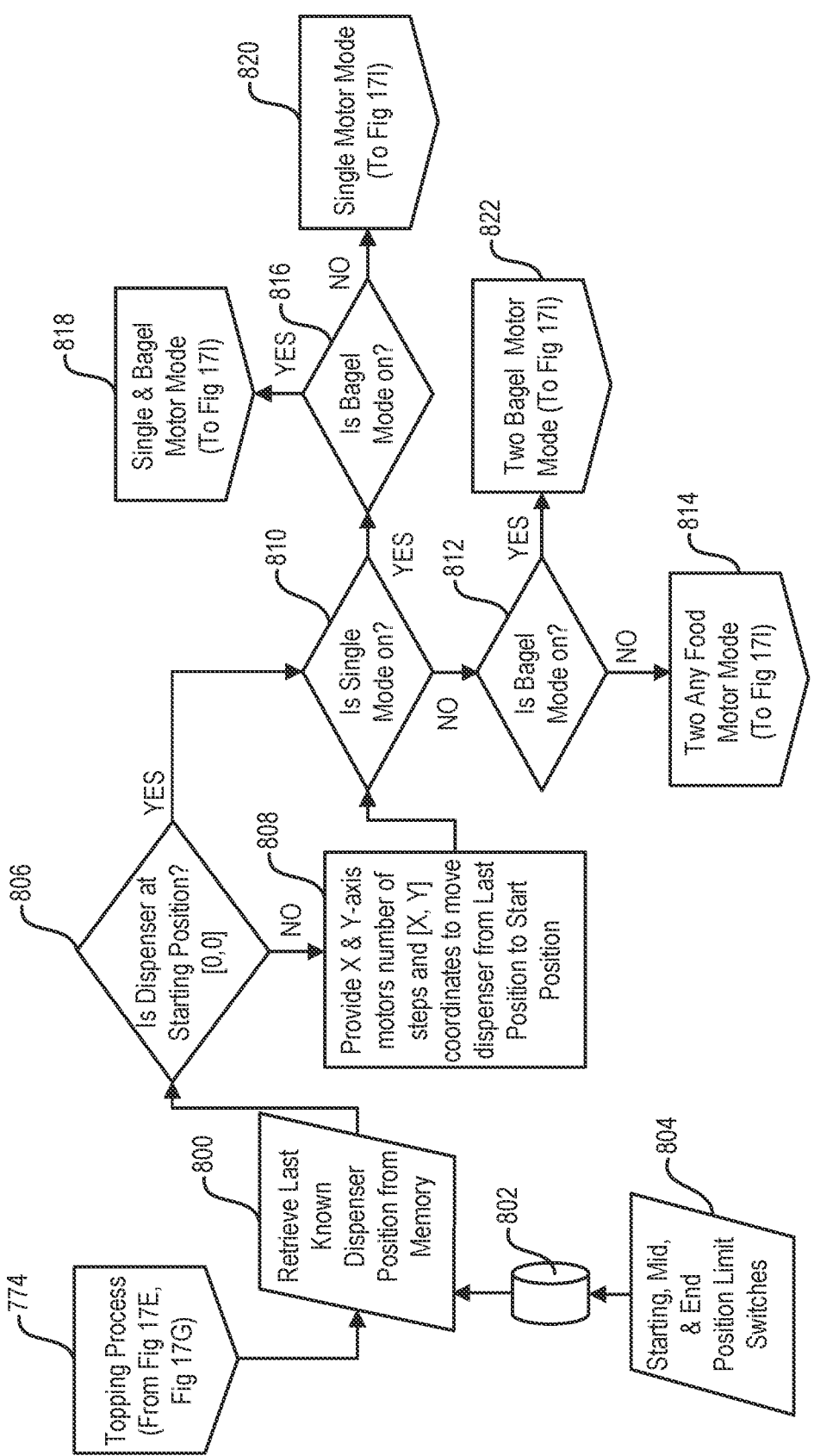
Figure 17I:
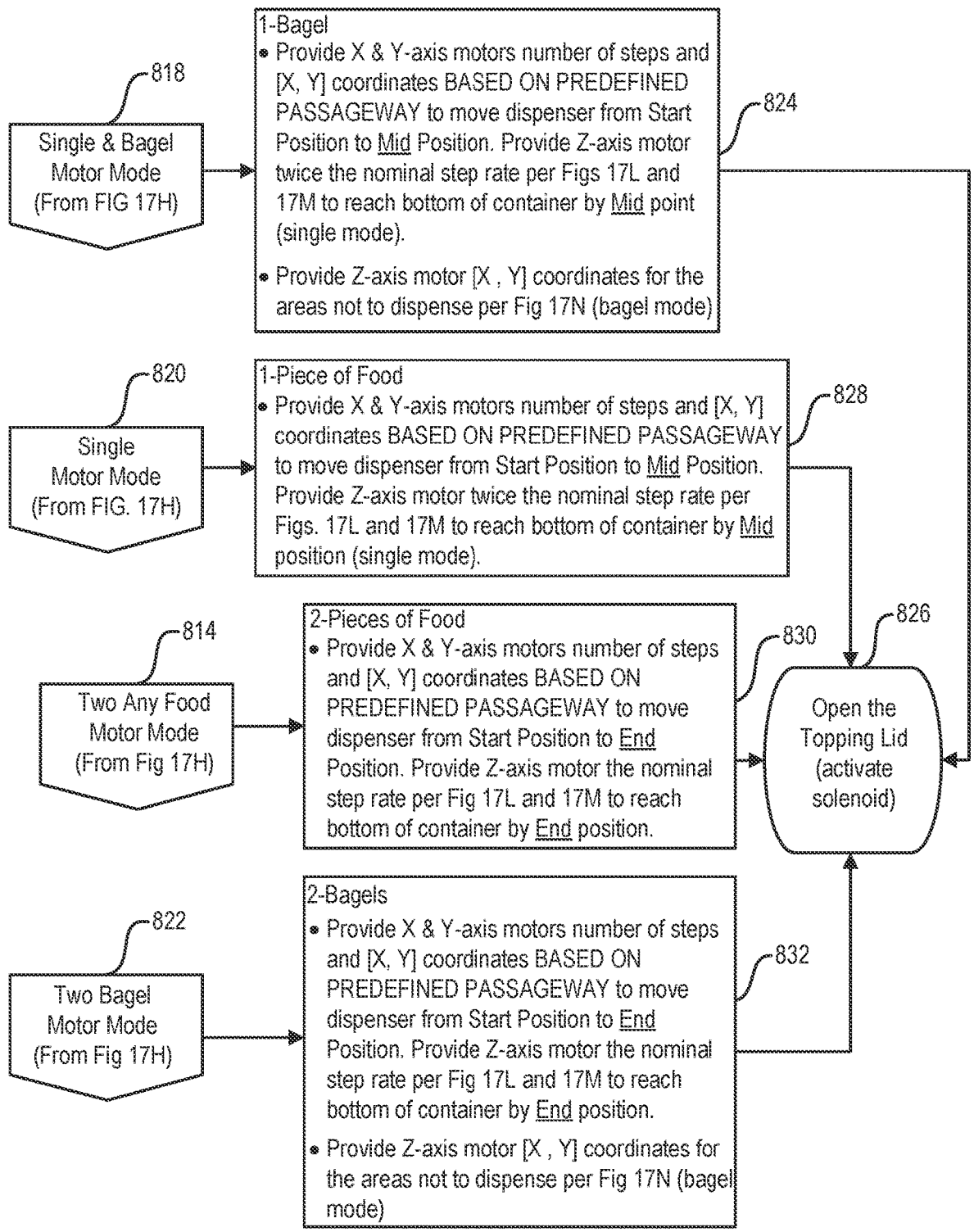
Figure 17J:
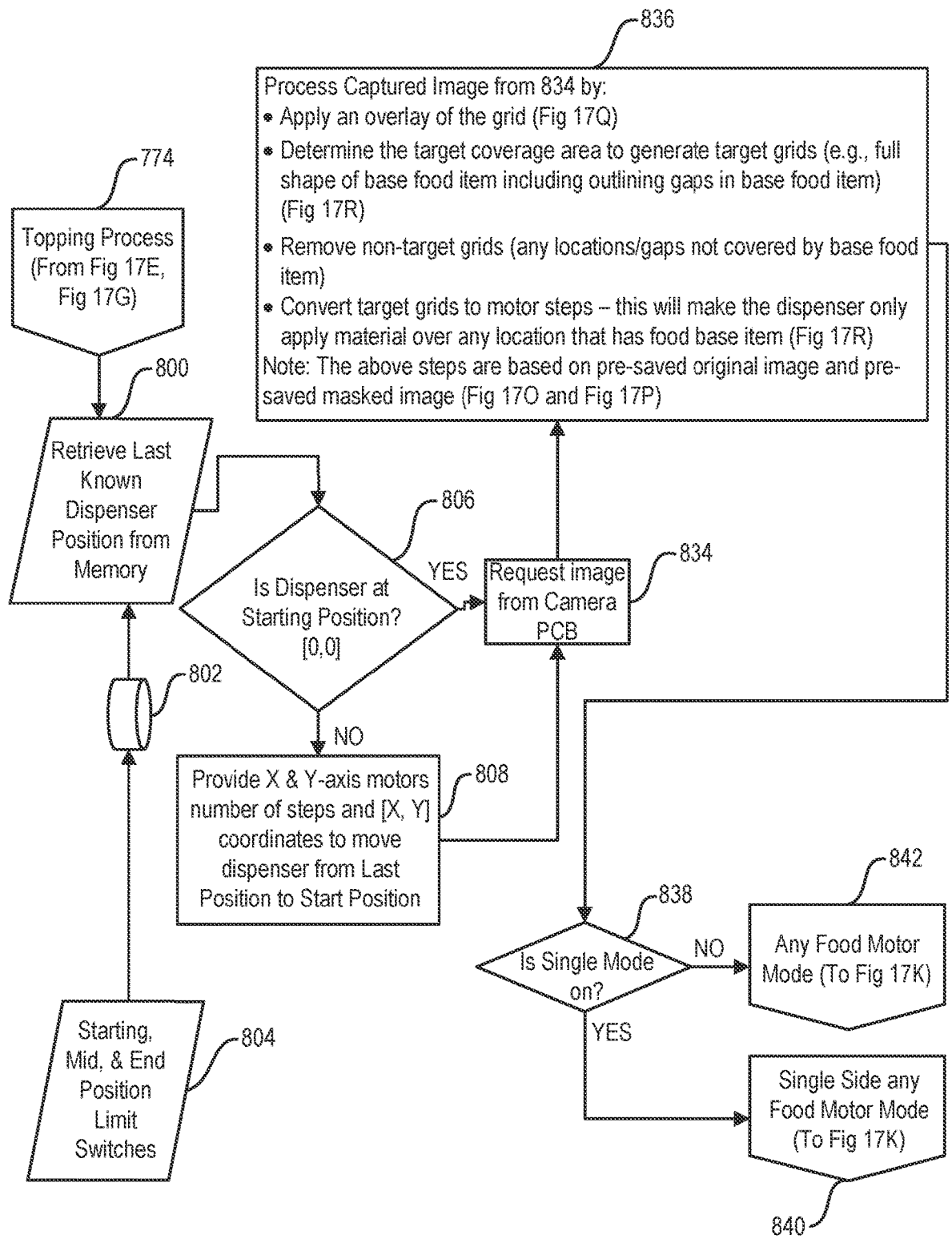
Figure 17K:
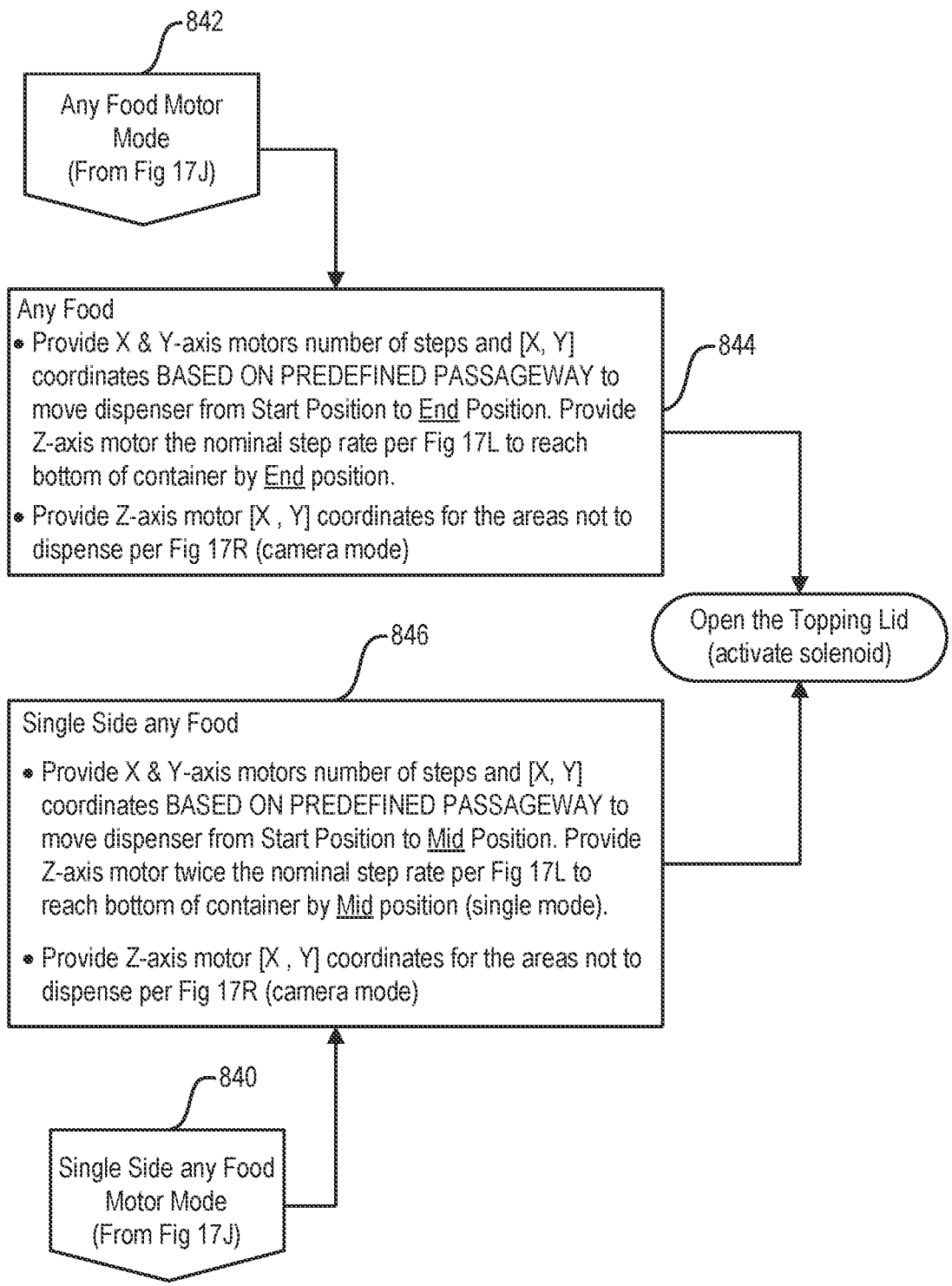
Figure 17L:
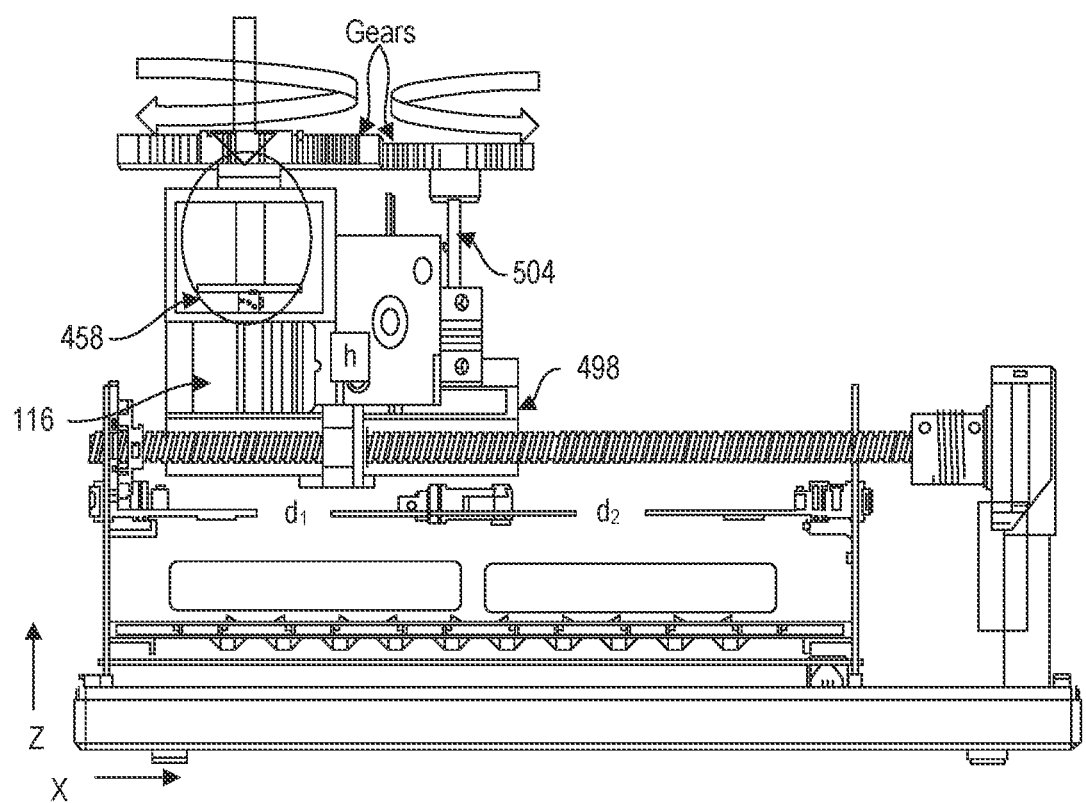
Figure 17M:
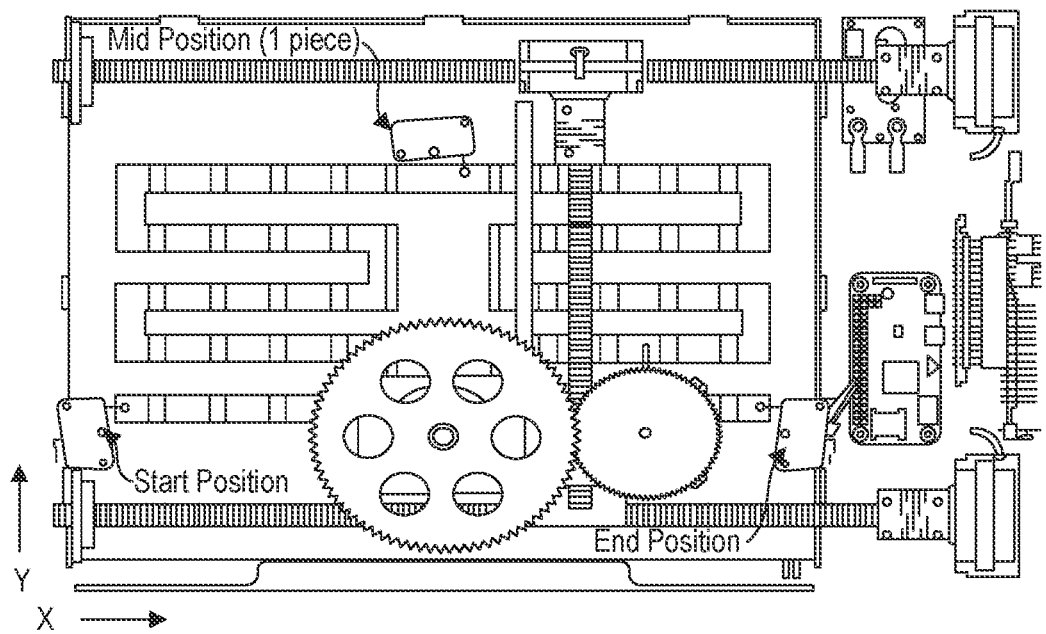
Figure 17N:
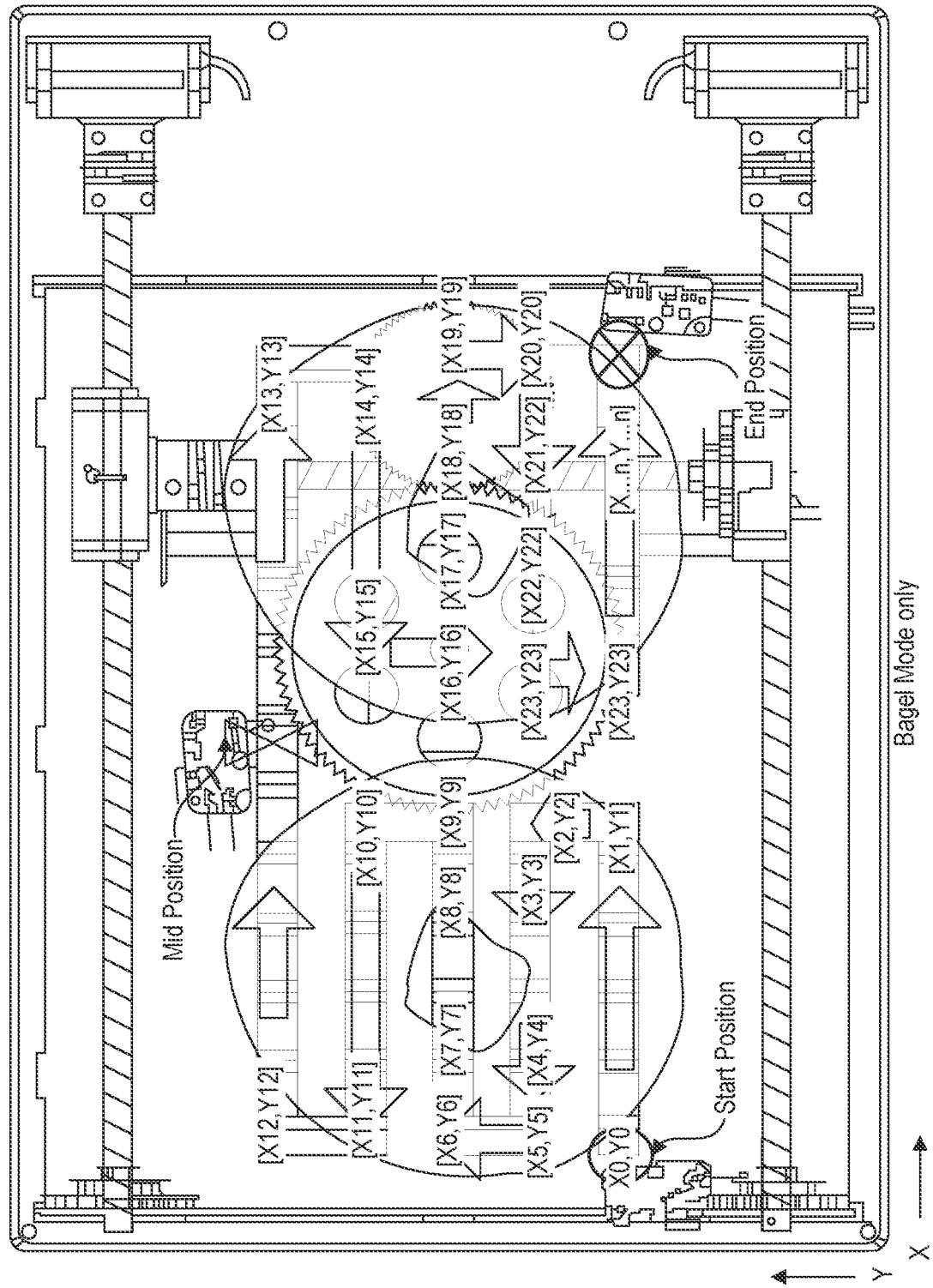
Figure 170:
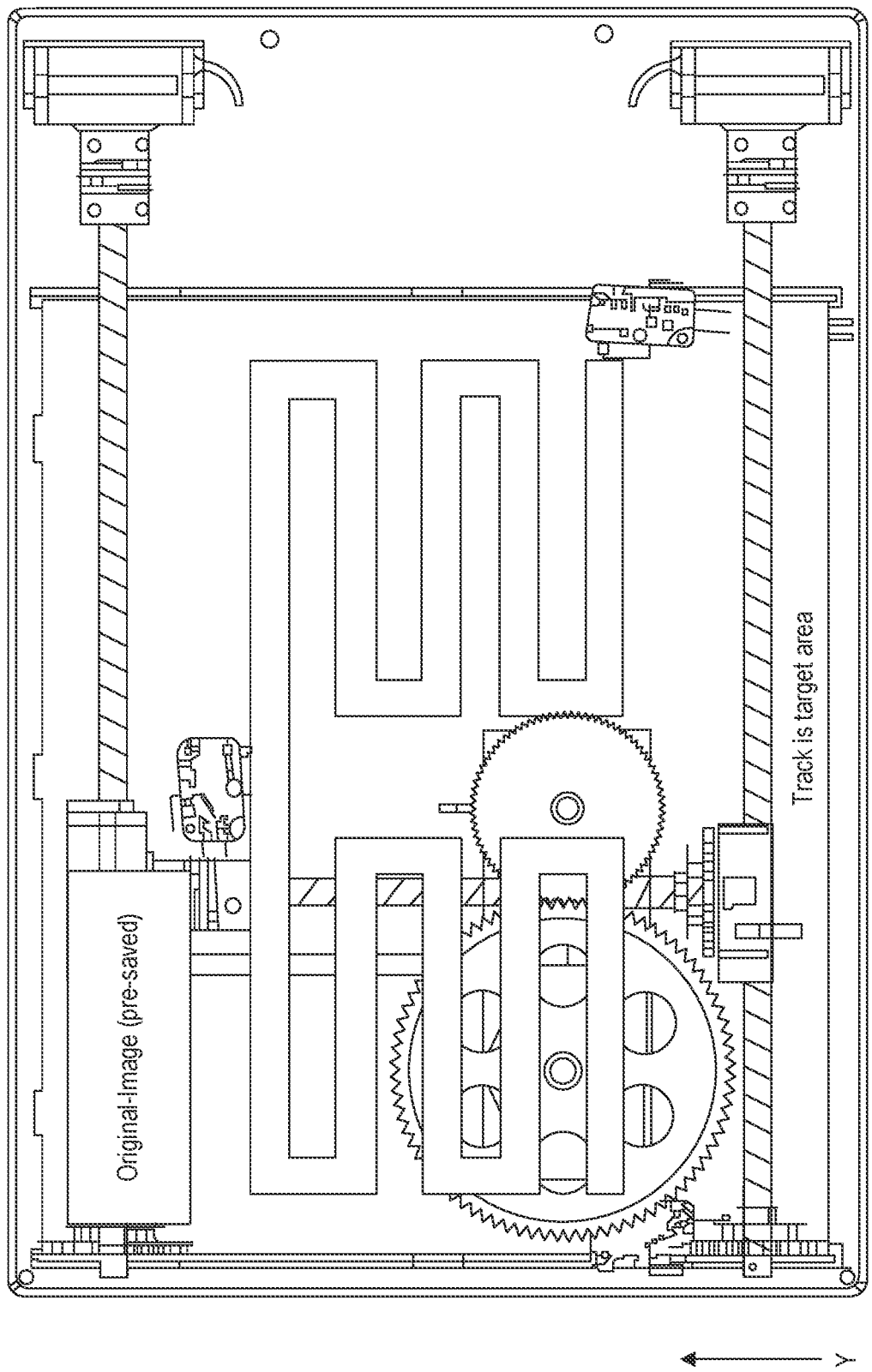
Figure 17P:
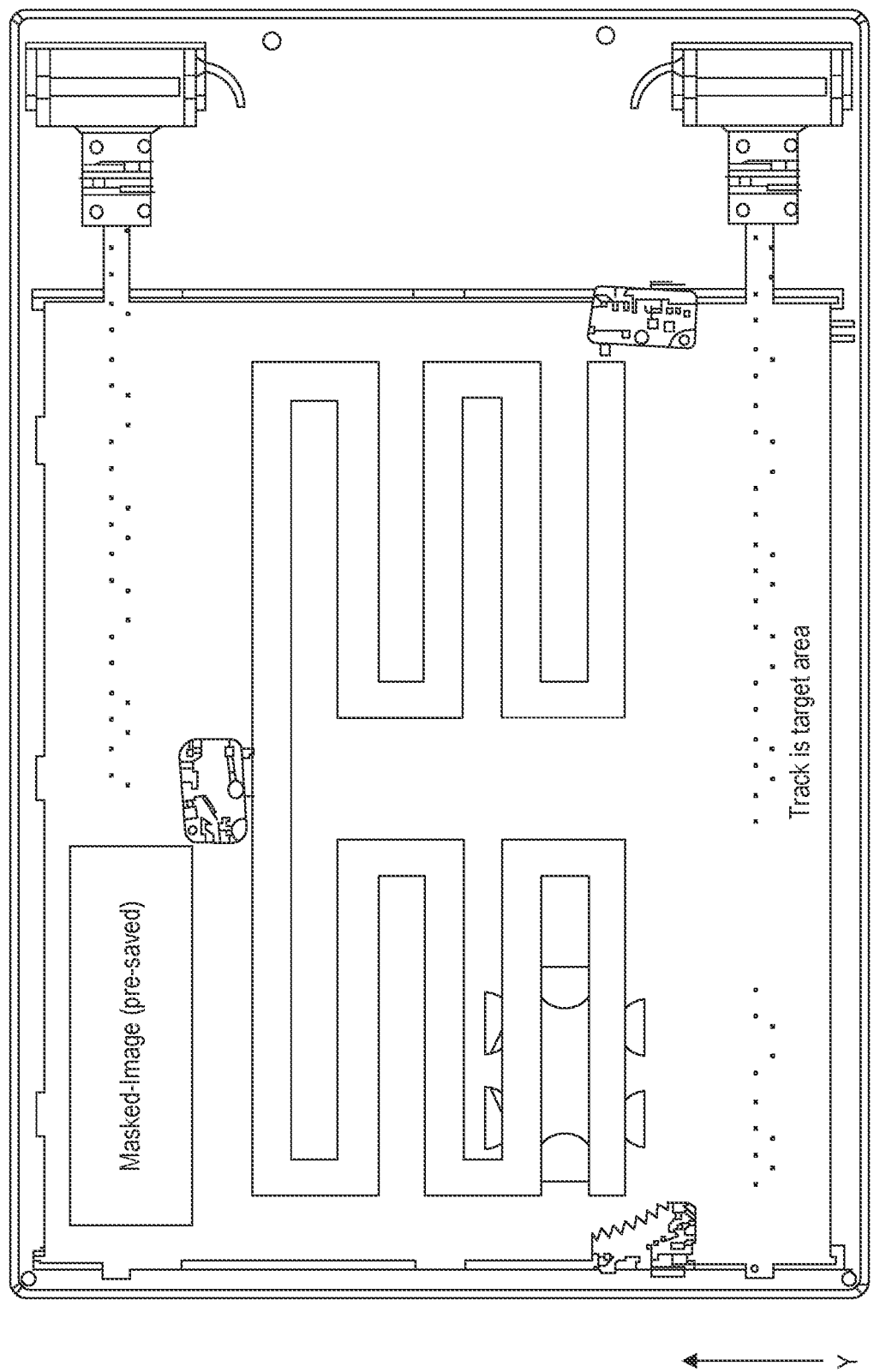
Figure 17Q:
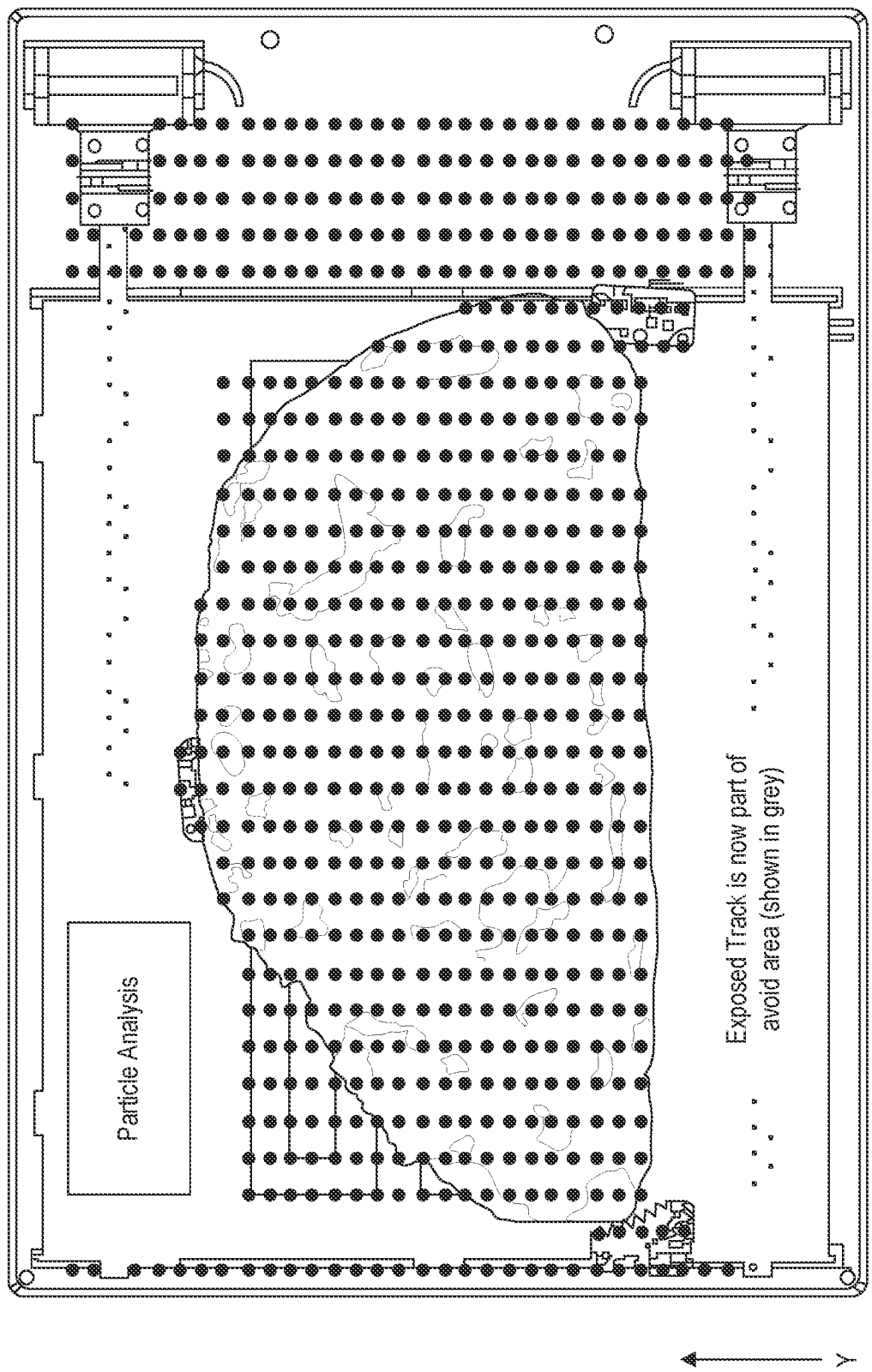
Figure 17R:
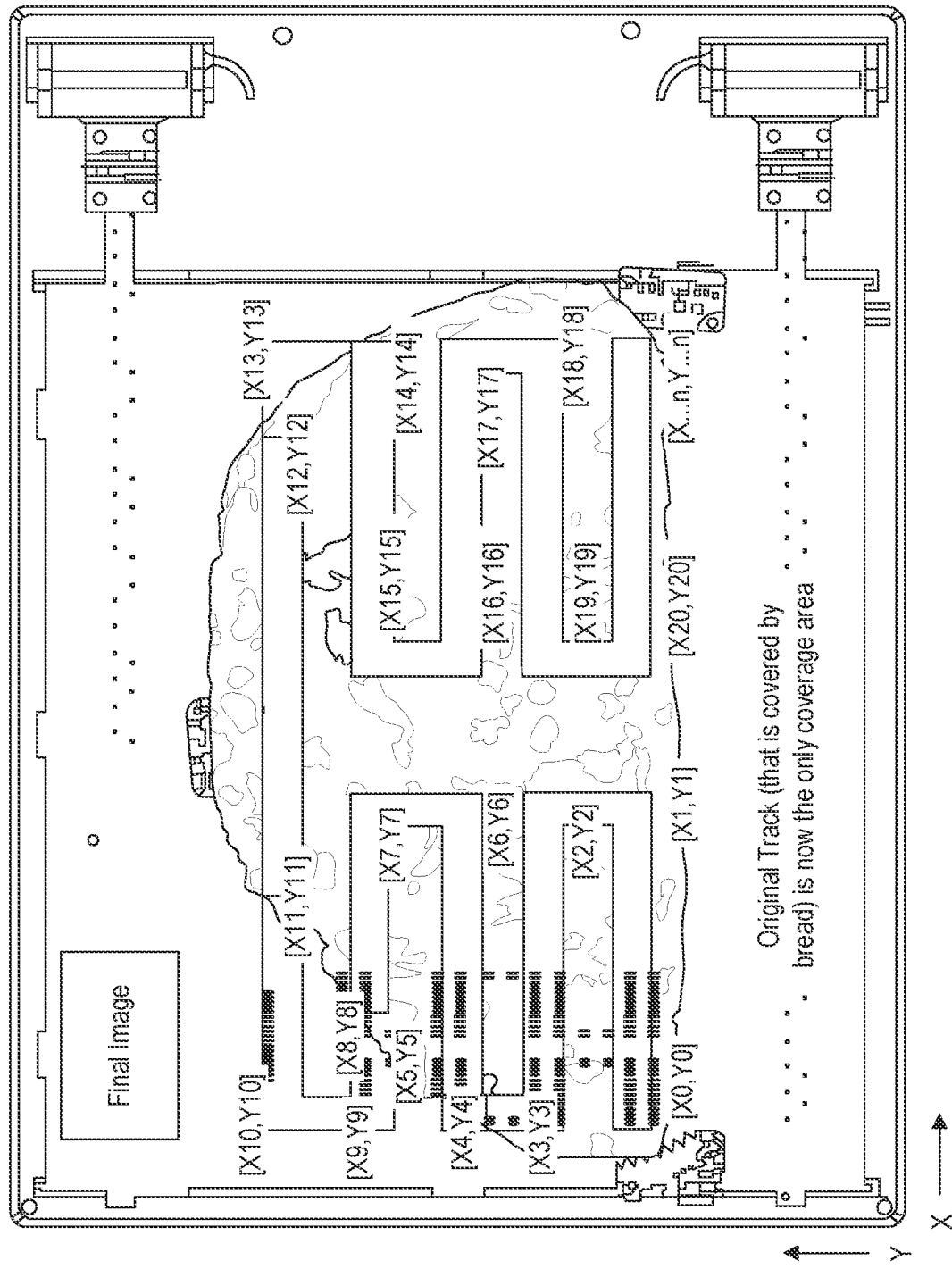

FIGS. 17A to 17R are non-limiting, exemplary illustrations of flow diagrams of controller unit operations of device shown in FIGS. 1A to 16B-2 in accordance with one or more embodiments of the present invention. As illustrated in FIGS. 1A to 17R, controller unit 260 and in fact, the entire device 100 is power ON by power source switch 140 at operation 730 (FIG. 17A).

Once powered, controller unit 260 is initialized at operation 732, and set to standby mode at operation 734. Controller unit 260 remains at standby mode operations 734 until it detects inputs at its various input terminals.

Upon detecting an ON-button actuation (determined at operation 736), controller unit 260 is switched from a standby mode 734 to active mode of operation. When no actuation of Cancel button (operation 740) is detected, controller unit 260 commences an input timer and determines detection of inputs from user interface 102 (front panel PCB 700) and if those inputs were received within a predetermined time limit at operation 742.

Inputs (at terminals 704 of controller unit 260) from user interface 102 (from output terminals 702 of front panel PCB 700) may include any one or more combinations described above, and operationally shown in operations 744 to 756.

It should be noted that Cancel button operation 744 may be performed at any time, where the entire process is halted and controller unit 260 returns to standby mode 736.

As for Darkness Level operation 750, controller unit 260 determines Darkness level operation 750 in accordance with flow control shown in FIG. 17B (indicated by Off-page connecter 774 in FIG. 17A), and returned back to flow control shown in FIG. 17A, indicated by Off-page connecter 782 in FIG. 17A).

As illustrated in FIG. 17B, controller unit 260 determines darkness setting options selected at operation 776 based on user manipulation of a cook-level user interface (or slider) 124 received by front interface PCB 700.

In this non-limiting exemplary instance shown, the present invention provides 6 levels of darkness (cooking levels) as an example only. Accordingly, the darkness levels 778 may be more granulated to a higher degrees or levels or reduced. Each darkness level 778 (Level 0 to Level 5) has its corresponding operations 780, detailed below.

As illustrated, operations 780 are timing for toasting and delaying topping. Controller unit 260 executes a countdown timer when the toast and topping operations are used so that the correct balance of toast darkness can be performed before the toppings 130 are applied. This is a result of the natural toasting process taking longer than the topping process and not having the toppings applied too early so that the bread/food is not toasted and the topping food item 130 is burned.

At any one of the operations 780, controller unit 260 first checks the darkness setting (0-5, with 5 being the darkest) and starts a countdown timer to delay the start of motor control operations. For example, Level 0 darkness setting will result in a 9 second delay, with 3 seconds added for each level of darkness level higher. Therefore, the mid-setting of 3 darkness will result in an 18 second delay (for example) and the highest level of 5 will result in a 24 second delay (for example). Once the timer has reached 0 seconds, the controller unit 260 will start topping operations. Once all timers are set, control returns to flow shown in FIG. 17A. As a final note, Timers ($t_n$ and $d_n$) are set regardless of which Toast or Topping inputs were selected. If topping operations are not selected, then controller unit 260 ignores the topping delay timer ($d_n$). If toast operations are not selected, then controller unit 260 ignores the toast timer ($t_n$). Once timers are set, control returns to flow shown in FIG. 17A, Off-page connector 782.

As further illustrated in FIG. 17A, all timely received user inputs from operations 746 to 756 (with the exception of Cancel button operation 744) are further processed by toast and topping selections flows shown in FIG. 17C, following an Off-page connector 758 in FIG. 17A.

As shown in FIG. 17C, controller unit 260 determines if any one or more combinations of input operations 746 to 756 received included toasting operations 760. If controller unit 260 determines that toasting operations are requested, controller unit 260 determines if topping operations 762 are also requested. Assuming that both toasting operations 760 and topping operations 762 are requested, then operations are directed to flows shown in FIG. 17G as indicated by Off-page connector 764.

If at operation 762 controller unit 260 determines that no topping operation is requested or required, then operations are directed to flows shown in FIG. 17D as indicated by Off-page connector 766.

If controller unit 260 determines that no toasting operations are to be executed (for example, the user has selected to only add topping 130 to base food item 106) without cooking, then operations are directed to flows shown in FIG. 17E as indicated by Off-page connector 768.

Referring back to operation 762, assume that controller unit 260 determines a request for both toasting and topping operations, which would direct flow control to FIG. 17G via Off-page connector 764. This scenario would allow discussions for both toast and topping operational flows.

As illustrated in FIG. 17G, in this non-limiting, exemplary scenario, controller unit 260 determines at respective operations 770 and 772 if main tray 104 and lid (or topping cover 112) are closed, based on signals received from respective tray and lid limiter switches 266 and 270. Although not shown, power is also provided to solenoids 268 and 272 to maintain tray and lid closed as part of device operations. If controller unit 260 determines that lid and tray are closed, toasting and topping process is started (indicated by Off-page connecter 774).

There are two methods of determining topping parameters for a base food item 106, one without an imaging device option (FIGS. 17H and 17I) and the other with the optional imaging device option (FIGS. 17J and 17K). Further, as to which operations (toasting or topping) is executed first, the darkness level settings and its determined timing scheme determine that process, detailed above in relation to FIG. 17B.

In this non-limiting, exemplary instance, assume cooking darkness level 2 for example, controller unit 260 commences toasting operations shown in FIG. 17F and after a predetermined time delay while toasting operations are underway, controller unit 260 also concurrently commences topping operations shown in FIGS. 17H and 17I (assuming no imaging device is used) or, FIGS. 17J and 17K (assuming the optional imaging device is used).

Referring now to toasting operational flows shown in FIG. 17F via Off-page connector 774, at operation 776 controller unit 260 determines if a defrost operation 752 is requested, if no defrost operation 752 is requested, at operation 778 controller unit 260 determines if base food item 106 is a bagel (bagel operation 754 is requested). If no defrost and no bagel operations are requested, then controller unit commences a simple toasting at operation 780. At operation 780, controller unit 260 powers second heater assembly 256 and first heater assembly 254 via power relay PCB 258 for a toasting to time span (as defined by darkness level in FIG. 17B).

At operation 782 controller unit determines if topping operations are active at which point, controller unit 260 will continue to maintain topping cover 112 closed at operation 784 and 786. Once topping operations are complete, controller unit 260 at operation 788 opens topping cover 112 by activating solenoid 272. For the scenario where no topping operation is requested, controller unit 260 simply opens main tray 104 by activating solenoid 268 at operation 790.

Referring back to operation 778, assuming that controller unit 260 determines that base food item 106 is a bagel (bagel operation 754 is requested), then controller unit 260 commences operation 792 for toasting bagel. At operation 792, controller unit 260 powers ON second heater assembly 256 and OFF first heater assembly 254 via power relay PCB 258 for a toasting $t_n$ time span (as defined by darkness level in FIG. 17B).

Referring back to operation 776, if controller unit 260 determines that a defrost operation 752 is requested, and that base food item is a bagel (operation 794), at operation 796 controller unit 260 commences to defrost a bagel powering ON second heater assembly 256 and OFF first heater assembly 254 via power relay PCB 258 using a model-based proportional-integral-derivative (PID). Controller unit 260 using PID to regulate temperature of 256 and 254 throughout toasting $t_n$ time span (as defined by darkness level in FIG. 17B).

A model based proportional-integral-derivative (PID) controller without the feedback loop (well known) is used to power cycle on/off the heater relays at 258 every $t_{cyc}$ time interval throughout toasting $t_n$ time span (as defined by Darkness level in FIG. 17B) plus an additional tad time span (e.g., 30 sec) to allow lower average heat allowing the frozen contents to melt without burning the outer surface of the food. For example, with Level 0 darkness set, the $t_n$=30 seconds, plus an additional defrost time of 30 seconds brings the total defrost toast time to 60 seconds. The power cycle on/off will occur 20 times (or every 3 seconds).

Referring back to operation 794 and assuming that defrost operation 752 is not for a bagel, then at operation 798 controller unit 260 executes model-based PID controller to regulate temperature of 254 and 256 throughout toasting to time span (as defined by Darkness level in FIG. 17B).

While toasting operations are underway (as detailed in FIG. 17F) for a base food item 106, topping operations (17H and 17I or 17J and 17K) commence after a delay determined by operations of controller unit 260 shown discussed in FIG. 17B. Assuming topping operations without the use of the optional imaging device (FIGS. 17H and 17I), at operation 800 controller unit 260 retrieves last known position of dispenser mechanism 114 from controller unit memory 802, which were read (operation 804) from limit switches Start 288, middle 290, and final (or end) 292.

Once position data is retrieved at operation 800, controller unit 260 at operation 806 determines if dispenser mechanism 114 is at the start position (e.g., point (0,0). If controller unit 260 determines that 114 is not at start position, at operation 808 controller unit 260 provides motors 286 the number of steps and (X, Y) coordinates to move 114 from Last Known Position to Start Position via 284.

If controller unit 260 at operation 806 determines that 114 is at start position, then at operations 810 controller unit 260 determines if base food item 106 is a single food item (single mode operation 756 for single slice of bread). If controller unit 260 determines that no single mode operation 756 is entered, then at operation 812 controller unit 260 determines if bagel mode operation 754 was entered. If at operation 812 controller unit 260 determines that no bagel mode operation 754 was entered, then control is directed to topping operations in FIG. 17I (via Off-page connector 814).

Referring back to operation 812, if controller unit 260 determines that a bagel mode operation 754 was entered, then control is directed to topping operations in FIG. 17I (via Off-page connector 822).

Referring back to operation 810, if controller unit 260 determines that base food item 106 is a single food item (single mode operation 756 for single slice of bread), then at operation 816 controller unit 260 determines if single mode operation 756 is for a bagel mode operation 754. If single and bagel mode operations are entered, then control is directed to topping operations in FIG. 17I (via Off-page connector 818). On the other hand, if only single mode operation 756 is entered but not bagel mode operations 754, then control is directed to topping operations in FIG. 17I (via Off-page connector 820).

Referring to FIG. 17I, for a single bagel base food item, controller unit 260 executes operation 824, which includes providing X & Y-axis motors the number of steps and (X, Y) coordinates based on predefined passageway pattern 452 to move dispenser mechanism 114 from Start Position to mid Position.

Further at operation 824, controller unit 260 also provides Z-axis motor twice the nominal step rate (as detailed in FIGS. 17L and 17M) to empty cartridge 116 by mid-point (single mode operation).

Additionally, at operation 824 controller unit 260 also provide Z-axis motor (X, Y) coordinates for the areas not to dispense (as detailed in FIG. 17N) for bagel mode operations.

Referring to FIGS. 17L and 17M, the motors and lead screws are designed to be precision controlled to an accuracy of about 0.0393701 inches (1 mm) per motor step or per one screw rotation.

The height 522 of cartridge 116 is represented by "h" and the distance the dispenser has to travel while applying toppings in for typical two pieces of food 106 is "$d_1+d_2$".

When topping, compressor 454 travels downward via compressor-driver 456 in the z-axis for h distance which is the bottom of cartridge 116. This movement forces topping food item 130 out of egress portal 296 from cartridge 116.

The speed of the rate for compressor-driver 456 (or how fast the motor steps) for it to corkscrew down and push out food item 130 from cartridge 116 is the rate equivalent to compressor 454 reaching the bottom of cartridge 116 at the same time the Topping Dispenser reaches the End position for two pieces of food.

Represented mathematically:

$$r=h/t_h$$

and for two pieces of food: $t_h=t_{d1+d2}$ therefore, $r=h/t_{d1+d2}$ where:

$t_h$=Time it takes to execute the Number of Z-axis Steps to travel distance h $t_{d1+d2}$=Time it takes to execute the Number of X-axis Steps to travel distances $d_1+d_2$ r=Typical 2 Piece of Food Z-axis step Rate.

For 2 pieces of food example:

If cartridge height 522, h, is equal to 1.97 inches and $d_1$ and $d_2$ are 5 inches each, and 1 step distance is 0.03937 inches, then it will take 254 X-axis motor steps to reach the end position, and 50 X-axis motor steps to travel h. Setting the time for to travel h equal to $d_1+d_2$, the X-axis to Z-axis motor ratio is 5.076142 steps per second, therefore, to travel h it will take 9.86 seconds (50 steps/5.076142 steps/sec).

For 1 piece of food example:

Using the motor rate ratio of 5.076142 and considering d1 is half of d1+d2, and the same distance h needs to be travelled, then Z-axis motor rate needs to be doubled at 10.15228, therefore, to travel hit will take half the time at 4.92874 seconds ensuring cartridge 116 is emptied when it reaches the mid position.

Referring to FIG. 17N, the X & Y-axis motors number of steps and (X, Y) coordinates are based on predefined passageway 452 to move dispenser from Start Position to the Mid Position and End Position. This is represented by the $(X_n, Y_n)$ coordinates that describe the passageway. For every change in direction, there are an associated (X, Y) coordinate to follow, $(X_0, Y_0)$, $(X_1, Y_2)$, $(X_2, Y_2)$, etc.

The Z-axis plunger 458 pushes topping food item out of the cartridge 116 as the dispenser travels along the X, Y directions at the appropriate rate as described in FIG. 17L. When the bagel mode is activated, the Z-axis step rate does not change. Instead, the plunger 458 is temporarily paused when there are areas where no food is beneath the dispensing point 296 to avoid spill over. As a result, when the dispenser reaches the final destination (Mid or End Position) in bagel mode, the cartridge will not be fully emptied.

The Z-axis motor is told to pause by the controller when the predefined X, Y coordinates for a typical bagel hole is reached.

For Single Bagel example:

The dispenser will begin at $(X_0, Y_0)$ and plunger 458 will begin to press down in the Z-axis as it travels to $(X_1, Y_1)$, and continue to $(X_2, Y_2)$, and continue to $(X_3, Y_3)$ at which the Z-axis motor will pause because $(X_3, Y_3)$ has been defined as the beginning of the bagel hole. The Z-axis motor will resume at ($X_4$, $Y_4$) as the end of the bagel hole was reached, and it will continue pressing through ($X_7$, $Y_7$), and pause as the bagel hole was reached again, and resume at ($X_8$, $Y_8$) through the Mid position.

Referring back to operation 824 shown in FIG. 17I, controller unit 260 opens top cover 112 at operation 826. The remaining operations 828 to 832 shown in FIG. 17I are similar to those for operations 824, which follow the patterns detailed in FIGS. 17L to 17N.

Referring back to FIG. 17G and operation 774 with the assumption that an optional imaging device is used for topping, FIG. 17J is an exemplary illustration of a flow control for topping using an imaging device. As illustrated in FIG. 17J, for image processing of base food item 106, at operation 834 controller unit 260 request image of base food item 106 from image capturing device PCB 706, where controller unit 260 processes that image at operation 836.

It should be noted that prior to commencement of operations 836 by controller unit 260 when an image of a base food item 106 is received, controller unit 260 retrieves predetermined masked topographical image of target area (FIG. 17P). As illustrated in FIG. 17O, as a first step to generate masked topographical image of target area, an image of the pattern 452 of 256, including position of 114 at (0,0,0) and limiters are captured. Next, as shown in FIG. 17P, a masked topographical image of target area is generated from the original image shown in FIG. 17O and saved in memory 802 during manufacture.

The masked topographical image of target area shown in FIG. 17P is retrieved by controller unit 260 and is used in operation 836. As indicated in operation 836, a first step in image processing is to superimpose a captured image of base food item 106 from operation 834 onto masked topographical image of target area, shown in FIG. 17Q. Thereafter, apply an overlay of a dotted-grid over the superimposed image (best shown in FIG. 17Q). The dotted-grid enables controller unit 260 at operation 836 to determine the target coverage area to generate target-grids (e.g., full shape of base food item including outlining gaps on base food item 106). Gaps are those areas where pattern 452 is still visible.

Once target-grids are determined, controller unit 260 remove non-target grids (any locations/gaps not covered by base food item 106), best shown in FIG. 17R. Controller unit 260 also convert target grids to motor steps—this will make the 114 to only apply topping food items 130 over any location that has base food item 106.

In particular, the X & Y-axis motors, the number of steps and (X, Y) coordinates are based on predefined passageway 452 to move dispenser from Start Position to the Mid Position and End Position. This is represented by the ($X_n$, $Y_n$) coordinates that describe the passageway. For every change in direction, there are an associated (X, Y) coordinate to follow, ($X_0$, $Y_0$), ($X_1$, $Y_2$), ($X_2$, $Y_2$), etc.

The Z-axis Press pushes topping food item 130 out of the topping cartridge as the dispenser travels along the X, Y directions at the appropriate rate as described above.

When the camera is used, the X, Y directions defaults are overwritten by the latest image data which will then be used similar to FIG. 17N where the Z-axis motor is told to pause when the unique X, Y coordinates for areas to be ignored is reached.

For Large Food example:

The dispenser 114 will begin at ($X_0$, $Y_0$) and the plunger will begin to press down in the Z-axis as it travels to ($X_1$, $Y_1$), and continue to ($X_2$, $Y_2$), and continue to ($X_3$, $Y_3$), and continue to ($X_4$, $Y_4$) at which the Z-axis motor will pause because ($X_4$, $Y_4$) has been identified by the image processing as the beginning of a gap that does not have food. The Z-axis motor will resume at ($X_5$, $Y_5$) as the end of the gap was reached, and it will continue pressing through ($X_8$, $Y_8$), and pause as another gap was reached, and resume at ($X_{11}$, $Y_{11}$) and follow similar logic until the End position.

Referring back to FIG. 17J, once operation 836 is completed, controller unit at operation 838 determines if single mode operation 756 was entered. It should be noted that operation 756 is optional and is available for redundancy. That is, single mode 756 is shown as a redundant functionality as the camera can determine if a single piece is used.

It should also be noted that bagel mode 754 is not shown in FIG. 17J with the camera option due to the camera image processing providing a more accurate representation of the bagel shape and center hole gap as compared to the predefined [X, Y] locations in the non-camera option (FIG. 17H).

Referring back to operation 838, if controller unit 260 determines entry of a single mode operation 756, operations continue on FIG. 17K via Off page connector 840 otherwise, operations continue via Off page connector 842 (also FIG. 17K). Assuming there is not entry for single mode operation (756), then operation 844 shown in FIG. 17K is executed otherwise, operation 846 is executed.

Operation 844 is comprised of controller unit 260 providing X & Y-axis motors the number of steps and (X, Y) coordinates based on the predefined passageway 452 to move dispenser from Start Position to End Position. Additionally, controller unit 260 is also to provide Z-axis motor the nominal step rate to reach bottom of cartridge 116 by End position, as detailed above. Further, controller unit is also to provide Z-axis motor (X, Y) coordinates for the areas not to dispense as detailed above (camera mode).

Operation 846 includes provide X & Y-axis motors the number of steps and (X, Y) coordinates based on predefined passageway 452 to move dispenser from Start Position to mid Position. Also, provide Z-axis motor twice the nominal step rate to reach bottom of cartridge 116 by mid position (single mode), as detailed above. Further, controller unit 260 also provides Z-axis motor the (X, Y) coordinates for the areas not to dispense per FIG. 17R (camera mode).

Although the invention has been described in considerable detail in language specific to structural features and or method acts, it is to be understood that the invention defined in the appended claims is not necessarily limited to the specific features or acts described. Rather, the specific features and acts are disclosed as exemplary preferred forms of implementing the claimed invention. Stated otherwise, it is to be understood that the phraseology and terminology employed herein, as well as the abstract, are for the purpose of description and should not be regarded as limiting. Further, the specification is not confined to the disclosed embodiments. Therefore, while exemplary illustrative embodiments of the invention have been described, numerous variations and alternative embodiments will occur to those skilled in the art. For example, including more than one cartridge housing 632 on topping dispenser mechanism 114 to use more than one food item for topping. For example, two cartridge housings 632 may be positioned adjacent one another wherein their respective egress portals 296 are combined together with a well-known Y-connector manifold structure. In this non-limiting, exemplary instance, the final egress portal would be the output from the Y-connector. Further, same mechanism detailed above and used to move topping food item 130 out of the first, original cartridge 116 may be used for the adjacently added cartridge housing with its cartridge. Such variations and alternate embodiments are contemplated, and can be made without departing from the spirit and scope of the invention.

It should further be noted that throughout the entire disclosure, the labels such as left, right, front, back, top, inside, outside, bottom, forward, reverse, clockwise, counter clockwise, up, down, or other similar terms such as upper, lower, aft, fore, vertical, horizontal, lateral, oblique, proximal, distal, parallel, perpendicular, transverse, longitudinal, etc. have been used for convenience purposes only and are not intended to imply any particular fixed direction, orientation, or position. Instead, they are used to reflect relative locations/positions and/or directions/orientations between various portions of an object.

In addition, reference to "first," "second," "third," and etc. members throughout the disclosure (and in particular, claims) is not used to show a serial or numerical limitation but instead is used to distinguish or identify the various members of the group.

Further the terms "a" and "an" throughout the disclosure (and in particular, claims) do not denote a limitation of quantity, but rather denote the presence of at least one of the referenced item.

The use of the phrases "and or," "and/or" throughout the specification (if any used) indicate an inclusive "or" where for example, A and or B should be interpreted as "A," "B," or both "A and B."

In addition, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of," "act of," "operation of," or "operational act of" in the claims herein is not intended to invoke the provisions of 35 U.S.C. 112, Paragraph 6.

What is claimed is:

1. A device for cooking and topping of food, comprising:
   a cooker;
   a topper;
   a tray for positioning a base food item within the device; and
   a control panel for turning ON the cooker, the topper, or both the cooker and the topper, wherein:
      the base food item on the tray is cooked and topped with a topping food item if both the cooker and the topper are ON;
      the base food item on the tray is cooked without the topping food item if the cooker is ON and the topper if OFF;
      the base food item on the tray is topped with the topping food item without cooking if the topper is ON and the cooker is OFF;
   the topping food item is contained within a replaceable topping cartridge;
   the cooker is comprised of:
   a heater for cooking, with the heater including:
   a first heater assembly positioned below the tray and a second heater assembly positioned above the tray;
   the topping food item is contained within a replaceable topping cartridge, which is removably secured within a topping dispenser;
   the topping dispenser is positioned above the second heater assembly.

2. The device for cooking and topping of food as set forth in claim 1, wherein:
   the topping cartridge is removably secured within a topping dispenser.

3. The device for cooking and topping of food as set forth in claim 1, wherein:
   the second heater assembly is comprised of a dispensing passage to allow topper to dispense topping food item directly onto the base food item.

4. The device for cooking and topping of food as set forth in claim 1, wherein:
   the topper includes:
   a motive system; and
   a topping dispenser;
   wherein: the motive system moves the topping dispenser over the base food item while dispensing the topping food item.

* * * * *